United States Patent
Bassett

(10) Patent No.: US 10,506,755 B2
(45) Date of Patent: Dec. 17, 2019

(54) AGRICULTURAL SYSTEMS

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 15/695,785

(22) Filed: Sep. 5, 2017

(65) Prior Publication Data
US 2017/0359940 A1 Dec. 21, 2017

Related U.S. Application Data

(63) Continuation of application No. 14/974,087, filed on Dec. 18, 2015, now abandoned, which is a
(Continued)

(51) Int. Cl.
*A01B 49/06* (2006.01)
*A01B 61/04* (2006.01)
(Continued)

(52) U.S. Cl.
CPC ............ *A01B 61/048* (2013.01); *A01B 49/06* (2013.01); *A01B 61/044* (2013.01);
(Continued)

(58) Field of Classification Search
CPC ......... A01B 49/06; A01B 49/04; A01B 49/00; A01B 61/044; A01B 61/04; A01B 61/00;
(Continued)

(56) References Cited

U.S. PATENT DOCUMENTS

| 114,002 A | 4/1871 | Godfrey |
| 123,966 A | 2/1872 | Wing |

(Continued)

FOREIGN PATENT DOCUMENTS

| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).
(Continued)

*Primary Examiner* — Christopher J. Novosad
(74) *Attorney, Agent, or Firm* — Nixon Peabody LLP

(57) ABSTRACT

An agricultural implement includes at least one row unit having a plurality of support members, each of which is pivotably coupled to an attachment frame or another of the support members to permit vertical pivoting vertical movement of the support members, and a plurality of soil-engaging tools, each of which is coupled to at least one of the support members. A plurality of hydraulic cylinders are coupled to the support members for urging the support members downwardly toward the soil. A plurality of controllable pressure control valves are coupled to the hydraulic cylinders for controlling the pressure of hydraulic fluid supplied to the cylinders. A plurality of sensors produce electrical signals corresponding to predetermined conditions, and a controller is coupled to the sensor and the controllable pressure control valves. The controller receives the electrical signals from the sensors and produces control signals for controlling the pressure control valves.

8 Claims, 76 Drawing Sheets

Related U.S. Application Data continuation of application No. 14/146,822, filed on Jan. 3, 2014, now Pat. No. 9,232,687, which is a continuation-in-part of application No. 13/893,890, filed on May 14, 2013, now Pat. No. 9,107,338, which is a continuation-in-part of application No. 13/861,137, filed on Apr. 11, 2013, now Pat. No. 9,107,337, which is a continuation-in-part of application No. 13/839,669, filed on Mar. 15, 2013, now abandoned, which is a continuation-in-part of application No. 13/589,829, filed on Aug. 20, 2012, now Pat. No. 8,985,232, which is a continuation-in-part of application No. 13/359,914, filed on Jan. 27, 2012, now Pat. No. 8,763,713, which is a continuation-in-part of application No. 13/758,979, filed on Feb. 4, 2013, now Pat. No. 9,055,712, which is a continuation-in-part of application No. 13/561,934, filed on Jul. 30, 2012, now Pat. No. 8,776,702, which is a continuation-in-part of application No. 13/075,574, filed on Mar. 30, 2011, now Pat. No. 8,544,398, which is a continuation-in-part of application No. 12/882,627, filed on Sep. 15, 2010, now Pat. No. 8,544,397.

(60) Provisional application No. 61/798,266, filed on Mar. 15, 2013.

(51) Int. Cl.
*A01B 63/00* (2006.01)
*A01C 5/06* (2006.01)
*A01C 7/20* (2006.01)
*A01C 7/00* (2006.01)

(52) U.S. Cl.
CPC .............. *A01B 63/008* (2013.01); *A01C 5/06* (2013.01); *A01C 7/203* (2013.01); *A01C 7/205* (2013.01); *A01C 7/006* (2013.01); *Y02P 60/23* (2015.11)

(58) Field of Classification Search
CPC ..... A01B 63/008; A01B 63/002; A01B 63/00; A01B 61/048; A01B 61/046; A01C 5/06; A01C 5/00; A01C 7/203; A01C 7/201; A01C 7/20; A01C 7/00; A01C 7/205; A01C 7/006; Y02P 60/23; Y02P 60/20; Y02P 60/00
See application file for complete search history.

(56) References Cited

U.S. PATENT DOCUMENTS

| | | |
|---|---|---|
| 321,906 A | 7/1885 | McCormick |
| 353,491 A | 2/1886 | Wells |
| 523,508 A | 7/1894 | Bauer |
| 736,369 A | 8/1903 | Dynes |
| 803,088 A | 10/1905 | Barker |
| 1,069,264 A | 8/1913 | Keller |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,481,981 A | 1/1924 | Boye |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 1,938,132 A | 12/1933 | Broemmelsick |
| 2,014,334 A | 9/1935 | Johnson |
| 2,058,539 A | 10/1936 | Welty |
| 2,249,637 A | 7/1941 | Rietz |
| 2,269,051 A | 1/1942 | Cahoy |
| 2,285,932 A | 6/1942 | Leavitt |
| 2,298,539 A | 10/1942 | Mott |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,080,004 A | 3/1963 | McNair |
| 3,103,993 A | 9/1963 | Gies |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,256,942 A | 6/1966 | Van Sickle |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,397,933 A | 8/1968 | Hatcher |
| 3,420,273 A | 1/1969 | Greer |
| 3,433,474 A | 3/1969 | Piret |
| 3,447,495 A | 6/1969 | Miller |
| 3,500,937 A | 3/1970 | Erickson |
| 3,507,233 A | 4/1970 | Greig |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,711,974 A | 1/1973 | Webb |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,906,814 A | 9/1975 | Magnussen |
| 3,939,846 A | 2/1976 | Drozhzhin |
| 3,945,532 A | 3/1976 | Marks |
| 3,975,890 A | 8/1976 | Rodger |
| 3,986,464 A | 10/1976 | Uppiano |
| 4,009,668 A | 3/1977 | Brass |

(56) References Cited

U.S. PATENT DOCUMENTS

| | | |
|---|---|---|
| 4,018,101 A | 4/1977 | Mihalic |
| 4,044,697 A | 8/1977 | Swanson |
| 4,055,126 A | 10/1977 | Brown |
| 4,058,171 A | 11/1977 | Van der Lely |
| 4,063,597 A | 12/1977 | Day |
| 4,069,029 A | 1/1978 | Hudson |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,161,090 A | 7/1979 | Watts, Jr. |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,407,660 A | 10/1983 | Nevens |
| 4,413,685 A | 11/1983 | Gremelspacher |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | van der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |
| 4,619,329 A | 10/1986 | Gorbett |
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,648,466 A | 3/1987 | Baker |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,682,550 A | 7/1987 | Joy |
| 4,703,809 A | 11/1987 | Van den Ende |
| 4,726,304 A | 2/1988 | Dreyer |
| RE32,644 E | 4/1988 | Brundage |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |
| 4,768,387 A | 9/1988 | Kemp |
| 4,776,404 A | 10/1988 | Rogers |
| 4,779,684 A | 10/1988 | Schultz |
| 4,785,890 A | 11/1988 | Martin |
| 4,825,957 A | 5/1989 | White |
| 4,825,959 A | 5/1989 | Wilhelm |
| 4,920,901 A | 5/1990 | Pounds |
| 4,926,767 A | 5/1990 | Thomas |
| 4,930,431 A | 6/1990 | Alexander |
| 4,986,367 A | 1/1991 | Kinzenbaw |
| 4,987,841 A | 1/1991 | Rawson |
| 4,998,488 A | 3/1991 | Hansson |
| 5,015,997 A | 5/1991 | Strubbe |
| 5,022,333 A | 6/1991 | McClure |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,042 A | 3/1996 | Yanagawa |
| 5,499,683 A * | 3/1996 | Bassett ............... A01B 63/114 172/239 |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |

(56) References Cited

U.S. PATENT DOCUMENTS

| | | |
|---|---|---|
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,730,074 A | 3/1998 | Peter |
| 5,809,757 A | 9/1998 | McLean |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobbs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |
| 6,068,061 A | 5/2000 | Smith |
| 6,079,340 A | 6/2000 | Flamme |
| 6,082,274 A | 7/2000 | Peter |
| 6,085,501 A | 7/2000 | Walch |
| 6,091,997 A | 7/2000 | Flamme |
| 6,164,385 A | 12/2000 | Buchl |
| 6,176,334 B1 | 1/2001 | Lorenzen |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,289,829 B1 | 9/2001 | Fish |
| 6,295,939 B1 | 10/2001 | Emms |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thomspon |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,516,595 B2 | 2/2003 | Rhody |
| 6,530,334 B2 | 3/2003 | Hagny |
| 6,575,104 B2 | 6/2003 | Brummelhuis |
| 6,622,468 B2 | 9/2003 | Lucand |
| 6,644,224 B1 | 11/2003 | Bassett |
| 6,681,868 B2 | 1/2004 | Kovach |
| 6,701,856 B1 | 3/2004 | Zoke |
| 6,701,857 B1 | 3/2004 | Jensen |
| 6,715,433 B1 | 4/2004 | Friestad |
| 6,763,773 B2 | 7/2004 | Schaffert |
| 6,786,130 B2 | 9/2004 | Steinlage |
| 6,827,029 B1 | 12/2004 | Wendte |
| 6,834,598 B2 | 12/2004 | Jüptner |
| 6,840,853 B2 | 1/2005 | Foth |
| 6,886,650 B2 | 5/2005 | Bremmer |
| 6,889,943 B2 | 5/2005 | Dinh |
| 6,892,656 B2 | 5/2005 | Schneider |
| 6,907,833 B2 | 6/2005 | Thompson |
| 6,912,963 B2 | 7/2005 | Bassett |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,163,227 B1 | 1/2007 | Burns |
| 7,222,575 B2 | 5/2007 | Bassett |
| 7,290,491 B2 | 11/2007 | Summach |
| 7,325,756 B1 | 2/2008 | Giorgis |
| 7,360,494 B2 | 4/2008 | Martin |
| 7,360,495 B1 | 4/2008 | Martin |
| 7,438,006 B2 | 10/2008 | Mariman |
| 7,451,712 B2 | 11/2008 | Bassett |
| 7,497,174 B2 | 3/2009 | Sauder |
| 7,523,709 B1 | 4/2009 | Kiest |
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 7,975,629 B1 | 7/2011 | Martin |
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,649,930 B2 | 2/2014 | Reeve |
| 8,746,661 B2 | 6/2014 | Runkel |
| 8,763,713 B2 | 7/2014 | Bassett |
| 8,770,308 B2 * | 7/2014 | Bassett ............... A01C 7/205 111/135 |
| 8,776,702 B2 * | 7/2014 | Bassett ............... A01C 7/205 111/135 |
| RE45,091 E | 8/2014 | Bassett |
| 8,863,857 B2 | 10/2014 | Bassett |
| 8,910,581 B2 | 12/2014 | Bassett |
| 8,939,095 B2 | 1/2015 | Freed |
| 9,003,982 B1 | 4/2015 | Elizalde |
| 9,003,983 B2 | 4/2015 | Roth |
| 9,055,712 B2 * | 6/2015 | Bassett ............... A01B 61/044 |
| 9,144,187 B2 | 9/2015 | Bassett |
| 9,148,989 B2 | 10/2015 | Van Buskirk |
| 9,167,740 B2 | 10/2015 | Bassett |
| 9,192,088 B2 | 11/2015 | Bruce |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 9,504,195 B2 | 11/2016 | Bassett |
| 9,615,497 B2 | 4/2017 | Bassett |
| 9,668,398 B2 | 6/2017 | Bassett |
| 9,681,601 B2 | 6/2017 | Bassett |
| 9,723,778 B2 | 8/2017 | Bassett |
| 9,788,472 B2 | 10/2017 | Bassett |
| 9,848,522 B2 | 12/2017 | Bassett |
| 9,861,022 B2 | 1/2018 | Bassett |
| 2002/0162492 A1 | 11/2002 | Juptner |
| 2003/0141086 A1 | 7/2003 | Kovach |
| 2004/0005929 A1 | 1/2004 | Piasecki |
| 2005/0045080 A1 | 3/2005 | Halford |
| 2005/0199842 A1 | 9/2005 | Parsons |
| 2006/0102058 A1 | 5/2006 | Swanson |
| 2006/0191695 A1 | 8/2006 | Walker et al. |
| 2006/0213566 A1 | 9/2006 | Johnson |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |

(56) References Cited

U.S. PATENT DOCUMENTS

| | | |
|---|---|---|
| 2008/0236461 A1 | 10/2008 | Sauder |
| 2008/0256916 A1 | 10/2008 | Vaske |
| 2009/0260902 A1 | 10/2009 | Holman |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0147148 A1 | 6/2011 | Ripa |
| 2011/0247537 A1 | 10/2011 | Freed |
| 2011/0313575 A1 | 12/2011 | Kowalchuk |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0000448 A1 | 1/2014 | Franklin, III |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0165527 A1 | 6/2014 | Oehler |
| 2014/0190712 A1 | 7/2014 | Bassett |
| 2014/0197249 A1 | 7/2014 | Roth |
| 2014/0224513 A1 | 8/2014 | Van Buskirk |
| 2014/0224843 A1 | 8/2014 | Rollenhagen |
| 2014/0278696 A1 | 9/2014 | Anderson |
| 2015/0216108 A1 | 8/2015 | Roth |
| 2016/0270285 A1 | 9/2016 | Hennes |
| 2016/0309641 A1 | 10/2016 | Taunton |
| 2017/0034985 A1 | 2/2017 | Martin |
| 2017/0164548 A1 | 6/2017 | Bassett |
| 2017/0181373 A1 | 6/2017 | Bassett |
| 2017/0300072 A1 | 7/2017 | Bassett |
| 2017/0231145 A1 | 8/2017 | Bassett |
| 2017/0318741 A1 | 11/2017 | Bassett |
| 2018/0000001 A1 | 1/2018 | Bassett |
| 2018/0000002 A1 | 1/2018 | Bassett |

FOREIGN PATENT DOCUMENTS

| | | |
|---|---|---|
| DE | 335464 | 9/1921 |
| DE | 1108971 | 6/1961 |
| DE | 24 02 411 | 7/1975 |
| EP | 2 196 337 B1 | 6/2010 |
| EP | 2 497 348 A1 | 9/2012 |
| GB | 1 574 412 | 9/1980 |
| GB | 2 056 238 A | 10/1982 |
| GB | 2 160 401 A | 12/1985 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |
| WO | WO 2016/073964 A1 | 5/2016 |
| WO | WO 2016/073966 A1 | 5/2016 |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "New Efficiencies in Nitrogen Application," Feb. 1991, p. 6 (1 page).

Hiniker Company, Flow & Acreage Continuous Tracking System Monitor Demonstration Manuel, date estimated as early as Feb. 1991 (7 pages).

Russnogle, John, "Sky Spy: Gulf War Technology Pinpoints Field and Yields," Top Producer, A Farm Journal Publication, Nov. 1991, pp. 12-14 (4 pages).

Borgelt, Steven C., "Sensor Technologies and Control Strategies for Managing Variability," University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Exner, Rick, "Sustainable Agriculture: Practical Farmers of Iowa Reducing Weed Pressure in Ridge-Till," Iowa State University Extension, http://www.extension.iastate.edu/Publications/SA2.pdf, Jul. 1992, Reviewed Jul. 2009, retrieved Nov. 2, 2012 (4 pages).

Finck, Charlene, "Listen to Your Soil," Farm Journal Article, Jan. 1993, pp. 14-15 (2 pages).

Acu-Grain, "Combine Yield Monitor 99% Accurate? 'You Bet Your Bushels!!'" date estimated as early as Feb. 1993 (2 pages).

John Deere, New 4435 Hydro Row-Crop and Small-Grain Combine, date estimated as early as Feb. 1993 (8 pages).

Vansichen, R. et al., "Continuous Wheat Yield Measurement On A Combine," date estimated as early as Feb. 1993 (5 pages).

Yetter 2010 Product Catalog, date estimated as early as Jan. 2010 (2 pages).

Yetter Cut and Move Manual, Sep. 2010 (28 pages).

Yetter Screw Adjust Residue Manager Operator's Manual, labeled "2565-729_REV_D" and dated Sep. 10 on p. 36, retrieved Mar. 10, 2014 from the internet, available online Jul. 13, 2011, at https://web.archive.org/web/20110713162510/http://www.yetterco.com/help/manuals/Screw_Adjust_Residue_Manager2.pdf John Deere, Seat Catalog, date estimated as early Sep. 2011 (19 pages).

Martin Industries, LLC Paired 13" Spading Closing Wheels Brochure, date estimated as early as Jun. 6, 2012, pp. 18-25 (8 pages).

Vogt, Willie, "Revisiting Robotics," http://m.farmindustrynews.com/farm-equipment/revisiting-robotics, Dec. 19, 2013 (3 pages).

John Deere, New Semi-Active Sea Suspension, http://www.deere.com/en_US/parts/agparts/semiactiveseat.html, date estimated as early as Jan. 2014, retrieved Feb. 6, 2014 (2 pages).

* cited by examiner

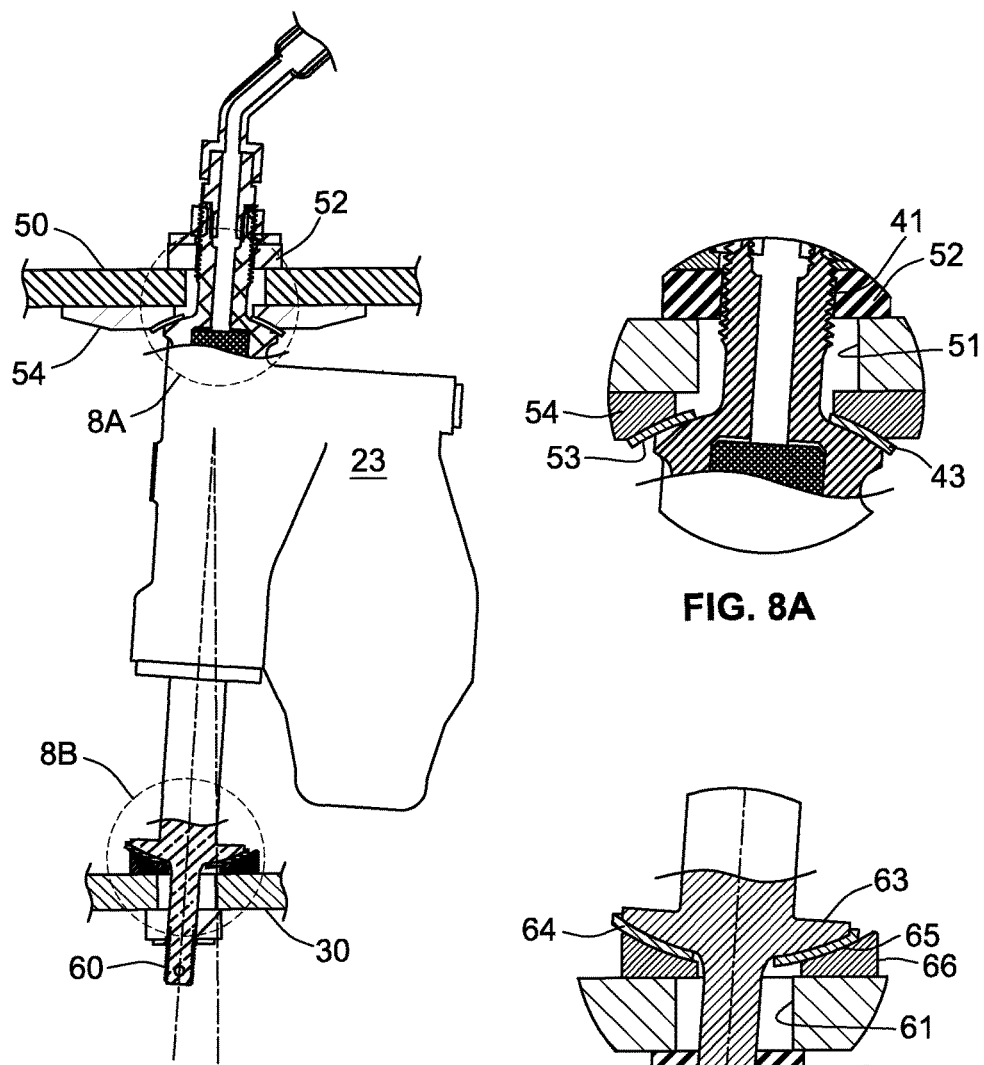

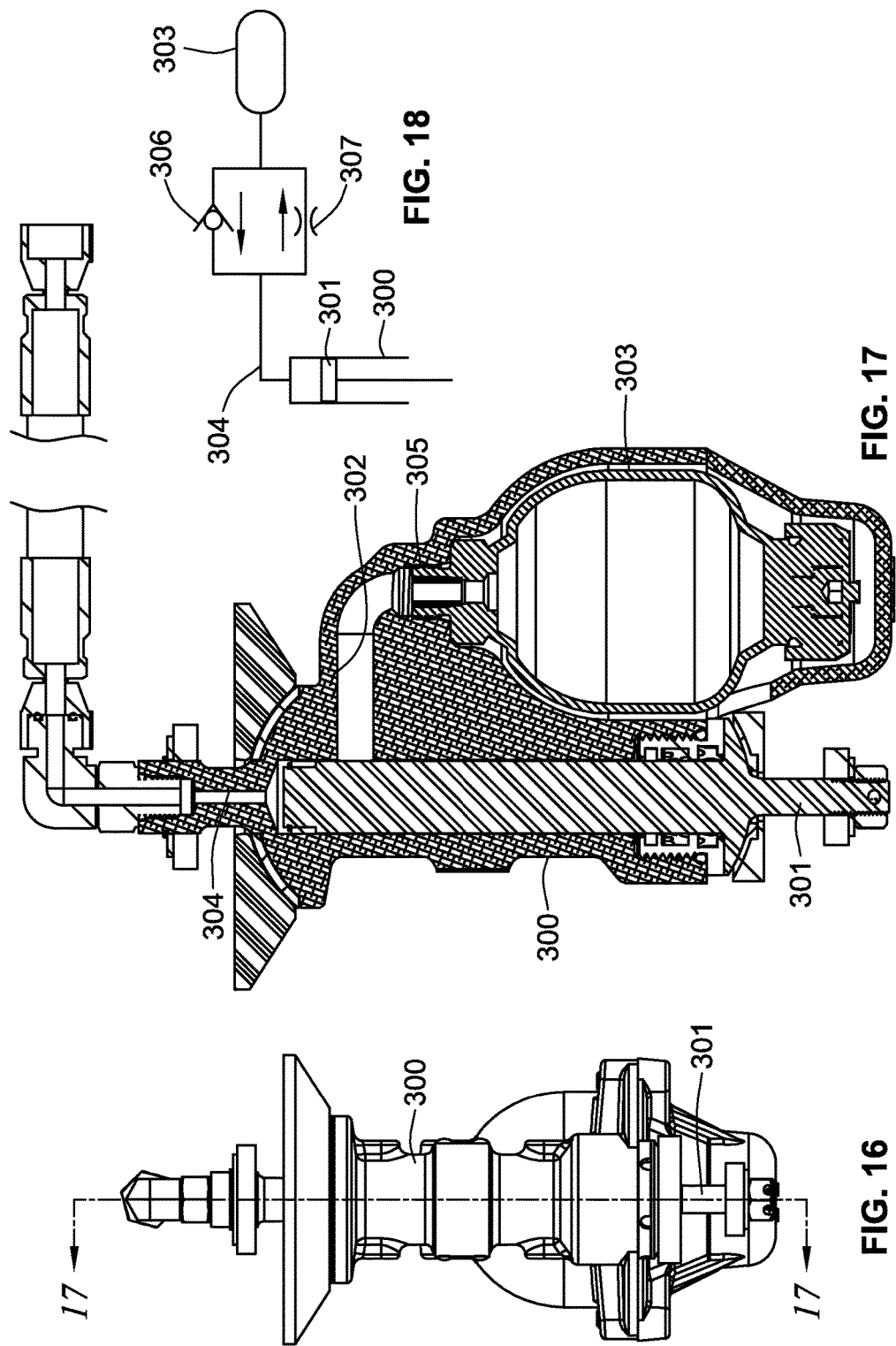

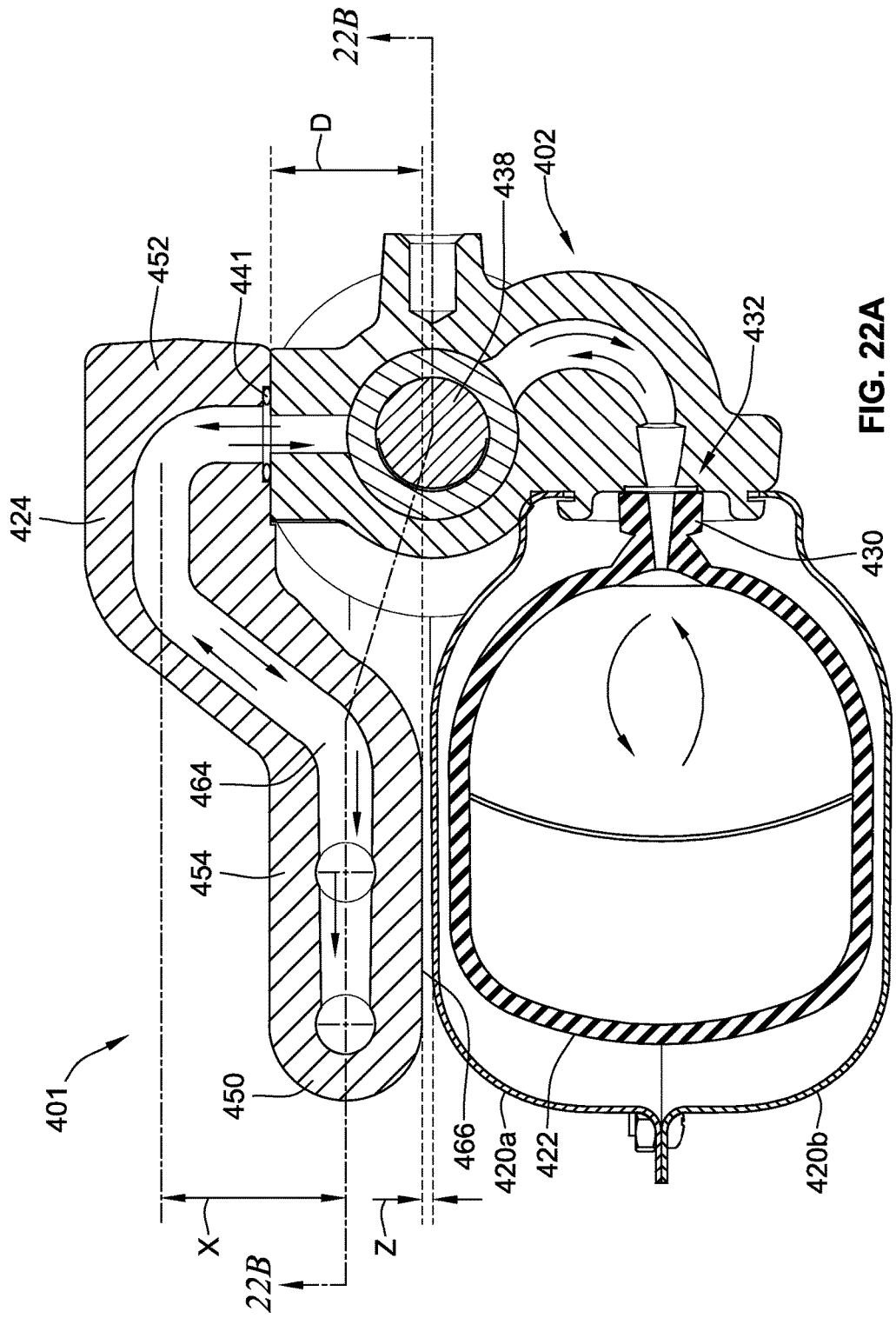

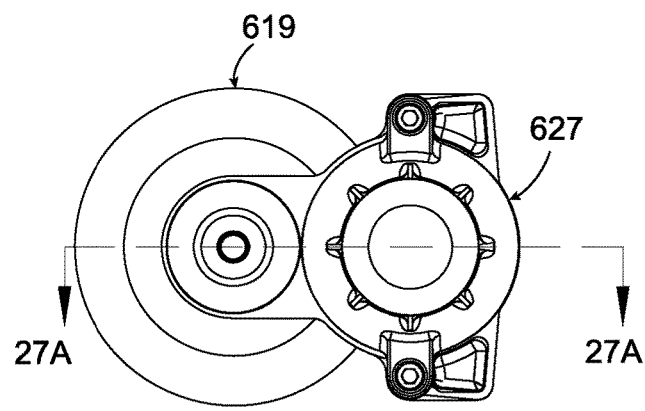
FIG. 26
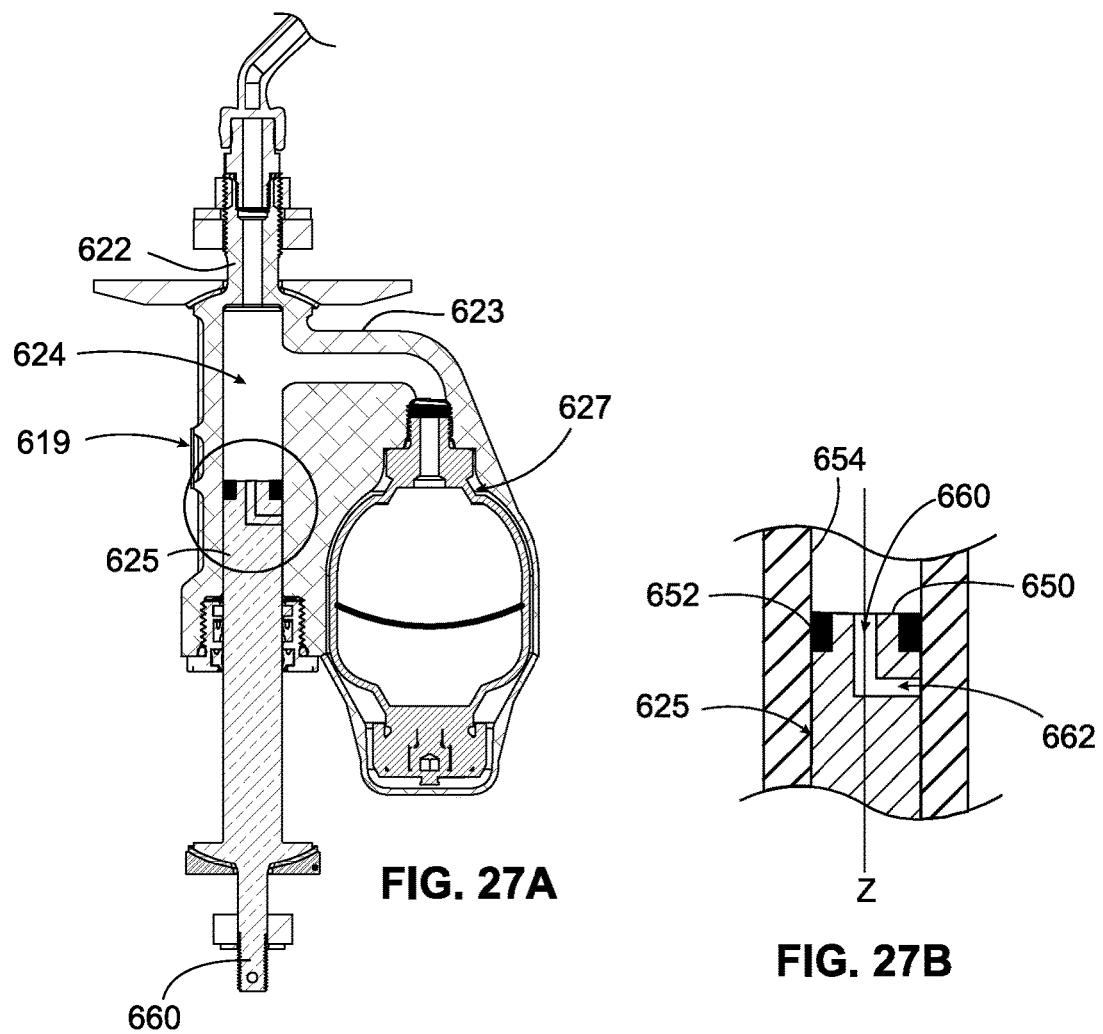
FIG. 27A
FIG. 27B

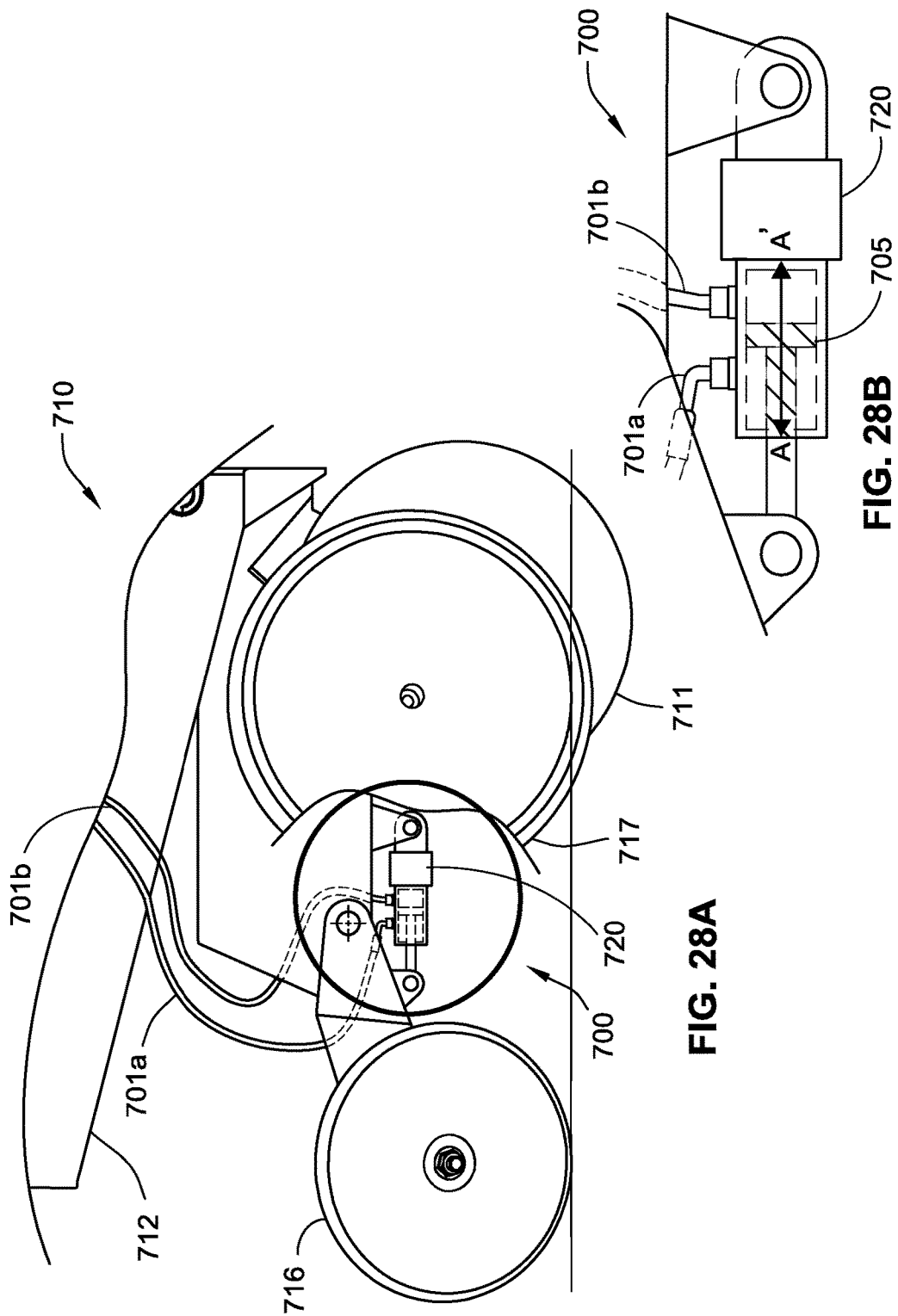

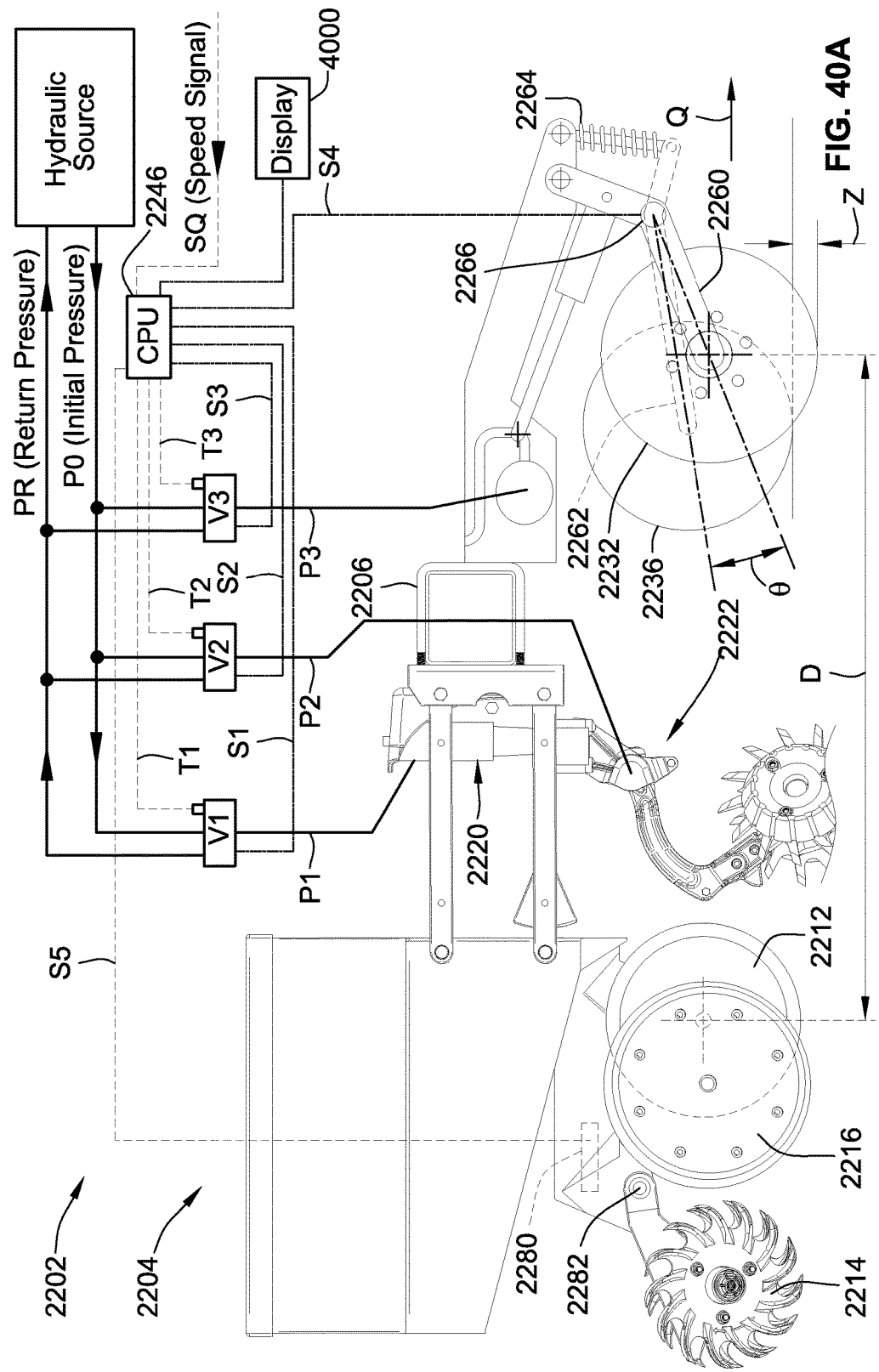

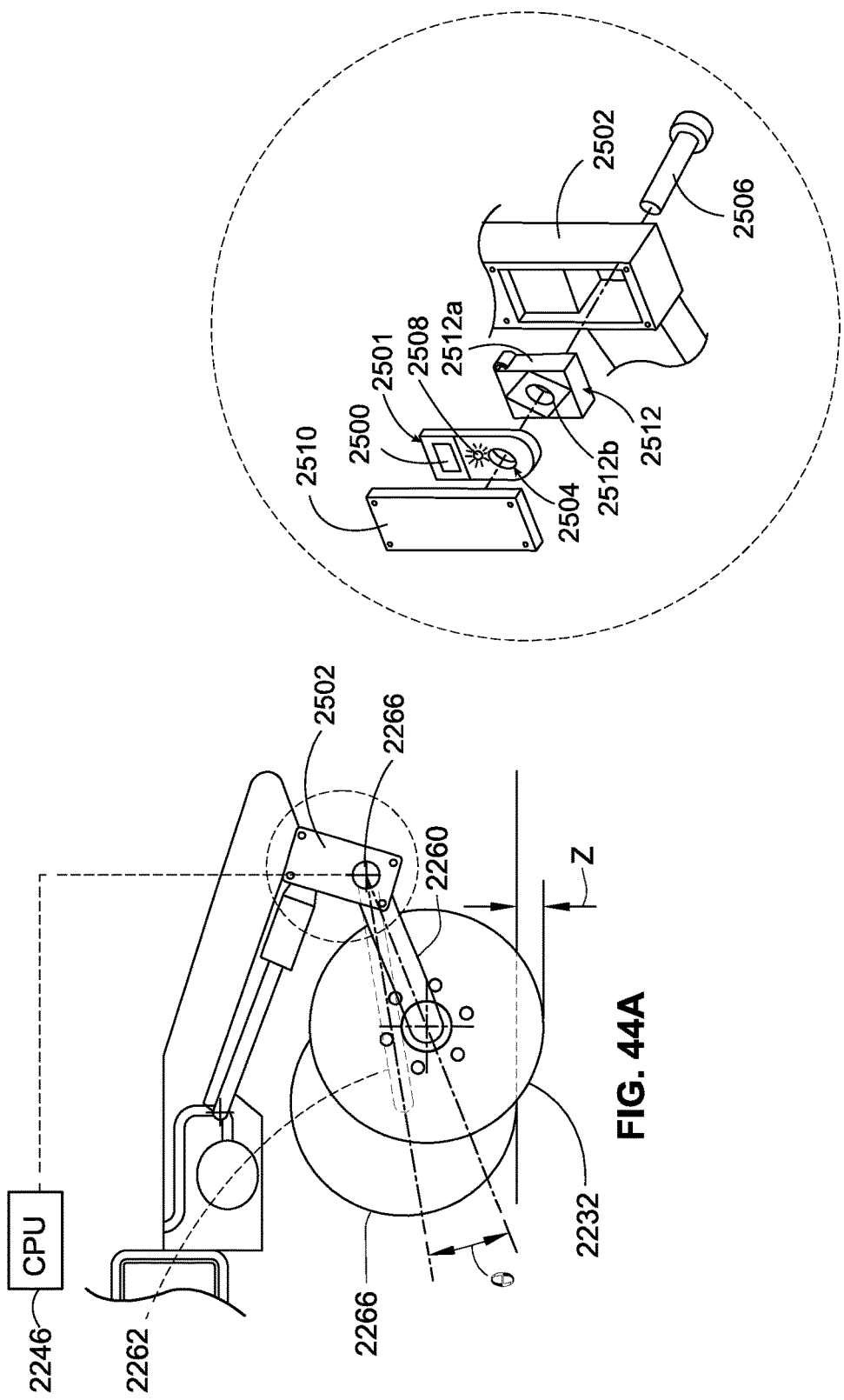

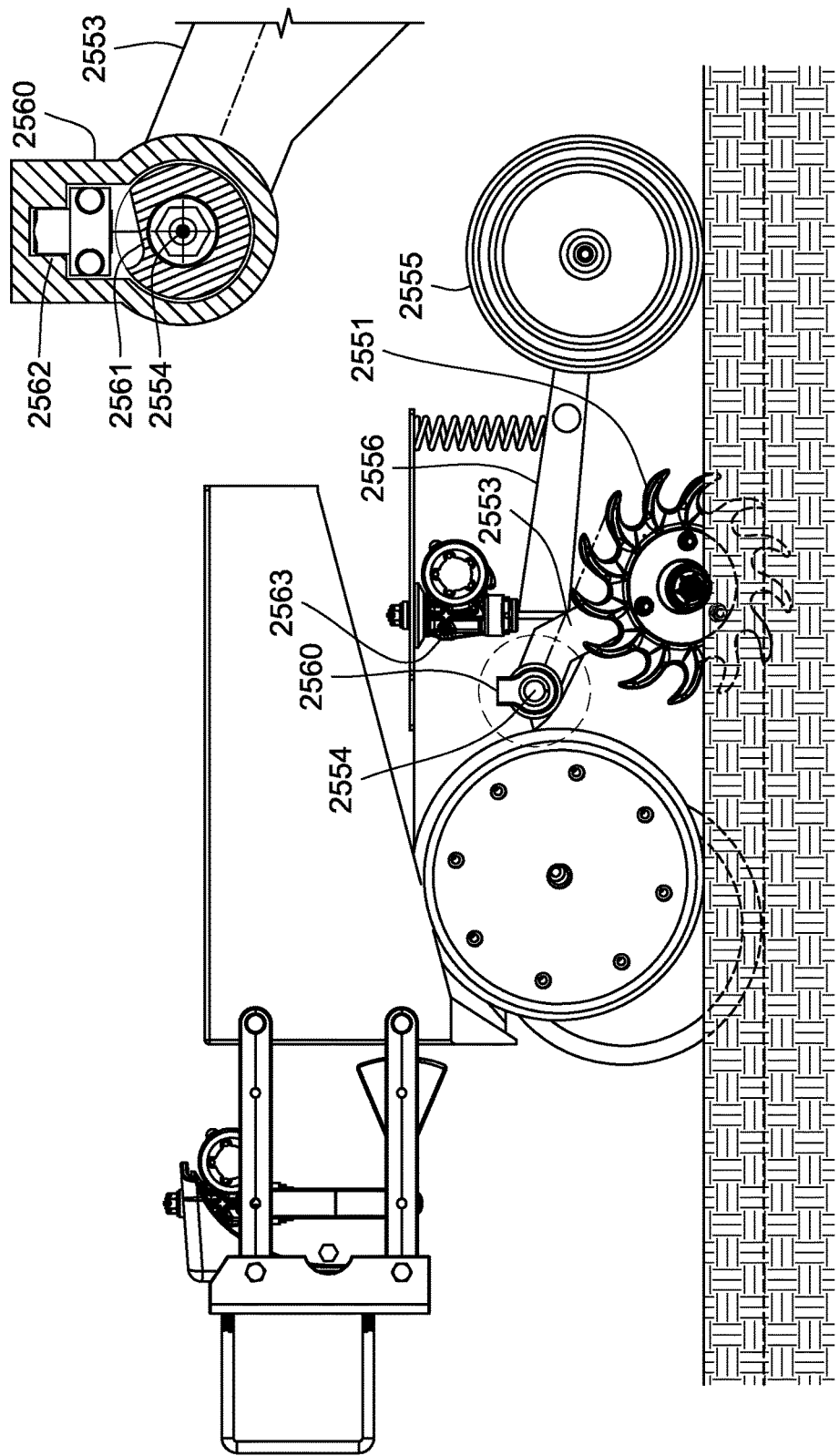

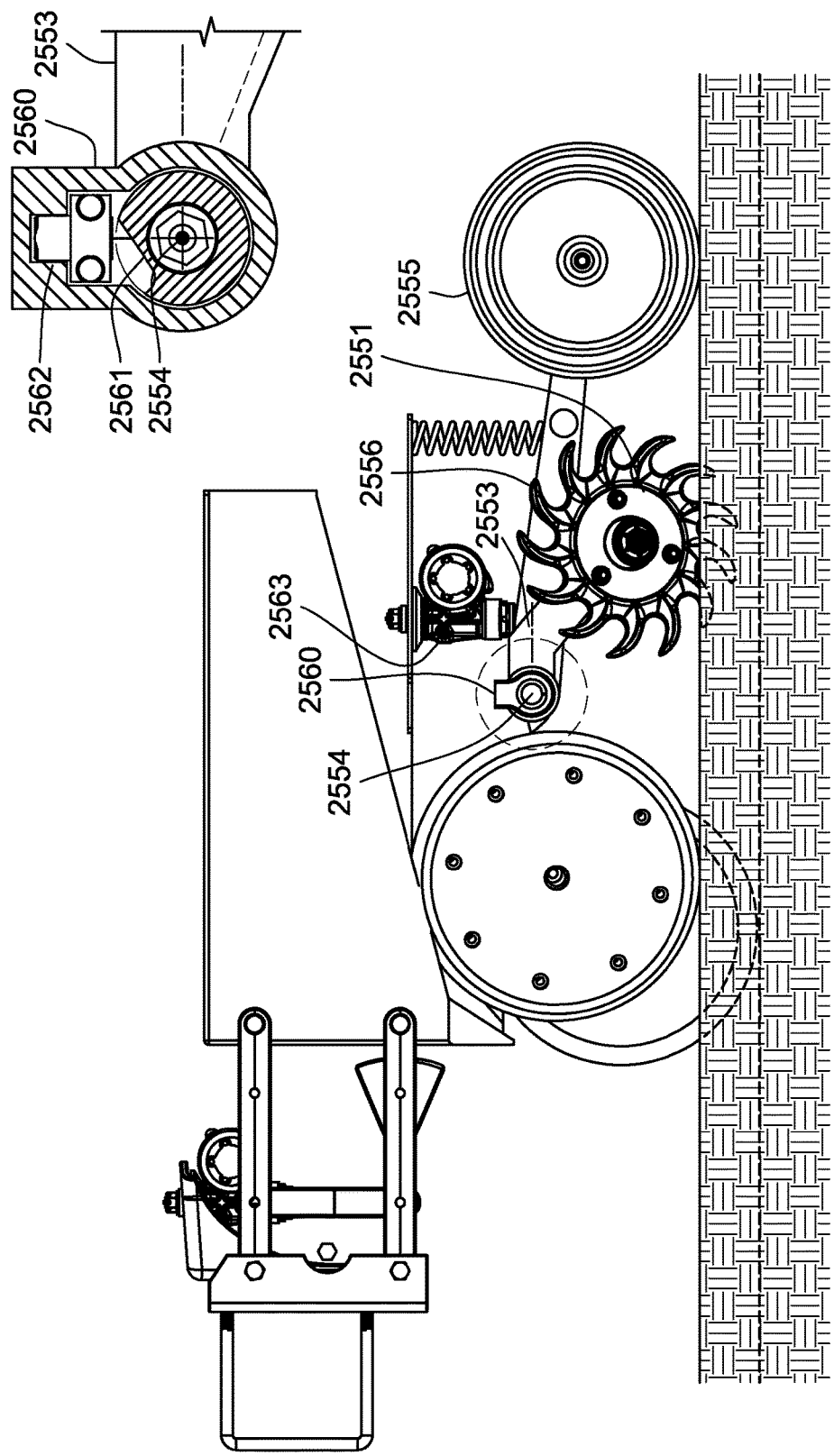

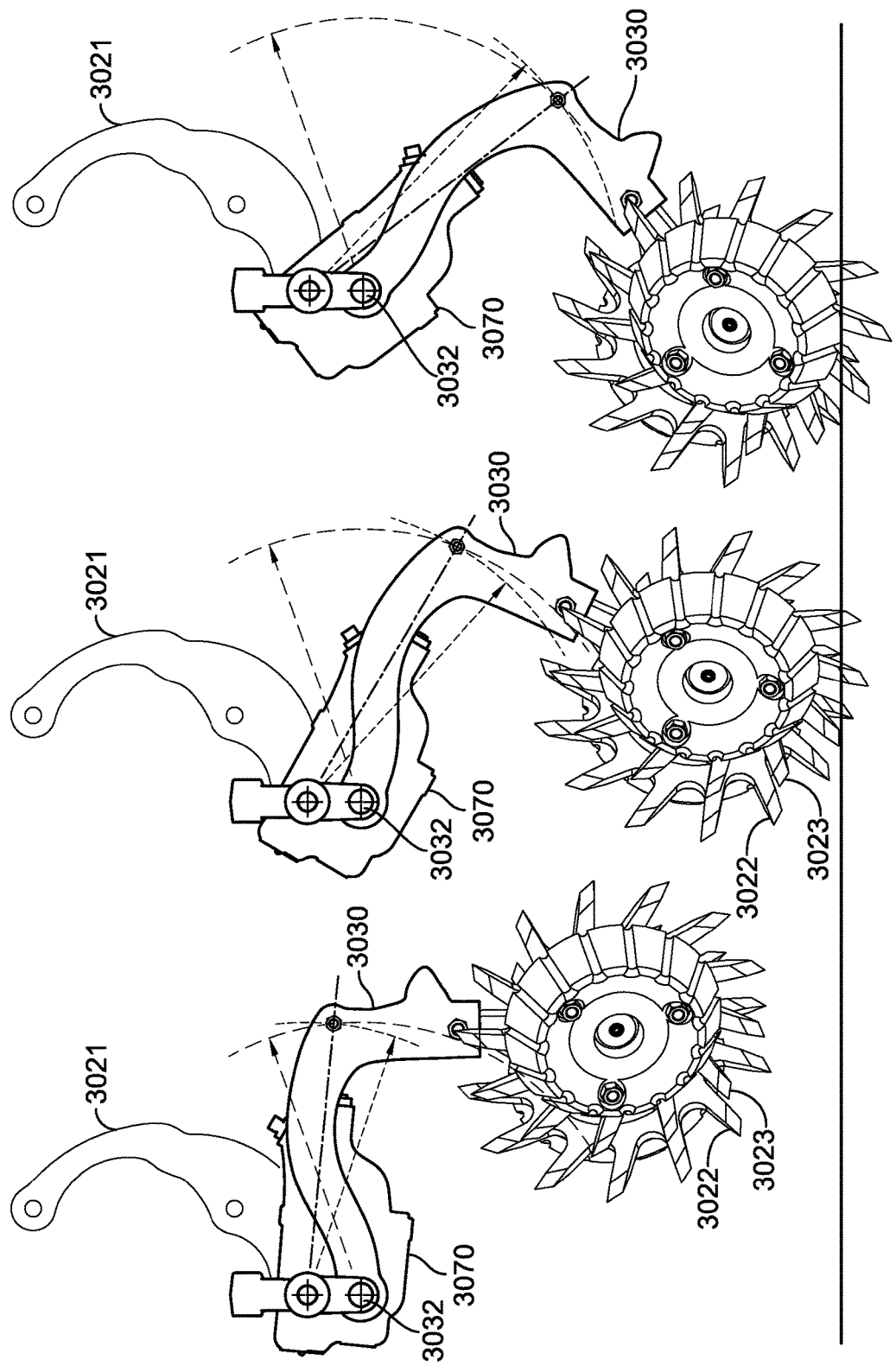

FIG. 69
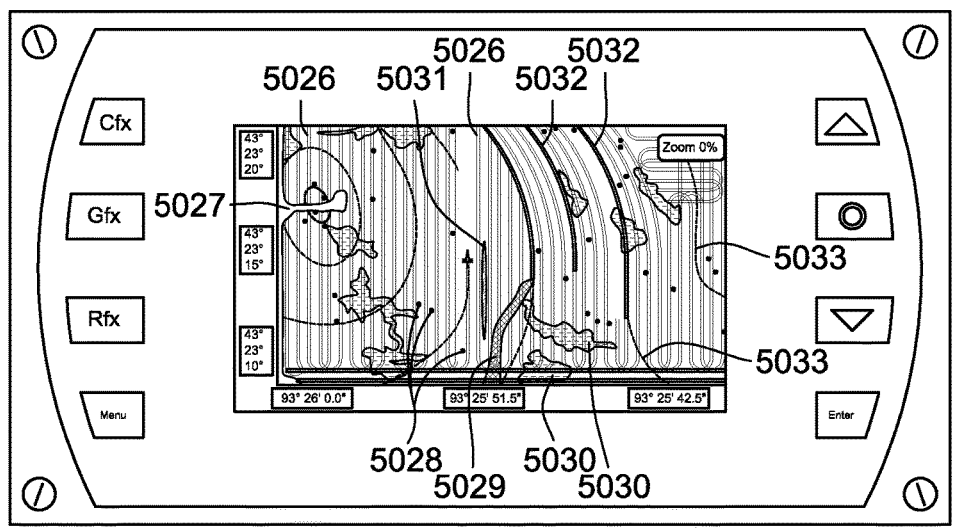
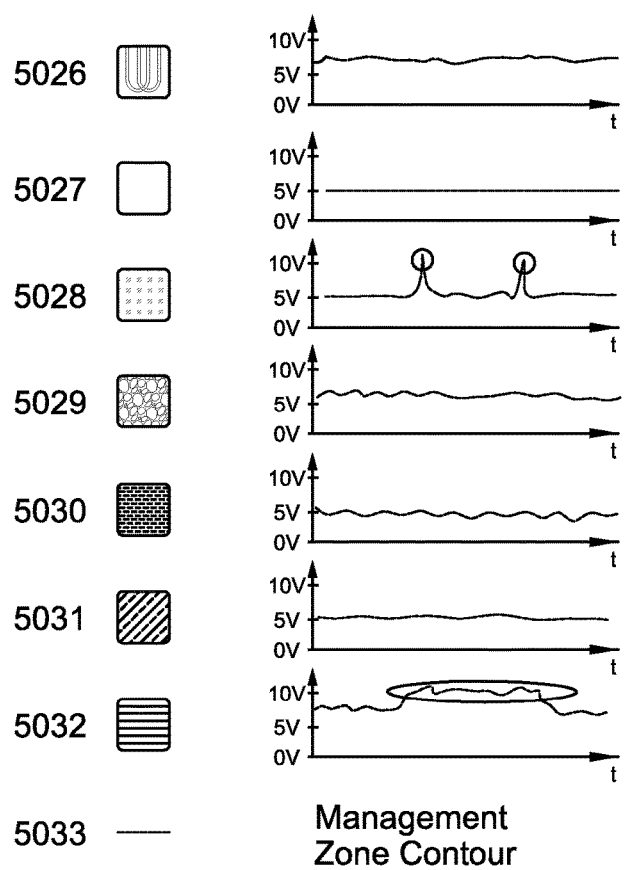
Management Zone Contour

AGRICULTURAL SYSTEMS

CROSS-REFERENCE TO RELATED APPLICATIONS

This application is a continuation of U.S. patent application Ser. No. 14/974,087, filed Dec. 18, 2015, now allowed, which is a continuation of U.S. patent application Ser. No. 14/146,822, filed Jan. 3, 2014, now U.S. Pat. No. 9,232,687, which is a continuation-in-part and claims priority to
 (1) U.S. Provisional 61/798,266, filed Mar. 15, 2013,
 (2) U.S. patent application Ser. No. 13/893,890, filed May 14, 2013, which is a continuation-in-part of U.S. patent application Ser. No. 13/861,137, filed Apr. 11, 2013, which is a continuation-in-part of U.S. patent application Ser. No. 13/839,669, filed Mar. 15, 2013, which is a continuation-in-part of U.S. patent application Ser. No. 13/589,829, filed Aug. 20, 2012,
 (3) U.S. patent application Ser. No. 13/359,914, filed Jan. 27, 2012, and
 (4) U.S. patent application Ser. No. 13/758,979, filed Feb. 4, 2013, which is a continuation-in-part of U.S. patent application Ser. No. 13/561,934, filed Jul. 30, 2012, which is a continuation-in-part of U.S. patent application Ser. No. 13/075,574, filed Mar. 30, 2011, which is a continuation-in-part of U.S. patent application Ser. No. 12/882,627, filed Sep. 15, 2010, each of which is incorporated herein in its entirety.

FIELD OF THE INVENTION

The present invention relates generally to agricultural equipment and, more particularly, to row crop implements having automatic control systems.

SUMMARY

In accordance with one embodiment, an agricultural implement is provided for use with a towing frame hitched to a tractor having a hydraulic system for supplying pressurized hydraulic fluid to the implement. The implement includes at least one row unit having (1) an attachment frame adapted to be rigidly connected to the towing frame, (2) a plurality of support members, each of which is pivotably coupled to the attachment frame or another of the support members to permit vertical pivoting vertical movement of the support members, (3) a plurality of soil-engaging tools, each of which is coupled to at least one of the support members, (4) a plurality of hydraulic cylinders, each of which is coupled to one of the support members for urging the respective support member downwardly toward the soil, each of the hydraulic cylinders including a movable ram extending into the cylinder, (5) a plurality of hydraulic lines, each of which is coupled to one of the hydraulic cylinders for supplying pressurized hydraulic fluid to the respective cylinders, (6) a plurality of controllable pressure control valves, each of which is coupled to one of the hydraulic lines for controlling the pressure of hydraulic fluid supplied by the respective hydraulic lines to the respective cylinders, (7) a plurality of sensors, each of which produces an electrical signal corresponding to a predetermined condition, and (8) at least one controller coupled to the sensor and the controllable pressure control valves, the controller being adapted to receive the electrical signal from the sensors and produce a control signal for controlling the pressure control valves.

In one implementation, the plurality of sensors include at least one sensor selected from the group consisting of a pressure sensor detecting the force applied by one of the hydraulic cylinders to the support member to which that cylinder is coupled.

In accordance with another embodiment, an agricultural row unit attachable to a towing frame for movement over a field having varying hardness conditions, comprises a soil-penetrating tool, a gauge wheel mounted for rolling engagement with the soil surface, and a sensor coupled to the tool and the gauge wheel for detecting changes in the difference between the vertical positions of the tool and the gauge wheel, and producing an output corresponding to the changes. A controllable actuator is coupled to the tool for applying a downward pressure on the tool, and a control system is coupled to the actuator and receiving the output of the sensor for controlling the actuator and thus the downward pressure on the tool.

In one implementation, the agricultural row unit is a planting row unit that includes an opening device for opening a furrow into which seeds can be planted, and the soil-penetrating tool is at least one closing wheel for closing the furrow after seeds have been deposited into the furrow.

BRIEF DESCRIPTION OF THE DRAWINGS

The invention may best be understood by reference to the following description taken in conjunction with the accompanying drawings, in which:

FIG. 7 is a side elevation of the unit shown in FIGS. 5 and 6 connected to a pair of supporting elements, with the support structures and the connecting portions of the hydraulic cylinder shown in section.

FIGS. 8A and 8B are enlarged cross sectional views of the supporting structures shown in section in FIG. 7.

FIG. 16 is a side elevation of another modified embodiment of a hydraulic control unit;

FIG. 17 is an enlarged section taken along the line 17-17 in FIG. 16; and

FIG. 18 is a schematic diagram of the hydraulic circuit in the unit of FIGS. 16 and 17.

FIG. 22A is a top cross-sectional view of FIG. 20B.

FIG. 26 is a top plan view of a hydraulic cylinder for a row unit.

FIG. 27A is a vertical section taken along line 27A-27A in FIG. 26.

FIG. 27B is an enlarged view of a ram leading area that is shown in FIG. 27A.

FIG. 28A is a side elevation of a hydraulic control system with double-acting ram for use with a row unit.

FIG. 28B is an enlarged view illustrating a hydraulic control unit of the hydraulic control system of FIG. 28A.

FIG. 40A is a schematic side elevation illustrating sensing of soil conditions and determining of hydraulic pressures for a planting row unit.

FIG. 44A is side elevation illustrating an alternative embodiment of the soil-hardness sensing device with a modified blade arm.

FIG. 44B is an enlarged exploded illustration of a distal end of the blade arm.

FIG. 44C is a side elevation of a row unit having a ground hardness sensor integrated with a furrow-closing device that includes a pair of toothed wheels and a ground gauge wheel.

FIG. 44D is an enlarged sectional view of a proximity sensing device included in the ground hardness sensor in the row unit shown in FIG. 44C.

FIG. 44E is the same side elevation shown in FIG. 44C, with the closing wheels at a higher elevation than shown in FIG. 44C.

FIG. 44F is an enlarged sectional view of the proximity sensor shown in FIG. 44D, with the closing wheels in the position shown in FIG. 44E.

FIGS. 50, 51 and 52 are side elevations of the main components of the row-clearing unit shown in FIGS. 47-49 in three different vertical positions.

FIG. 69 is exemplary display depicting an interactive map screen.

DETAILED DESCRIPTION OF ILLUSTRATED EMBODIMENTS

Figure 1:
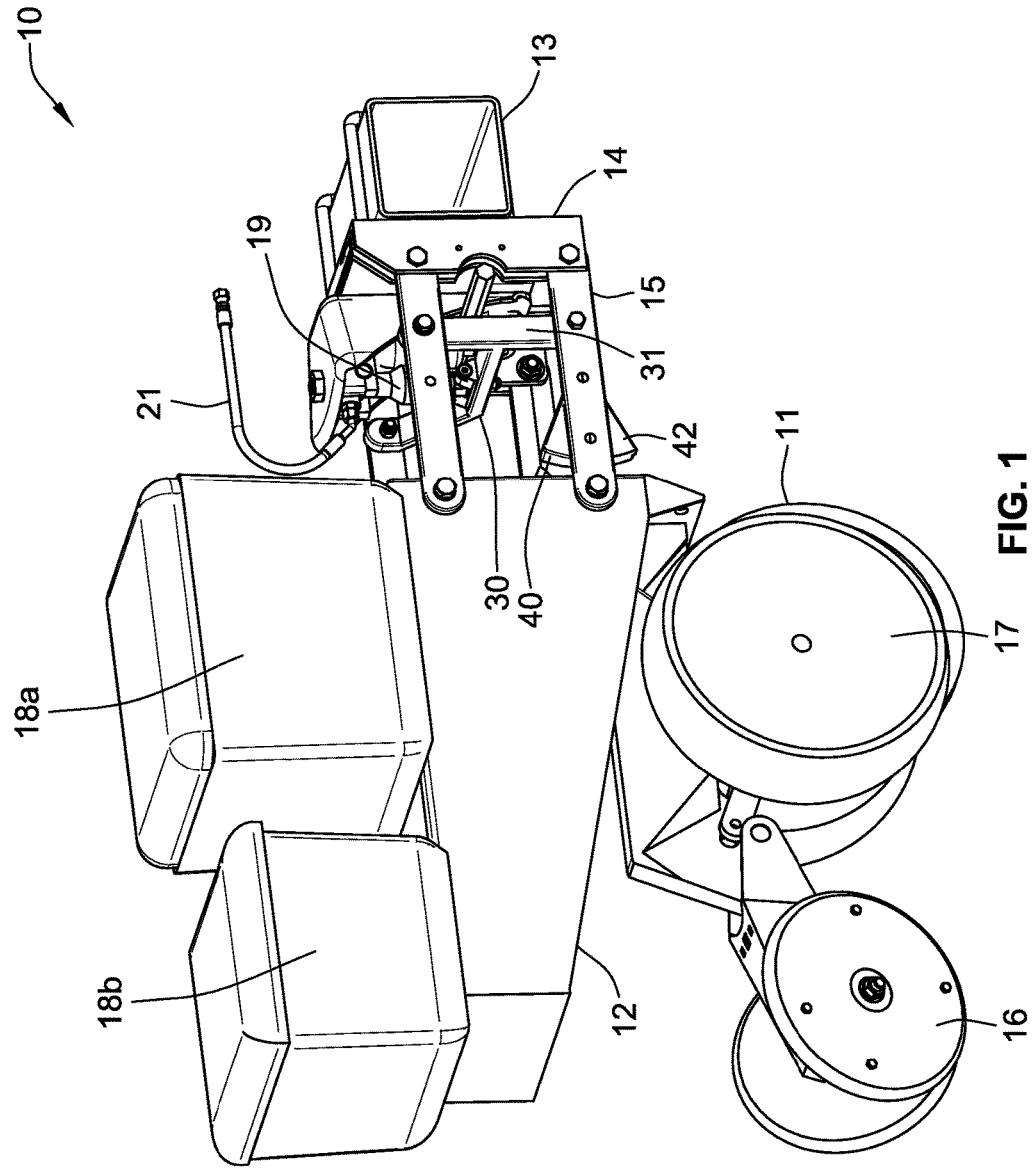
FIG. 1 is a perspective view of a planting row unit attached to a towing frame.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, a planting row unit 10 includes a furrow-opening device for the purpose of planting seed or injecting fertilizer into the soil. In the illustrated embodiment, the furrow-opening device is a V-opener 11 formed by a pair of conventional tilted discs depending from the leading end of a row unit frame 12. It will be understood that other furrow-opening devices may be used. A conventional elongated hollow towing frame 13 (typically hitched to a tractor by a draw bar) is rigidly attached to the front frame 14 of a conventional four-bar linkage assembly 15 that is part of the row unit 10. The four-bar (sometimes referred to as "parallel-bar") linkage assembly 15 is a conventional and well known linkage used in agricultural implements to permit the raising and lowering of tools attached thereto.

As the planting row unit 10 is advanced by the tractor, the V-opener 11 penetrates the soil to form a furrow or seed slot. Other portions of the row unit 10 then deposit seed in the seed slot and fertilizer adjacent to the seed slot, and close the seed slot by distributing loosened soil into the seed slot with a pair of closing wheels 16. A gauge wheel 17 determines the planting depth for the seed and the height of introduction of fertilizer, etc. Bins 18a and 18b on the row unit carry the chemicals and seed which are directed into the soil. The planting row unit 10 is urged downwardly against the soil by its own weight, and, in addition, a hydraulic cylinder 19 is coupled between the front frame 14 and the linkage assembly 15 to urge the row unit 11 downwardly with a controllable force that can be adjusted for different soil conditions. The hydraulic cylinder 19 may also be used to lift the row unit off the ground for transport by a heavier, stronger, fixed-height frame that is also used to transport large quantities of fertilizer for application via multiple row units.

Figure 4:
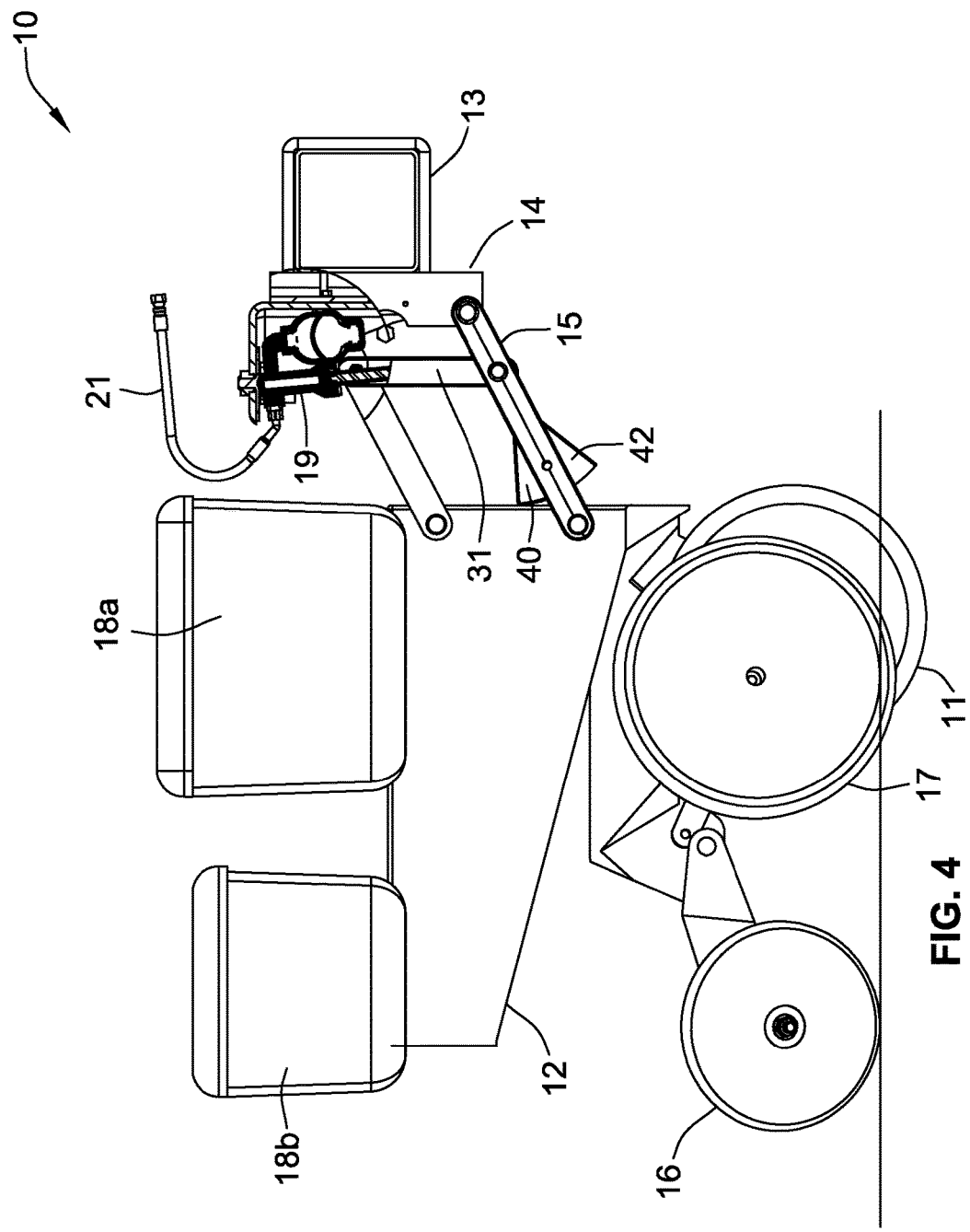
FIG. 4 is the same side elevation shown in FIG. 1 but with the linkage tilted downwardly to move the row unit to a lowered position.
Figure 5:
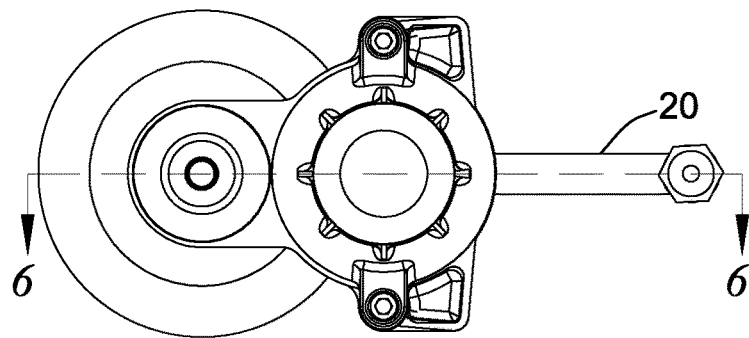
FIG. 5 is a top plan view of the hydraulic cylinder and accumulator unit included in the row unit of FIGS. 1-4.
Figure 6:
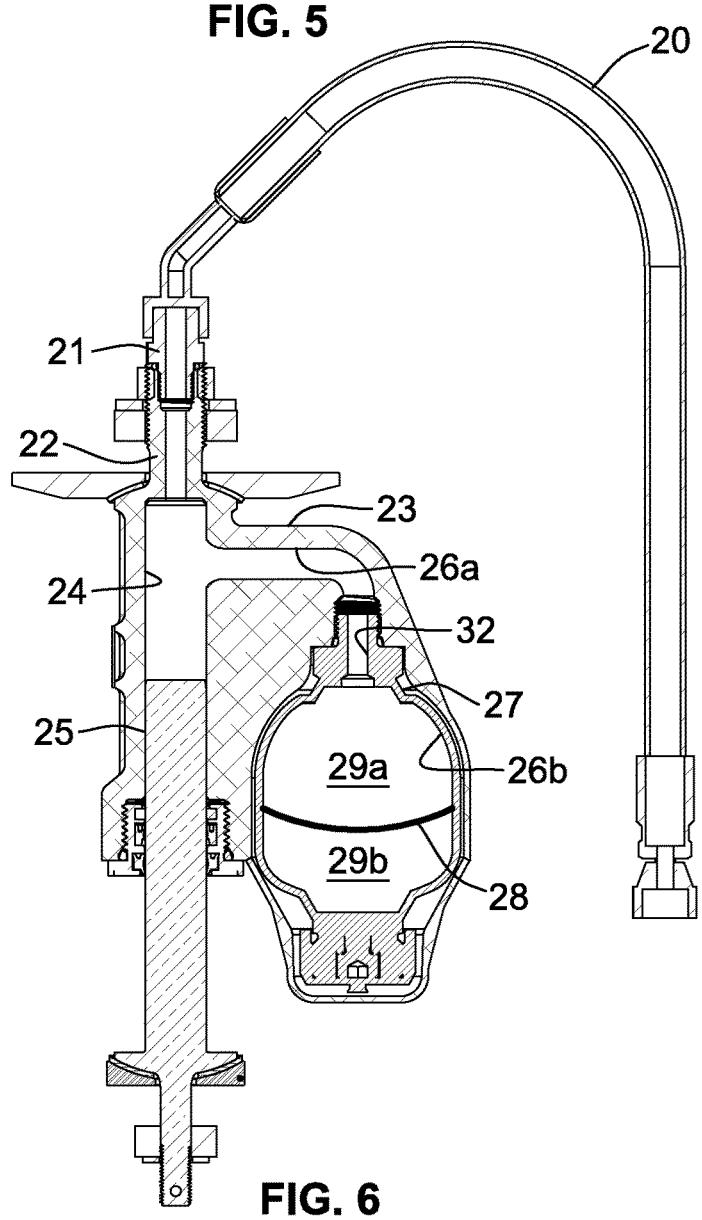
FIG. 6 is a vertical section taken along line 6-6 in FIG. 5.

The hydraulic cylinder 19 is shown in more detail in FIGS. 5 and 6. Pressurized hydraulic fluid from the tractor is supplied by a hose 20 to a port 21 that leads into a matching port 22 of a housing 23 that forms a cavity 24 of a hydraulic cylinder containing a ram 25. The housing 23 also forms a side port 26a that leads into cavity 26b that contains a gas-charged hydraulic accumulator 27. The lower end of the cavity 24 is formed by the top end surface of the ram 25, so that the hydraulic pressure exerted by the hydraulic fluid on the end surface of the ram 25 urges the ram downwardly (as viewed in FIG. 6), with a force determined by the pressure of the hydraulic fluid and the area of the exposed end surface of the ram 25. The hydraulic fluid thus urges the ram 25 in an advancing direction (see FIG. 4).

Figure 3:
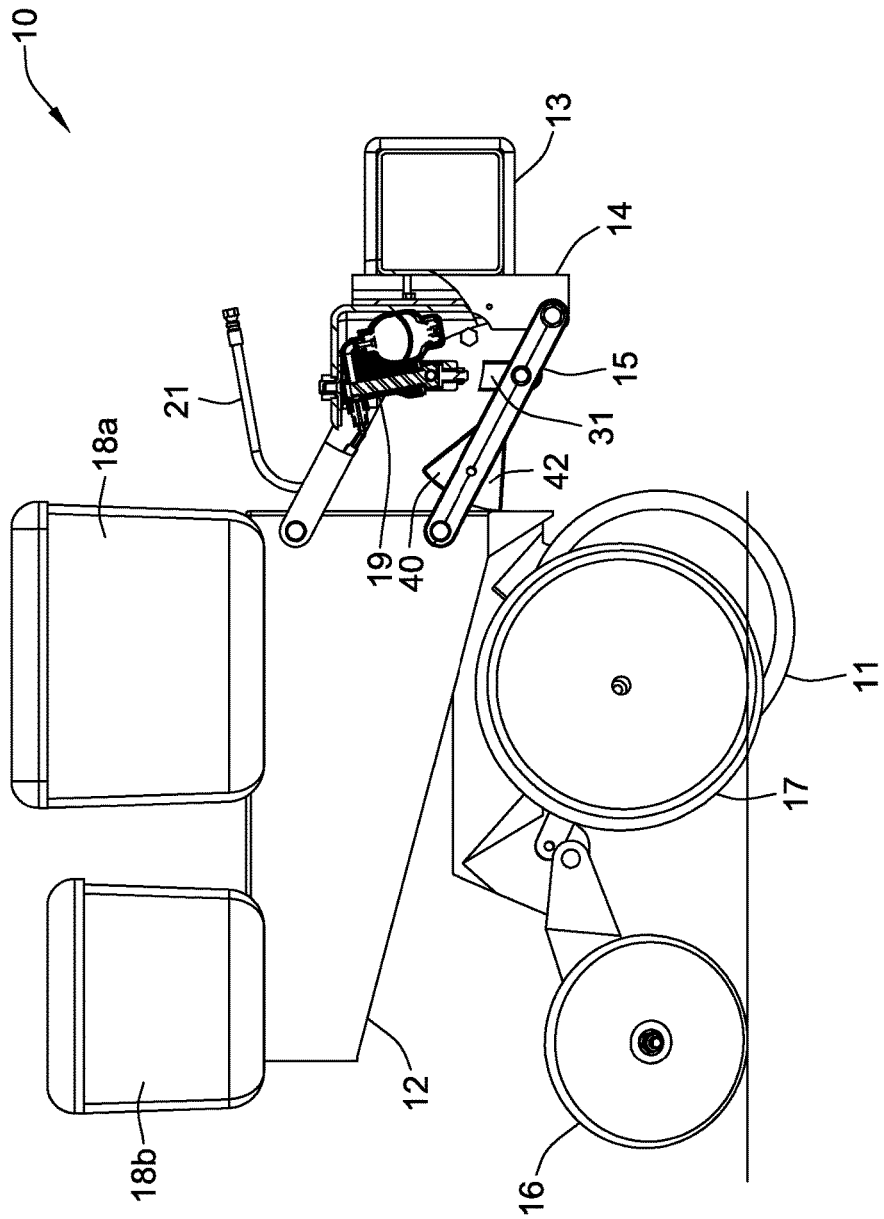
FIG. 3 is the same side elevation shown in FIG. 1 but with the linkage tilted upwardly to move the row unit to a raised position.
Figure 9:
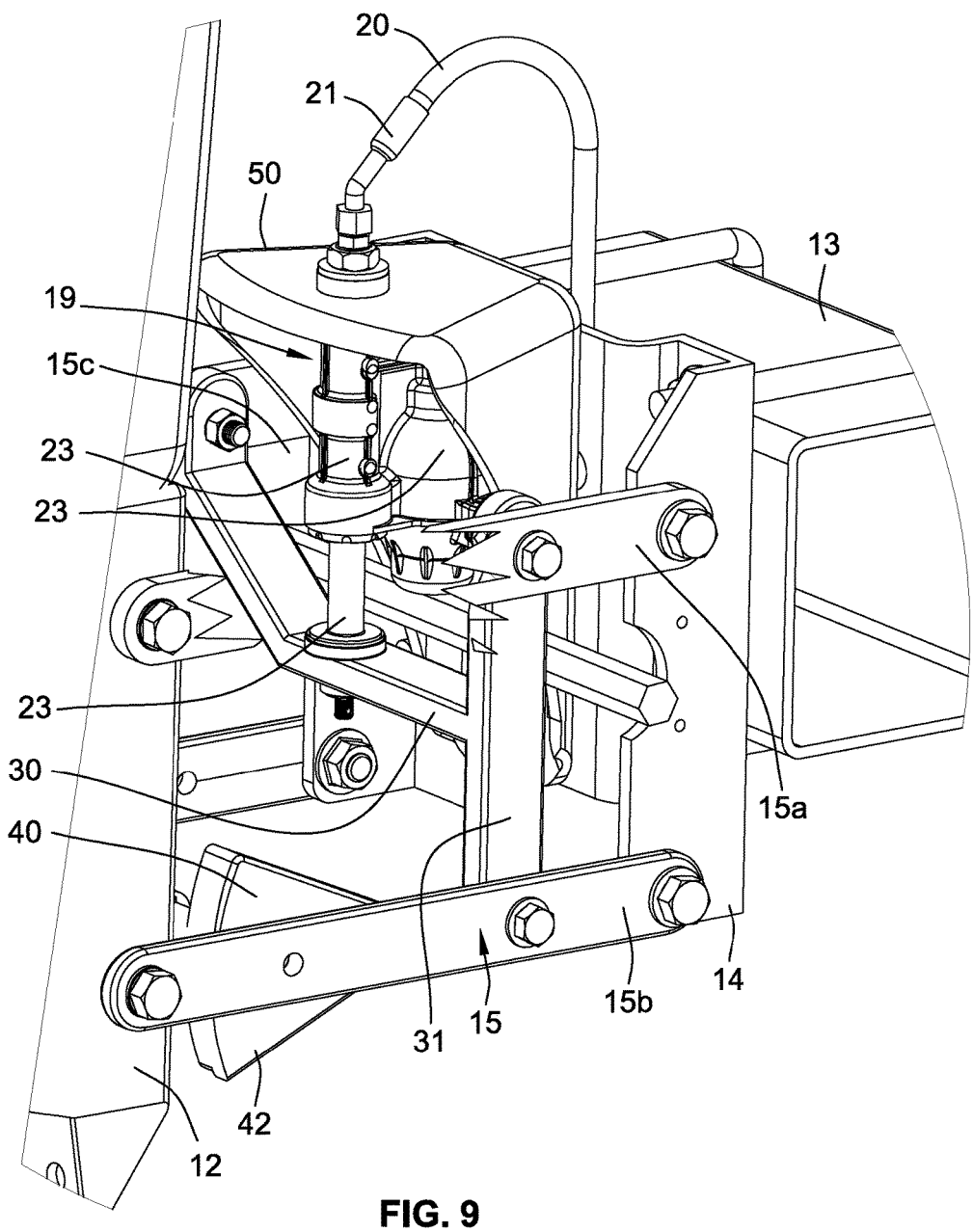
FIG. 9 is an enlarged perspective of the right-hand end portion of FIG. 1 with a portion of the four-bar linkage broken away to reveal the mounting of the hydraulic cylinder/accumulator unit.

As can be seen most clearly in FIG. 9, the hydraulic cylinder 19 and the accumulator 27 are mounted as a single unit on the front frame 14, with the lower end of the ram 25 connected to a cross bar 30 that is joined at one end to a vertical link 31. The upper and lower ends of the link 31 are pivotably attached to upper and lower links 15a and 15b, respectively, on one side of the four-bar linkage 15. The other end of the cross bar 30 is angled upwardly and pivotably attached to the upper link 15c on the opposite side of the four-bar linkage 15. With this mounting arrangement, retracting movement of the ram 25 into the cavity 24 tilts the linkage assembly 15 downwardly, as depicted in FIG. 3, thereby lowering the row unit. Conversely, advancing movement of the ram 25 tilts the linkage assembly 15 upwardly, as depicted in FIG. 4, thereby raising the row unit.

Figure 2:
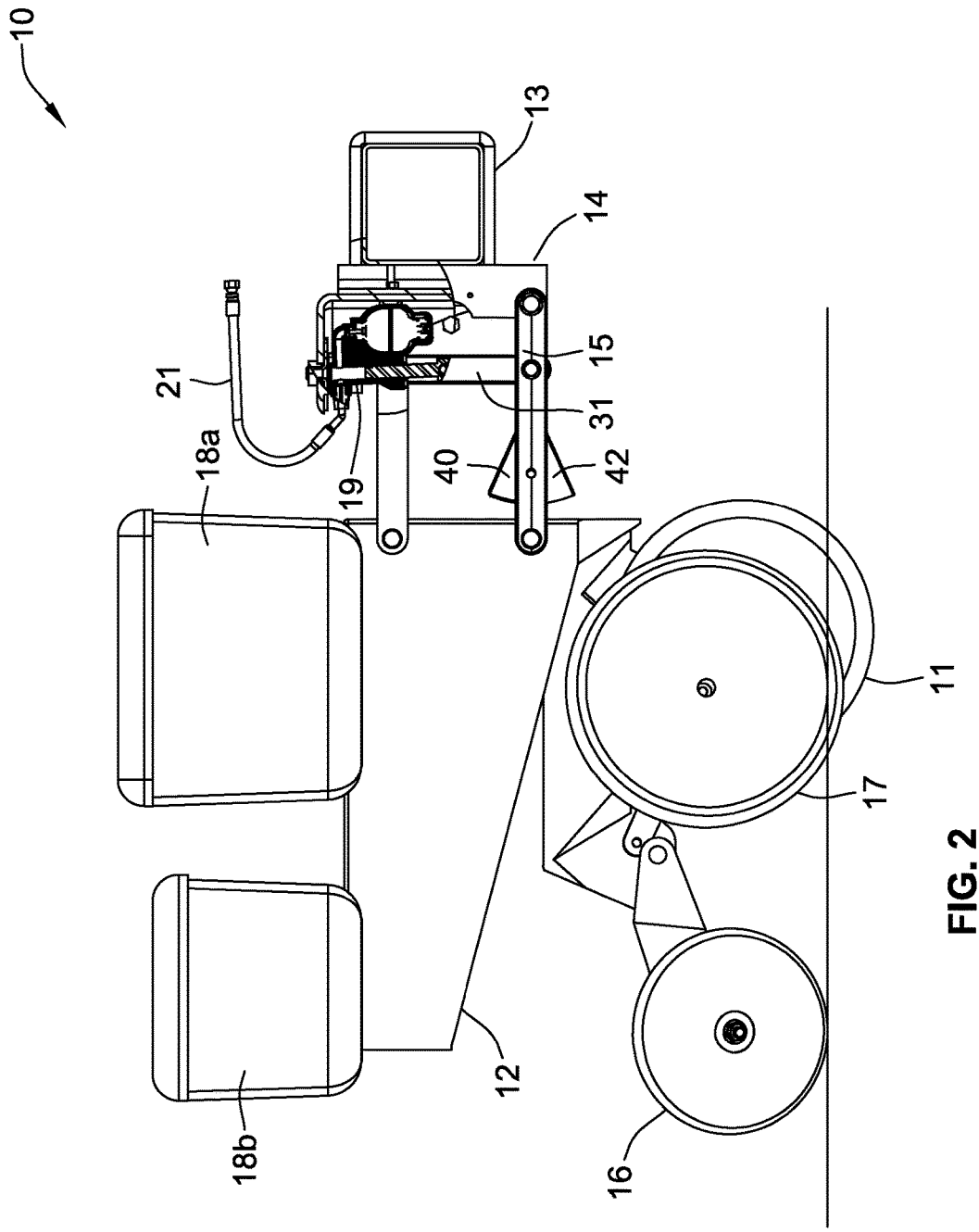
FIG. 2 is a partially sectioned side elevation of the planting row unit of FIG. 1 with the linkage that connects the row unit to the towing frame in a level position.

The accumulator 27 includes a diaphragm 28 that divides the interior of the accumulator into a hydraulic-fluid chamber 29a and a gas-filled chamber 29b, e.g., filled with pressurized nitrogen. FIG. 2 shows the ram 25 in a position where the diaphragm 28 is not deflected in either direction, indicating that the pressures exerted on opposite sides of the diaphragm are substantially equal. In FIG. 3, the ram 25 has been retracted by upward movement of the row unit, and the diaphragm 28 is deflected downwardly by the hydraulic fluid forced into the accumulator 27 by the retracting movement of the ram 25. In FIG. 4, the ram 25 has been moved to its most advanced position, and the diaphragm 28 is deflected upwardly by the air pressure as hydraulic fluid flows from the accumulator into the cavity 24. The use of this compact hydraulic down-force unit with an integral accumulator on each row unit provides the advantages of quick response and remote adjustability of a hydraulic down-force control system. If an obstruction requires quick movement, oil can flow quickly and freely between the force cylinder and the adjacent accumulator, without exerting force on other actuators in the system.

As can be seen in FIG. 4, advancing movement of the ram 25 is limited by engagement of stops 40, 42 on the lower links of the four-bar linkage 15, with the row unit frame 12. This prevents any further advancement of the ram 25. Advancing movement of the ram 25 expands the size of the cavity 24 (see FIG. 4), which causes the diaphragm 28 in the accumulator 27 to deflect to the position illustrated in FIG. 4 and reduce the amount of hydraulic fluid in the accumulator 27. When the ram 25 is in this advanced position, the row unit is in its lowermost position.

In FIG. 3, the ram 25 has been withdrawn to its most retracted position, which can occur when the row unit encounters a rock or other obstruction, for example. When the ram 25 is in this retracted position, the row unit is in its uppermost position. As can be seen in FIG. 3, retracting movement of the ram 25 is limited by engagement of stops 40, 42 on the lower links of the four-bar linkage 15, with the row unit frame 12.

Retracting movement of the ram 25 reduces the volume of the cavity 24 (see FIG. 3), which causes a portion of the fixed volume of hydraulic fluid in the cylinder 19 to flow into the chamber 29a of the accumulator 27, causing the diaphragm 28 to deflect to the position illustrated in FIG. 3. This deflection of the diaphragm 28 into the chamber 29b compresses the gas in that chamber. To enter the chamber 29a, the hydraulic fluid must flow through a port 32 in the top of the accumulator 27, which limits the rate at which the hydraulic fluid flows into the accumulator. This controlled rate of flow of the hydraulic fluid has a damping effect on the rate at which the ram 25 retracts or advances, thereby avoiding sudden large movements of the moving parts of the row unit, including the V-opener 11. This effect also minimizes vibration to improve accuracy of seed metering.

When the external obstruction causing the row unit 10 to rise is cleared, the combined effects of the pressurized gas in the accumulator 27 on the diaphragm 28 and the pressure of the hydraulic fluid return the ram 25 to a lower position. This downward force on the V-opener 11 holds it in the soil and prevents uncontrolled bouncing of the V-opener 11 over irregular terrain. The downward force applied to the V-opener 11 can be adjusted by changing the pressure of the hydraulic fluid supplied to the cylinder 19.

As can be seen in FIGS. 5 and 6, the single unitary housing 23 forms both the cavity 26b that contains the accumulator 27 and the cavity 24 of the hydraulic cylinder 19 and the fluid passageway 24 that connects the cavity 24 of the hydraulic cylinder 19 to the cavity 27 of the accumulator. By integrating the hydraulic cylinder 19 and the accumulator 27 in a single housing, there is no relative motion possible between the cylinder 19 and the accumulator 27, with minimal possibility for fluid passageways to act like orifices. The cylinder 19 and the accumulator 27 remain in fixed positions relative to each other regardless of the movements of the planter row unit via the linkage assembly 15. In this way the upward motion of the ram 25 that occurs when the planter row unit rolls over an obstruction is directly converted into compression of the gas in the accumulator 27 without restriction. It also allows the accumulator 27, which is by definition an energy storage device, to be mounted in a fully enclosed and safe housing. The accumulator 27 can be securely mounted to avoid puncture or rapid discharge (if it comes loose), or damage from hitting another part of the implement or a foreign object. The integrated cylinder and accumulator is also a convenient single package for installation and replacement and minimizes the number of hydraulic hoses and adapters (potential leakage points).

FIGS. 7, 8A and 8B illustrate in more detail how the illustrative hydraulic cylinder/accumulator unit is attached to the front frame 14 and the linkage assembly 15. The top of the unitary housing 23 forms a stem 41 that projects upwardly through a hole 51 in a bracket 50 attached to the front frame 14. The outer surface of the stem 41 is threaded to receive a nut 52 that connects the housing 23 to the bracket 50. The hole 51 is oversized and a rubber washer is installed on the stem 41 between the nut 52 and the bracket 50 to allow a limited amount of tilting movement of the housing relative to the bracket 50. At the base of the stem 41, beneath the bracket 50, the housing 23 forms a shoulder 43 that engages a conical bearing ring 53 that also engages a mating lower surface of a washer 54. Thus, the housing 23 can be tilted relative to the axis of the hole 51, with the shoulder 43 sliding over the lower surface of the bearing ring 53.

A similar arrangement is provided at the lower end of the ram 25, where a stem 60 extends downwardly through a hole 61 in the cross bar 30 that is pivotably attached to the linkage assembly 15. A nut 62 is threaded onto the stem 60 to connect the ram to the cross bar 30. The hole 61 is oversized and a rubber washer is installed on the stem 60 between the nut 62 and the cross bar 30 to allow a limited amount of tilting movement of the ram 25 relative to the cross bar 30. Above the cross bar 30, a flange 63 on the ram 25 forms a curved conical surface 64 that engages a mating surface of a curved conical bearing ring 65 that also engages a mating upper surface of a washer 66. Thus, the ram 25 can be tilted relative to the axis of the hole 61, with the flange 63 sliding over the upper surface of the bearing ring 65.

The use of a hydraulic system permits on-the-go adjustments to be made very rapidly because the hydraulic fluid is incompressible and therefore acts more directly than an air system. In addition, hydraulic fluids typically operate at higher pressures, which allow greater changes in applied forces. The accumulator 27 allows the fluid system to flex and float with the changing terrain and soil conditions. The accumulator 27 is preferably centrally mounted so that when any single row unit moves over an obstruction, the down-pressure cylinder 19 moves to displace the hydraulic fluid along a common set of lines connecting all row units. The gas in the accumulator is compressed at the same time, allowing for isolation among the row units so that upward movement of one row unit does not cause downward movement of other row units. Although the illustrative hydraulic ram is single-acting, it is also possible to use a double-acting ram, or a single-acting ram in combination with a return spring.

Another advantage of the compact hydraulic cylinder/accumulator unit is that it can be conveniently mounted to the same brackets that are provided in many row units for mounting an air bag, to control the down pressure on the row unit. For example, in FIG. 9, the brackets 50 and 51 on which the hydraulic cylinder/accumulator is mounted are the brackets that are often connected to an air bag, and thus the same row unit can be used interchangeably with either an air bag or the hydraulic cylinder/accumulator to control the down pressure on the row unit.

Figure 10:
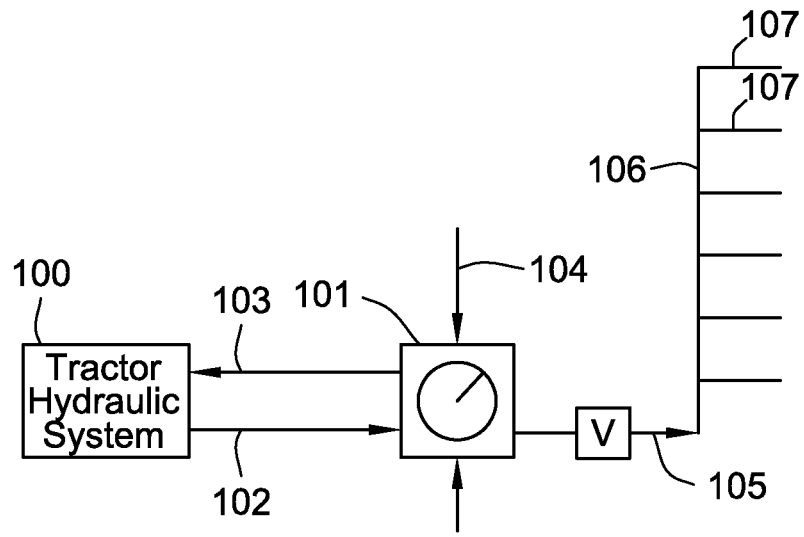
FIG. 10 is a schematic diagram of a first hydraulic control system for use with the row unit of FIGS. 1-9.

FIG. 10 is a schematic of a hydraulic control system for supplying pressurized hydraulic fluid to the cylinders 19 of multiple row units. A source 100 of pressurized hydraulic fluid, typically located on a tractor, supplies hydraulic fluid under pressure to a valve 101 via supply line 102 and receives returned fluid through a return line 103. The valve 101 can be set by an electrical control signal S1 on line 104 to deliver hydraulic fluid to an output line 105 at a desired constant pressure. The output line 105 is connected to a manifold 106 that in turn delivers the pressurized hydraulic fluid to individual feed lines 107 connected to the ports 21 of the respective hydraulic cylinders 19 of the individual row units. With this control system, the valve 101 is turned off, preferably by a manually controlled on/off valve V, after all the cylinders 19 have been filled with pressurized hydraulic fluid, to maintain a fixed volume of fluid in each cylinder.

Figure 11:
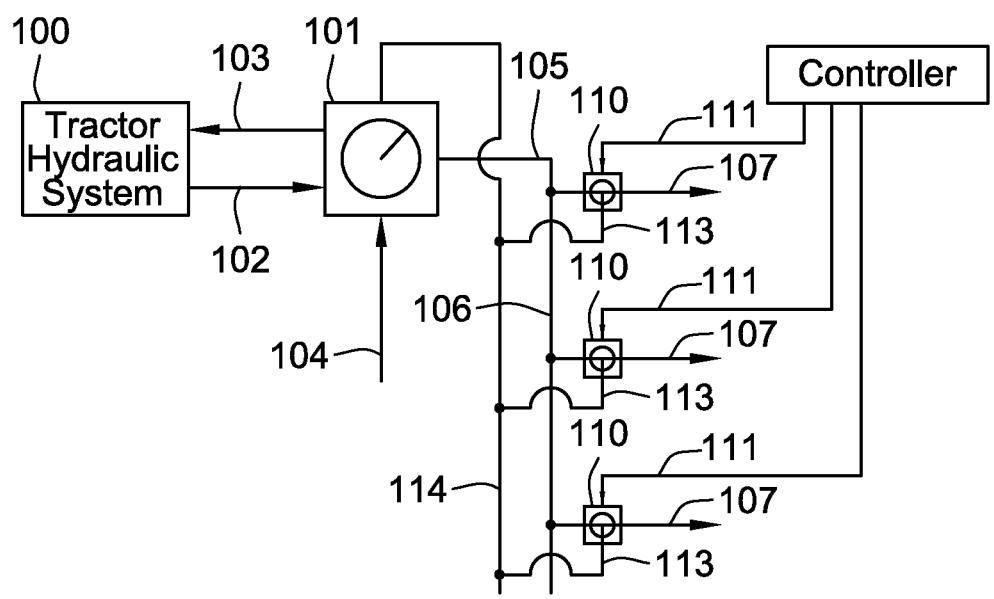
FIG. 11 is a schematic diagram of a second hydraulic control system for use with the row unit of FIGS. 1-9.

FIG. 11 is a schematic of a modified hydraulic control system that permits individual control of the supply of hydraulic fluid to the cylinder 19 of each separate row unit via feed lines 107 connected to the ports 21 of the respective cylinders 19, or to control valves for those cylinders. Portions of this system that are common to those of the system of FIG. 10 are identified by the same reference numbers. The difference in this system is that each separate feed line 107 leading to one of the row units is provided with a separate control valve 110 that receives its own separate control signal on a line 111 from a controller 112. This arrangement permits the supply of pressurized hydraulic fluid to each row unit to be turned off and on at different times by the separate valve 110 for each unit, with the times being controlled by the separate control signals supplied to the valves 110 by the controller 112. The individual valves 110 receive pressurized hydraulic fluid via the manifold 106, and return hydraulic fluid to a sump on the tractor via separate return line 113 connected to a return manifold 114 connected back to the hydraulic system 100 of the tractor.

Figure 12:
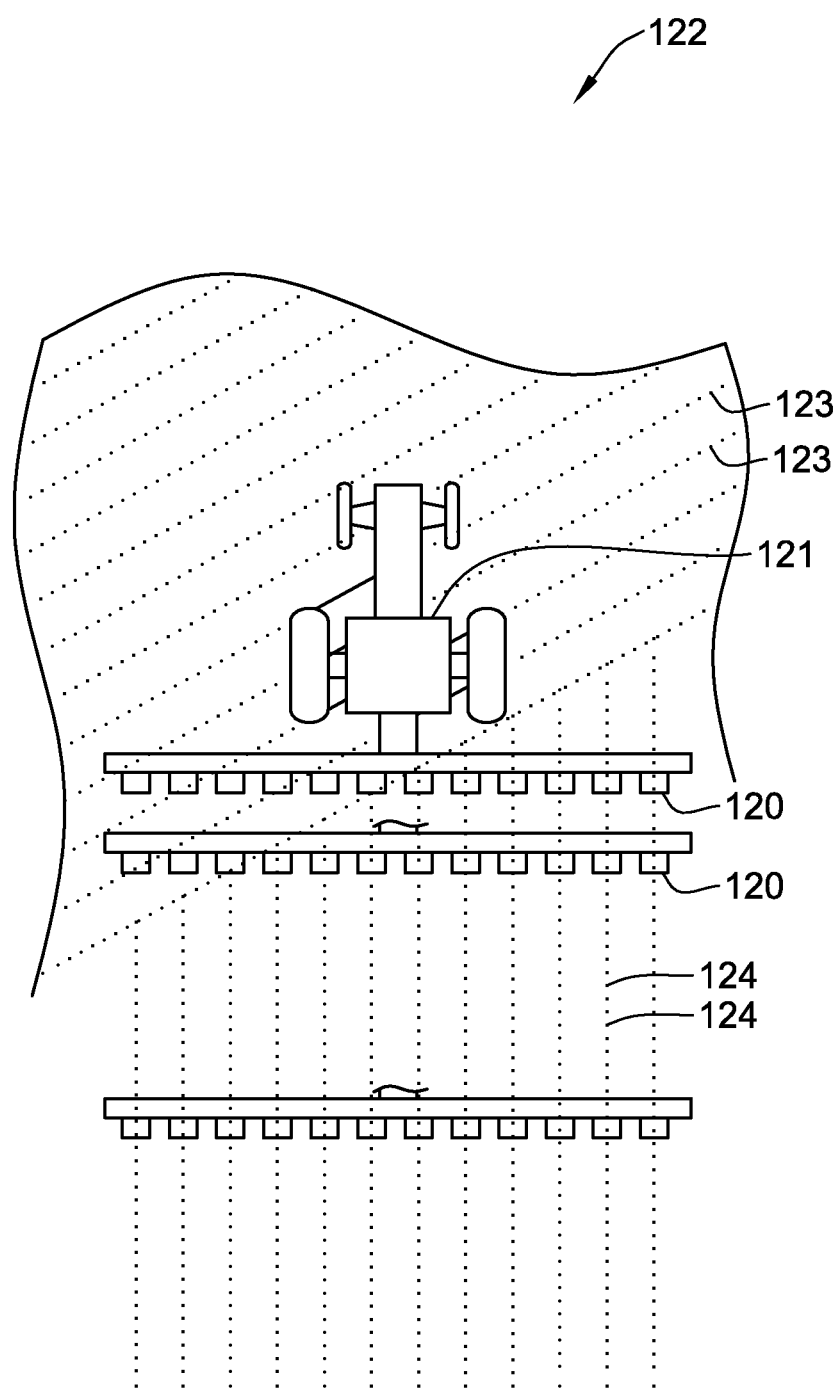
FIG. 12 is a diagram illustrating one application of the hydraulic control system of FIG. 11.

FIG. 12 illustrates on application for the controllable hydraulic control system of FIG. 11. Modern agricultural equipment often includes GPS systems that enable the user to know precisely where a tractor is located in real time. Thus, when a gang of planting row units 120 towed by a tractor 121 begins to cross a headland 122 in which the rows 123 are not orthogonal to the main rows 124 of a field, each planting row unit 120 can be turned off just as it enters the headland 122, to avoid double-planting while the tractor 121 makes a turn through the headland. With the control system of FIG. 11, the hydraulic cylinder 19 of each row unit can also be separately controlled to turn off the supply of pressurized hydraulic fluid at a different time for each row unit, so that each row unit is raised just as it enters the headland, to avoid disrupting the rows already planted in the headland.

One benefit of the system of FIG. 11 is that as agricultural planters, seeders, fertilizer applicators, tillage equipment and the like become wider with more row units on each frame, often 36 30-inch rows or 54 20-inch rows on a single 90-foot wide toolbar, each row unit can float vertically independently of every other row unit. Yet the following row units still have the down force remotely adjustable from the cab of the tractor or other selected location. This permits very efficient operation of a wide planter or other agricultural machine in varying terrain without having to stop to make manual adjustment to a large number of row units, resulting in a reduction in the number of acres planted in a given time period. One of the most important factors in obtaining a maximum crop yield is timely planting. By permitting remote down force adjustment of each row unit (or group of units), including the ability to quickly release all down force on the row unit when approaching a wet spot in the field, one can significantly increase the planter productivity or acres planted per day, thereby improving yields and reducing costs of production.

On wide planters or other equipment, at times 90 feet wide or more and planting at 6 mph or more forward speed, one row unit must often rise or fall quickly to clear a rock or plant into an abrupt soil depression. Any resistance to quick movement results in either gouging of the soil or an uncleared portion of the field and reduced yield. With the row unit having its own hydraulic accumulator, the hydraulic cylinder can move quickly and with a nearly constant down force. Oil displaced by or required by quick movement of the ram is quickly moved into or out of the closely mounted accumulator which is an integral part of each row unit. The accumulator diaphragm or piston supplies or accepts fluid as required at a relatively constant pressure and down force as selected manually or automatically by the hydraulic control system. By following the soil profile closely and leaving a more uniform surface, the toolbar-frame-mounted row unit permits the planter row unit following independently behind to use less down force for its function, resulting in more uniform seed depth control and more uniform seedling emergence. More uniform seedling stands usually result in higher yields than less uniform seedling stands produced by planters with less accurate row cleaner ground following.

Figure 13:
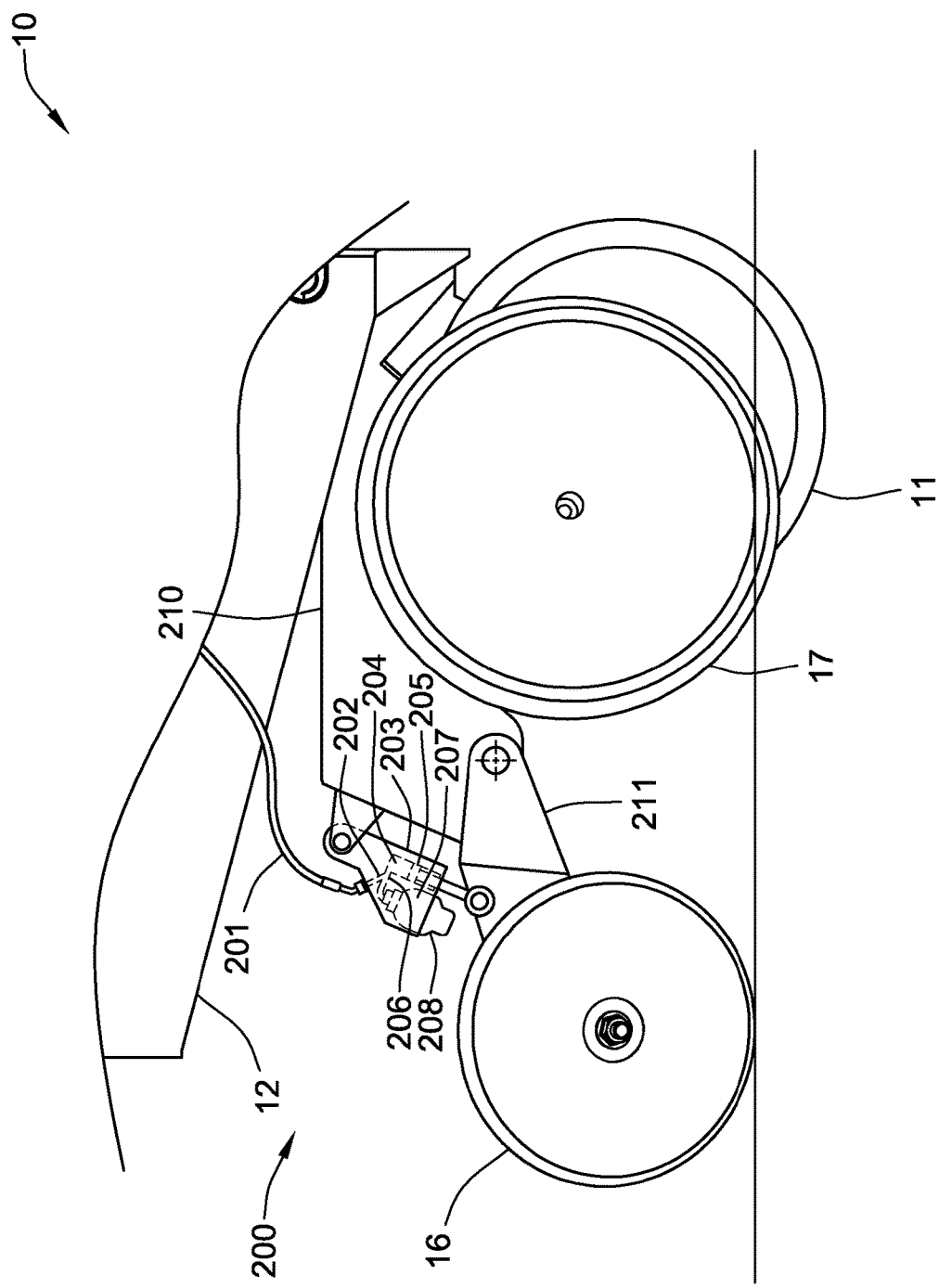
FIG. 13 is a side elevation of a modified embodiment having the hydraulic control unit coupled to the closing wheels of the row unit.
Figure 14:
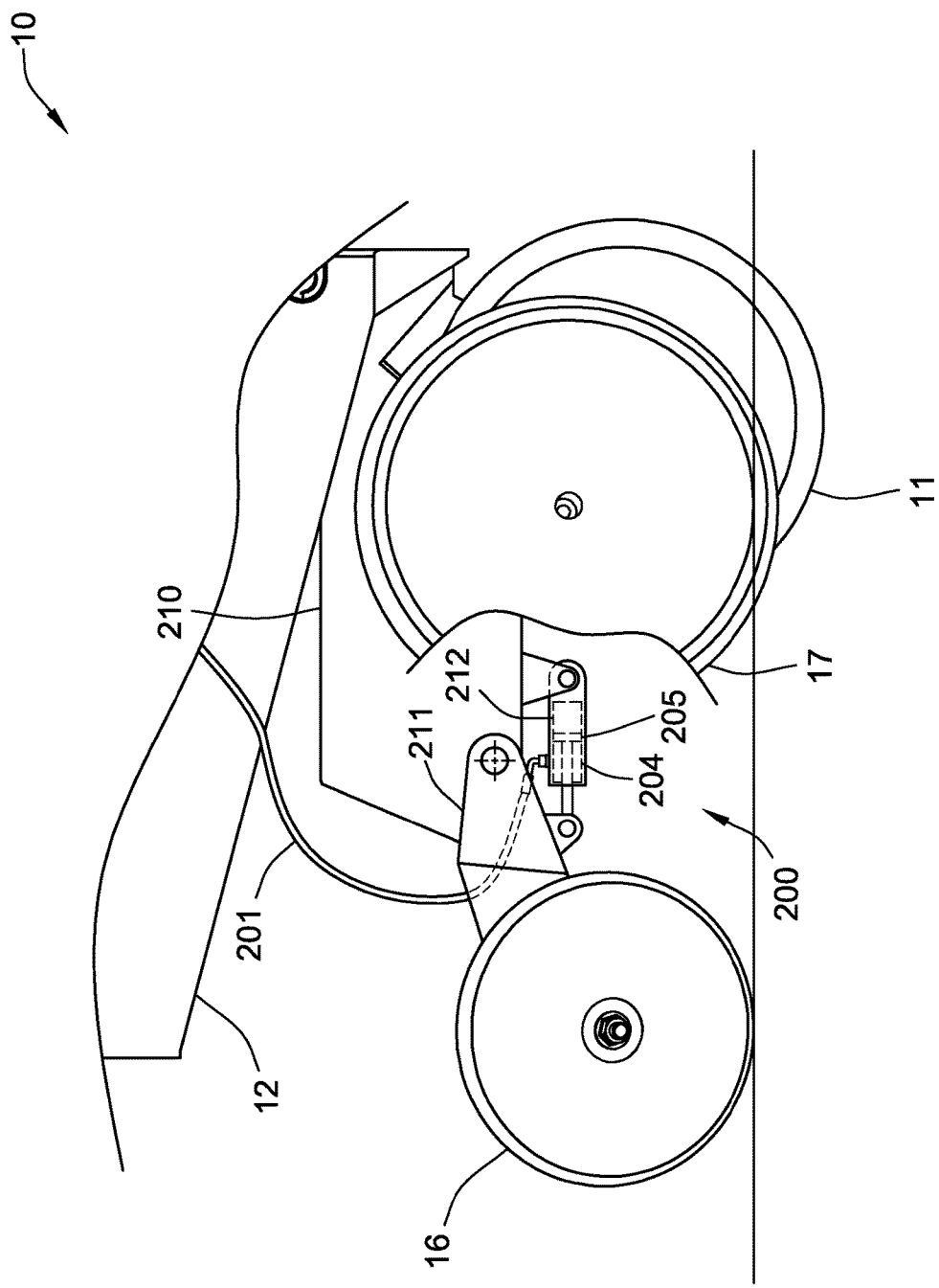
FIG. 14 is a side elevation of a further modified embodiment having the hydraulic control unit coupled to the closing wheels of the row unit.
Figure 15:
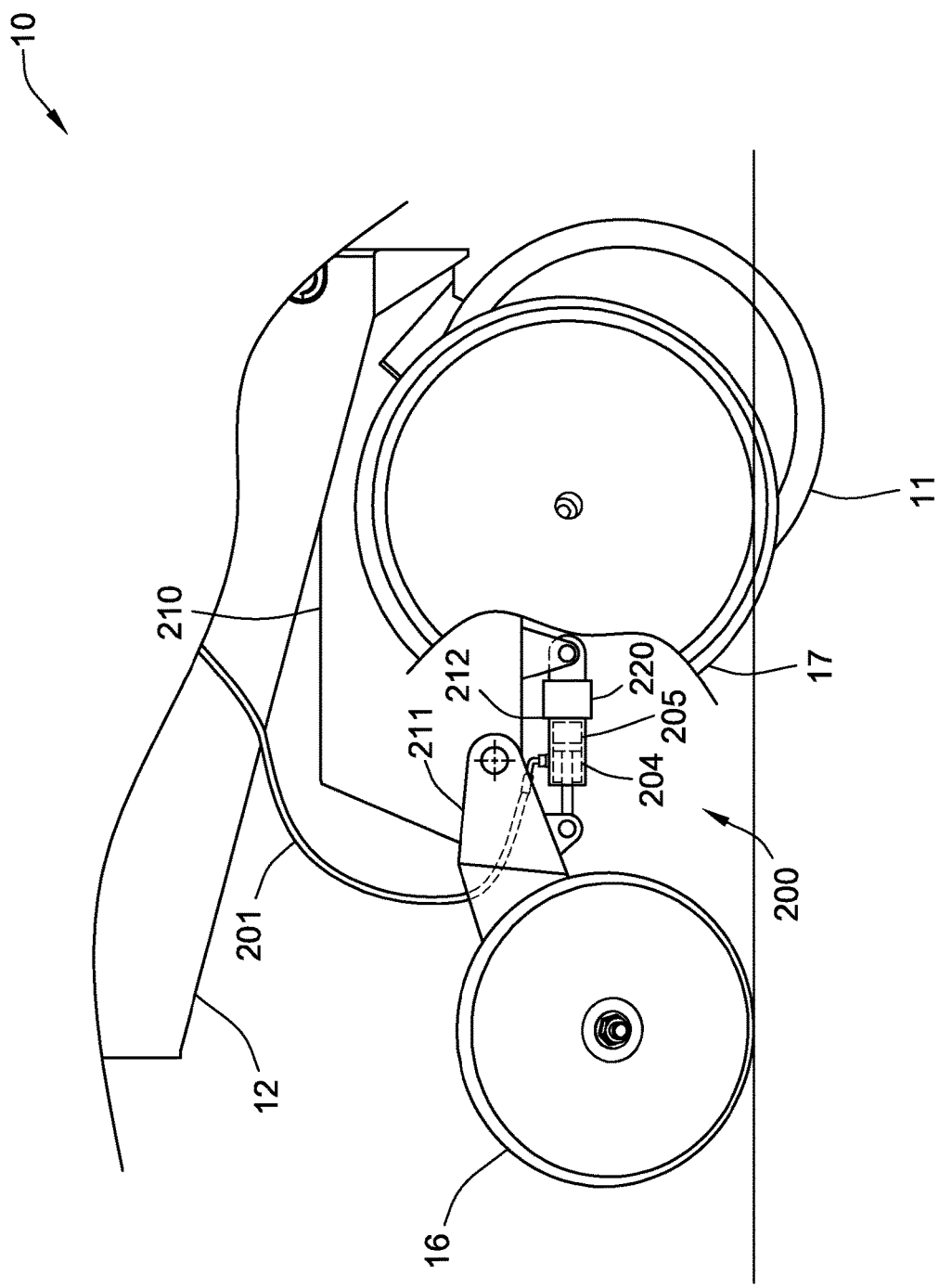
FIG. 15 is yet another modified embodiment having the hydraulic control unit coupled to the closing wheels of the row unit.

FIGS. 13-15 illustrate modified embodiments in which the hydraulic cylinder 200 urges the closing wheels 16 downwardly with a controllable force that can be adjusted for different conditions. Referring first to FIG. 13, pressurized hydraulic fluid from the tractor is supplied by a hose 201 to a port 202 of a housing 203 that forms a cavity of a hydraulic cylinder 204 containing a ram 205. The housing 203 also forms a side port 206 that leads into a cavity 207 that contains a gas-charged hydraulic accumulator 208. The lower end of the cavity 204 is formed by the top end surface of the ram 205, so that the hydraulic pressure exerted by the hydraulic fluid on the end surface of the ram 205 urges the ram downwardly (as viewed in FIG. 13), with a force determined by the pressure of the hydraulic fluid and the area of the exposed end surface of the ram 205. The hydraulic fluid thus urges the ram 205 in a downward direction.

The hydraulic cylinder 204 and the accumulator 208 are pivotally mounted as a single unit on the row unit frame 210, with the lower end of the ram 205 pivotally connected to a linkage 211 that carries the closing wheels 16. With this mounting arrangement, advancing movement of the ram 205 in the cylinder 204 tilts the linkage 211 downwardly, thereby urging the closing wheels 16 downwardly. Conversely, retracting movement of the ram 205 tilts the linkage 211 upwardly, thereby raising the closing wheels 16.

FIG. 14 illustrates an arrangement similar to FIG. 13 except that the hydraulic cylinder 204 is charged with a pressurized gas in chamber 212 on the side of the ram 205 that is not exposed to the pressurized fluid from the hose 201. Thus, as the ram 205 is retracted by increasing the hydraulic pressure on one side of the ram, the gas on the other side of the ram is compressed and thus increases the resistance to retracting movement of the ram. The hydraulic cylinder 204 is positioned such that advancing movement of the ram 205 in the cylinder 204 tilts the linkage 211 upwardly, thereby raising the closing wheels 16. Conversely, retracting movement of the ram 205 tilts the linkage 211 downwardly, thereby urging the closing wheels 16 downwardly with an increased force. To increase the downward pressure on the closing wheels 16, the hydraulic pressure must overcome the gas pressure that increases as the ram 205 is retracted, but upward movement of the closing wheels (e.g., when an obstruction is encountered) requires only that the ram be advanced with sufficient pressure to overcome that of the hydraulic fluid.

In FIG. 15, the arrangement is the same as in FIG. 14, but the hydraulic control unit has an added biasing element 220 on the side of the ram 205 that is not exposed to the pressurized hydraulic fluid. This biasing element 220 may be in addition to, or in place of, pressurized gas in the hydraulic cylinder 204. The biasing element 220 may be formed by various types of mechanical springs, such as a compressed coil spring, or may be pressurized air, nitrogen or other gas.

FIGS. 16-18 illustrate a modified hydraulic control unit that includes a hydraulic cylinder 300 containing a ram 301 that can be coupled at its lower end to a device on which the down pressure is to be controlled. Pressurized hydraulic fluid is supplied to the upper end of the cylinder 301 through a port 304. The cylinder 300 includes a side port 302 leading to an accumulator 303 of the type described above in connection with FIGS. 5 and 6. The entry port 305 to the accumulator 303 is equipped with a check valve 306 and restriction 307 as illustrated in FIG. 18. When the ram 301 is in a lowered position that opens the port 302, and is moved upwardly by an upward force applied by engagement of the controlled device with a rock or other obstruction, hydraulic fluid flows from the cylinder 300 into the accumulator 303 via the restriction 307. The restriction acts as a damper to reduce the shock on the equipment and avoid excessive upward movement of the ram 301. When the upward force on the ram has been removed, hydraulic fluid flows from the accumulator back into the cylinder 300 via the check valve 306, which allows unrestricted flow in this direction so that the controlled device quickly re-engages the ground with the down pressure exerted by the hydraulic fluid on the upper end of the ram 301. The check valve unit can be easily installed in the accumulator entry port 305. Additionally, the check valve unit can have an orifice system that is bidirectional for damping motion, both in and out.

The term row unit refers to a unit that is attached to a towing frame in a way that permits the unit to move vertically relative to the towing frame and other units attached to that same towing frame. Most row units are equipped to form, plant and close a single seed furrow, but row units are also made to form, plant and close two or more adjacent seed furrows.

Figure 19:
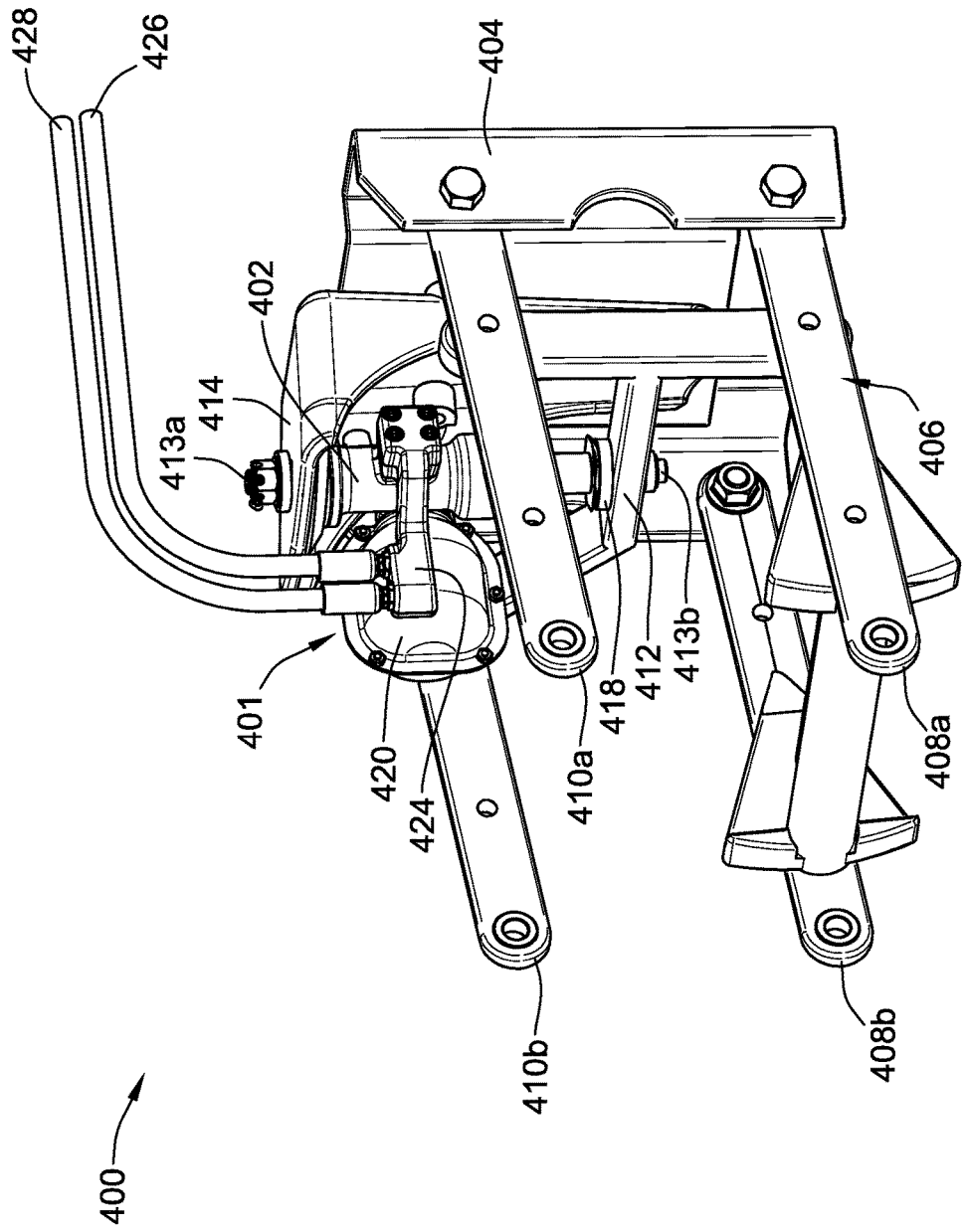
FIG. 19 is a perspective view of a standard configuration of a hydraulic system.

Referring to FIG. 19, a hydraulic system 400 includes a hydraulic assembly 401, a front frame 404, and a four-bar linkage assembly 406. The four-bar linkage assembly 406 is generally similar to the four-bar linkage assembly 15 described above in reference to FIGS. 1-9. The four-bar linkage assembly 406 includes a pair of parallel lower links 408a, 408b, a pair of parallel upper links 410a, 410b, and a cross bar 412. The hydraulic assembly 401 is rigidly attached to the four-bar linkage assembly 406 on a row-unit side, and the front frame 404 is pivotably attached to the four-bar linkage assembly 406 on a towing side.

The hydraulic assembly 401 includes a hydraulic cylinder 402, an accumulator protective cover 420, and a hose connection manifold 424. The hydraulic cylinder 402 is generally similar to the hydraulic cylinders 19, 204 described above in reference to FIGS. 1-9 and 13-18, and includes an upper end 413a and a lower end 413b. The upper end is mounted to a bracket 414 of the linkage assembly 406, and the lower end 413b is mounted to the cross bar 412 of the linkage assembly 406. A gland and securing nut 418 (with internal seals) is interposed at the lower end 413b between the hydraulic cylinder 402 and the cross bar 412.

The accumulator protective cover 420 is mounted adjacent to and between a left upper link 410b and the hydraulic cylinder 402. The accumulator protective cover 420 shields from environmental contaminants and physical damage an accumulator 422 (shown in FIG. 20A). In addition to protecting the accumulator 422, the accumulator protective cover 420 itself is provided with protection from physical damage, e.g., caused by debris, rocks, etc., by being located between the pair of upper links 410a, 410b. Although the upper links 410, 410b do not completely shield the accumulator protective cover 420, the upper links 410, 410b provide some protection from physical damage while, simultaneously, allowing ease of access for servicing and/or replacing the accumulator 422.

Figure 21:
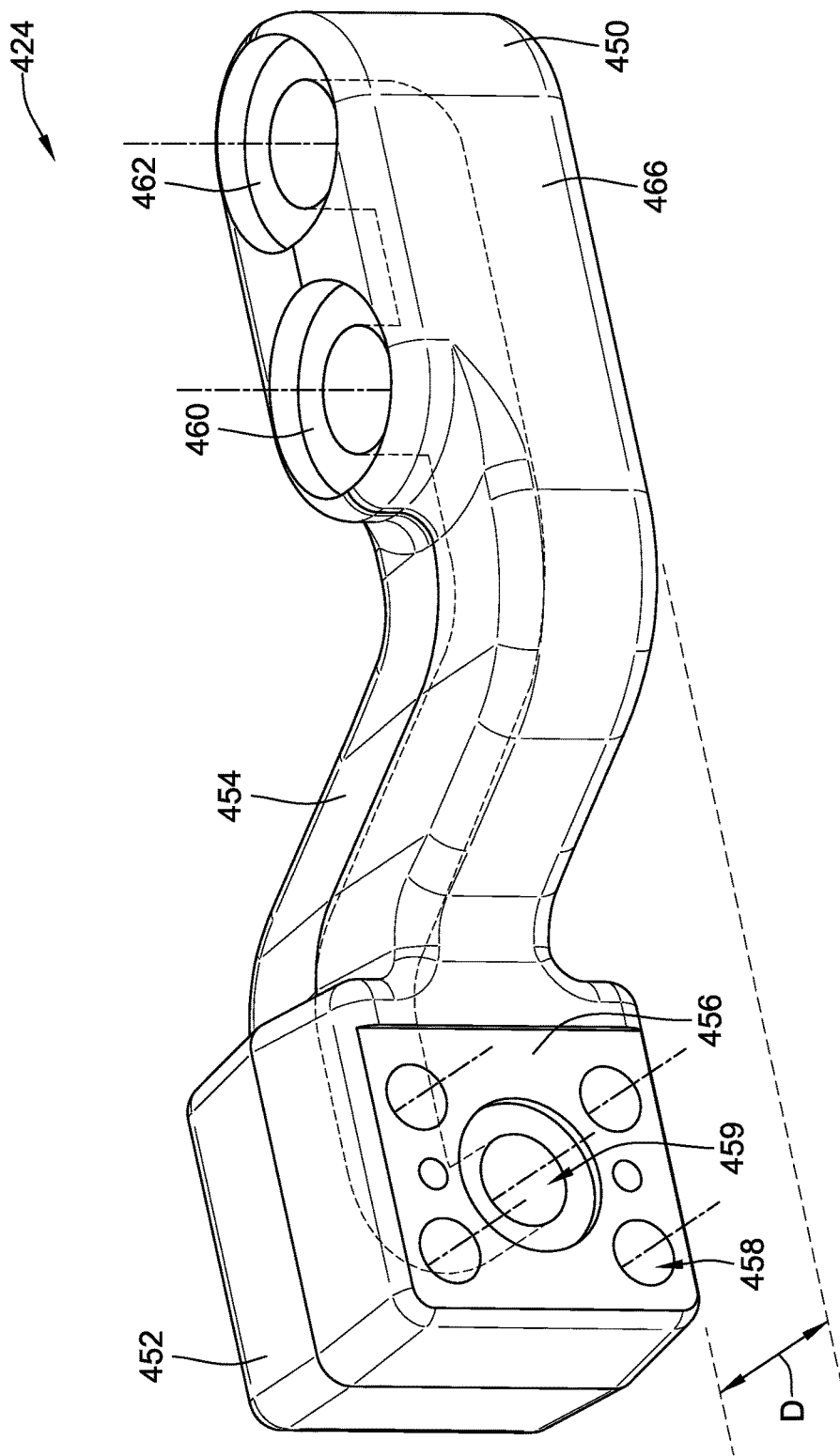
FIG. 21 is a perspective view of a hose connection manifold.

The hose connection manifold 424, which is described in more detail below in reference to FIG. 21, is mounted adjacent to and between a right upper link 410a and the hydraulic cylinder 402. The hose connection manifold 424 is configured such that it does not interfere with any of the other components of the hydraulic system 400, including the right upper link 410a, the hydraulic cylinder 402, and the accumulator protective cover 420. The hose connection manifold 424 is coupled at a distal end to a pair of hydraulic fluid hoses, including an inlet hose 426 and an outlet hose 428. Assuming a configuration in which a plurality of units are arranged in a parallel (or side-by-side) configuration, the inlet hose 426 receives and delivers hydraulic fluid from an adjacent row unit, and the outlet hose 428 connects to another adjacent row unit.

The attachment of the hoses 426, 428 to the hose connection manifold 424, in a position that is spaced away from the relatively more-cluttered area of the hydraulic cylinder 402 and bracket 414, facilitates easy field servicing of the hoses 426, 428. For example, a user can easily couple/uncouple the hoses 426, 428 to/from the hose connection manifold 424 by having a clear path directly to the hose connection manifold 424.

Figure 20A:
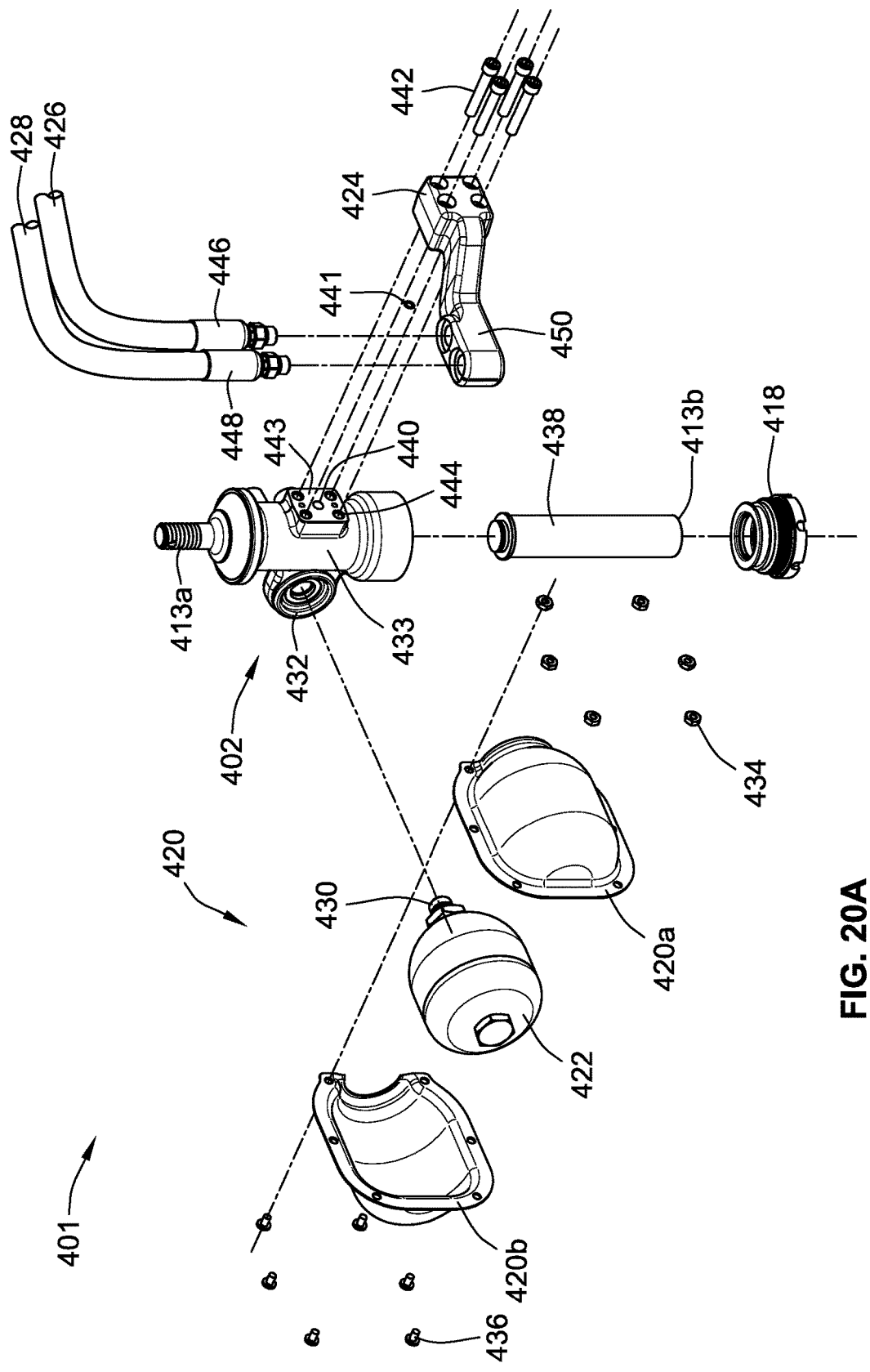
FIG. 20A is an exploded view of a standard configuration of a hydraulic assembly.
Figure 20B:
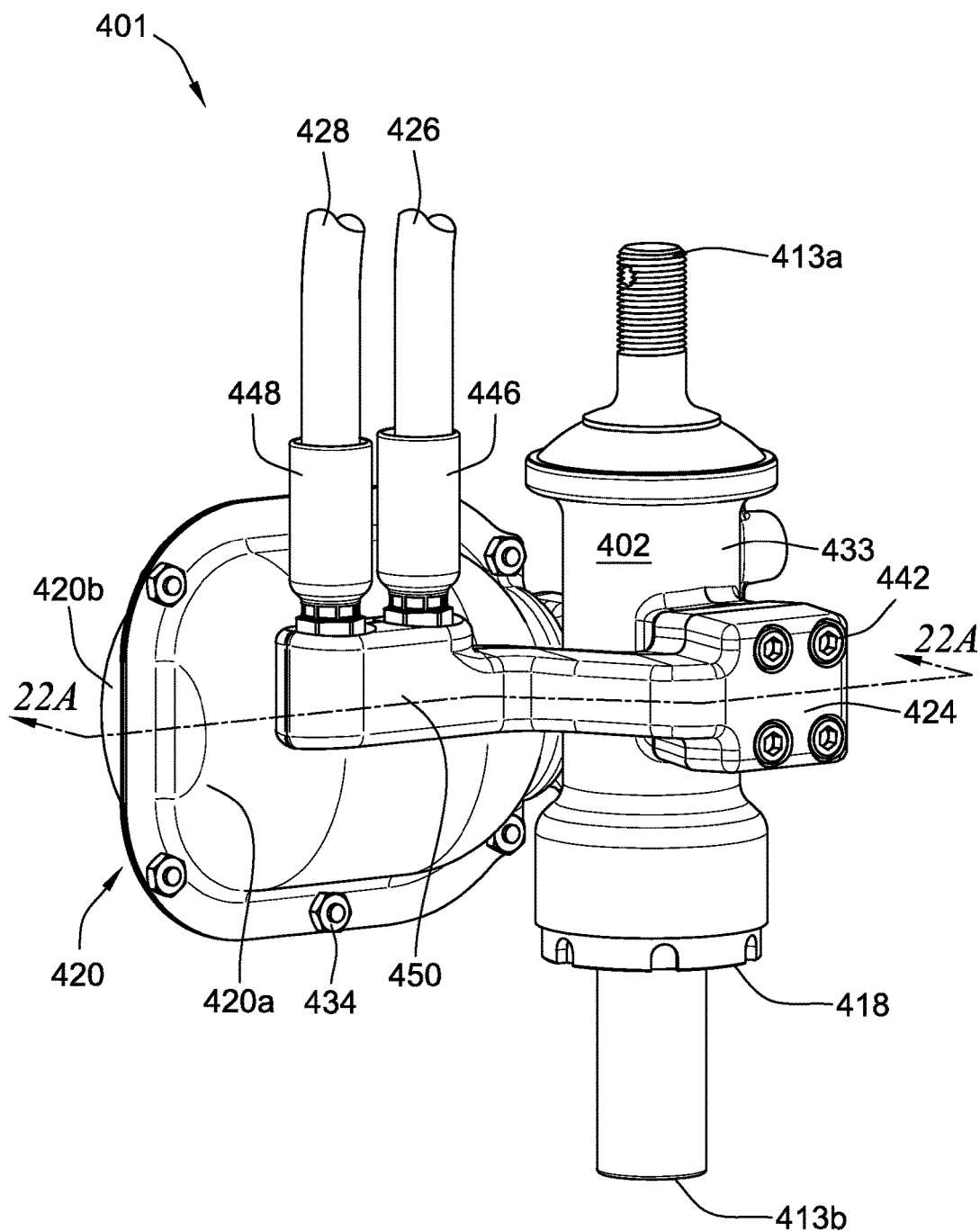
FIG. 20B is an assembled perspective view of FIG. 20A.

Referring to FIGS. 20A and 20B, the accumulator protective cover 420 includes a right cover 420a and a left cover 420b that are fastened to each other via a plurality of small nuts 434 and bolts 436. Enclosed within the accumulator protective cover 420 is the accumulator 422, which has an accumulator end 430 that is inserted into a accumulator receiver 432 of the hydraulic cylinder 402. The accumulator receiver 432 extends from a main body 433 of the hydraulic cylinder 402 a sufficient distance to permit the mounting of the accumulator protective cover 420 without interfering with the hose connection manifold 424 (as further illustrated in FIG. 22A).

The main body 433 of the hydraulic cylinder 402 receives a spherical rod 438 for axial mounting below the accumulator receiver 432. The gland 418 is threaded into the hydraulic cylinder 402 after the spherical rod 438 is installed on the hydraulic cylinder 402. The gland 418 contains internal seals and wear rings to hold pressure and seal out contaminants.

The hydraulic cylinder 402 further includes a mounting interface 440 extending from the main body 433 in an opposite direction relative to the accumulator receiver 432. The hose connection manifold 424 is mounted directly to the mounting interface 440 via a plurality of long bolts 442 that are received, respectively, in a plurality of threaded holes 444. An O-ring seal 441 is positioned between the control manifold 424 and the hydraulic cylinder 402 to prevent leakage of hydraulic fluid. The hose connection manifold 424 has a mounting face 456 (shown in FIG. 21) that is aligned, when mounted, in contact with a receiving face 443 of the mounting interface 440. As illustrated in the exemplary embodiment, the mounting face 456 of the hose connection manifold 424 and the receiving face 443 of the mounting interface 440 are configured such that they are complementary mating faces with the O-ring seal 441 holding pressure between the components.

The mounting interface 440 further facilitates a modular exchange between hose connection manifolds of different types. In the current illustration, the hose connection manifold 424 is an example of a standard configuration in which the manifold functions solely to attach hydraulic hoses and to circulate hydraulic fluid between the hydraulic source and the hydraulic cylinder 402. In an alternative configuration, described in more detail below in reference to FIGS. 23-25C, the same mounting interface 440 (without reliance on additional components or tools) is used to attach a manifold of a different type. This modular exchange between different manifold types is beneficial for quick and easy replacement of the manifolds based on current planting needs, which can quickly change in real time due to weather conditions, terrain conditions, etc.

A pair of hose ends 446, 448 are attached to the hose connection manifold 424 at a distal end 450 for coupling the inlet and outlet hoses 426, 428. Specifically, an inlet hose-end 446 is coupled to the inlet hose 426 and an outlet hose-end 446 is coupled to the outlet hose 428. The hose ends 446, 448 are attached to the distal end 450 in a generally parallel configuration relative to a central axis of the hydraulic cylinder 402. As discussed above, the attachment configuration of the hose ends 446, 448 to the hose connection manifold 424 facilitates easy access and servicing of the inlet and outlet hoses 426, 428.

Referring to FIG. 21, the hose connection manifold 424 is a valve-less manifold that lacks a control valve or a control module (in contrast to the integrated control manifold 524 discussed below in reference to FIGS. 23-25C). The hose connection manifold 424 has a mounting end 452 that is separated from the distal end 450 by a manifold arm 454. The manifold arm 454 includes a curved section that offsets the mounting face 456 of the mounting end 452 by a distance D from an exterior surface 466 of the distal end 450. The offset distance D is helpful in minimizing space requirements for mounting the hose connection manifold 424 within the space defined by the upper links 410, 410b of the linkage assembly 406. The manifold arm 454 is positioned generally parallel to the accumulator 422.

The mounting face 456 includes a plurality of mounting holes 458 arranged in a concentric pattern around a central hydraulic hole 459, through which hydraulic fluid is delivered to the hydraulic cylinder 402. The pattern of the mounting holes 458 matches a pattern of the threaded holes 444 of the mounting interface 440. When the hose connection manifold 424 is mounted to the hydraulic cylinder 402, the long bolts 442 are received through the mounting holes 458.

The hydraulic hole 459 is internally connected to an inlet port 460 and an outlet port 462 via an internal channel 464 (illustrated in FIG. 22A). The inlet port 460 is adapted to receive the inlet hose-end 446, to which the inlet hose 426 is coupled, and the outlet port 462 is adapted to receive the outlet hose-end 446, to which the outlet hose 428 is coupled. The inlet and outlet ports 460, 462 are aligned with a central axis of the internal channel 464 and are oriented perpendicular to the orientation of the hydraulic hole 459. Additionally, the spacing between the inlet port 460 and the outlet port 462 facilitates parallel coupling of the two hose ends 446, 448 adjacent to each other.

Figure 22B:
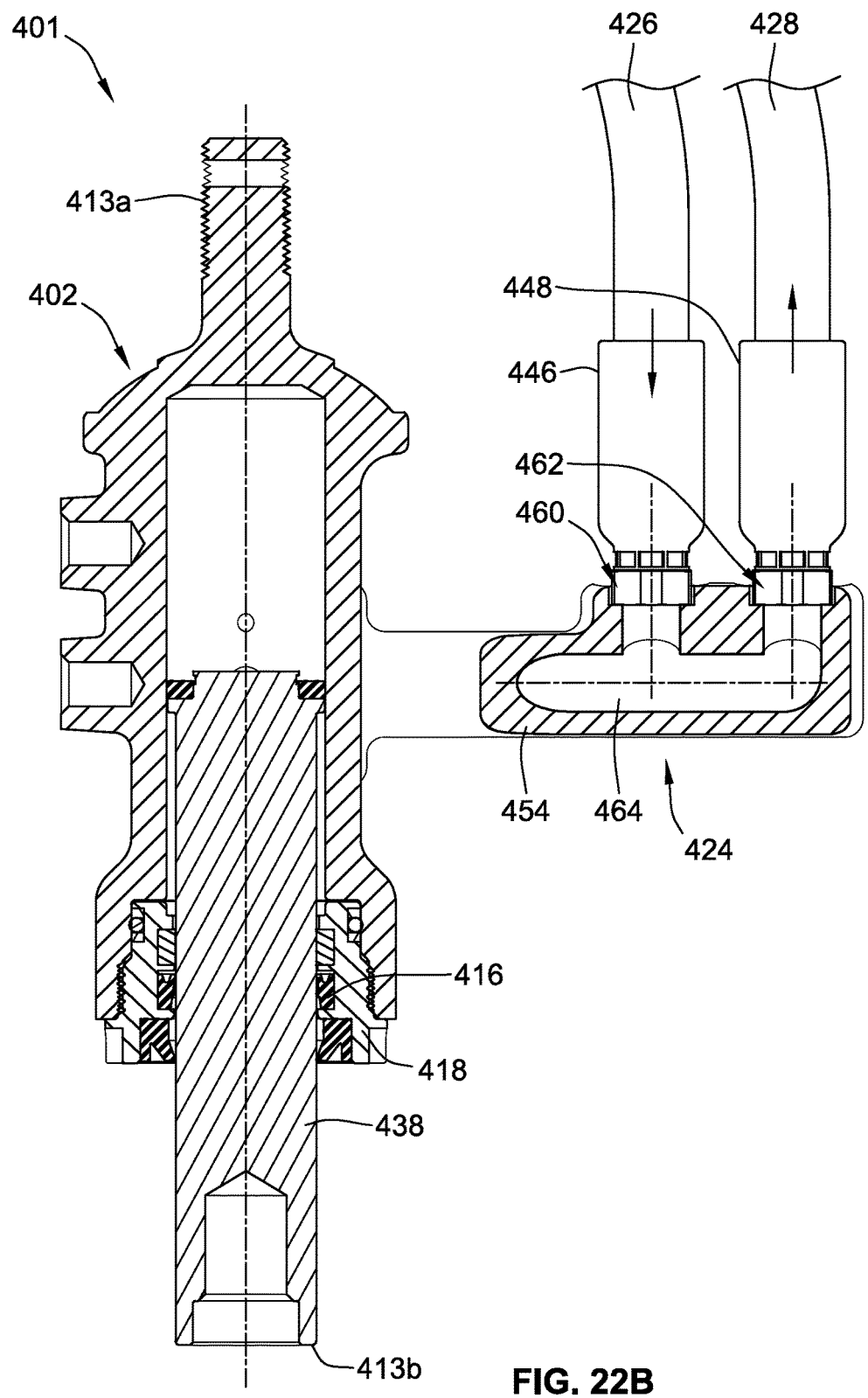
FIG. 22B is a side cross-sectional view of FIG. 20B.

Referring to FIGS. 22A and 22B, the configuration of the hydraulic assembly 401 facilitates delivery of hydraulic fluid to the hydraulic cylinder 402 in a relatively space-constrained environment while still providing easy access to main components, including the accumulator 422 and the hose connection manifold 424, for service and replacement. For example, referring specifically to FIG. 22A, hydraulic fluid circulates unrestricted between the hose connection manifold 424, the hydraulic cylinder 402, and the accumulator 422 via the internal channel 464. The geometric configuration of the hose connection manifold 424 facilitates mounting the accumulator protective cover 420 close to the distal end 450 of the hose connection manifold 424 at a relatively small distance Z, thus minimizing required mounting space, without causing interference between the hose connection manifold 424 and the accumulator protective cover 420.

In addition to the offset distance D, the distal end 450 is further defined by a distance X that separates two extreme points of a central axis of the internal channel 464. Specifically, distance X is defined by a point of the central axis near the distal end 450 and a point of the central axis near the mounting end 452. Although the offsetting of the two ends 450, 452 does not impact the flow of hydraulic fluid, the offsetting helps increase clearance space between the hose connection manifold 424 and the linkage assembly 406.

Referring more specifically to FIG. 22B, the inlet hose 426 and the outlet hose 428 can be easily and quickly removed, in the field, based at least on their parallel upward attachment to the hose connection manifold 424. Optionally, the inlet hose 426 and the outlet hose 428 can be daisy chained when using a typical side-by-side arrangement of row units. For example, in one illustrative example, a first row unit is connected directly to the hydraulic source via its inlet hose and directly to the inlet port of an adjacent second row unit via its outlet hose. Thus, the second row unit receives hydraulic fluid, indirectly, from the hydraulic source via the first row unit. The second row unit, is further daisy chained to an adjacent third row unit such that the outlet hose of the second row unit is directly connected to the inlet port of the third row unit. This type of daisy-chain configuration can continue with dozens of row units. To change the configuration to a standard hose routing, one of the two ports 460, 462 is plugged and a tee is placed in front of the row unit such that a single hose is connected to the hydraulic cylinder 402.

Figure 23:
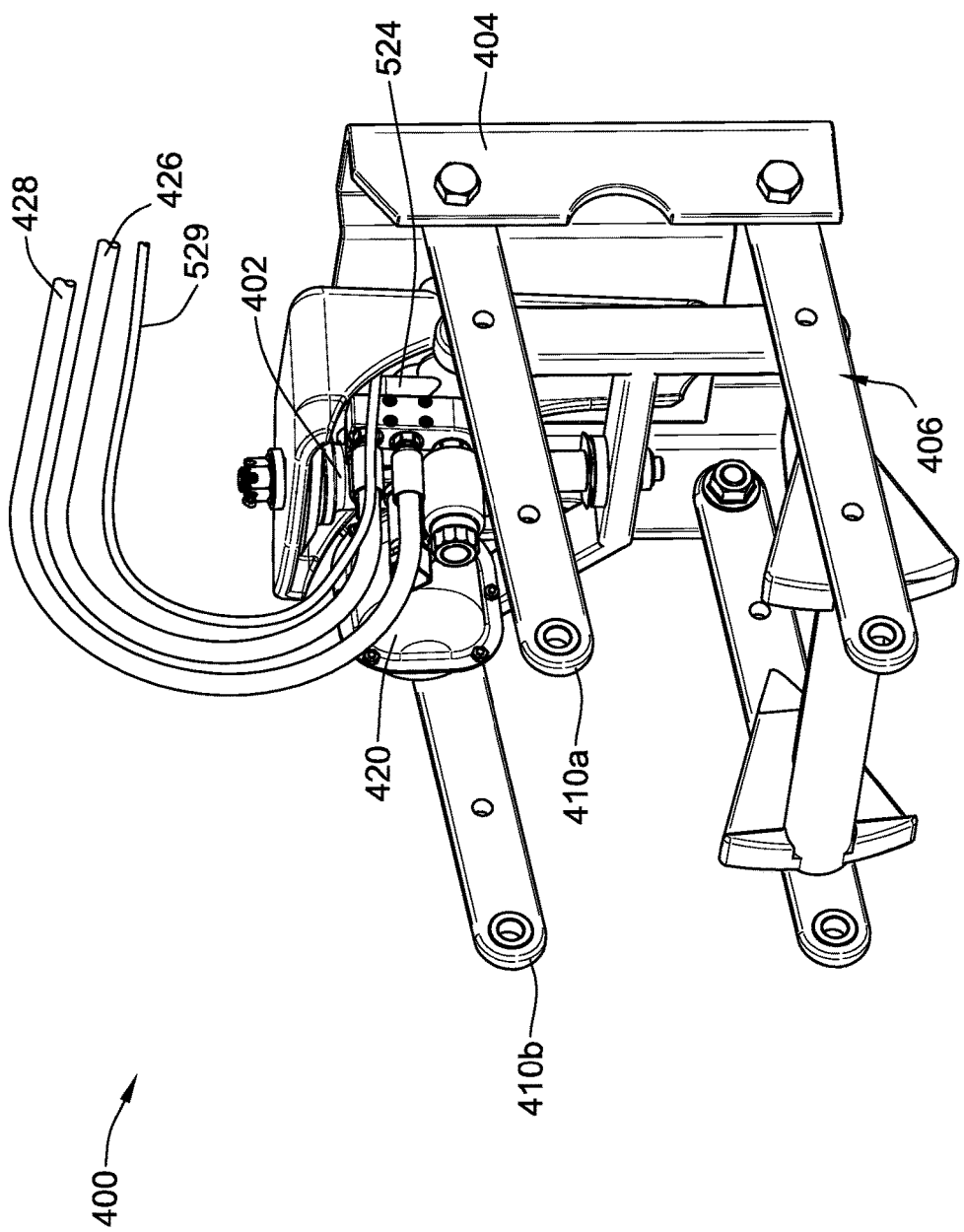
FIG. 23 is a rear perspective view of an alternative configuration of the hydraulic system of FIG. 19.
Figure 24A:
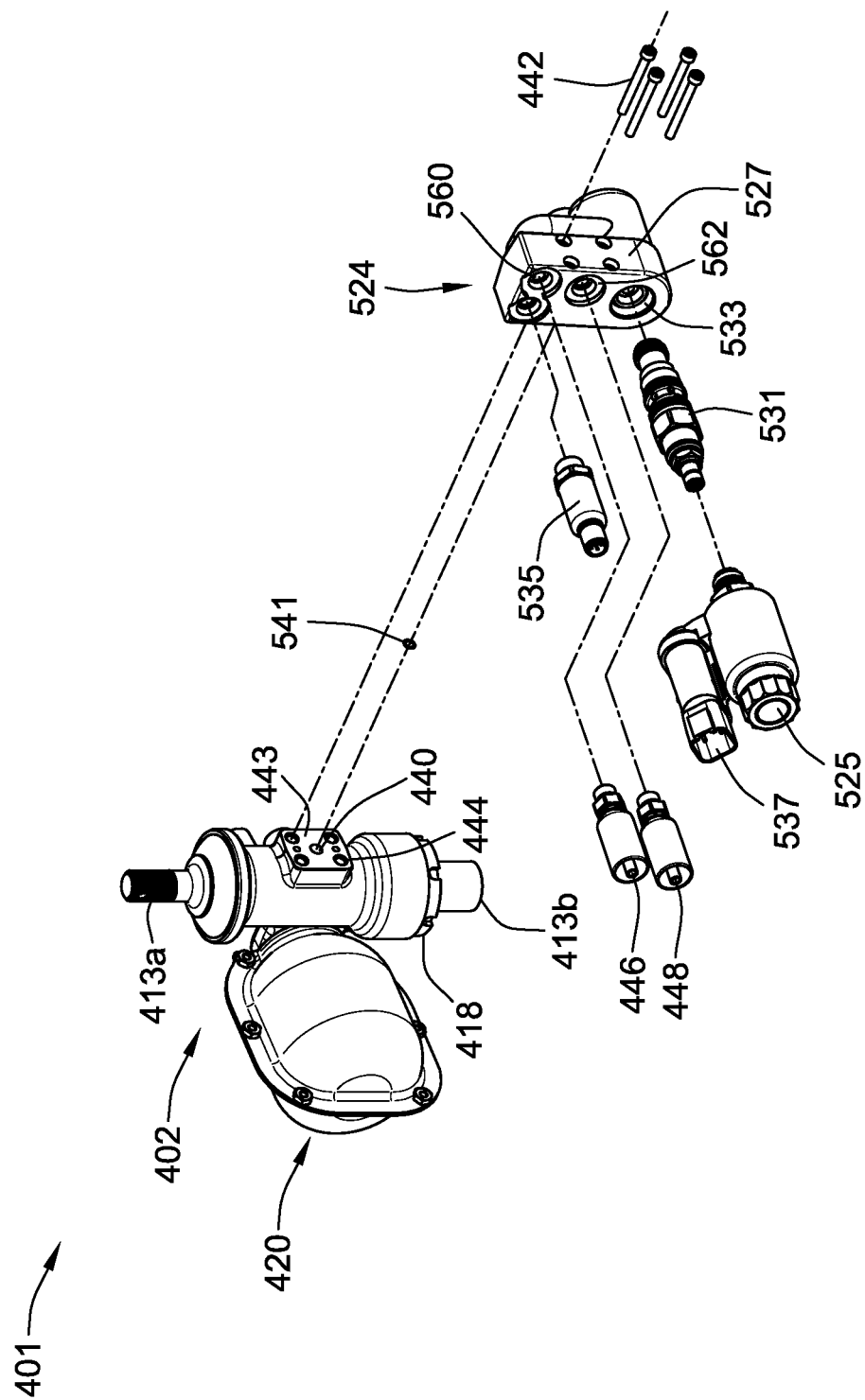
FIG. 24A is an exploded view of an alternative configuration of a hydraulic assembly.
Figure 24B:
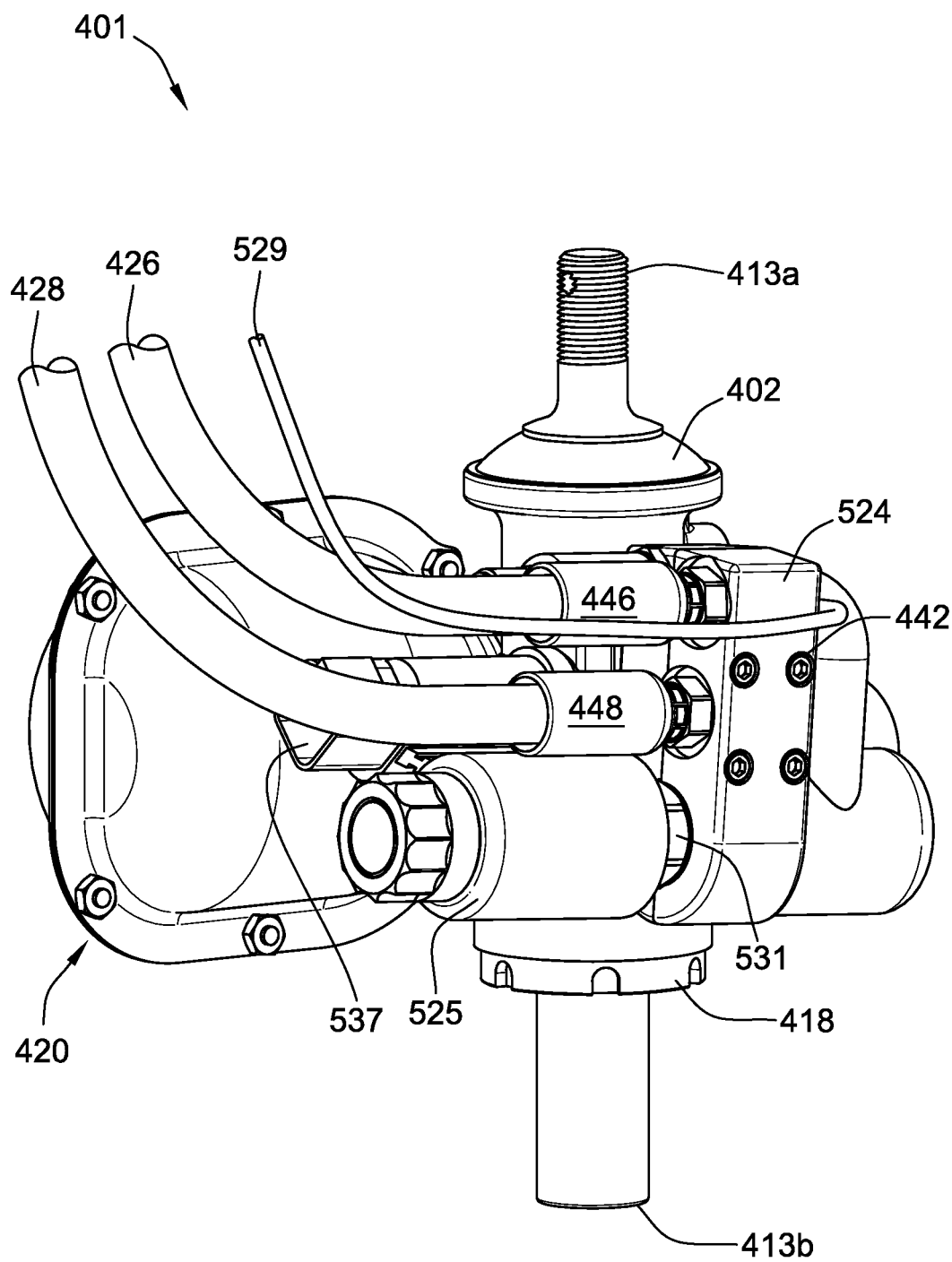
FIG. 24B is an assembled perspective view of FIG. 24A.

Referring to FIG. 23, in an alternative configuration of the hydraulic system 400 the hose connection manifold 424 has been replaced with the integrated control manifold 524 that includes both an electronic control module 525 and a connection manifold 527 (both shown in FIGS. 24A and 24B). The control manifold 524 is configured to fit within the upper links 410a, 410b next to the accumulator protective cover 420, similar to the hose connection manifold 424. Thus, similarly to the hose connection manifold 424, the control manifold 524 does not interfere with any components of the hydraulic system 400. Additionally, easy access is provided for a user to couple/uncouple the inlet and outlet hoses 426, 428 to/from the control manifold 524. The control manifold 524 is further connected to a control signal wire 529 for receiving control signals from a central processing unit.

One benefit of the control manifold 524 is that each row unit of a plurality of adjacent row units (in a side-by-side arrangement of row units) has its own pressure control valve. Assuming that the control manifold 524 is mounted in each of the plurality of row units, the down pressure in each row unit can be individually controlled. To achieve individual control, both the inlet hose 426 and the outlet hose 428 of each row unit are connected to the hydraulic source in parallel. For example, the inlet hose of a first row unit is connected to the tractor for supplying constant pressure to the first row unit, and the outlet hose of the first row unit is also connected to the tractor for returning hydraulic fluid from the first row unit. Similarly, the inlet hose of a second row unit is connected to the tractor for supplying constant pressure to the second row unit, and the outlet hose of the second row unit is also connected to the tractor for returning hydraulic fluid from the second row unit. According to this example, the pressure in the first and second row units can be independently controlled.

Referring to FIGS. 24A-24B, the control manifold 524 is mounted to the hydraulic cylinder 402 using the same long bolts 442, which are fastened to the threaded holes 444. The control manifold 524 has a mating face 556 (shown in FIGS. 25A-25C) that is generally similar (if not identical) to the mating face 456 of the hose connection manifold 424. The mating face 556 is configured as a mating face for facilitating attachment of the control module 524 to the mounting interface 440 (similar to the attachment of the hose connection manifold 424 to the mounting interface 440). An O-ring seal 541 is positioned between the control manifold 524 and the hydraulic cylinder 402 to prevent leakage of hydraulic fluid.

The hose ends 446, 448 are received in respective inlet and outlet ports 560, 562 for facilitating coupling of the hoses 426, 428 to the control module 542. In contrast to the inlet and outlet ports 460, 462 of the hose connection manifold 424, the inlet and outlet ports 560, 562 of the control manifold 524 are oriented perpendicular to (not parallel to) the central axis of the hydraulic cylinder 402. Nevertheless, a user can still reach with relative ease the connection between hoses 426, 428 and the ports 560, 562 for service-related needs.

The control module 525 includes a hydraulic valve cartridge 531 for reducing and/or relieving pressure in hydraulic cylinder 402. The valve cartridge 531 is enclosed within the control module 525 and has one end inserted in a cartridge port 533 of the connection manifold 527. In response to receiving a control signal, via the control signal wire 529 and the electrical connector 537, the valve cartridge 531 reduces pressure in the hydraulic cylinder 402 and, optionally, acts as a relief valve relieving any shocks or surges that may occur between the hydraulic source and the hydraulic cylinder 402. The control module 525 optionally includes a pressure transducer 535 and/or other embedded electronics.

For ease of access, an integrated electronic connector 537 of the control module 525 is positioned above the valve cartridge 531 for receiving electrical power via an electrical cable (not shown). The electronic connector 537 is angled towards the accumulator protective cover 420 to provide sufficient space for connecting all the required cables and hoses to the control module 525, e.g., the inlet and outlet hoses 426, 428, the control signal wire 529, and the electrical cable.

Figures 25A, 25B, 25C:
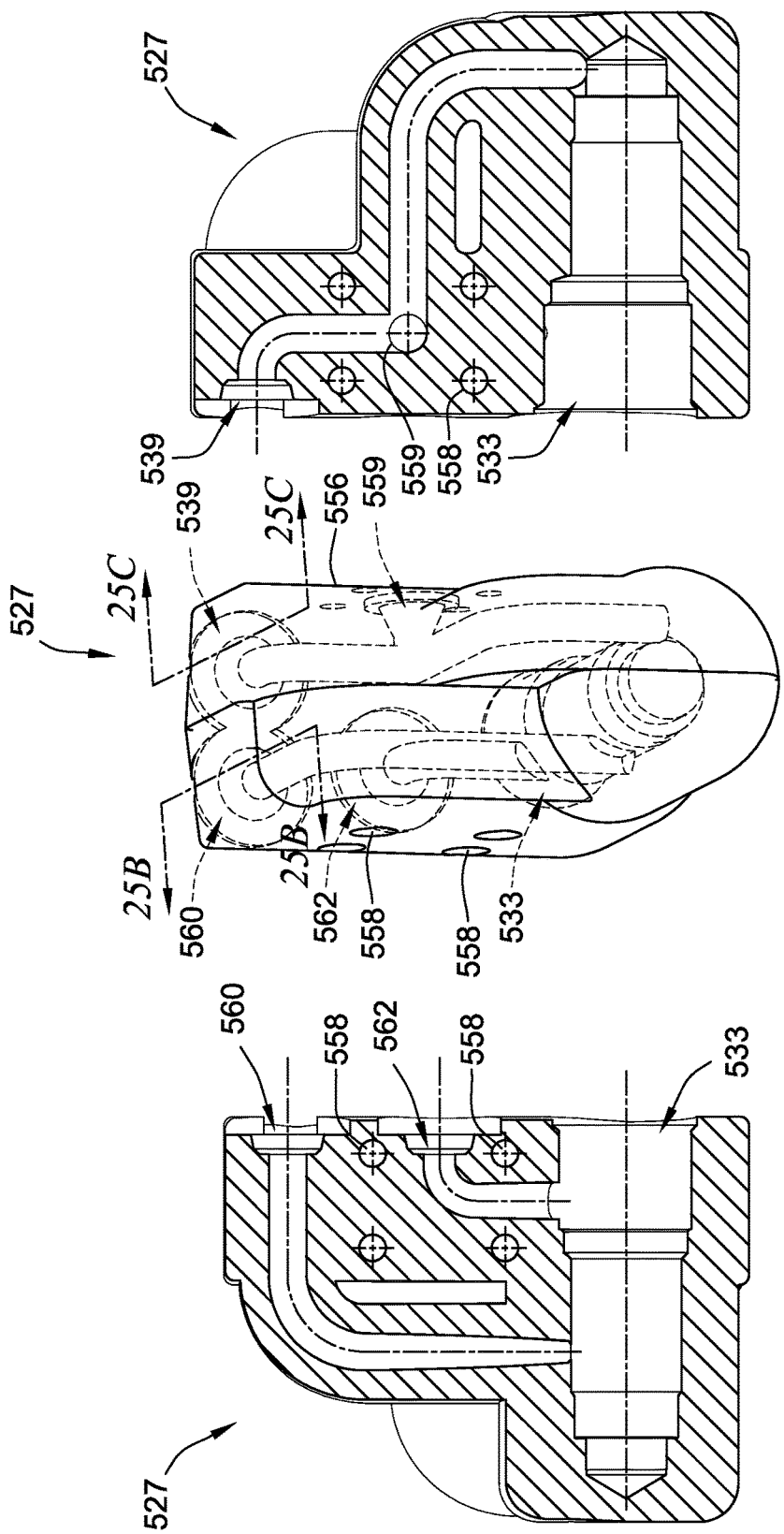
FIG. 25A is a perspective view of a control manifold.
FIG. 25B is a left cross-sectional view of the control manifold of FIG. 25A.
FIG. 25C is a right cross-sectional view of the control manifold of FIG. 25A.

Referring to FIGS. 25A-25C, the connection manifold 527 is configured to facilitate the integral combination with the control module 525. For example, the connection manifold 527 has a mounting face 556 that is aligned, when mounted with the receiving face 443 of the mounting interface 440. The mounting face 556 of the connection manifold 527 is generally similar (if not identical) to the mounting face 456 of the hose connection manifold 424. For example, the mounting face 556 includes a plurality of mounting holes 558 arranged in a concentric pattern around a central hydraulic hole 559, through which hydraulic fluid is delivered to the hydraulic cylinder 402. The pattern of the mounting holes 558 matches a pattern of the threaded holes 444 of the mounting interface 440. When the connection manifold 527 is mounted to the hydraulic cylinder 402, the long bolts 442 are received through the mounting holes 558.

The hydraulic hole 559 is internally connected to the inlet port 560, the outlet port 562, the cartridge port 533, and a transducer port 539. In contrast to the hose connection manifold 424, the connection manifold 527 includes the additional cartridge port 533 for coupling to the valve cartridge 531 (which controls output of fluid pressure from the hydraulic cylinder 402) and the transducer port 539 for coupling to the pressure transducer 535. The ports are positioned along a control face 541, which is generally perpendicular to the mounting face 556. Thus, although the connection manifold 527 and the hose connection manifold 424 share some similarities (e.g., sharing the modular mounting interface 440), they are different in type at least based on the connection manifold 527 being configured geometrically to facilitate the integration with the control module 525.

Referring generally to FIGS. 26-27B, a hydraulic cylinder 619 and energy storage device 627 are generally similar to the hydraulic cylinder 19 and accumulator 27 described and illustrated above in reference to FIGS. 5 and 6. Referring specifically to FIG. 27A, a single unitary housing 623 forms a cavity 624 in which the hydraulic cylinder 619 and the energy storage device 627 are enclosed, at least in part. The hydraulic cylinder 619 contains a ram 625 that advances towards a housing port 622 or retracts towards a stem 660.

Referring specifically to FIG. 27B, the ram 625 has a leading edge 650 near which a wear ring 652 is mounted. The wear ring 652 is mounted on the ram 625 concentric with a central axis Z of the ram 625 and in physical contact (or close to being in physical contact) with a cylinder wall 654. The wear ring 652 can be a seal or some other component that can provide a barrier zone between the ram 625 and the cylinder wall 654. The wear ring 652 can have a cylindrical cross-sectional profile (as illustrated in FIG. 27B) or any other cross-sectional profile.

The wear ring 652 guides the ram 625 within the cylinder wall 654 of the hydraulic cylinder 619, absorbing transverse forces. The wear ring 652 further prevents (or reduces) metal-to-metal contact between the ram 625 and the cylinder wall 654 and, thus, optimizes the performance of the hydraulic cylinder 619. As such, one benefit of the wear ring 652 is that it prevents or reduces wear of the ram 625 due to frictional contact with the cylinder wall 654. Another benefit of the wear ring 652 is that it tends to act as a seal component (although not necessarily specifically intended to be a seal component). For example, especially during high-speed movement of the ram 625, tight tolerances between the ram 625 and the cylinder wall 654 help achieve a sealing function that prevents, or greatly reduces, undesired fluid flow between the ram 625 and the cylinder wall 654. According to one example, the tight tolerances can range between 0.01 inches and 0.03 inches.

The ram 625 further includes a plurality of intersecting internal passageways, including an axial passageway 660 and a radial passageway 662. The axial passageway 660 starts at the leading edge 650 and continues partially within the ram 624, along the central axis Z, until it intersects with the radial passageway 662. The radial passageway 662 extends perpendicular to the central axis Z between the central axis Z and a peripheral wall of the ram 625.

Similar to a shock absorber, the internal passageways 660, 662 provide a dampening feature to the hydraulic cylinder 610. Specifically, the internal passageways 660, 662 equalize pressure on either side of the wear ring 652 (which tends to act as a seal at high-speed ram velocities). While the hydraulic cylinder 619 is intended to generate pressure, the internal passageways 660, 662 integrate into the hydraulic cylinder 619 damping to control unwanted movement and or pressure. As such, the internal passageway 660, 662 are helpful in preventing damage to the hydraulic cylinder 619 by controlling the damping of the hydraulic cylinder 619. Optionally, in addition to acting as orifices for controlling damping, the internal passageways 660, 662 can be used for mounting check valves to the ram 625. The check valves can further control the damping in the hydraulic cylinder 619. Accordingly, the internal passageways 660, 662 provide a hydraulic cylinder with an integrated damping-control system.

Referring to FIGS. 28A and 28B, a planting row unit 710 is generally similar to the planting row unit 10 described above. The planting row unit 710 includes a V-opener 711, a row unit frame 712, a pair of closing wheels 716, and a gauge wheel 717 that are assembled and function similarly to the similarly numbered components of the planting row unit 10. The planting row unit 710 also includes a hydraulic cylinder 700 that urges the closing wheels 716 downwardly with a controllable force that can be adjusted for different conditions.

The hydraulic cylinder 700 includes a double-acting ram 705 (which further exemplifies the double-acting ram embodiment identified above in reference to the ram 25) that can move in opposing directions based on fluid pressure received from either a first hose 701a or a second hose 701b. As such, hydraulic fluid is received via the hoses 701a, 701b to act alternately on both sides of the double-acting ram 705 and, consequently, apply alternate pressure in both directions of arrows A-A'. The hydraulic cylinder 700 can, optionally, further includes a biasing element 720 (e.g., mechanical spring, compressed coil spring, pressurized gas) to further add pressure in addition to the pressure provided by the double-acting ram 705. The biasing element 720 can be added on either side of the double-acting ram 705.

One benefit of the double-acting ram 705 is that it can provide both down pressure or up pressure, as needed, for the planting row unit 710. For example, if additional pressure is required to cause the V-opener 711 to penetrate the soil to a required depth, down pressure would be applied. If, for example, the planting row unit 710 is too heavy and the V-opener 711 penetrates the soil in excess of the required depth, then up pressure would be applied (without requiring an additional hydraulic cylinder).

Figure 29:
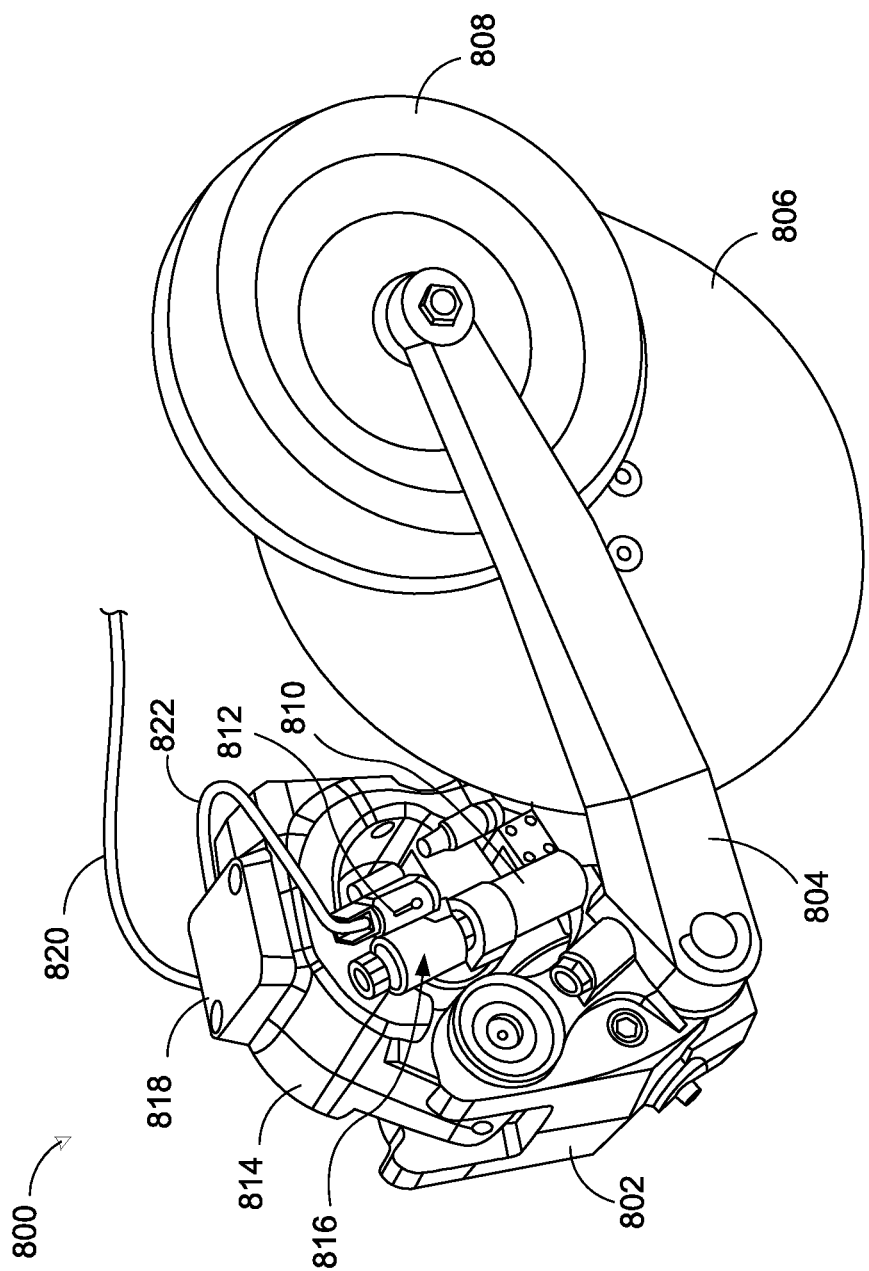
FIG. 29 is a perspective view of an agricultural opener device with integrated controller.

Referring to FIG. 29, a disk opener 800 is adapted for attachment to a row unit, such as planting row unit 10 described above in reference to FIG. 1. The disk opener 800 includes a support 802 to which a swing arm 804 is mounted for attaching a disk 806 and a gauge wheel 808. The disk 806 penetrates the soil to a planting depth for forming a furrow or seed slot, as the row unit is advanced by a tractor or other towing vehicle. The gauge wheel 808 determines the planting depth for seeds and/or height of introduction of fertilizer.

The disk opener 800 further includes a down-pressure cylinder 810, with an integrated control valve 812, that is mounted to a bracket 814. The down-pressure cylinder 810 is generally similar to the hydraulic cylinder 402 (e.g., illustrated in FIG. 19) and the integrated control valve 812 is generally similar to the control module 525 (e.g., illustrated in FIG. 24A). The control valve 812 includes a solenoid 816 that is generally similar to the electronic connector 537 (e.g., illustrated in FIG. 24A).

In addition, the disk opener 800 includes a programmable-logic controller (PLC) or other computer control unit 818 that is also mounted to the bracket 814. Optionally, the control unit 818 is directly integrated into the control valve 812, e.g., into the solenoid 816. According to this optional embodiment, the control unit 818 would be generally similar to the embedded electronics integrated with and described above in reference to the control module 525. The control unit 818 is coupled to a power supply via a control wire 820 and to the control valve 812 via a valve wire 822. The control wire 820 optionally functions to connect the control unit 818 with a control interface such as found in a tractor.

An advantage of mounting the control unit 818 to the row unit, via the disk opener 800, is that it provides better, and specific, control over the control valve 812. As such, for example, each row unit in an arrangement having a plurality of side-by-side row units (such as illustrated below in FIG. 30) can be individually controlled to apply a desired down pressure specific to the corresponding row unit. Thus, the control unit 818 runs a control algorithm that takes inputs and determines an output signal for the control valve 812.

Figure 30:
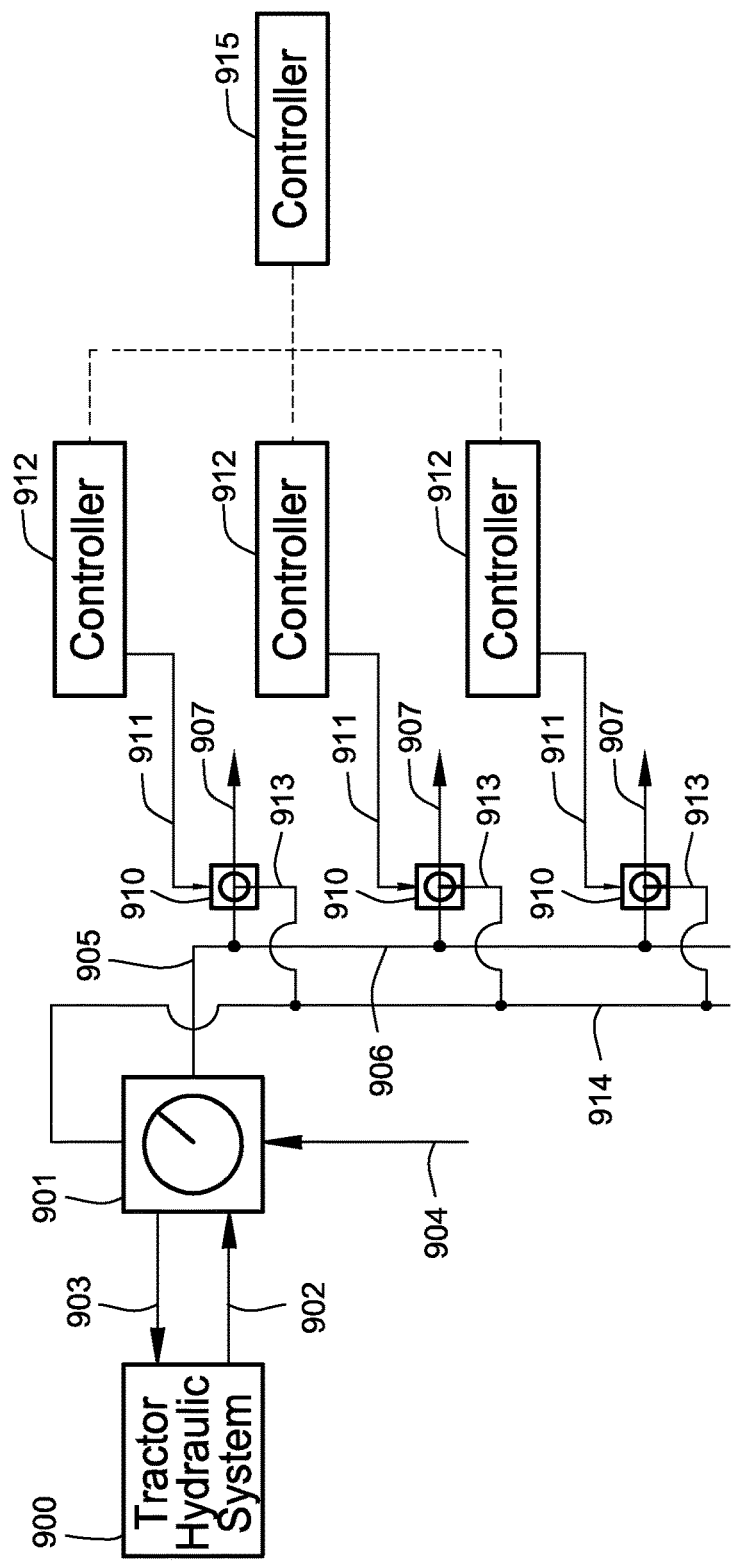
FIG. 30 is a schematic diagram of a hydraulic control system having integrated controllers in one or more row units.

Referring to FIG. 30, a hydraulic control system supplies pressurized hydraulic fluid to cylinders of multiple row units. A source 900 of pressurized hydraulic fluid, typically located on a tractor, supplies hydraulic fluid under pressure to an optional main valve 901 via a supply line 902 and receives returned fluid through a return line 903. The main valve 901 can be set by an electrical control signal S1 on line 904 to deliver hydraulic fluid to an output line 905 at a desired constant pressure. The output line 905 is connected to a manifold 906 that, in turn, delivers the pressurized hydraulic fluid to individual feed lines 907 (which are connected to ports of respective hydraulic cylinders of the individual row units). Optionally, the main valve 901 is turned off after all cylinders have been filled with pressurized hydraulic fluid to maintain a fixed volume of fluid in each cylinder.

Each of the individual feed lines 907 leads to one of the row units and is provided with a separate control valve 910 that receives its own separate control signal on a line 911 from a respective controller 912 (which is integrated in the respective row unit as described above in reference to FIGS. 24A and 30). The separate control valve 910 is provided in addition to or instead of the valve 901. This arrangement permits the supply of pressurized hydraulic fluid to each row unit to be turned off and on at different times by the separate control valve 910 for each row unit, with the times being controlled by the separate control signals supplied to the valves 910 by the respective controllers 912. The individual valves 910 receive pressurized hydraulic fluid via the manifold 906, and return hydraulic fluid to the tractor via separate return lines 913 connected to a return manifold 914, which is connected back to the hydraulic system 900 of the tractor. Optionally, one or more of the individual integrated controllers 912 are connected to a main controller 915 that provides control input for at least one of the integrated controllers 912.

Figure 31:
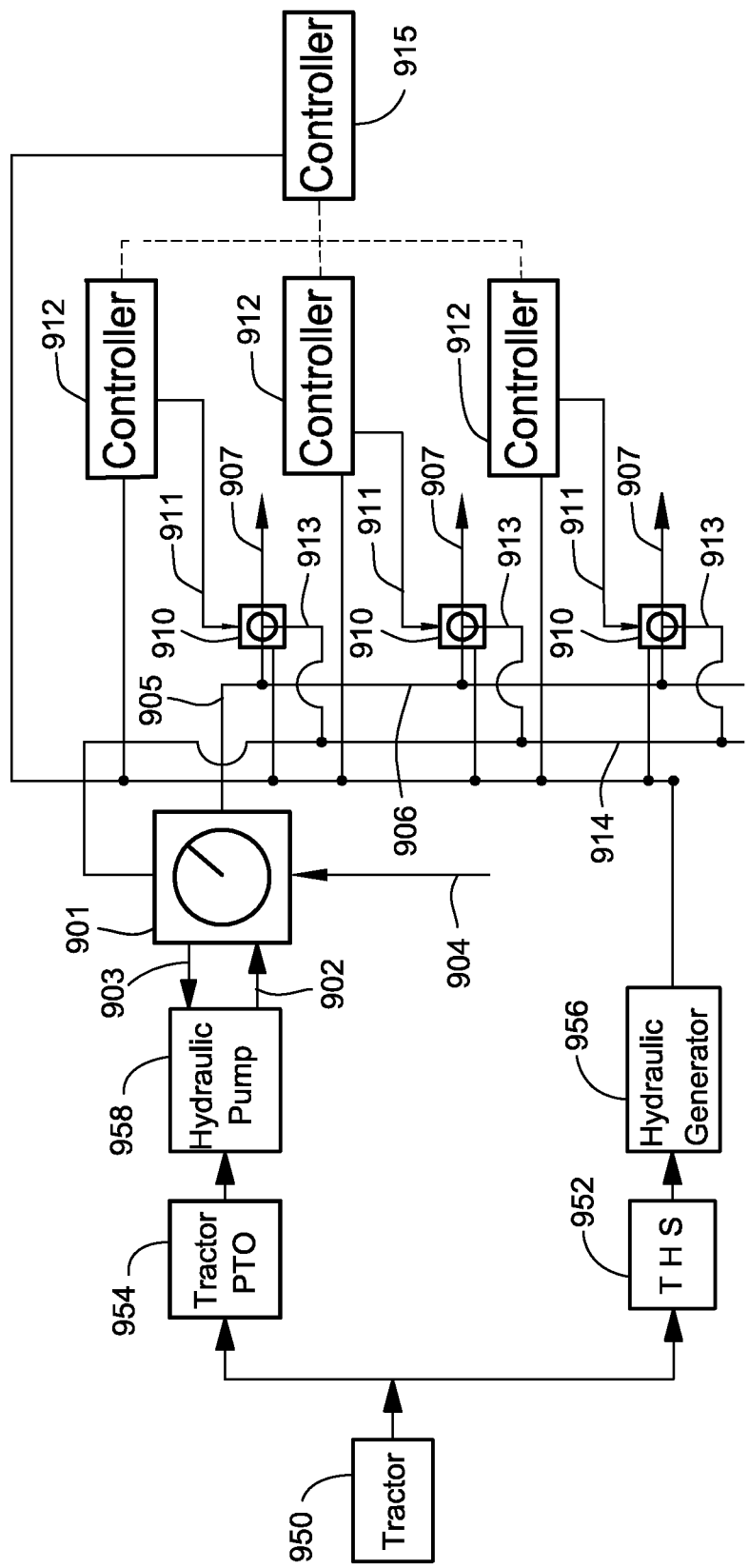
FIG. 31 is a schematic diagram of a hydraulic control system for use with a row unit.

Referring to FIG. 31, an alternative configuration is illustrated in reference to the hydraulic control system described above in FIG. 30. The alternative configuration includes a tractor 950 that generates hydraulic auxiliary power bifurcated into two power subsets: a tractor hydraulic system (THS) 952 and a tractor power take-off (PTO) 954. The tractor hydraulic system 952 is coupled to a hydraulically-driven electrical generator 956 for generating electricity for row unit components such as the control valves 910 and/or other control modules (e.g., controllers 912, 915). The tractor PTO 954 is mechanical power that runs a hydraulic pump 958 to provide mechanical power for row unit components such as hydraulic cylinders connected to the individual feed lines 907.

Providing both the hydraulic system 952 and the tractor PTO 954 helps provide additional electrical power for electrical components that previously were not included in an agricultural system. For example, adding controllers 912, 915 and control valves 910 to each row unit results in an increased need of electrical power relative to agricultural systems that, for example, lacked individual row-unit control. The electrical generator 956 compensates for and provides the required increased electricity.

Figure 32:
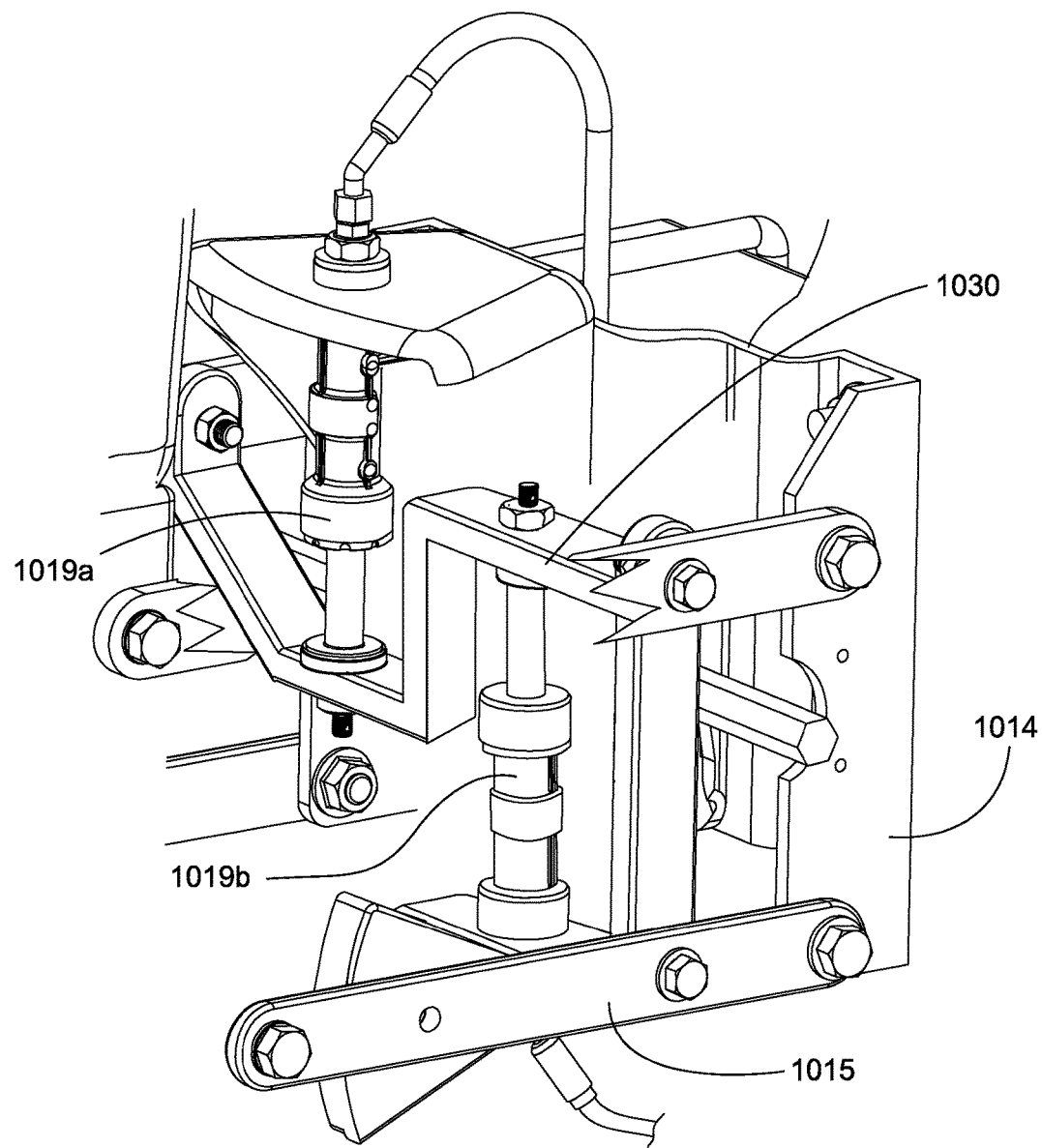
FIG. 32 is a partial perspective of a linkage assembly with two actuators for controlling a row unit.
Figure 33:
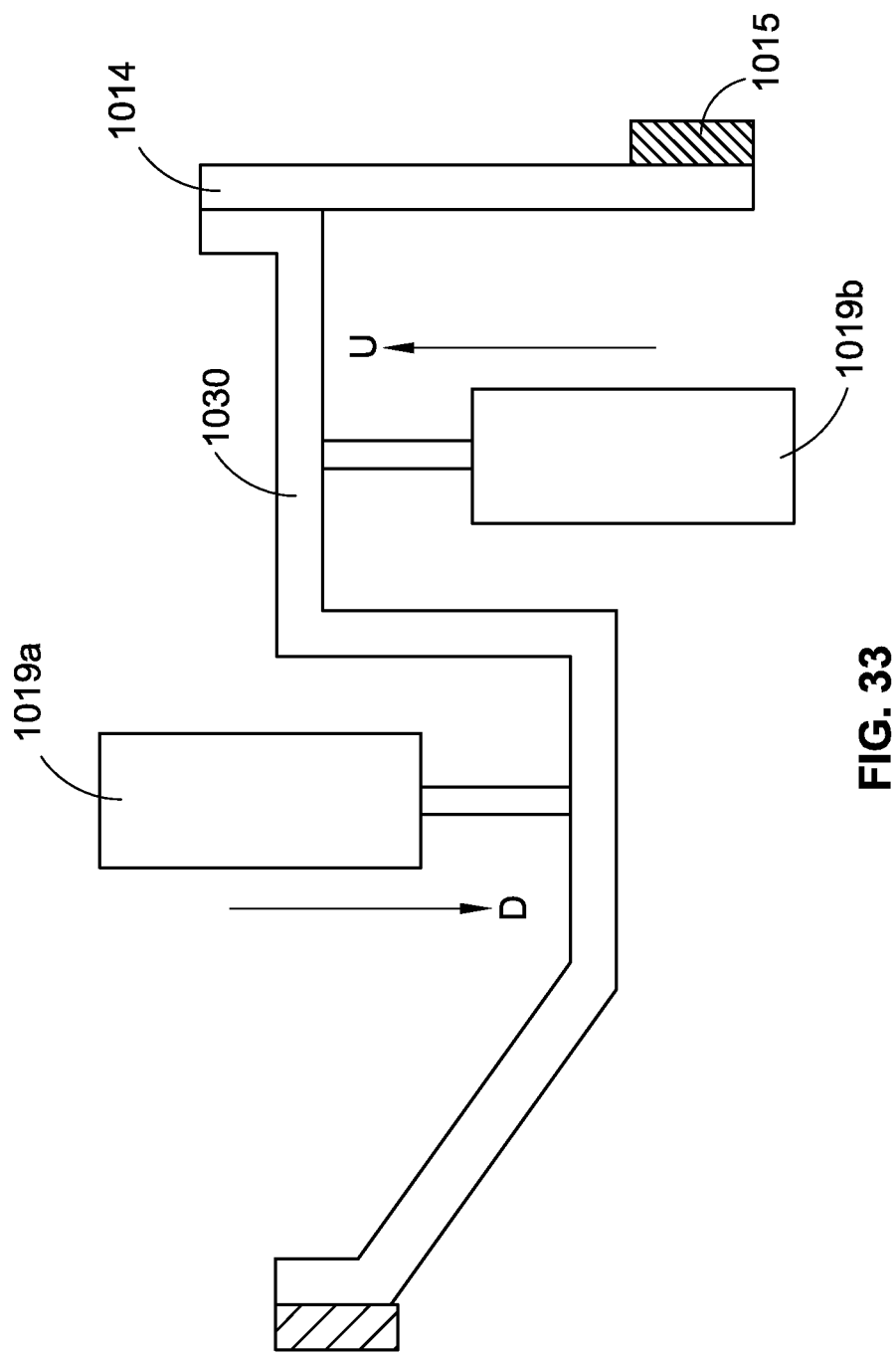
FIG. 33 is a side illustration of the linkage assembly of FIG. 32.

Referring to FIGS. 32 and 33, a hydraulic cylinder system includes two hydraulic cylinders 1019a, 1019b, instead of a single actuator as described above in reference to the hydraulic cylinder 19 (which is illustrated, for example, in FIG. 9). Each of the hydraulic cylinders 1019a, 1019b is generally similar to the hydraulic cylinder 19. However, instead of coupling the single hydraulic cylinder 19 between a front frame and a linkage assembly, this alternative embodiment illustrates coupling the two hydraulic cylinders 1019a, 1019b between a front frame 1014 and a linkage assembly 1015.

The hydraulic cylinders 1019a, 1019b are both mounted at one end to a cross bar 1030, which has been modified in this illustrative embodiment and relative to the cross bar 30 of FIG. 9 to have generally a Z-shape. Specifically, a first hydraulic cylinder 1019a is mounted such that it can apply down pressure D to the row unit and a second hydraulic cylinder 1019b is mounted such that it can apply up pressure U to the row unit.

One advantage of having two cylinders 1019a, 1019b is that the row unit can be controlled both up and down with more precision. For example, the controlled row unit may have a heavy weight that results in a furrow depth exceeding the desired planting depth. To counter the weight, the second hydraulic cylinder 1019b is used to raise the row unit such that the shallower depth is achieved. As such, the second hydraulic cylinder 1019b acts to subtract (or counter) at least some of the row-unit weight. If the row unit has a light weight that results in a shallower depth than desired, the first hydraulic cylinder 1019a is used to lower the row unit such that the deeper depth is achieved. As such, the first hydraulic cylinder 1019a acts to artificially add weight to the row unit.

Figure 34:
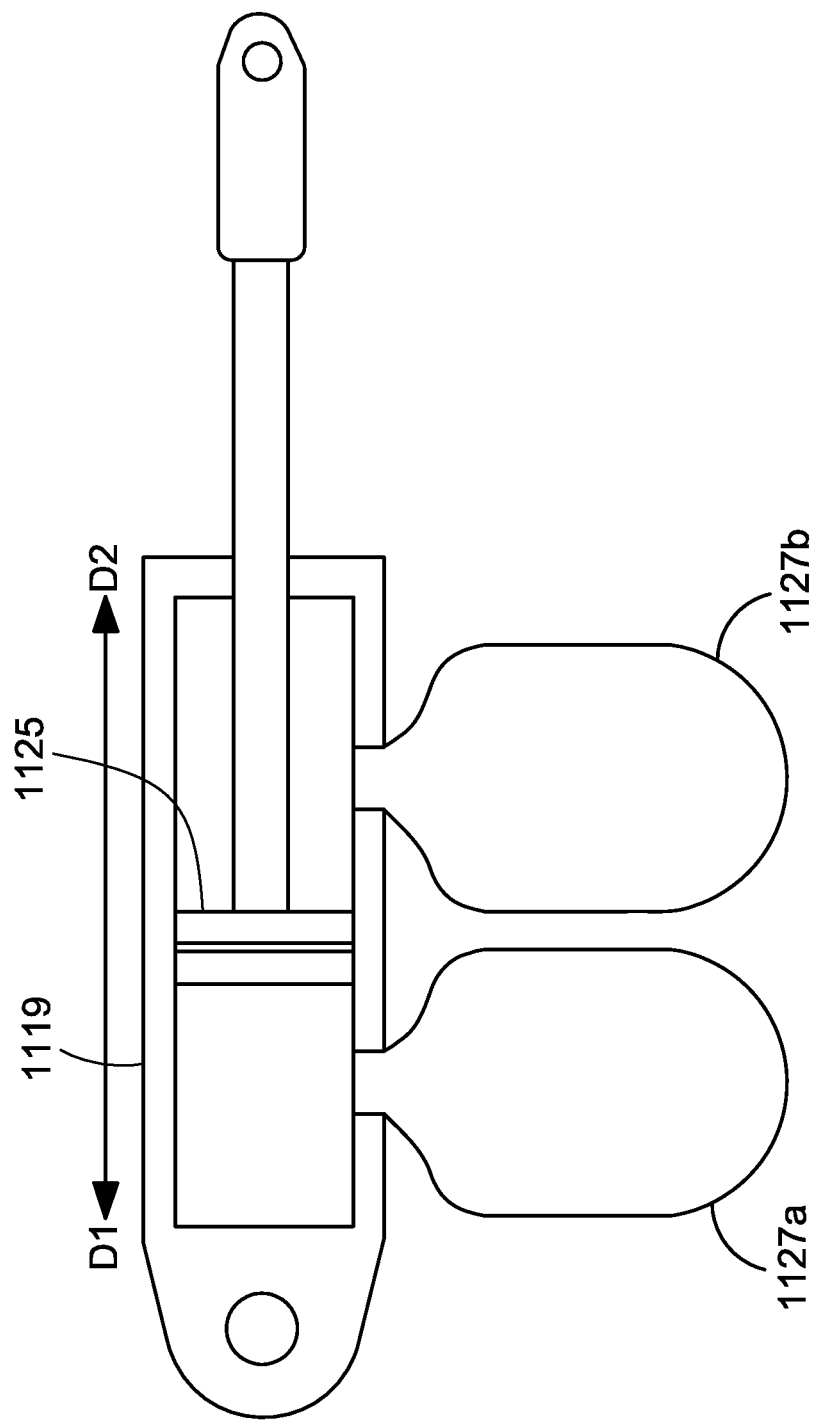
FIG. 34 illustrates an actuator having two energy storage devices.

Referring to FIG. 34, a hydraulic cylinder 1119 includes two storage energy devices, which are illustrated in the form of a first accumulator 1127a and a second accumulator 1127b. Each of the two accumulators 1127a, 1127b is generally similar to the accumulator 27 (illustrated, for example, in FIG. 6). The hydraulic cylinder 1119 includes a ram 1125 that acts similar to the double-acting ram 705 illustrated in FIGS. 28A and 28B. The ram 1125 can provide both down pressure and up pressure, as needed, for a planting row unit (e.g., planting row unit 710). The accumulators 1127a, 1127b act as shock absorbers to help relieve pressure based on the direction of the applied pressure by the double-acting ram 1125. For example, the first accumulator 1127a relieves pressure when the double-acting ram 1125 applies pressure in a first direction D1 (e.g., down pressure), and the second accumulator 1127b relieves pressure when the double-acting ram 1125 applies pressure in a second direction D2 (e.g., up pressure).

The use of this hydraulic cylinder 1119, as a compact hydraulic down-force unit with integral accumulators 1127a, 1127b on each row unit, provides the advantages of quick response and remote adjustability of a hydraulic down-force and up-force control system. If an obstruction requires quick movement, oil can flow quickly and freely between the force cylinder 1119 and the respective adjacent accumulator 1127a, 1127b, without exerting force on other actuators in the system.

Figure 35:
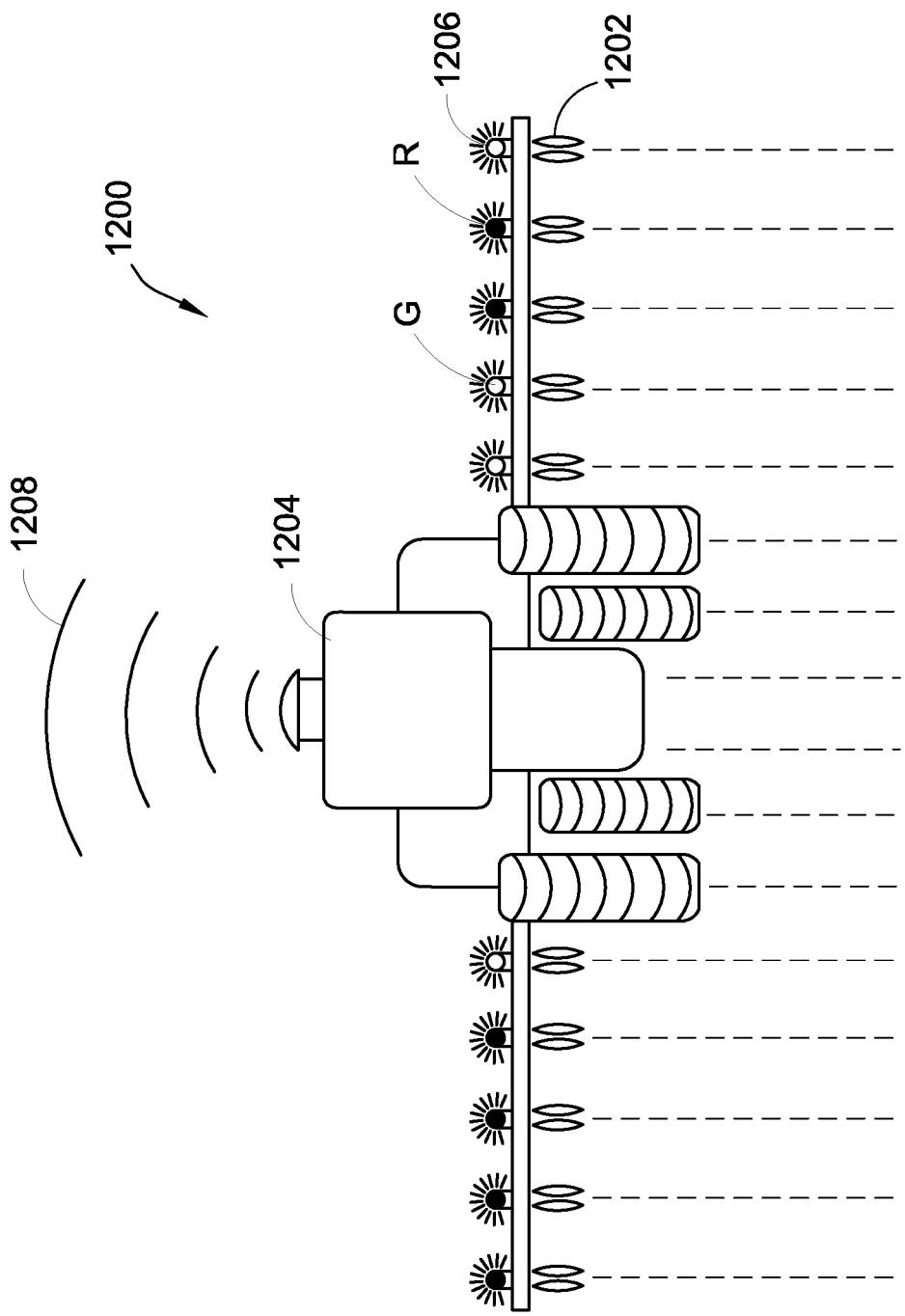
FIG. 35 illustrates a tractor towing a plurality of row units having status indicators.

Referring to FIG. 35, a controllable hydraulic control system 1200 includes a plurality of row units 1202 that are towed by a vehicle 1204 through a field. Each of the row units 1202 includes a status indicator 1206 for signaling performance-related issues. According to one example, the status indicators 1206 are light-emitting diodes (LED) that provide an easily discernable way to visually inspect the performance of the row units 1202. For example, the LED status indicators 1206 can flash a red color R to indicate improper tilling or a malfunction. If everything performs as intended, the status indicators 1206 can flash a green color G.

The status indicator 1206 can be a single (larger) LED or a plurality of LEDs of various sizes. Alternatively, the status indicator 1206 can include in addition to or instead of the LED an audible indicator to signal a malfunction or other condition of the system 1200.

Optionally, the status indicators 1206 can be integrated with control electronics of the row units 1202 (e.g., control module 525 illustrated in FIG. 23) and can provide a status-check of the electronics. Thus, the status indicators 1206 are attached to each individual row unit 1202 to provide a person that is far away from the row units 1202 a quick visual check on the performance status of the system 1200, including the performance status of an electronic controller.

In another example, the status indicators 1206 are particularly helpful in a system 1200 that is a human-less farming system. The human-less farming system is a system in which robotic machines are moving about in the field to perform tilling, planting, and/or other agricultural functions. Such a system is monitored by a farm manager that is standing, for example, a quarter-mile away from the system. The status indicators 1206 provide the farm manager with quick and easy visual signals that indicate the performance of the system.

Optionally, the system 1200 further emits a wireless signal 1208 for communicating status performance to an online monitoring system. The performance of the system 1200 can be, then, evaluated using an electronic device such as a smartphone.

Figure 36:
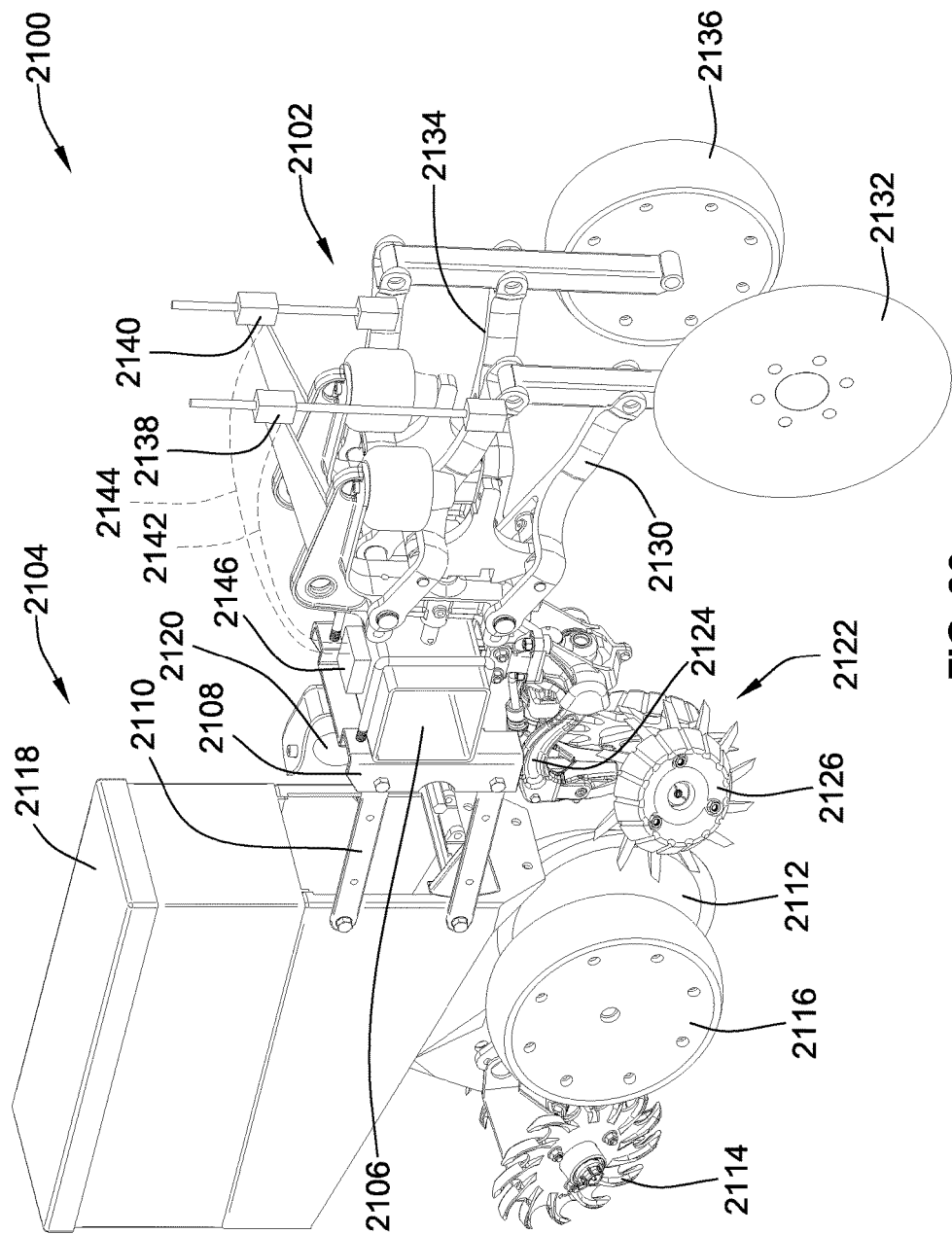
FIG. 36 is a perspective view of a soil-hardness sensing device attached to a planting row unit.

Referring to FIG. 36, an agricultural system 2100 includes a soil-hardness sensing device 2102 attached in front of an agricultural row unit 2104 (also referred to as a planting row unit) via a towing frame 2106. The towing frame 2106 is generally a common elongated hollow frame that is typically hitched to a tractor by a draw bar. The towing frame 2106 is rigidly attached to a front frame 2108 of a four-bar linkage assembly 2110 that is part of the row unit 2104. The four-bar (sometimes referred to as "parallel-bar") linkage assembly 2110 is a conventional and well known linkage used in agricultural implements to permit the raising and lowering of tools attached thereto.

As the planting row unit 2104 is advanced by the tractor, a pair of cooperating toothed clearing wheels 2122 clear residue from the soil and then other portions of the row unit, such as a V-opener disk 2112, part the cleared soil to form a seed slot, deposit seed in the seed slot and fertilizer adjacent to the seed slot, and close the seed slot by distributing loosened soil into the seed slot with a pair of closing wheels 2114. According to one example, the closing wheels 2114 are CUVERTINE™ closing wheels sold by the assignee of the present application. The CUVERTINE™ closing wheel is an efficient toothed wheel in-between a spading wheel and a rubber wheel.

A gauge wheel 2116 of the planting row unit 2104 determines the planting depth for the seed and the height of introduction of fertilizer, etc. One or more bins 2118 on the planting row unit 2104 carry the chemicals and seed that are directed into the soil.

The planting row unit 2104 is urged downwardly against the soil by its own weight. To increase this downward force, or to be able to adjust the force, a hydraulic or pneumatic actuator 2120 (and/or one or more springs) is added between the front frame 2108 and the four-bar linkage assembly 2110 to urge the planting row unit 2104 downwardly with a controllable force. Such a hydraulic actuator 2120 may also be used to lift the row unit off the ground for transport by a heavier, stronger, fixed-height frame that is also used to transport large quantities of fertilizer for application via multiple residue-clearing and tillage row units. According to one example, the hydraulic actuator 2120 is an RFX™ system sold by the assignee of the present application. The RFX™ system includes a down-pressure actuator that is a compact, fast action actuator, and that is remotely controlled. The RFX™ system includes a nitrogen pressure-vessel that is integrated with the down-pressure actuator. According to other examples, the hydraulic or pneumatic actuator 2120 may be controlled to adjust the downward force for different soil conditions such as is described in U.S. Pat. Nos. 5,709,271, 5,685,245 and 5,479,992.

The planting row unit 2104 further includes a row-clearing unit 2122 having a pair of rigid arms 2124 adapted to be rigidly connected to the towing frame 2106. According to one example, the row-clearing unit 2122 is a GFX™ system (i.e., ground effects row cleaner), which is sold by the assignee of the present application, that is a hydraulically-controlled row cleaner. The GFX™ system is a hydraulically-controlled row cleaner with spring upward pressure and hydraulic down pressure. Furthermore, the GFX™ system is remotely adjusted.

At the bottom of the row-clearing unit 2122, the pair of cooperating toothed clearing wheels 2126 are positioned in front of the V-opener 2112 of the planting row unit 2104. The clearing wheels 2126 are arranged for rotation about transverse axes and are driven by engagement with the underlying soil as the wheels are advanced over the soil. The illustrative clearing wheels 2126 are a type currently sold by the assignee of the present invention under the trademark TRASHWHEEL™. The clearing wheels 2126 cooperate to produce a scissors action that breaks up compacted soil and simultaneously clears residue out of the path of planting. The clearing wheels 2126 kick residue off to opposite sides, thus clearing a row for planting. To this end, the lower edges are tilted outwardly to assist in clearing the row to be planted. This arrangement is particularly well suited for strip tilling, where the strip cleared for planting is typically only about 10 inches of the 30-inch center-to-center spacing between planting rows.

The soil-hardness sensing device 2102 has a first linkage 2130 with an attached blade 2132 and a second linkage 2134 with an attached gauge wheel 2136. According to one example, the linkages are medium FREEFARM™ linkages sold by the assignee of the present application. The FREEFARM™ linkages are generally modular sets of parallel linkages used for different purposes. Also, according to one example, the soil-hardness sensing device 2102 is a FORESIGHT AND CFX™ ground hardness sensor that is sold by the assignee of the present application.

The two linkages 2130, 2134 are parallel to each other and each has a down hydraulic pressure that is controlled independently. Under constant hydraulic pressure, when the soil-hardness sensing device 2102 is moved through the field, the blade 2132 penetrates the soil deeper in soft soil and shallower in hard soil. However, the wheel 2136 rides on the soil surface regardless of the type of soil.

Each linkage 2130, 2134 has a high quality all-stainless steel linear position sensor 2138, 2140 enclosed in a protecting housing, with a cable 2142, 2144 routed to a central processing unit (CPU) 2146, which includes a memory device for storing instructions and at least one processor for executing the instructions. When the blade 2132 or the wheel 2136 moves, a corresponding change in position is detected by the respective position sensors 2138, 2140. The two values from the position sensors 2138, 2140 are outputted as fast as approximately 1,000 times/second and are fed as soil-hardness signals to the CPU 2146, which is a rugged outdoor-rated programmable logic controller that measures the difference in the two values in real time.

In the illustrated example, the CPU 2146 is positioned on the planting row unit 2104. However, in other embodiments the CPU 2146 may be positioned remote from the planting row unit 2104, e.g., in a tractor cabin, on a different planting row unit of a side-by-side row unit arrangement, etc. Furthermore the processor and the memory device of the CPU 2146 can be located in the same place, e.g., on the planting row unit 2104, or in different places, e.g., the processor can be located on the planting row unit 2104 and the memory device can be located in the tractor cabin.

The CPU 2146 averages the values over a predetermined time period (e.g., 0.25 seconds), executes an algorithm with filtering effects (e.g., removes conditions in which a rock is hit by the soil-hardness sensing device 2102), and provides real-time measurement of the soil hardness. The CPU 2146 optionally receives other user-controllable variables for adjusting/tuning the agricultural system 2100. For example, the user-controllable variables may include values for different residue levels, different initial conditions, etc.

Figure 37:
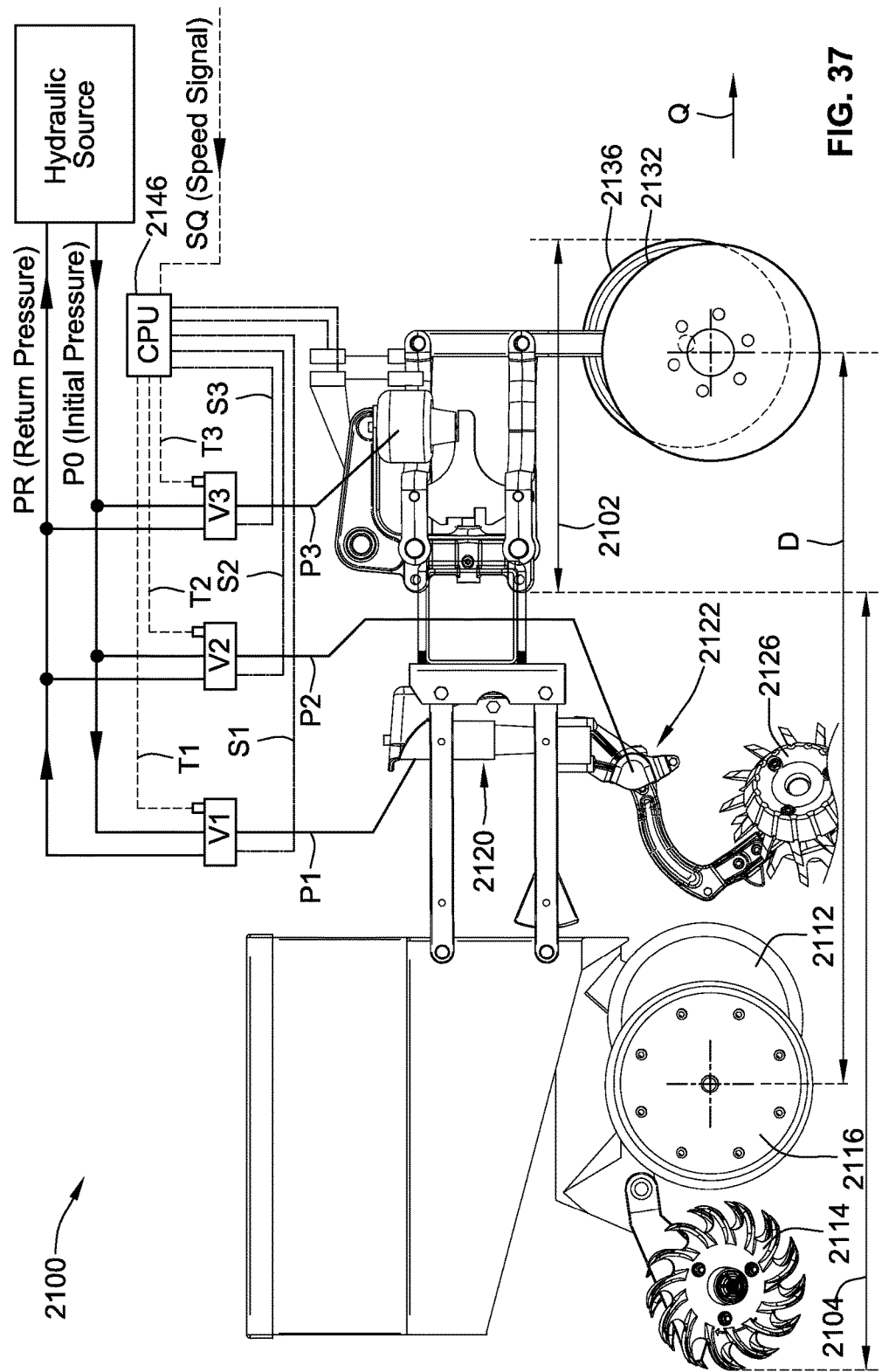
FIG. 37 is a schematic side elevation illustrating the soil-hardness device attached to the planting row unit.

Referring to FIG. 37, the agricultural system 2100 receives hydraulic fluid from a hydraulic source, typically located in the tractor, at a hydraulic input pressure P0. The hydraulic fluid is directed to each one of a plurality of hydraulic control valves V1-V3. The CPU 2146 outputs respective signals S1-S3 to the respective control valves V1-V3, which create a proportional output/change in the pressure of hydraulic circuits, virtually instantaneously changing the pressure in real time as the agricultural system 2100 moves through a field. The pressure changes are useful, for example, when the agricultural system 2100 encounters hardened soil areas in which combines or grain carts have previously compacted the soil. The agricultural system 2100 optimizes the pressure to achieve a desired depth control by applying the right amount of pressure at the right time.

To achieve the right amount of pressure for each controllable component (e.g., the row-unit actuator 2120, the row-clearing-unit actuator 2122, and the soil-hardness sensing device 2102), the CPU 2146 outputs the respective signals S1-S3 to the associated control valves V1-V3. For example, in response to receiving a first signal S1 from the CPU 2146, a first control valve V1 outputs a proportional first pressure P1 to the hydraulic actuator 2120 (e.g., RFX™ system) for urging the planting row unit 2104 downwardly. Similarly, in response to receiving a second signal S2 from the CPU 2146, a second control valve V2 outputs a proportional second pressure P2 to the row-clearing unit 2122 (e.g., GFX™ system). The RFX™ system 2120 and the GFX™ system 2122 are controlled independently because residue typically exhibits non-linear behavior. In other words, the independent control of the two systems 2120, 2122 is likely to achieve better depth-control results.

A third control valve V3 receives a third signal S3 from the CPU 2145, in response to which the third control valve outputs a proportional third pressure P3 to the soil-hardness sensing device 2102 (e.g., FORESIGHT AND CFX™ system). The control valves V1-V3 return hydraulic fluid to the hydraulic source at a return pressure PR. Respective transducers for each of the control valves V1-V3 may be used to verify that hydraulic output pressures match the desired values. If a hydraulic output pressure does not match the desired value, the hydraulic output pressure is corrected. Furthermore, each of the control valves V1-V3 has a respective valve response time T1-T3, as discussed in more detail below in reference to determining the timing of applying the appropriate pressures P1-P3.

The CPU 2146 further receives an input speed signal SQ indicative of a speed Q of the agricultural system 2100, which moves typically at about 6 miles per hour, i.e., about 8.8 feet per second. As discussed in more detail below, the speed signal SQ is used to determine the desired values of pressures P1-P3 based on current soil conditions. Furthermore, as discussed in more detail below, the CPU 2146 further outputs two signals, a sensor signal SCFX to the soil-hardness sensing device 2102 and a closing wheel signal SCW to the closing wheel 2114.

The soil-hardness sensing device 2102 is positioned in front of the planting row unit 2104 at a distance D (which is measured generally from a center line of the blade 2132 to a center line of the V-opener 2112), which can be obtained based on the following formula:

$$Q \text{ (speed)} = D \text{ (distance)}/T \text{ (time interval)} \quad \text{Equation 1}$$

Thus, the distance D is calculated as follows:

$$D = Q*T \quad \text{Equation 2}$$

If D is a known distance (e.g., the distance between the sensed position and position where seed-depositing position) and the speed Q is also known, changes in soil conditions can be anticipated in real time prior to the time when each individual tool on the planter row unit 2104 arrives at any particular soil-change area. For example, assuming that Q is approximately 8.8 feet per second and T is approximately 0.25 seconds, D should be approximately equal to or greater than 2.2 feet. In other words, the minimum distance for D should be approximately 2.2 feet. If D is greater than the minimum value (e.g., D is greater than 2.2 feet), the agricultural system 2100 is calibrated to account for the additional distance. For example, the CPU 2146 will send the respective signals S1, S2 to the associated control valves V1, V2 only after a predetermined period of time Tact, as discussed in more detail below.

Pressures P1 and P2 are continually matched with the corresponding soil conditions. For example, P1 and P2 are increased exactly at the time when harder soil conditions are encountered directly below the clearing wheels 2126. To properly time the change in pressures P1 and P2 correctly, a time variable R refers to the latent processing speed of CPU 2146 and accounts for the time between (a) receiving an input signal by the CPU 2146, (b) sending output signals S1, S2 by the CPU 2146, and (c) responding to the output signals S2, S2 by the control valves V1, V2 with respective outputting pressures P1, P2.

It is noted that each of the control valves V1, V2 has a minimum input time Tmin, and that the distance D (e.g., as measured between the center of the blade 2232 and the center of the V-opener 2212) is directly proportional to the speed Q multiplied by the minimum input time Tmin of the respective control valve V1, V2. It is further noted that a theoretical time Ttheor is directly proportional to the distance D divided by the speed Q (i.e., D/Q), and that an actual time Tact is directly proportional to the theoretical time Ttheor minus the time variable R (i.e., Ttheor−R). Based on these conditions, for outputting pressures P1 and P2, the CPU 146 holds in memory output signals S1 and S2 for a time duration that is equal to the actual time Tact. After the actual time Tact has elapsed, the CPU 146 outputs signals S1 and S2, respectively, to the control valves V1, V2, which respond by outputting pressures P1, P2. Optionally, signals S1 and S2 are outputted as signals ranging between 0-10 volts.

Figure 38:
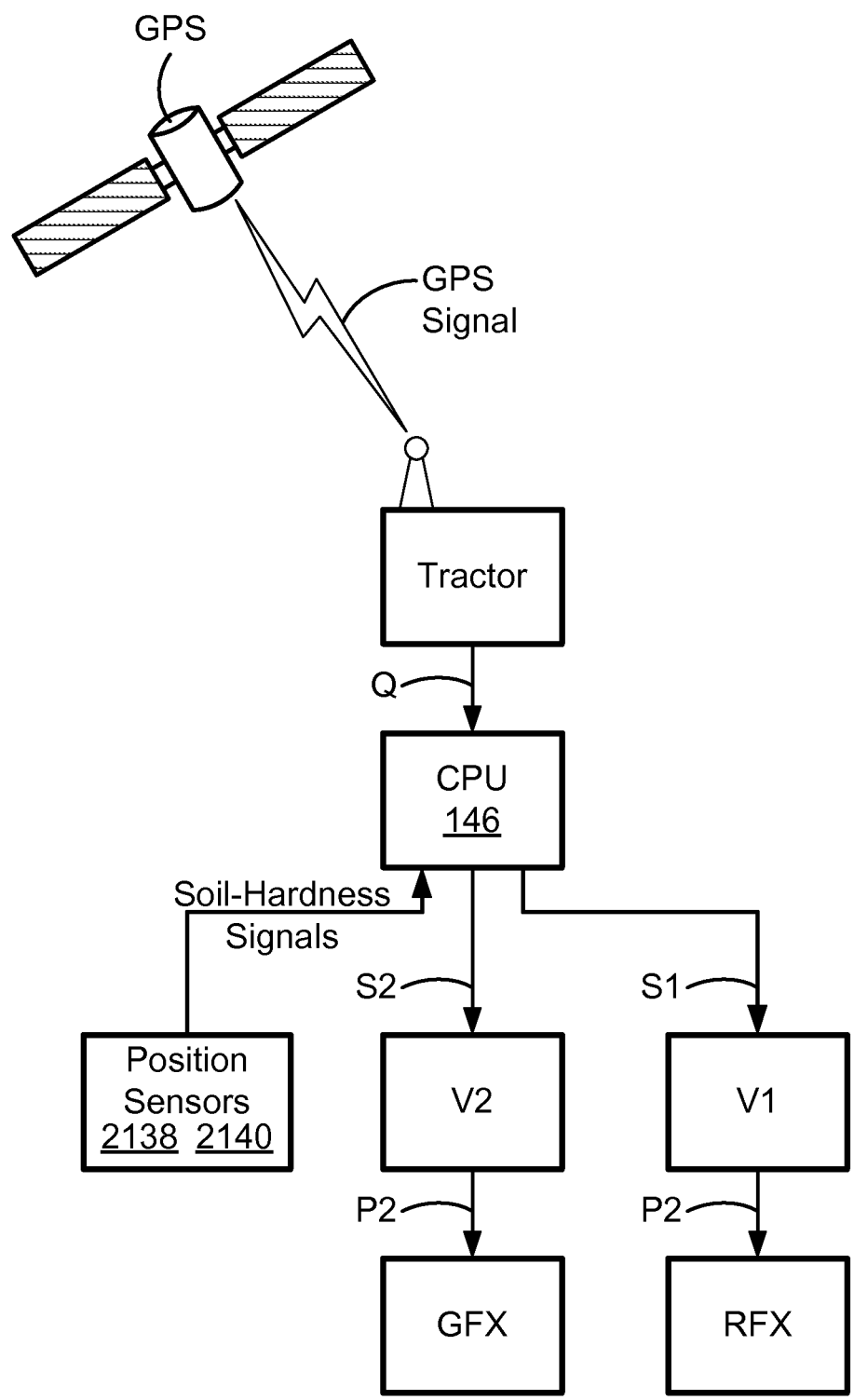
FIG. 38 is a schematic diagram illustrating the determination of hydraulic pressures for a planting row unit.

Referring to FIG. 38, a global positioning system (GPS) provides a GPS signal indicative of the speed Q to the tractor. Optionally, for example, the speed Q can be generated from a radar system. The speed Q is inputted to the CPU 2146, along with the soil-hardness signals received from the position sensors 2138, 2140. Based on the speed Q and the soil-hardness signals, the CPU 2146 outputs signals S1 and S2 to the control valves V1, V2, which output proportional pressures P1 and P2 for adjusting, respectively, the RFX™ system 2120 and the GFX™ system 2122.

Figure 39A:
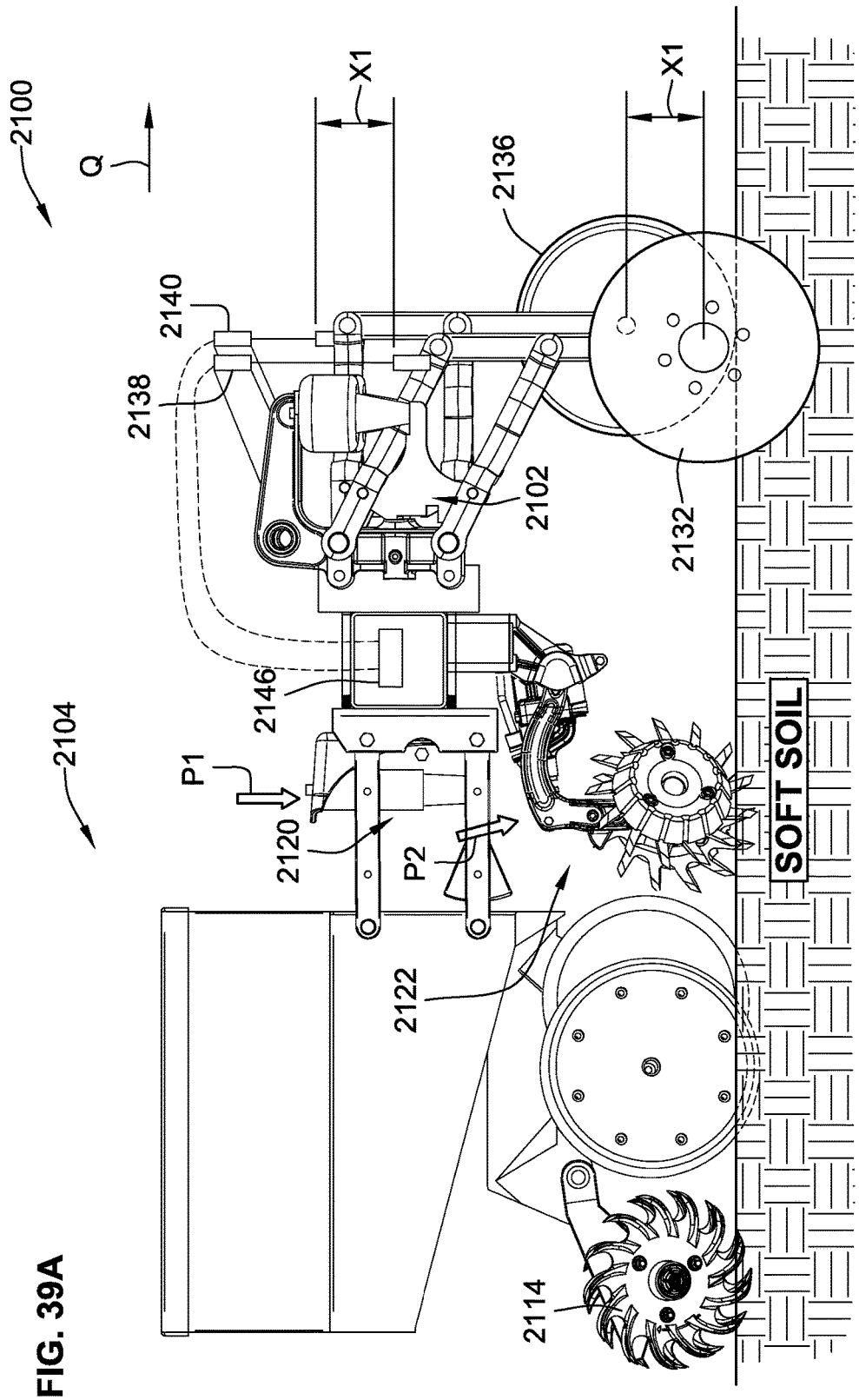
FIG. 39A is a side elevation of an agricultural system moving over soft soil conditions.
Figure 39B:
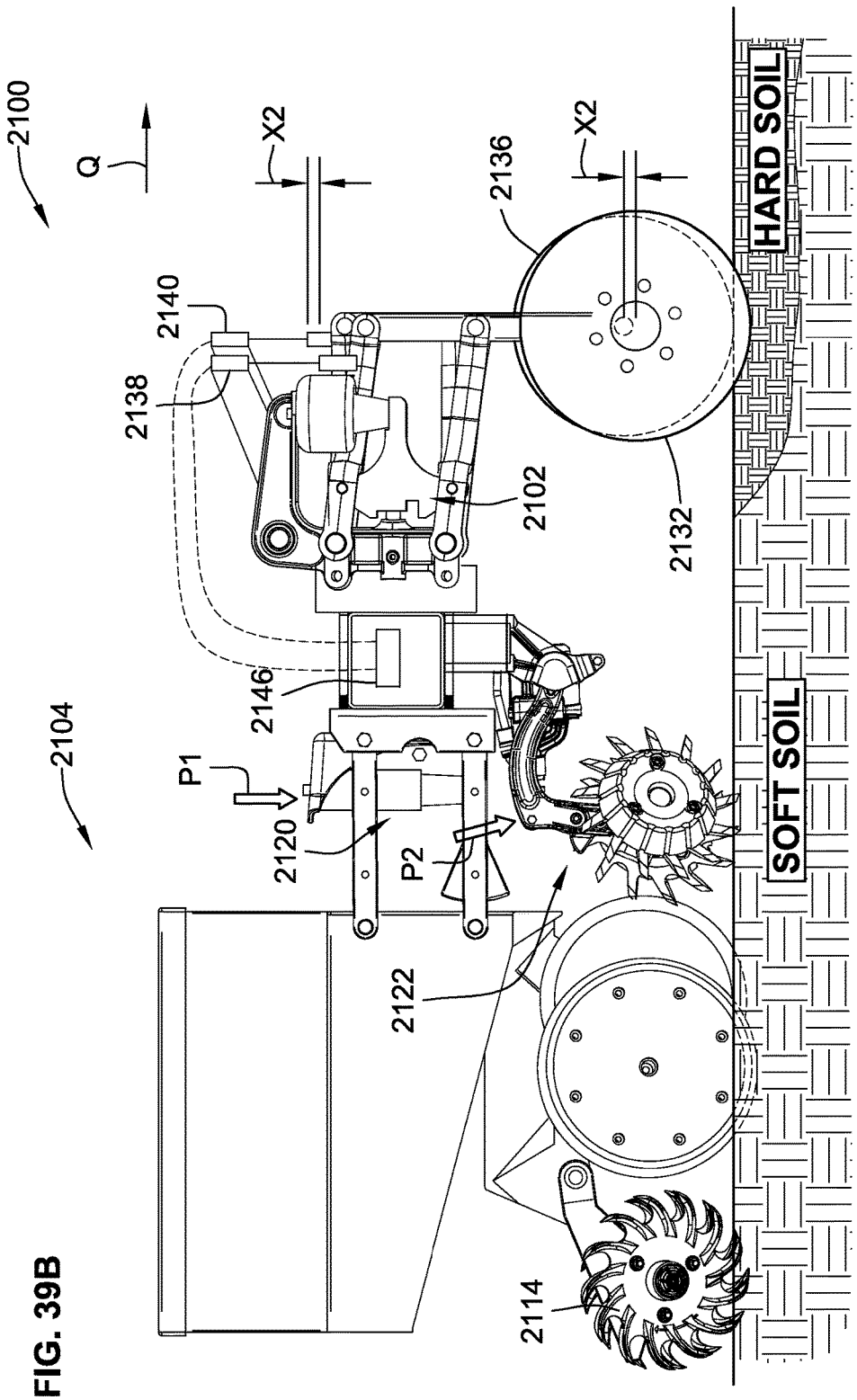
FIG. 39B is a side elevation of the agricultural system of FIG. 39A in which a soil-hardness sensing device is moving over hard soil conditions.
Figure 39C:
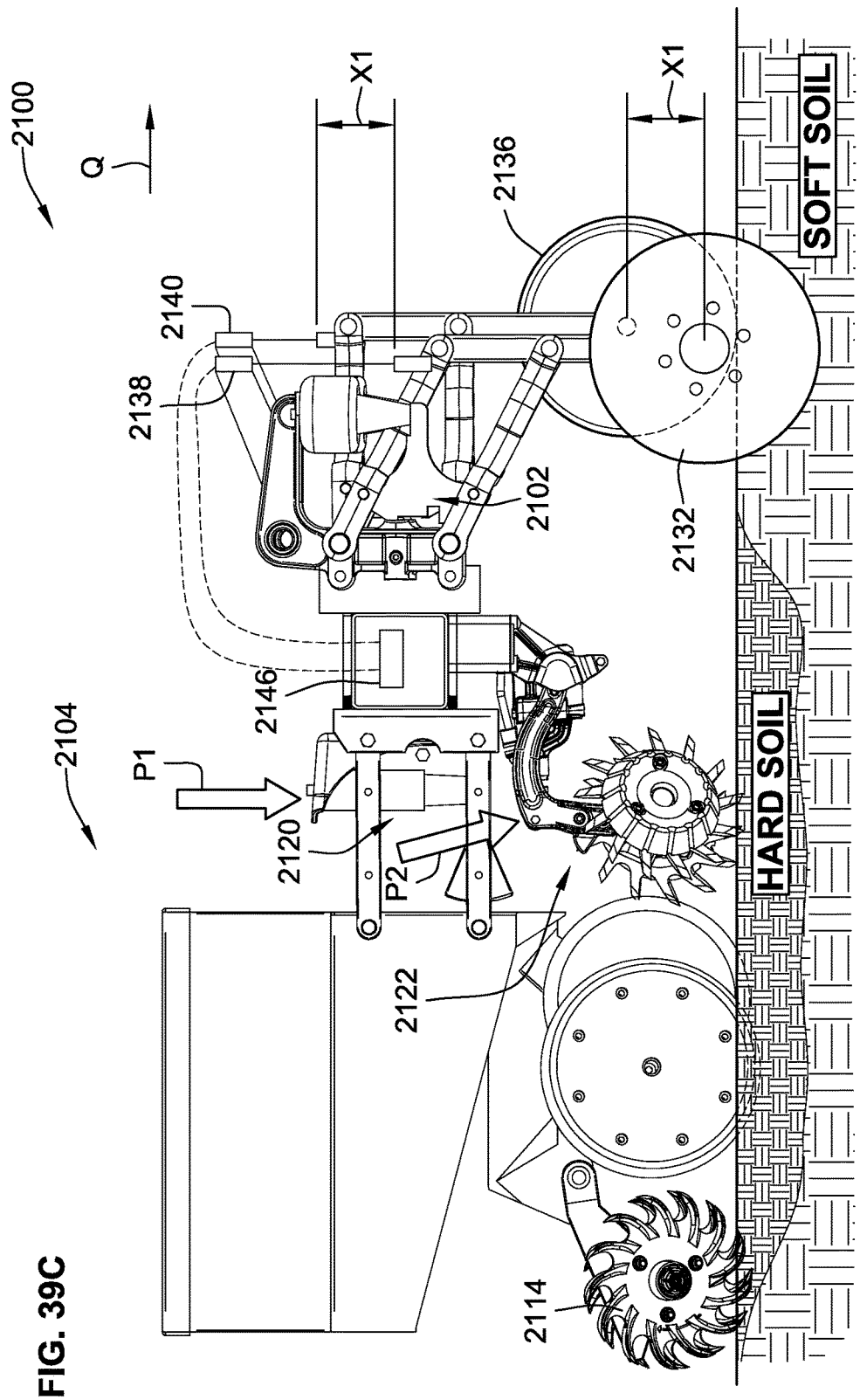
FIG. 39C is a side elevation of the agricultural system of FIG. 39B in which a planting row unit is moving over the hard soil conditions.

Referring to FIGS. 39A-39C, the agricultural system 2100 encounters various types of soil-hardness conditions, which, for ease of understanding, will include soft soil conditions and hard soil conditions. The soft soil conditions exemplify typical soil conditions, and the hard soil conditions exemplify compacted soil areas, e.g., areas compacted by tire tracks of tractors or combines.

Referring specifically to FIG. 39A, the agricultural system 2100 is moving forward at a speed Q over an initial soil area having only soft soil conditions. Based on the soft soil, the blade 2132 penetrates the soil at a distance X1 lower than the wheel 2136 (which rides on the soil surface). The distance X1 is the difference between the position sensors 2138, 2140. In accordance with the distance X1, which is associated with soft soil conditions, corresponding pressures P1 and P2 are applied to the hydraulic actuator 2120 and the row-clearing unit 2122.

Referring specifically to FIG. 39B, the blade 2132 and the wheel 2136 (but not the planting row unit 2104) are now moving over a soil area of hard soil conditions. Because the soil is now much harder than the previous soil area, the blade 2132 cannot penetrate the soil as much as in the previous soil area. As such, the blade 2132 rises higher relative to the soil surface and penetrates the soil only at a distance X2 lower than the wheel 2136 (which continues to ride on the soil surface). The distance X2 is the distance determined by the CPU 2146 based on the corresponding change in values outputted by the position sensors 2138, 2140. However, although the distance X2 (which is associated with hard soil conditions) is different from the previous distance X1 (which is associated with soft soil conditions), the corresponding pressures P1 and P2 are not changed, yet, because the planting row unit 2104 has not reached the hard-soil area.

Referring specifically to FIG. 39C, the planting row unit 2104 is now moving over the hard-soil area, which the blade 2132 and the wheel 136 have already passed. At this point in time, and only at this point in time, the pressures P1 and P2 are increased to maintain the desired depth level. Thus, although the soil-hardness sensing device 2102 has reached, again, soft soil conditions that allow the blade 2132 to penetrate the soil at the previous distance X1, the pressures P1 and P2 are adjusted in accordance with the hard soil conditions.

Referring to FIG. 40A, another exemplary soil-hardness sensing device 2202 is attached to a towing frame 2206 which in turn is attached to a planting row unit 2204 having a V-opener disk 2212, a pair of closing wheels 2214, and a row-unit gauge wheel 2216. The planting row unit 2204 further includes a hydraulic actuator 2220 that responds to a pressure P1 and a row-clearing-unit actuator 2222 that responds to a pressure P2. The soil-hardness device 2202 and the planting row unit 2204 are generally similar to the soil-hardness device 2102 and the planting row unit 2104 described above in reference to FIGS. 1-4C, except for any changes described below.

In this embodiment the soil-hardness device 2202 can be a device that is already included in the planting row unit 2204, such as a cutting coulter running directly in-line with the planter row unit or a fertilizer opener positioned off to a side of the planted area. Thus, assuming a side-by-side arrangement of row units, the soil-hardness device can include a fertilizer opener or a no-till cutting coulter in front of every row unit.

The soil-hardness device 2202 includes a blade 2232 and a soil-hardness gauge wheel 2236. The blade 2232 is attached to a blade arm 2260, and the soil-hardness gauge wheel 2236 is attached to a wheel arm 2262. The wheel arm 2262 is biased down by a spring 2264 and pivots relative to the blade arm 2260. An angular encoder 2266 measures changes in an angle θ between the blade arm 2260 and the wheel arm 2262. The angle θ is directly proportional to the depth of the blade 2232 relative to the soil-hardness gauge wheel 2236.

The angle θ, represented by a signal S4, is sent to a CPU 2246 which executes an algorithm to determine corresponding pressure values for the planting row unit 2204. A minimum angle θmin is equal to angle θ when both the blade 2232 and the soil-hardness gauge wheel 2236 are on the soil surface, e.g., when passing over very hard soil conditions or a concrete floor. A depth variable Z indicates a desired blade depth, i.e., blade 2232 penetration into the soil. The angle θ is directly proportional to the depth variable Z, which has a range between an actual (or current) depth value Zact and a theoretical depth value Ztheor.

By way of comparison, in the soil-hardness device 2202 of the current embodiment a controllable pressure P3, which is applied to the soil-hardness device 2202, is varied, but the angle θ between the blade 2232 and the soil-hardness gauge wheel 2236 is maintained generally constant, with the blade 2232 penetrating the soil at a desired blade depth Z. In contrast, in the soil-hardness device 2102 described above in reference to FIGS. 39A-39C the difference between the blade 2132 and the wheel 2136 is varied (e.g., distances X1 and X2), but the pressure applied to the soil-hardness device 2102 is maintained generally constant.

Figure 40B:
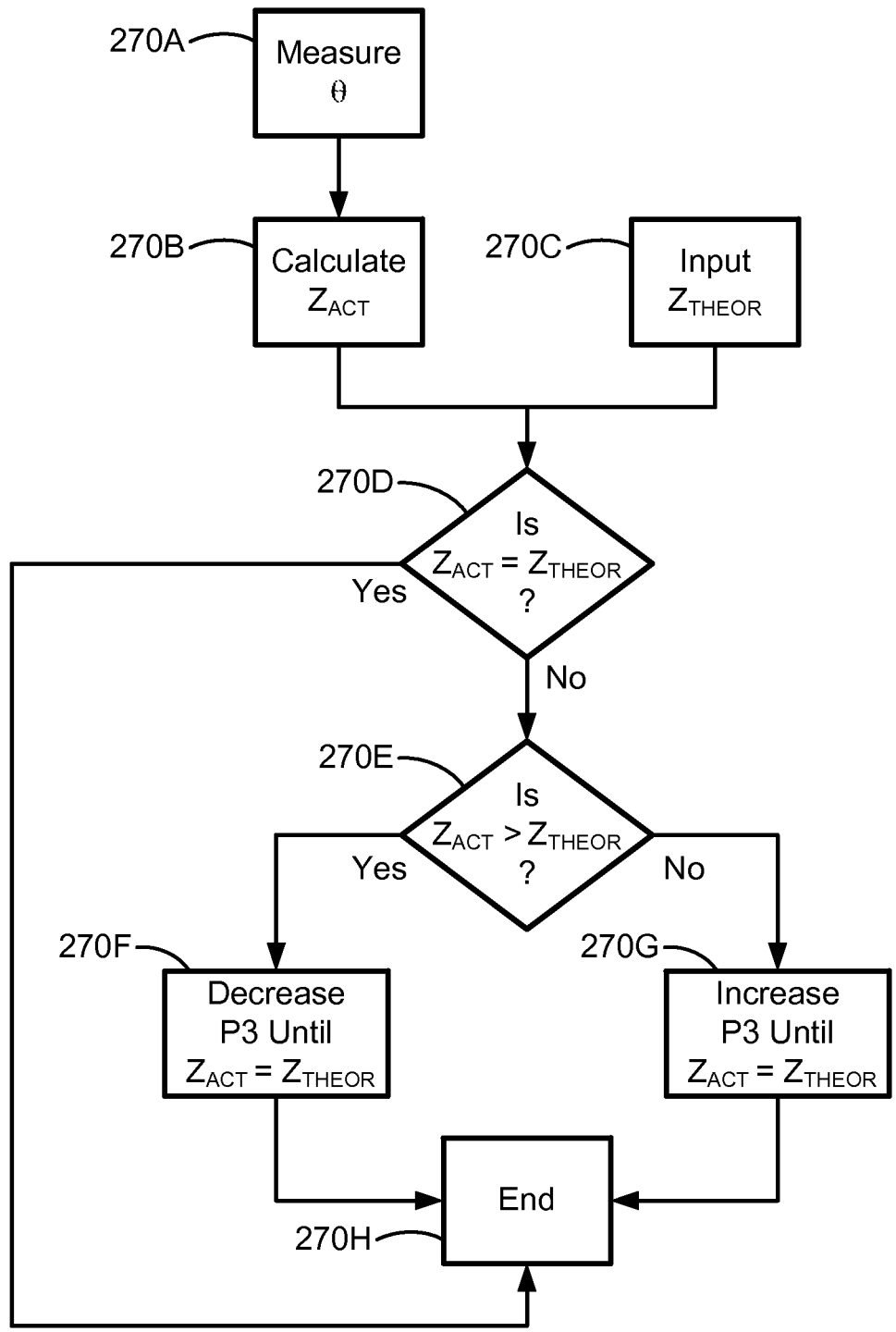
FIG. 40B is a flowchart of an algorithm for adjusting a pressure applied to a soil-hardness sensing device.

According to one aspect of the algorithm illustrated in FIG. 40B, the angle θ is measured (2270A) and the actual depth value Zact is calculated (2270B). Based on the actual depth value Zact and an inputted theoretical depth value Ztheor (2270C), a determination is made whether the actual depth value Zact is equal to the theoretical depth value Ztheor (2270D):

$$\text{If } Zact=Ztheor \Rightarrow end \qquad \text{Equation 3}$$

If the actual depth value Zact is equal to the theoretical depth value Ztheor (i.e., Zact=Ztheor), the algorithm ends (until the next value is received) (2270H). Optionally, if angle θ is less than minimum angle θmin (i.e., θ<θmin), algorithm ignores changes because those values typically illustrate that the soil-hardness sensing device 2202 has hit a rock.

If the actual value of the depth variable Z is greater than the theoretical value of the depth variable Z (i.e., Zact>Ztheor) (2270E), the controllable pressure P3 that is being applied to the soil-hardness device 2202 is decreased until the actual value of the depth variable Z is equal to the theoretical value of the depth variable Z (i.e., Zact=Ztheor) (2270F):

$$\text{If } Zact>Ztheor \Rightarrow \text{decrease P3 until } Zact=Ztheor \qquad \text{Equation 4}$$

If the actual value of the depth variable Z is smaller than the theoretical value of the depth variable Z (i.e., Zact<Ztheor), then the controllable pressure P3 is increased until the actual value of the depth variable Z is equal to the theoretical value of the depth variable Z (i.e., Zact=Ztheor) (2270G):

$$\text{If } Zact<Ztheor \Rightarrow \text{increase P3 until } Zact=Ztheor \qquad \text{Equation 5}$$

Thus, according to this algorithm, the desired depth Z of the blade 2232 is maintained constant by varying the pressure P3 in response to detected changes in the angle θ. To vary the pressure P3, a user-defined variable M (similar to the user-defined variables K and J described below) is increased or decreased to modify an actual value P3act of the pressure P3 until the desired depth variable Z is achieved. As such, assuming that a theoretical value P3theor of the pressure P3 is being applied to the blade 2232 when the desired depth Ztheor is achieved, and further assuming that P3theor is directly proportional to M*P3act, M is modified until M*P3act is equal to P3theor (and, consequently, the desired depth variable Z is achieved). For example, if the depth variable Z is too small, i.e., the blade 2232 is running too shallow into the soil (e.g., the blade 2232 is moving through a heavily compacted soil area), as detected by a change in the angle θ, M is increased until the actual pressure value P3act is equal to the theoretical value P3theor. Once the theoretical value P3theor is reached, the increased pressure forces the blade 2232 into the soil at the desired depth. Furthermore changes to the pressure P1 and the pressure P2 can be effected based on M*P3act being directly proportional to P1 and P2.

Figure 40C:
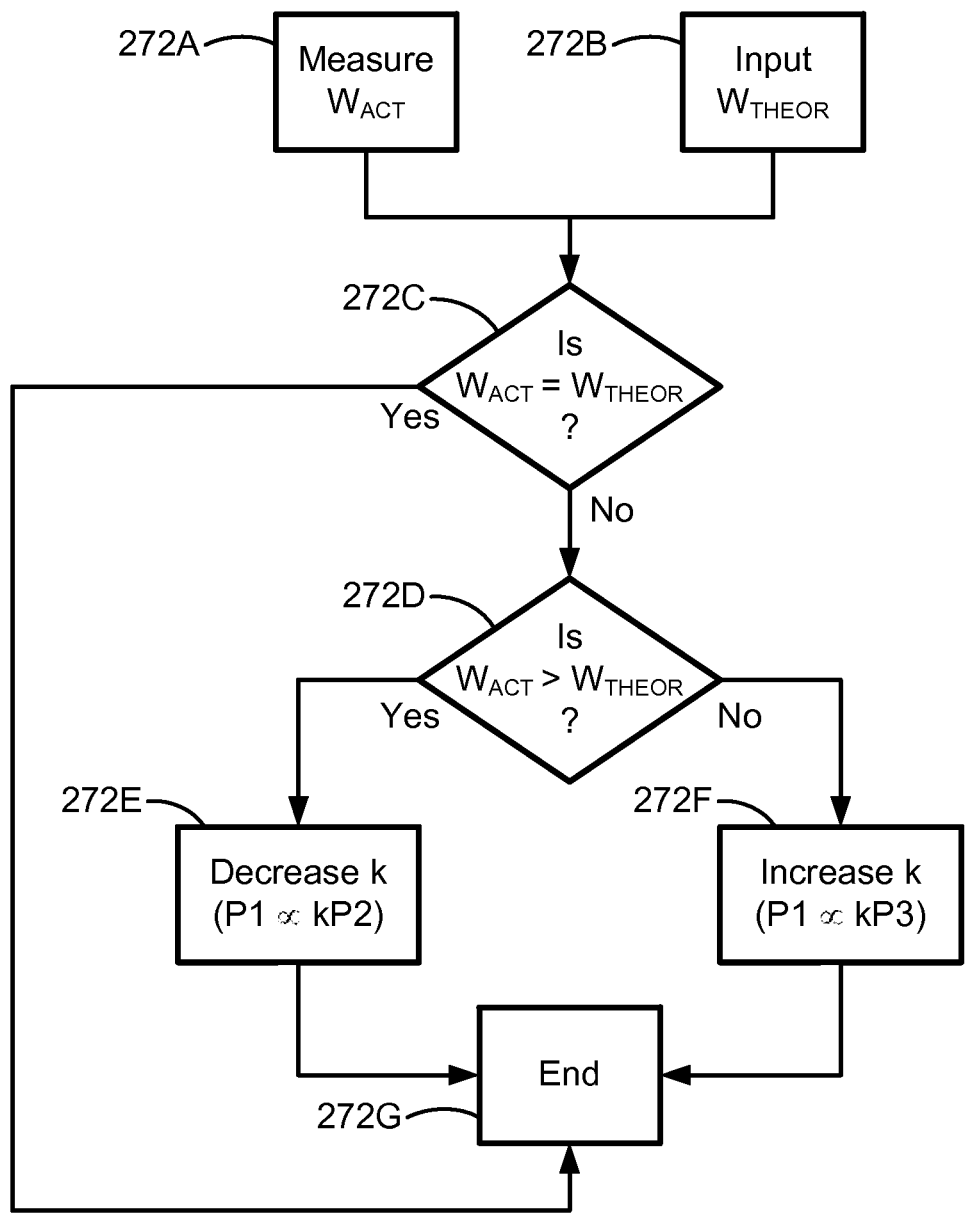
FIG. 40C is a flowchart of an algorithm for adjusting a user-defined variable associated with a pressure applied to a planting row unit.

According to another aspect of the algorithm, illustrated in FIG. 40C, if feedback is desired from the row-unit gauge wheel 2216, to verify that the system is performing as desired (e.g., to verify that the appropriate pressure values are being applied to the planting row unit 2204), a weight variable W is set in accordance with a desired weight. In this example, the pressure P1 applied to the hydraulic actuator 2220 of the planting row unit 2204 is directly proportional to a user-defined variable K multiplied by the pressure P3 applied to the soil-hardness device 2202 (i.e., P1 is directly proportional to K*P3).

A signal S5 (illustrated in FIG. 40A), which is directly proportional to the weight variable W, is outputted by a gauge wheel load sensor 2280 (illustrated in FIG. 5A) and averaged over a time period Tgauge. After measuring the actual weight value Wact (272A) and receiving the theoretical weight value Wtheor (2272B), a determination is made whether the actual weight value Wact is equal to the theoretical weight value Wtheor (2272C):

If Wact=Wtheor=>end  (Equation 6)

If the actual weight value Wact is equal to the theoretical weight value Wtheor (i.e., Wact=Wtheor), the algorithm ends (2272G) until the next measurement.

If the actual weight value Wact is greater than the theoretical weight value Wtheor (i.e., Wact>Wtheor), then the user-defined variable K is decreased (2272E) until the actual weight value Wact is equal to the theoretical weight value Wtheor:

If Wact>Wtheor=>decrease K  (Equation 7)

If the actual weight value Wact is less than the theoretical weight value Wtheor (i.e., Wact<Wtheor), then the user-defined variable K is increased (2272F) until the actual weight value Wact is equal to the theoretical weight value Wtheor:

If Wact<Wtheor=>increase K  (Equation 8)

The user-defined variable K can be set manually by a user or automatically via a load pin 2282.

Figure 40D:
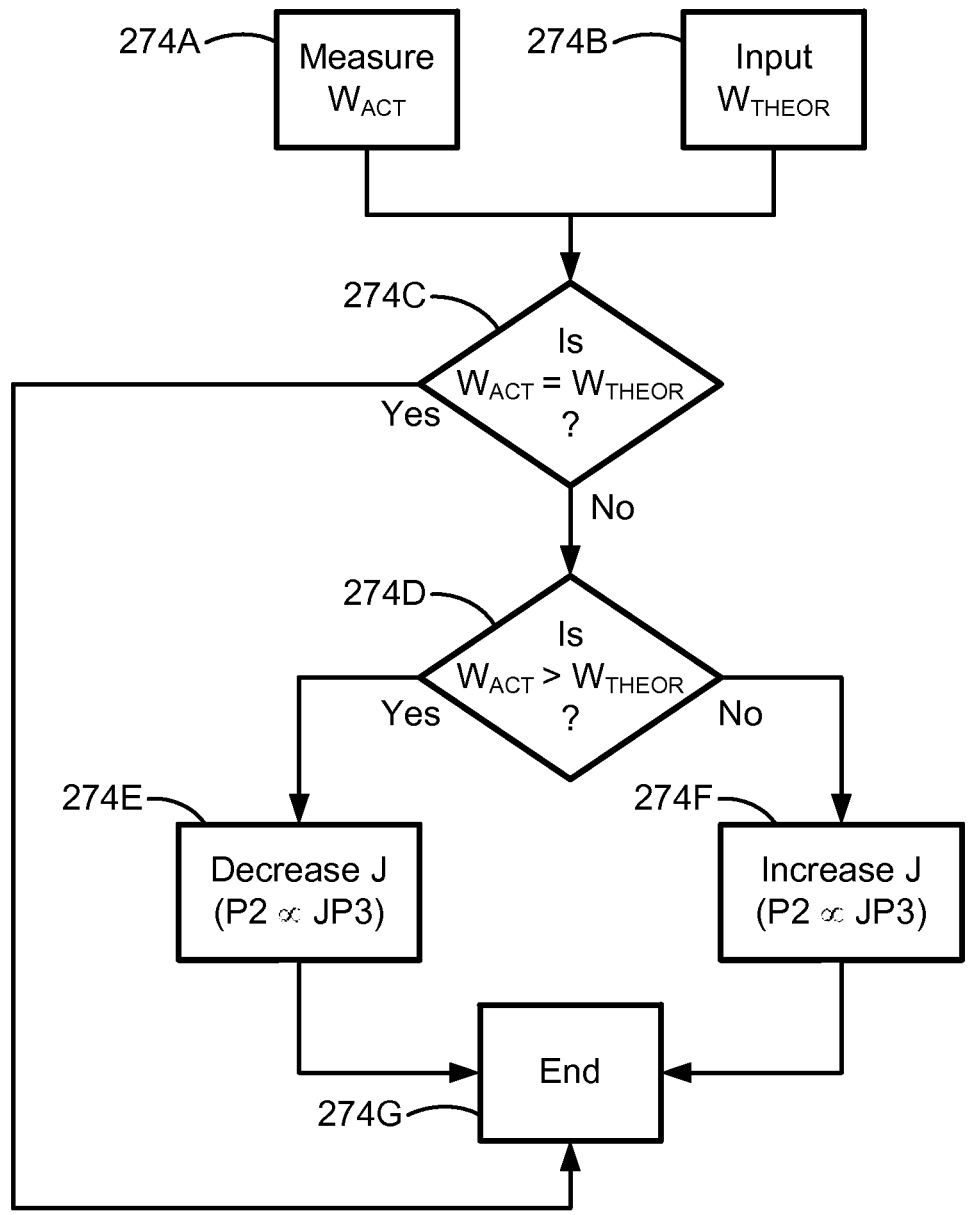
FIG. 40D is a flowchart of an algorithm for adjusting a user-defined variable associated with a pressure applied to a row-clearing unit.

Similarly, referring to FIG. 40D, the pressure P2 applied to the row-cleaner unit 2222 can be adjusted by adjusting a user-defined variable J. Specifically, in this example, the pressure P2 is directly proportional to the user-defined variable J multiplied by the pressure P3 (i.e. P2 is directly proportional to J*P3). After measuring the actual weight value Wact (2274A) and receiving the theoretical weight value Wtheor (2274B), a determination is made whether the actual weight value Wact is equal to the theoretical weight value Wtheor (2274C):

If Wact=Wtheor=>end  (Equation 9)

If the actual weight value Wact is equal to the theoretical weight value Wtheor (i.e., Wact=Wtheor), the algorithm ends (2274G) until the next measurement.

If the actual weight value Wact is greater than the theoretical weight value Wtheor (i.e., Wact>Wtheor), then the user-defined variable J is decreased (274E) until the actual weight value Wact is equal to the theoretical weight value Wtheor:

If Wact>Wtheor=>decrease J  (Equation 10)

If the actual weight value Wact is less than the theoretical weight value Wtheor (i.e., Wact<Wtheor), then the user-defined variable J is increased (2274F) until the actual weight value Wact is equal to the theoretical weight value Wtheor:

If Wact<Wtheor=>increase J  (Equation 11)

The user-defined variable J can also be set manually by a user or automatically via the load pin 282.

Figure 41A:
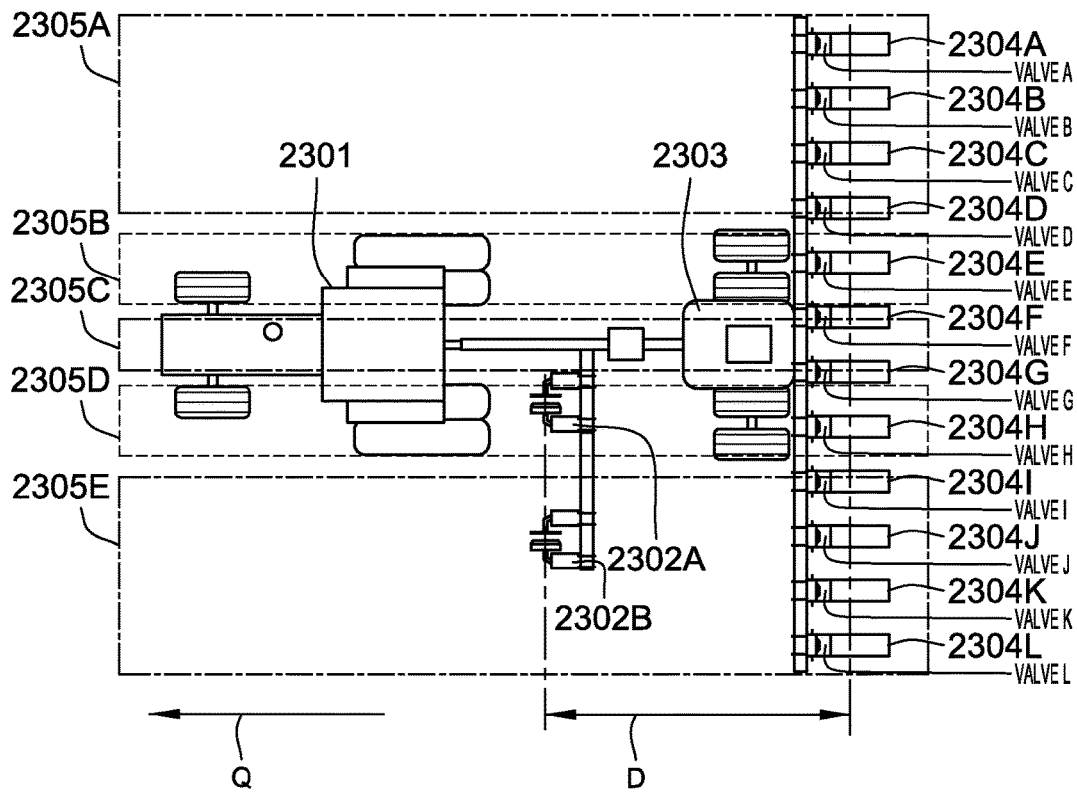
FIG. 41A is a top elevation illustrating an agricultural system in which a plurality of planting row units are adjusted by two soil-hardness sensing devices.
Figure 41B:
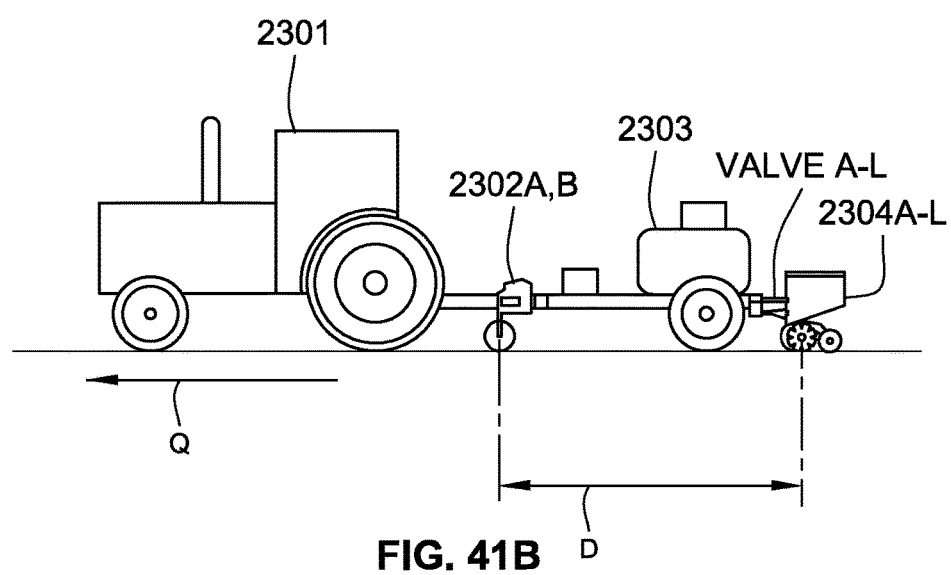
FIG. 41B is a side elevation illustrating the agricultural system of FIG. 41B.

Referring to FIGS. 41A and 41B, an agricultural system 2300 includes a tractor 2301, two soil-hardness sensing devices 2302A, 2302B, a planting device 2303, and a plurality of planting row units 2304A-2304L, which are configured in a side-by-side arrangement. In this example, each of the planting row units 2304A-2304L has at least one respective control Valve A-L, which is adjustable based on signals received from the soil-hardness sensing devices 2302A, 2302B.

The tractor 2301 moves at a speed Q, pulling the soil-hardness sensing device 2302A, 2302B, the planting device 2303, and the planting row units 2304A-2304L along a soil area that includes five soil areas 2305A-2305E. Specifically, the soil areas 2305A-2305E includes a right-side outside area 2305A, a right-side wheel area 2305B, a central area 2305C, a left-side wheel area 2305D, and a left-side outside area 2305E. The right-side wheel area 2305B and the left-side wheel area 2305D have soil conditions that are harder than the right-side outside area 2305A, the central area 2305C, and the left-side outside area 305E. The harder soil conditions are caused by the wheels of the tractor 2301 and/or planting device 2303, which form a compacted path as the tractor 301 moves along the soil area. Thus, each of the right-side wheel area 2305B and the left-side wheel area 2305D are areas compacted by the wheels of vehicles.

A first soil-hardness sensing device 2302A controls only the planting row units 2304E, 2304H that are positioned inside the compacted paths of the right-side wheel area 2305B and the left-side wheel area 2305D. A second soil-hardness sensing device 2302B controls all the other planting row units 2304A-2304D, 2304F-2304G, and 2304I-2304L, i.e., all the planting row units positioned outside the compact paths of the right-side wheel area 2305B and the left-side wheel area 2305D (and within the right-side outside area 305B, the central area 2305C, and the left-side outside area 2305E). Optionally, any number of soil-hardness sensing devices and any number of planting row units can be used. For example, each of the planting row units 2304A-2304L can have its own designated soil-hardness sensing device.

The soil-hardness sensing devices 2302A, 2302B are positioned at a distance D in front of the planting row units 2304A-2304L. Optionally, each of the soil-hardness sensing devices 2302A, 2302B can be positioned at a different distance in front of the planting row units 2304A-2304L. For example, the first soil-hardness sensing device 2302A can be positioned at a distance X1 in front of the planting row units 2304A-2304L and the second soil-hardness sensing device 2302B can be positioned at a distance X2 in front of the planting row units 2304A-2304L. As currently illustrated in FIGS. 41A-41B, the distances X1 and X2 are equal to each other (being effectively distance D). Furthermore, the first soil-hardness sensing device 2302A is positioned inside the compacted path of the left-side wheel area 2305D and the second soil-hardness sensing device 2302B is positioned inside the left-side outside area 2305E (i.e., outside the compacted path of the bottom wheel area 305D).

The soil-hardness sensing devices 2302A, 2302B and the attached planting row units 2304A-2304L are generally configured to sense soil conditions and adjust corresponding hydraulic pressures of Valves A-L as described above in reference to FIGS. 36-40. The configuration of having multiple soil-hardness sensing devices 2302A, 2302B increases precision in adjustment of hydraulic pressures, based on current soil conditions, because it accounts for differences between compacted and non-compacted paths in a field that is being planted. Thus, for example, the soil-hardness sensing devices 2302A, 2302B provides signals to corresponding control valves for increasing and/or decreasing hydraulic pressures of the planting row units 2304A-2304L.

The soil-hardness sensing devices discussed above can be remotely controlled. For example, the soil-hardness sensing devices 2302A, 2302B can be remotely controlled with a handheld radio-frequency remote controller. By way of example, the remote controller can be used to manually increase and/or decrease the hydraulic pressures in one or more of the soil-hardness sensing devices 2302A, 2302B.

Figure 42:
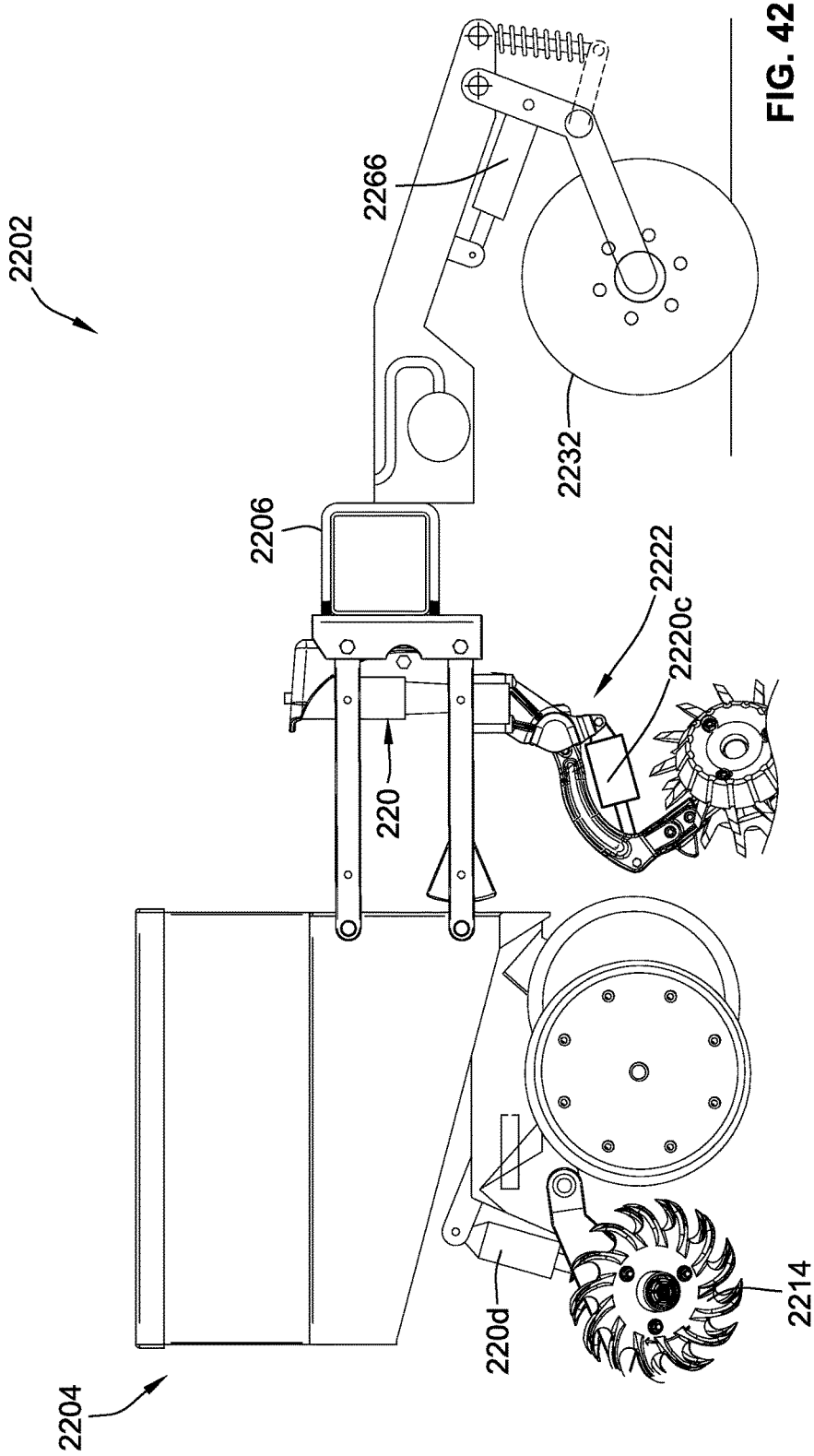
FIG. 42 is a side elevation illustrating an alternative embodiment of the soil-hardness sensing device with modular actuators.

Referring to FIG. 42, the soil-hardness device 2202 illustrated in FIG. 40A has been modified to include modular actuators 2220a-2220d. Each of the modular actuators 2220a-2220d is identical (or nearly identical) to each other as a modular unit that allows the same unit to be used for movement of different components of the soil-hardness device 2202. According to one example, the modular actuators 2220a-2220d include the hydraulic actuator 2220 described above and illustrated in FIG. 40A or the hydraulic actuator 2120 described above and illustrated in FIG. 36.

Each of the modular actuators 2220a-2220d provides controllable pressure for urging the respective components downwardly and/or upwardly, based on the mounting and type of actuator. For example, the modular actuators 2220a-2220d can include a double-acting actuator in which the controllable pressure can be applied to urge the planting row 2104, alternately, both upwards and downwards.

A first modular actuator 2220a is configured and mounted to apply a controllable downward force on the entire planting row unit 2204 attached to the rear side of the towing frame 2221. A second one of the modular actuators 2220b is configured and mounted to urge the blade 2232 with a controllable force. A third one of the modular actuators 2220c is configured and mounted to urge the row-clearing unit 2222 with a controllable force. A fourth one of the modular actuators 2220d is configured and mounted to urge the closing wheel 2214 with a controllable force. Thus, for each of the four independently movable components—the planting row unit 2204, the blade 2232, the row-clearing unit 2222, and the closing wheel 2214—the same modular actuator 2220d is configured to achieve the desired force.

One exemplary benefit of having interchangeable actuators 2220a-2220d is that a reduced number of spare parts is required for maintaining the system, thus, reducing cost. Another exemplary benefit is that a farmer or operator does not have to learn how to use and/or replace a separate and distinct type of actuator for each movable component. For example, knowing how to replace or maintain the first actuator 2220a means that the farmer knows how to replace or maintain each of the other three actuators 2220b-2220d. As such, the general result of having interchangeable actuators is reduced cost and a simpler system.

According to alternative embodiments, any number of modular actuators can be adapted for mounting in any agricultural systems. For example, the soil-hardness device 2202 can include two modular actuators of a first type and two modular actuators of a second type. By way of a specific example, the first and second actuators 2220a, 2220b can include a double-acting actuator for applying both upwards and downwards pressure, and the third and fourth actuators 2220c, 2220d can include a single-acting actuator for applying either upward or downward pressure. In other embodiments, the modular actuators are used in systems that lack soil-hardness sensing capabilities.

Figure 43:
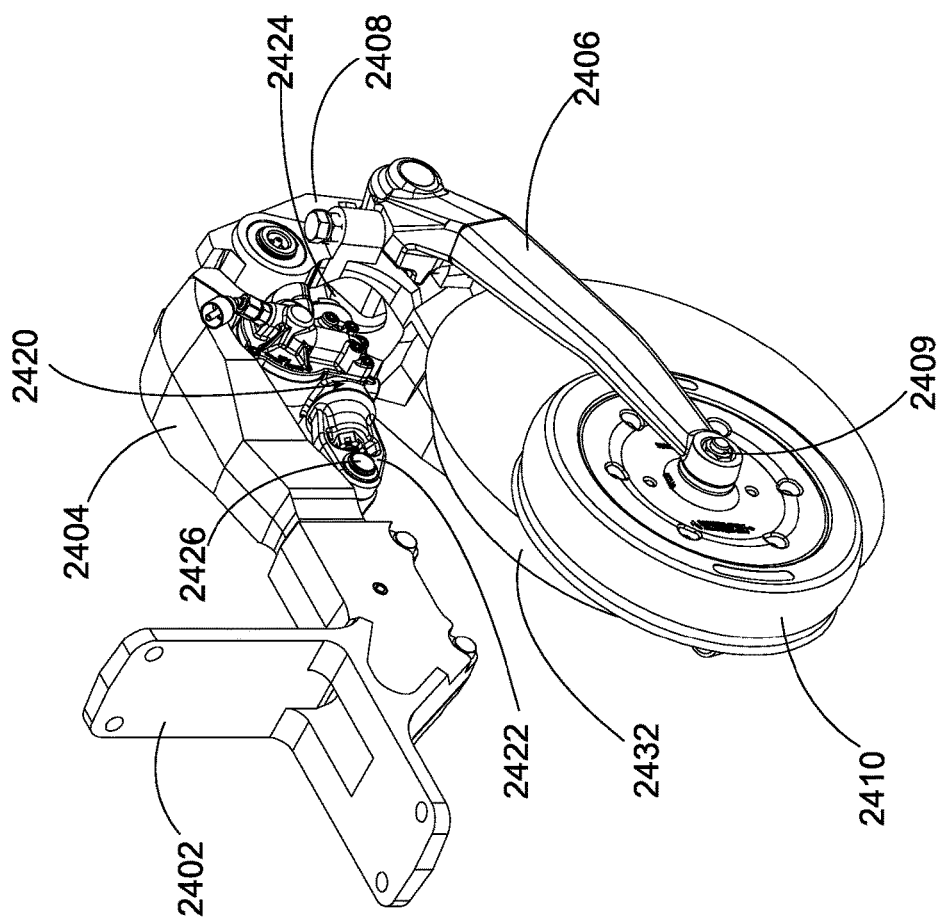
FIG. 43 is a perspective view illustrating an alternative modular unit.

Referring to FIG. 43, an alternative modular unit 2400 includes a mounting bracket 2402 attached to an upper support 2404. A gauge arm 2406 is pivotably attached at a proximal end 2407 to a swing arm 2408, which is attached to the upper support 2404. The gauge arm 2406 is attached at a distal end 2409 to a gauge wheel 2410, and the swing arm 2408 is further attached to a blade 2432.

The modular unit 2400 includes a modular actuator 2420 that is removably attached to the upper support 2404 at a fixed end 2422 and to the swing arm 2408 at a movable piston end 2424. The modular actuator 2420 is illustrated in this exemplary embodiment as a pressure-applying device for the blade 2432. However, to convert the modular actuator 2420 for use with a different component (e.g., to apply pressure to the row-clearing unit 2222), the modular actuator 2420 is removed by removing, for example, an assembly bolt 2426 and/or any other fastener holding the modular actuator 2420 in place relative to the upper support 2404 and the swing arm 2408. Then, the same modular actuator 2420 (without the requirement for additional components) can be fastened to a different component of the soil-hardness device 2202 (e.g., the row-clearing unit 2222). Thus, removal and/or assembly of the modular actuator 2420 is easily achieved with minimal effort and a small number of fasteners.

Figure 44G:
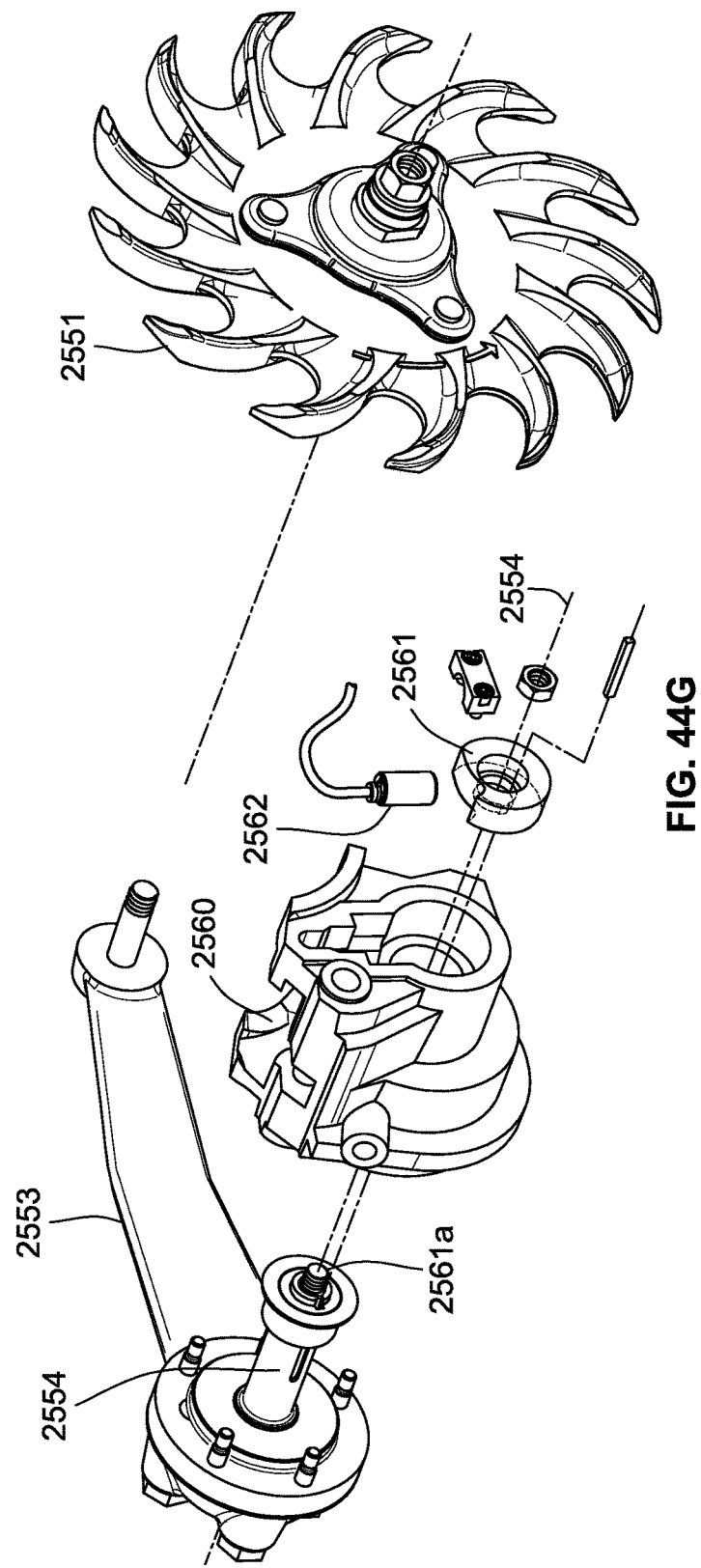
FIG. 44G is an enlarged exploded perspective view of the closing wheel support arm shown in FIGS. 44C-44F, and the sensing device coupled to the upper end of that support arm.

Referring to FIGS. 44A and 44B, according to an alternative configuration, the blade arm 2260 has a distal end 2502 in which a ground-hardness sensor 2500 is integrated. The ground-hardness sensor 2500 is fixed relative to the blade arm 2260 in a metallic cam 2501 that includes an aperture 2504 through which a rotating shaft 2506 protrudes. The rotating shaft 2506 is coupled to the gauge wheel 2236 via the wheel arm 2262. As the soil-hardness sensing device 2202 travels over soil of varying conditions (e.g., from hard soil to soft soil), the gauge wheel 2236 causes the shaft 2506 to rotate. In turn, the ground-hardness sensor 2500 detects the rotational movement of the shaft 2506 within the aperture 2504 and provides output indicative of an angular change between the supporting arms for the gauge wheel 2236 and the blade 2232.

The ground-hardness sensor 2500 also includes an indicator 2508 that is configured to indicate a performance condition. For example, the indicator 2508 is a light-emitting diode (LED) that displays a continuous green light when the ground-hardness sensor 2500 is functioning properly and a flashing red light when a malfunction occurs.

The ground-hardness sensor 2500 is shielded from the environment with a cover 2510, which is mounted to the distal end 2502 to enclose within the cam 2501. The cover 2510 consists of a translucent or transparent material, such as a clear plastic material, to readily allow visual inspection of the ground-hardness sensor 2500. Thus, one benefit of the cover 2510 is that an operator is not required to remove any parts to determine whether the ground-hardness sensor 500 is operating properly.

The ground-hardness sensor 2500 is provided in addition to or instead of the encoder 266 described above in reference to FIG. 40A. As described above, as the shaft 2506 rotates, the ground-hardness sensor 2500 measures changes in the angle $\theta$ between the blade arm 2260 and the wheel arm 2262 to determine the depth Z of the blade 2232 relative to the soil-hardness gauge wheel 2236. Then, the angle $\theta$ is sent to the CPU 2246 for executing the algorithm to determine corresponding pressure values for the planting row unit 2204. The angle $\theta$ is directly proportional to the depth of the blade 2232 relative to the soil-hardness gauge wheel 2236.

The ground-hardness sensor 2500 can be any analog or digital sensor that is capable of measuring an angular displacement. For example, the ground-hardness sensor 2500 can be a linear inductive distance sensor, which is an analog device.

The blade arm 2260 further includes a torsion spring 2512 that engages the shaft 2506 to rotationally bias the shaft 2506 toward an equilibrium point when the shaft 2506 applies a rotational force. The torsion spring 2512 can be attached instead of or in addition to the spring 2264 illustrated in FIG. 40A. According to the illustrated example, the torsion spring 2512 is a compressive, rubber spring with adjustable down-pressure. Specifically, in this example, the torsion spring 2512 is in the form of an external structure 2512a in which an internal structure 2512b is positioned. The external and internal structures 2512a, 2512b are generally rectangular and are concentrically aligned along a central axis. Furthermore, the internal structure 2512b is offset at an angle of about 90 degrees relative to the external structure 2512a. When the shaft 2506 rotates in a first direction (e.g., counterclockwise), the internal structure 2512b moves with the shaft 2506 such that corners of the internal structure 2512b tend to align with corners of the external structure 2512a. Simultaneously, the external structure 2512a applies a second, opposing force (e.g., clockwise) that counters the first direction and forces the internal structure 2512b and the shaft 2506 back towards the equilibrium point.

In addition to applying an opposing force to the rotational force of the shaft 2506, the torsion spring 2512 compresses to dampen the effects of the rotational force of the shaft 2506. The compression provides a smoother change in movement for the blade arm 2260, and increases the torsion spring 2512 resistance to fatigue.

Another benefit of integrating the torsion spring 2512 in the blade arm 2260 is that the torsion spring is protected from environmental conditions, including dirt or mud, that can potentially interfere with the applied compressive force. Yet another benefit of the torsion spring 2512 is that it reduces the number of exposed components, which can be a hazard to human operators.

FIGS. 44C-44G illustrate an application of soil hardness sensing for controlling the down pressure on a pair of closing wheels 2551 journaled on a support arm 2553 having an upper end that pivots around a horizontal axis 2554. A ground gauge wheel 2555 is journaled on a support arm 2556 having an upper end that pivots around the same horizontal axis 2554 as the support arm 2553. The ground gauge wheel 2555 rolls along the surface of the soil with little variation in its vertical position relative to the soil surface, because of the wide and smooth surface area of the wheel 2555. The closing wheels 2551, on the other hand, penetrate into the soil, and thus change their vertical positions according to the hardness of the soil. The resulting pivoting movement of the support arm 2553, relative to the more stable position of the support arm 2556, is thus representative of the soil hardness. This relative pivoting movement of the support arm 2553 is measured by an angular measurement device 2560 coupled to the upper end of the support area 2553.

In the illustrative embodiment of FIGS. 44C-44G, the angular measurement device 2560 is formed by the combination of (1) a cam 2561 attached to a stub shaft 2561a projecting laterally from the support arm 2553 and (2) an adjacent inductive proximity sensor 2562. As the support arm 2553 pivots around the axis 2554, the corresponding angular movement of the cam 2561 is detected by the sensor 2562, which produces an electrical output signal that is proportional to the distance between the surface of the arm 2561 and the adjacent and of the sensor 2562. That distance varies as the angular position of the cam 2561 changes with the pivoting movement of the support arm 2553, and thus the output signal produced by the sensor 2562 is proportional to the angular position of the support arm 2853, which in turn is generally proportional to the soil hardness. This signal can be used to regulate the down pressure exerted on the closing wheels 2551, by the hydraulic actuator 2563, to compensate for variations in the sensed soil hardness.

Figure 45:
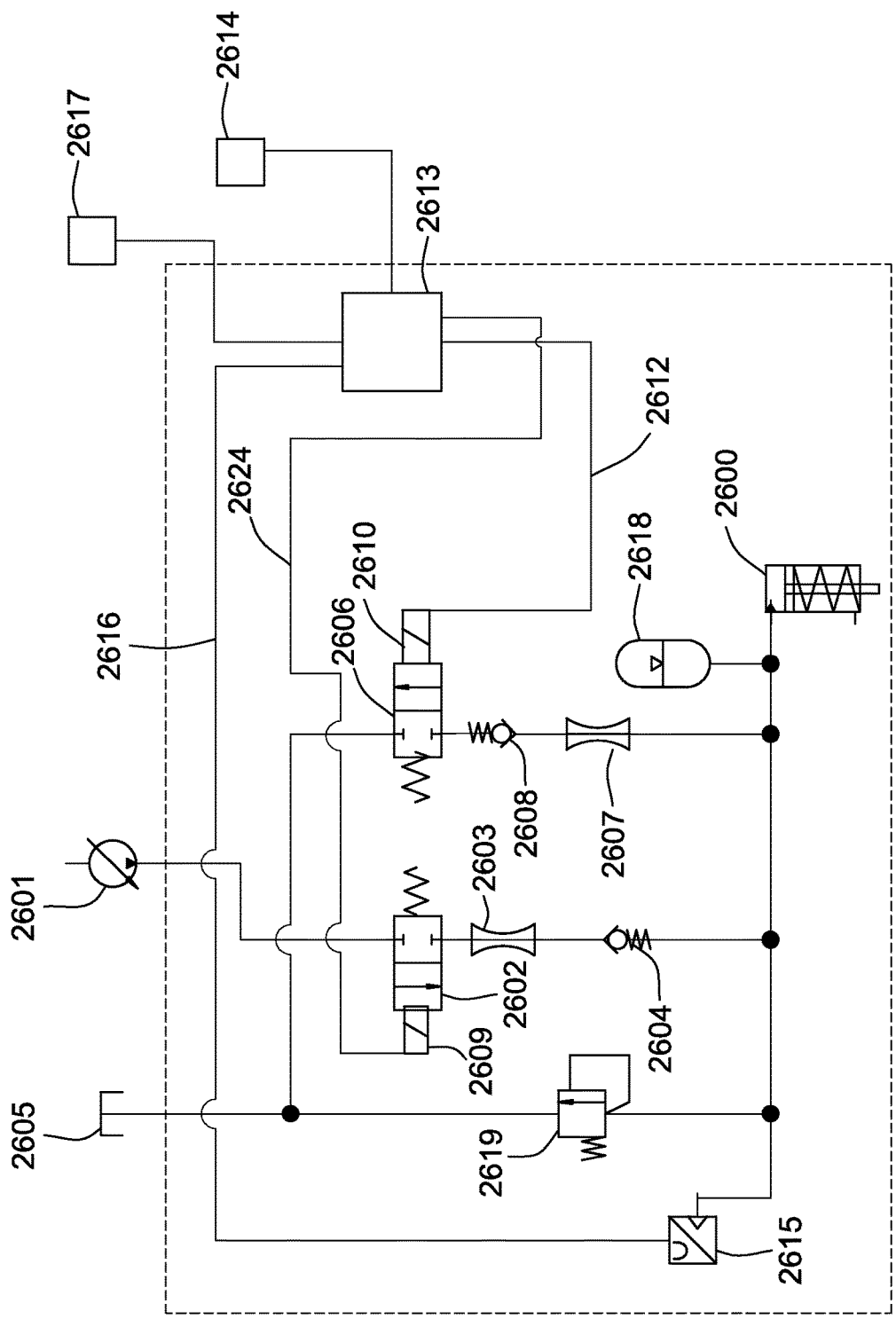
FIG. 45 is a schematic diagram of a hydraulic control system for controlling the hydraulic pressure in a hydraulic cylinder.

FIG. 45 is a schematic diagram of a hydraulic control system for any or all of the hydraulic actuators in the systems described above. The hydraulic cylinder 2600 is supplied with pressurized hydraulic fluid from a source 2601 via a first controllable two-position control valve 2602, a restriction 2603 and a check valve 2604. The pressurized hydraulic fluid supplied to the cylinder 2600 can be returned from the cylinder to a sump 2605 via a second controllable two-position control valve 2606, a restriction 2607 and a check valve 2608. Both the control valves 2602 and 2606 are normally closed, but can be opened by energizing respective actuators 2609 and 2610, such as solenoids. Electrical signals for energizing the actuators 2609 and 2610 are supplied to the respective actuators via lines 2611 and 2612 from a controller 2613, which in turn may be controlled by a central processor 2614. The controller 2613 receives input signals from a plurality of sensors, which in the example of FIG. 45 includes a pressure transducer 2615 coupled to the hydraulic cylinder 2600 via line 2616, and a ground hardness sensor 2617. An accumulator 2618 is also coupled to the hydraulic cylinder 2600, as described in detail above, and a relief valve 2619 connects the hydraulic cylinder 2600 to the sump 2605 in response to an increase in the pressure in the cylinder 2600 above a predetermined level.

To reduce the energy required from the limited energy source(s) available from the tractor or other propulsion device used to transport the row units over an agricultural field, the control valves 2602 and 2606 are preferably controlled with a pulse width modulation (PWM) control system implemented in the controller 2613. The PWM control system supplies short-duration (e.g., in the range of 50 milliseconds to 2 seconds with orifice sizes in the range of 0.020 to 0.2 inch) pulses to the actuators 2609 and 2610 of the respective control valves 2602 and 2606 to open the respective valves for short intervals corresponding to the widths of the PWM pulses. This significantly reduces the energy required to increase or decrease the pressure in the hydraulic cylinder 2600. The pressure on the exit side of the control valve is determined by the widths of the individual pulses and the number of pulses supplied to the control valves 2602 and 2606. Thus, the pressure applied to the hydraulic cylinder 2622 may be controlled by separately adjusting the two control valves 2602 and 2606 by changing the width and/or the frequency of the electrical pulses supplied to the respective actuators 2609 and 2610, by the controller 2613. This avoids the need for a constant supply current, which is a significant advantage when the only available power source is located on the tractor or other vehicle that propels the soil-engaging implement(s) across a field.

The hydraulic control system of FIG. 45 may be used to control multiple hydraulic cylinders on a single row unit or a group of row units, or may be replicated for each individual hydraulic cylinder on a row unit having multiple hydraulic cylinders. For example, in the system described above having a ground hardness sensor located out in front of the clearing wheels, it is desirable to have each hydraulic cylinder on any given row unit separately controlled so that the down pressure on each tool can be adjusted according to the location of that tool in the direction of travel. Thus, when the ground hardness sensor detects a region where the soil is softer because it is wet, the down pressure on each tool is preferably adjusted to accommodate the softer soil only during the time interval when that particular tool is traversing the wet area, and this time interval is different for each tool when the tools are spaced from each other in the direction of travel. In the case of a group of row units having multiple hydraulic cylinders on each row unit, the same hydraulic control system may control a group of valves having common functions on all the row units in a group.

Figure 46A:
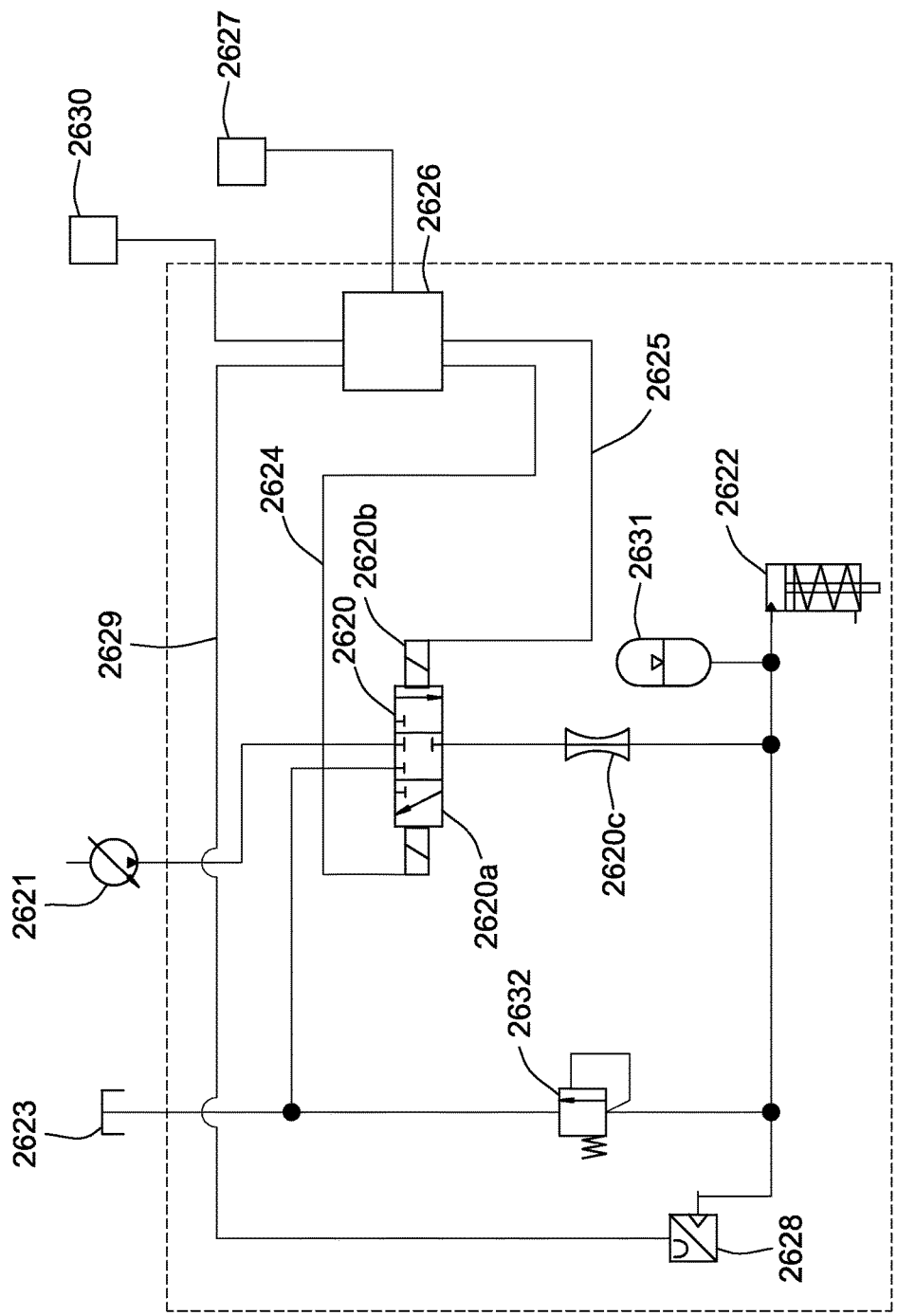
FIG. 46A is a schematic diagram of a modified hydraulic control system for controlling the hydraulic pressure in a hydraulic cylinder.

FIG. 46A is a schematic diagram of a modified hydraulic control system that uses a single three-position control valve 2620 in place of the two two-position control valves and the two check valves used in the system of FIG. 45. The centered position of the valve 2620 is the closed position, which is the normal position of this valve. The valve 2620 has two actuators 2620*a* and 2620*b*, one of which moves the valve to a first open position that connects a source 2621 of pressurized hydraulic fluid to a hydraulic cylinder 2622 via restriction 2620*c*, and the other of which moves the valve to a second open position that connects the hydraulic cylinder 2622 to a sump 2623. Electrical signals for energizing the actuators 2620*a* and 2620*b* are supplied to the respective actuators via lines 2624 and 2625 from a controller 2626, which in turn may be controlled by a central processor 2627. The controller 2626 receives input signals from a pressure transducer 2628 coupled to the hydraulic cylinder 2622 via line 2629, and from an auxiliary sensor 2630, such as a ground hardness sensor. An accumulator 2631 is coupled to the hydraulic cylinder 2622, and a relief valve 2632 connects the hydraulic cylinder 2622 to the sump 2623 in response to an increase in the pressure in the cylinder 2622 above a predetermined level.

Figure 46B:
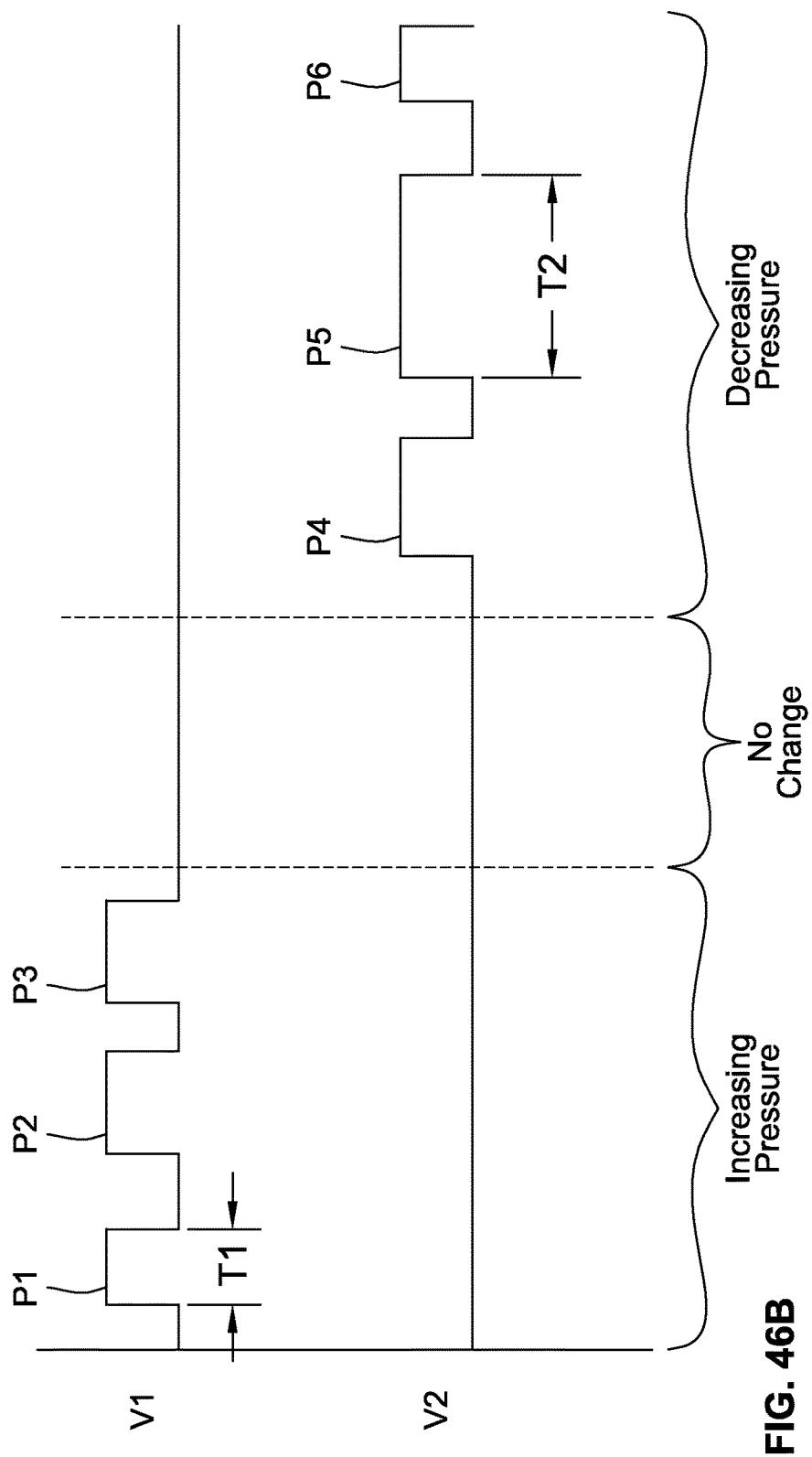
FIG. 46B is a waveform diagram illustrating different modes of operation provided by the hydraulic control systems of FIGS. 45 and 46A.

As depicted in FIG. 46B, a PWM control system supplies short-duration pulses P to the actuators 2620*a* and 2620*b* of the control valve 2620 to move the valve to either of its two open positions for short intervals corresponding to the widths of the PWM pulses. This significantly reduces the energy required to increase or decrease the pressure in the hydraulic cylinder 2622. In FIG. 46B, pulses P1-P3, having a voltage level V1, are supplied to the actuator 2620*b* when it is desired to increase the hydraulic pressure supplied to the hydraulic cylinder 2622. The first pulse P1 has a width T1 which is shorter than the width of pulses P2 and P3, so that the pressure increase is smaller than the increase that would be produced if P1 had the same width as pulses P2 and P3. Pulses P4-P6, which have a voltage level V2, are supplied to the actuator 2620*a* when it is desired to decrease the hydraulic pressure supplied to the hydraulic cylinder 2622. The first pulse P4 has a width that is shorter than the width T2 of pulses P2 and P3, so that the pressure decrease is smaller than the decrease that would be produced if P4 had the same width as pulses P5 and P6. When no pulses are supplied to either of the two actuators 2620*a* and 2620*b*, as in the "no change" interval in FIG. 46B, the hydraulic pressure remains substantially constant in the hydraulic cylinder 2622.

Figure 46C:
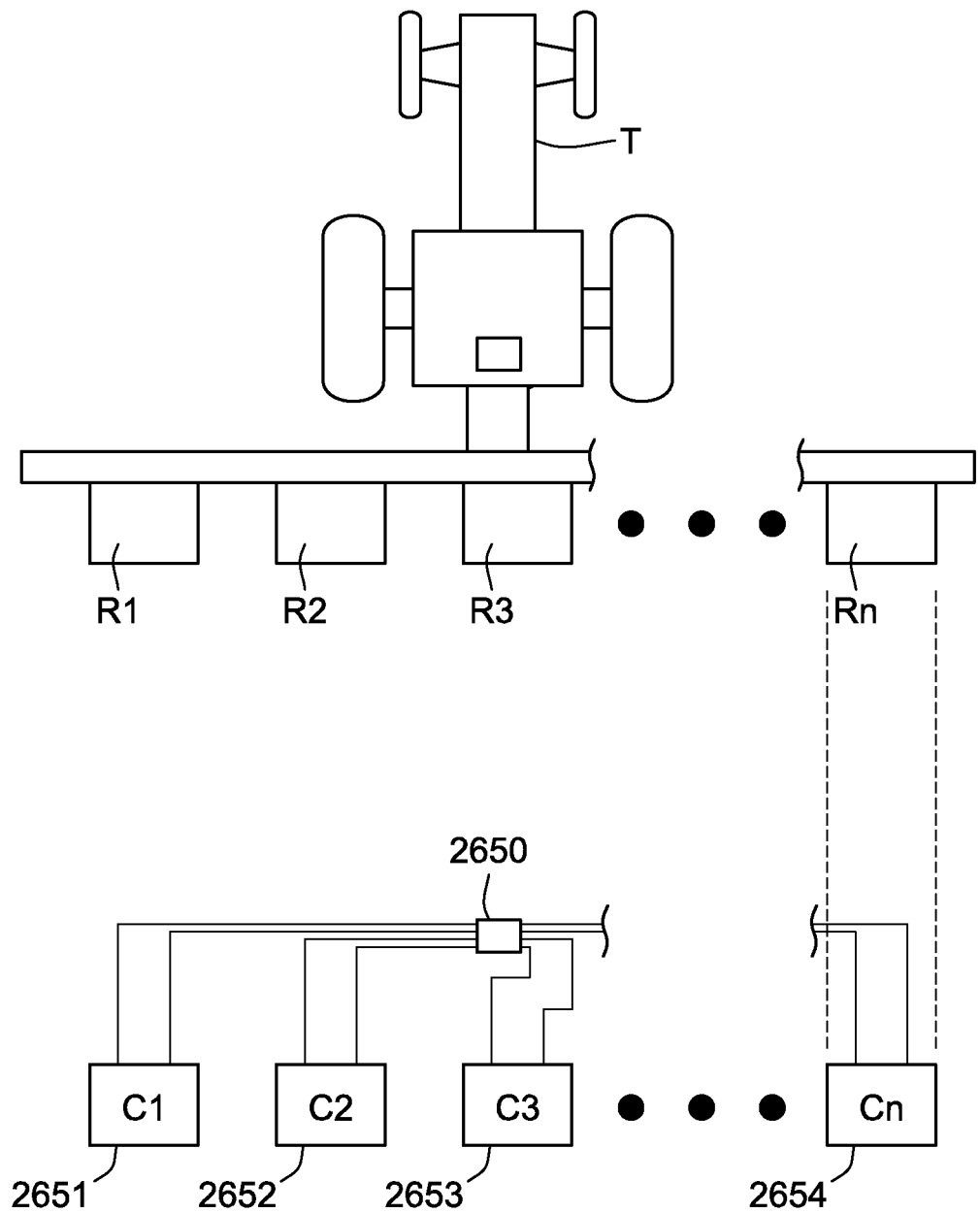
FIG. 46C is a diagrammatic illustration of an electrical control system for use with the hydraulic control systems of FIGS. 45 and 46A.

FIG. 46C illustrates an electrical control system that has a separate electrical controller 2651, 2652, 2653 . . . 2654 on each of multiple row units R1, R2, R3 . . . Rn drawn by a single tractor T. Thus, the hydraulic actuators on each row unit can be controlled independently of the actuators on the other row units. All the row unit controllers 2651-2654 are controlled by a master controller 2650, which may be located on the tractor or the draw bar, or even on one of the row units. The master controller 2650 sends electrical signals to, and receives electrical signals from, each individual row unit in parallel, which provides significant advantages, especially when combined with the use of intermittent control signals such as the PWM signals discussed above. For example, the master controller can coordinate changes in pressure in the multiple row units sequentially, so that only a single row unit draws power from the source at any given time. In another example, each row unit can signal the master controller when power is needed by that row unit, and then the master controller can control the supplying of power to only those row units requiring adjustment, and during the time interval when each row unit requires power for making adjustment. This reduces the time required to cycle through the row units to which power is sequentially supplied. In yet another example, the individual row units can send the master controller signals indicating the magnitude of adjustment required, and the master controller can assign higher priorities to those row units requiring the largest adjustments, so that those row units receive power for making adjustments more quickly than row units assigned lower priorities. Or the higher priority row units can be provided with power during more cycles than row units having lower priorities.

Figure 47:
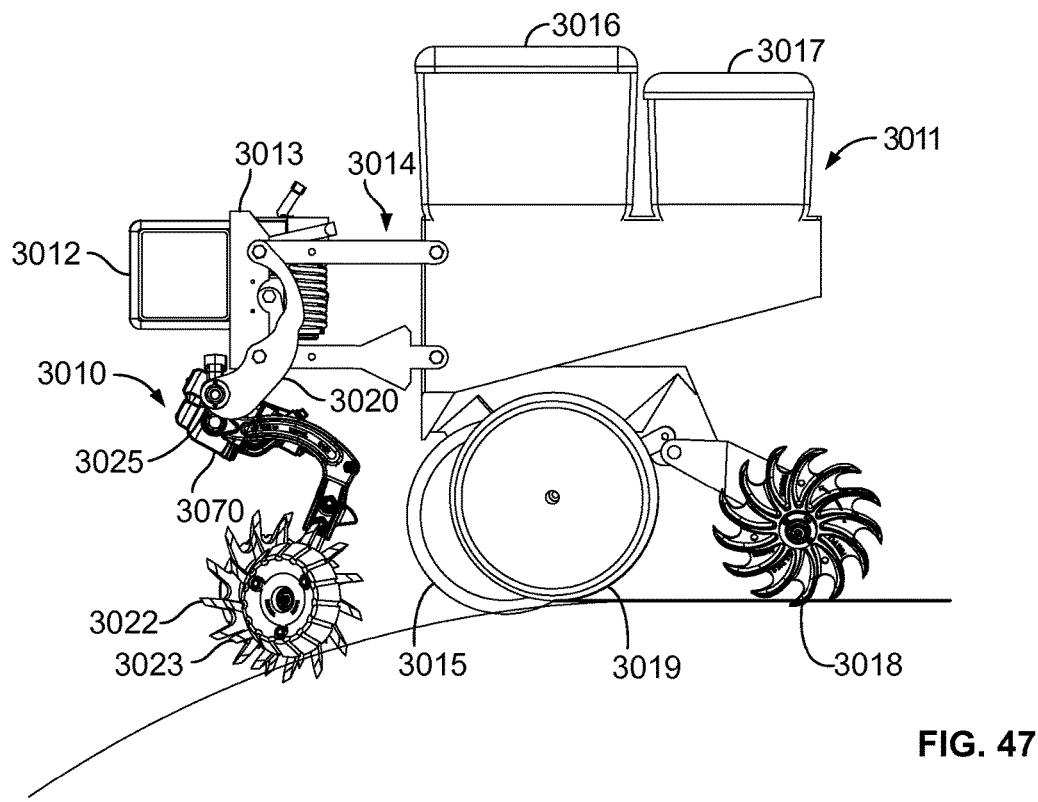
FIG. 47 is a side elevation of a planting row unit and a row-clearing unit, both attached to a towing frame, with the row-clearing unit in a lowered position.

Turning now to FIG. 47, a row-clearing unit 3010 is mounted in front of a planting row unit 3011. A common elongated hollow towing frame 3012 (typically hitched to a tractor by a draw bar) is rigidly attached to the front frame 3013 of a four-bar linkage assembly 3014 that is part of the row unit 3011.

As the planting row unit 3011 is advanced by the tractor, a coulter wheel 3015 works the soil and then other portions of the row unit part the cleared soil to form a seed slot, deposit seed in the seed slot and fertilizer adjacent to the seed slot, and close the seed slot by distributing loosened soil into the seed slot with a closing wheel 3018. A gauge wheel 3019 determines the planting depth for the seed and the height of introduction of fertilizer, etc. Bins 3016 and 3017 on the row unit carry the chemicals and seed which are directed into the soil. The planting row unit 3011 is urged downwardly against the soil by its own weight. If it is desired to have the ability to increase this downward force, or to be able to adjust the force, a hydraulic or pneumatic cylinder and/or one or more springs may be added between the front frame 3013 and the linkage 3014 to urge the row unit downwardly with a controllable force. Such a hydraulic cylinder may also be used to lift the row unit off the ground for transport by a heavier, stronger, fixed-height frame that is also used to transport large quantities of fertilizer for application via multiple residue-clearing and tillage row units. This hydraulic or pneumatic cylinder may be controlled to adjust the downward force for different soil conditions such as is described in U.S. Pat. Nos. 5,709,271, 5,685,245 and 5,479,992.

The row-clearing unit 3010 includes an attachment frame that includes a pair of rigid arms 3020 and 3021 adapted to be rigidly connected to the towing frame 3012. In the illustrative embodiment, the arms 3020 and 3021 are bolted to opposite sides of the front frame 3013 of the row unit 3011, which in turn is rigidly attached to the towing frame 3012. An alternative is to attach the row-clearing unit 3010 directly to the towing frame 3012. At the bottom of the row-clearing unit 3010, a pair of cooperating toothed clearing wheels 3022 and 3023 are positioned upstream of the coulter wheel 3015 of the planting row unit 3011.

The clearing wheels 4022, 4023 are arranged for rotation about transverse axes and are driven by the underlying soil as the wheels are advanced over the soil. The illustrative wheels 4022, 4023 are a type currently sold by the assignee of the present invention under the trademark TRASH-WHEEL. The toothed wheels 4022, 4023 cooperate to produce a scissors action that breaks up compacted soil and simultaneously clears residue out of the path of planting.

The wheels 4021 and 4022 kick residue off to opposite sides, thus clearing a row for planting. To this end, the lower edges are tilted outwardly to assist in clearing the row to be planted. This arrangement is particularly well suited for strip tilling, where the strip cleared for planting is typically only about 4010 inches of the 4030-inch center-to-center spacing between planting rows.

Figure 48:
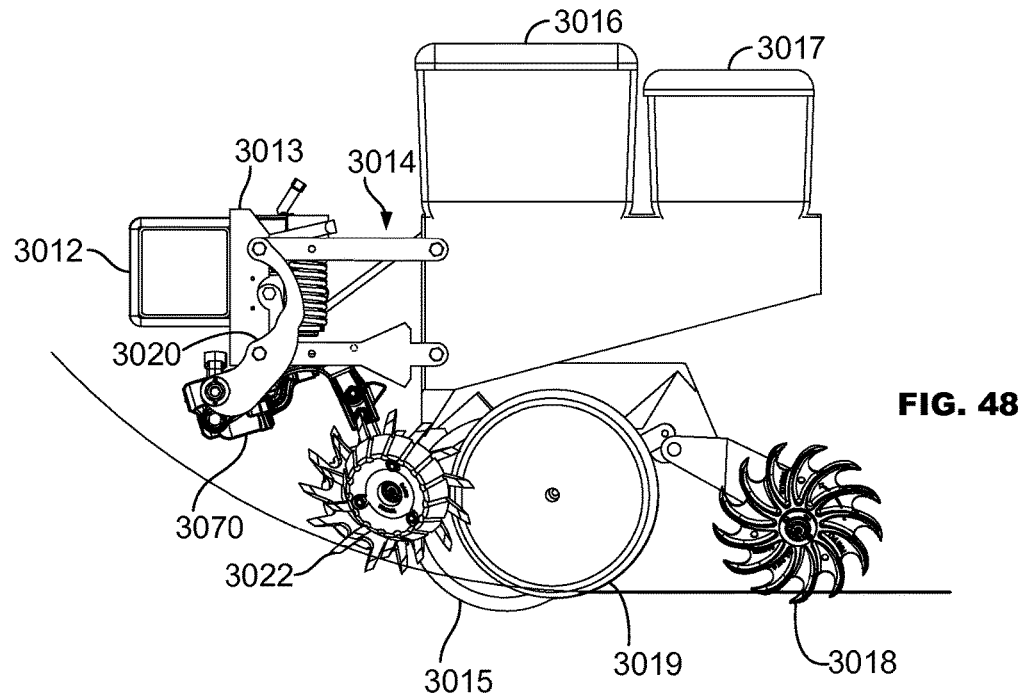
FIG. 48 is the same side elevation shown in FIG. 47 with the row-clearing unit in a raised position.
Figure 49:
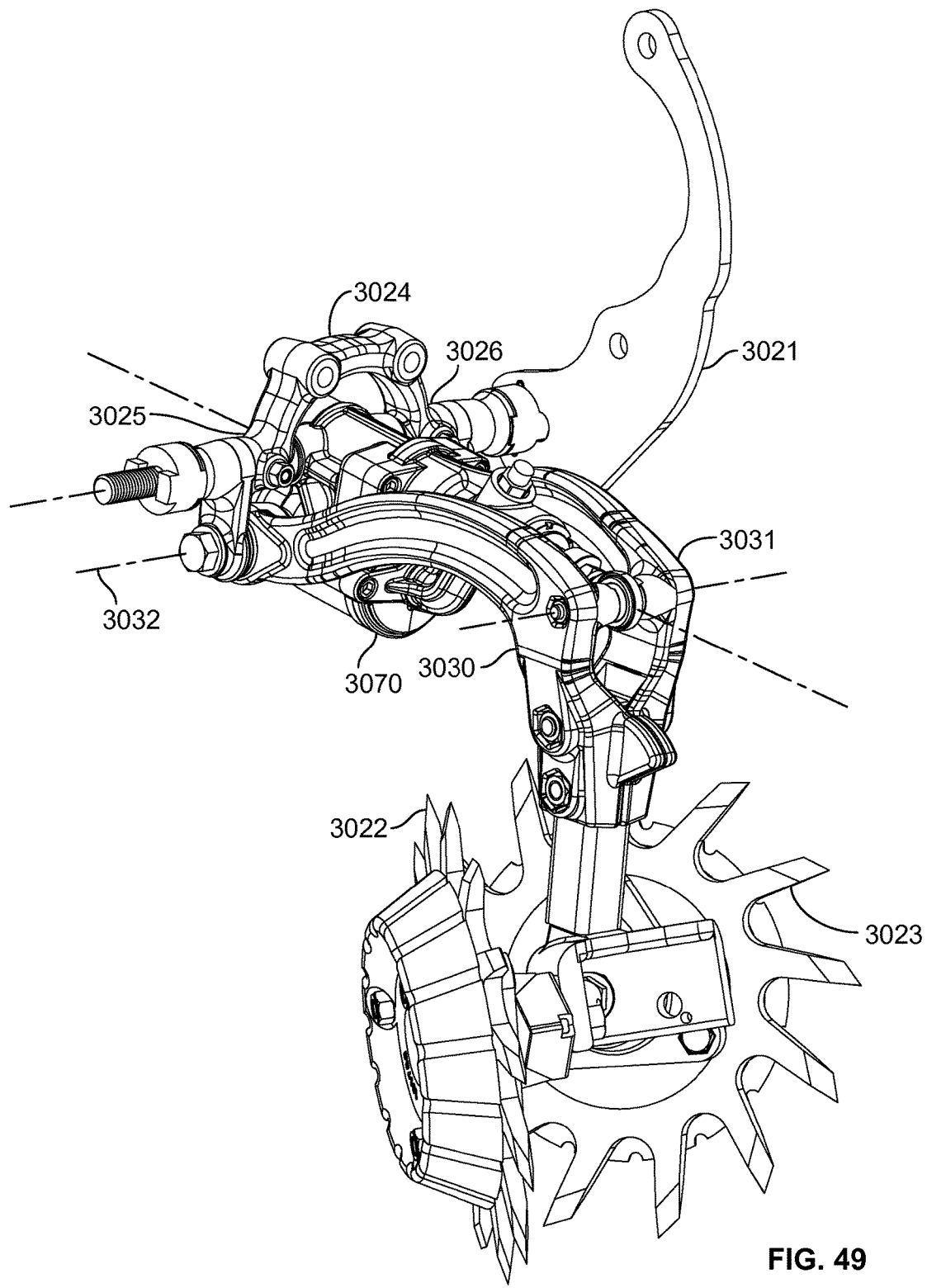
FIG. 49 is an enlarged perspective of the row-clearing unit shown in FIGS. 47 and 48.

In FIGS. 47 and 48, the clearing wheels 4022 and 4023 are shown in two different vertical positions. Specifically, the wheels 4022, 4023 are in a lower position in FIG. 1, where the elevation of the soil is decreasing, than in FIG. 48, where the soil elevation is increasing.

The row-clearing unit 10 is shown in more detail in FIGS. 49-55. The two frame arms 4020, 4021 are interconnected by an arched crossbar 4024 that includes a pair of journals 4025 and 4026 for receiving the leading ends of a pair of laterally spaced support arms 4030 and 4031. The support arms 4030, 4031 are thus pivotally suspended from the crossbar 4024 of the attachment frame, so that the trailing ends of the support arms 4030, 4031 can be pivoted in an arc around a horizontal axis 4032 extending through the two journals 4025, 4026.

The row-clearing wheels 4022 and 4023 are mounted on the trailing ends of the support arms 4030 and 4031, which are bolted or welded together. As can be seen in FIGS. 50-52, the wheels 4022, 4023 can be raised and lowered by pivoting the support arms 4030, 4031 around the horizontal axis 4032. The pivoting movement of the support arms 4030, 4031 is controlled by a hydraulic cylinder 4070 connected between the fixed crossbar 4024 and the trailing ends of the support arms 4030, 4031. FIGS. 50-52 show the support arms 4030, 4031, and thus the clearing wheels 4022, 4023, in progressively lower positions. The downward pressure applied to the support arms 4030, 4031 to urge the clearing wheels 4022, 4023 against the soil is also controlled by the hydraulic cylinder 4070.

Figure 53:
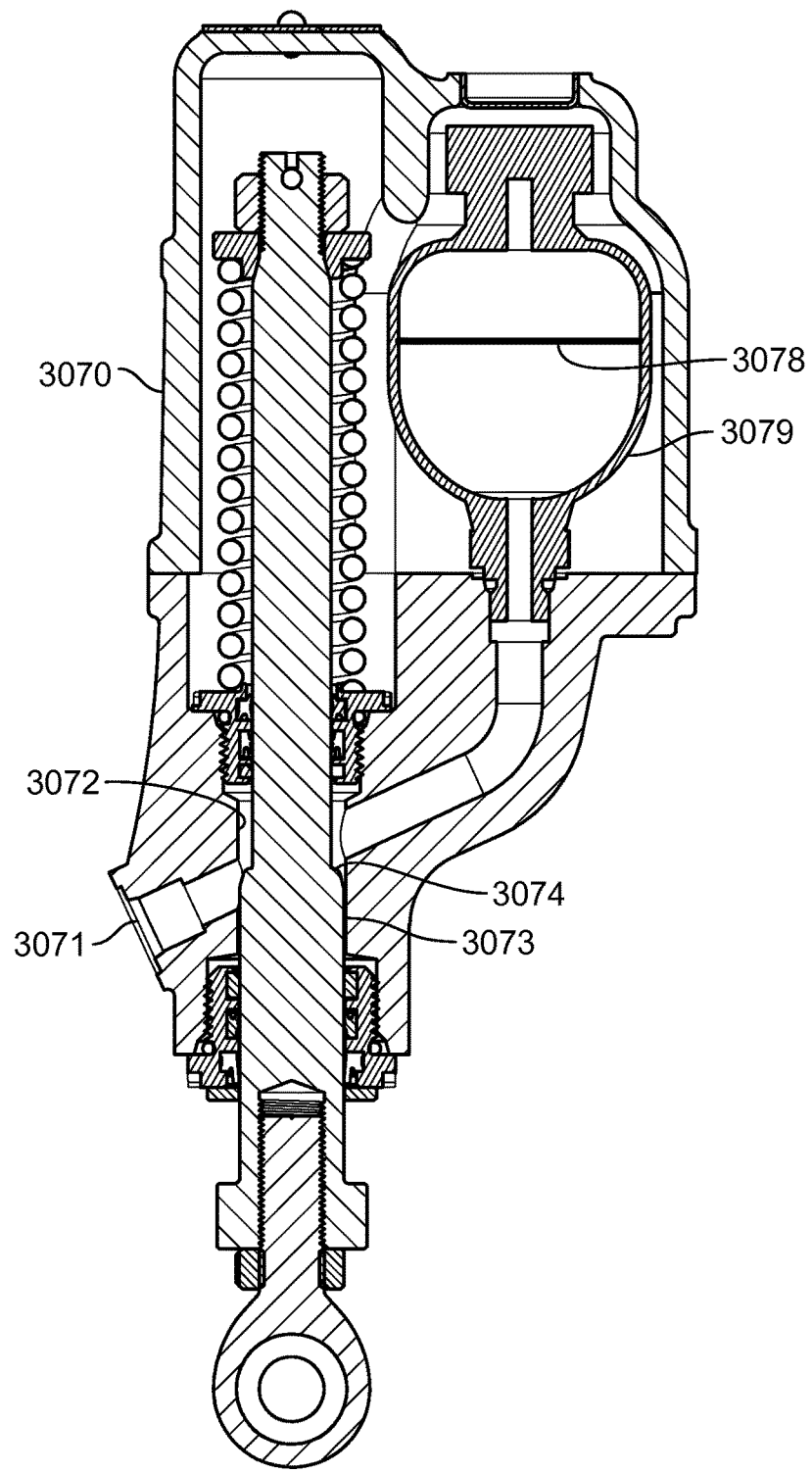
FIGS. 53, 54 and 55 are side elevations of the hydraulic cylinder of the row-clearing unit shown in FIGS. 47-52 with the cylinder rod in three different positions corresponding to the positions shown in FIGS. 51, 52 and 50, respectively.
Figure 54:
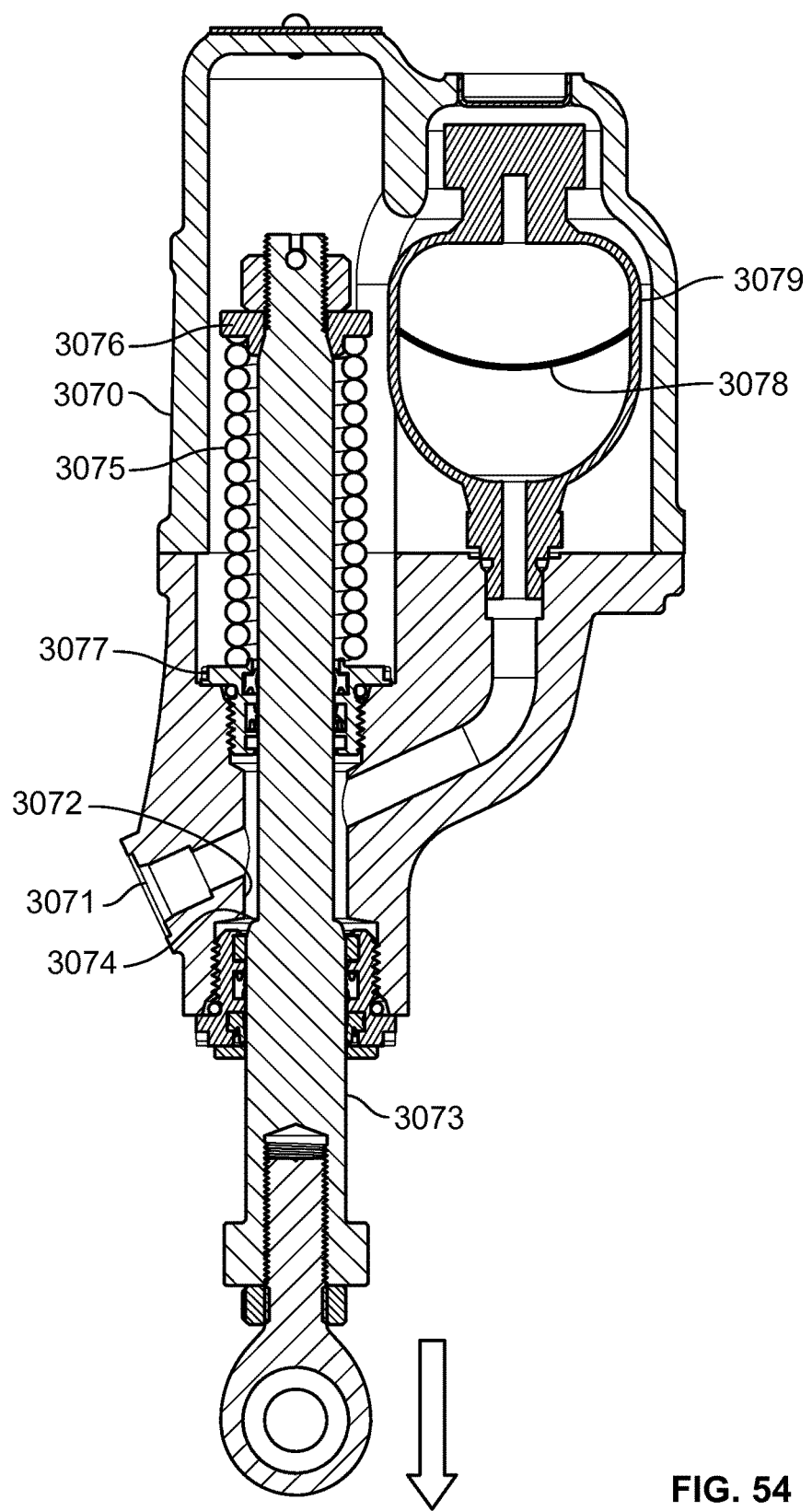
Figure 55:
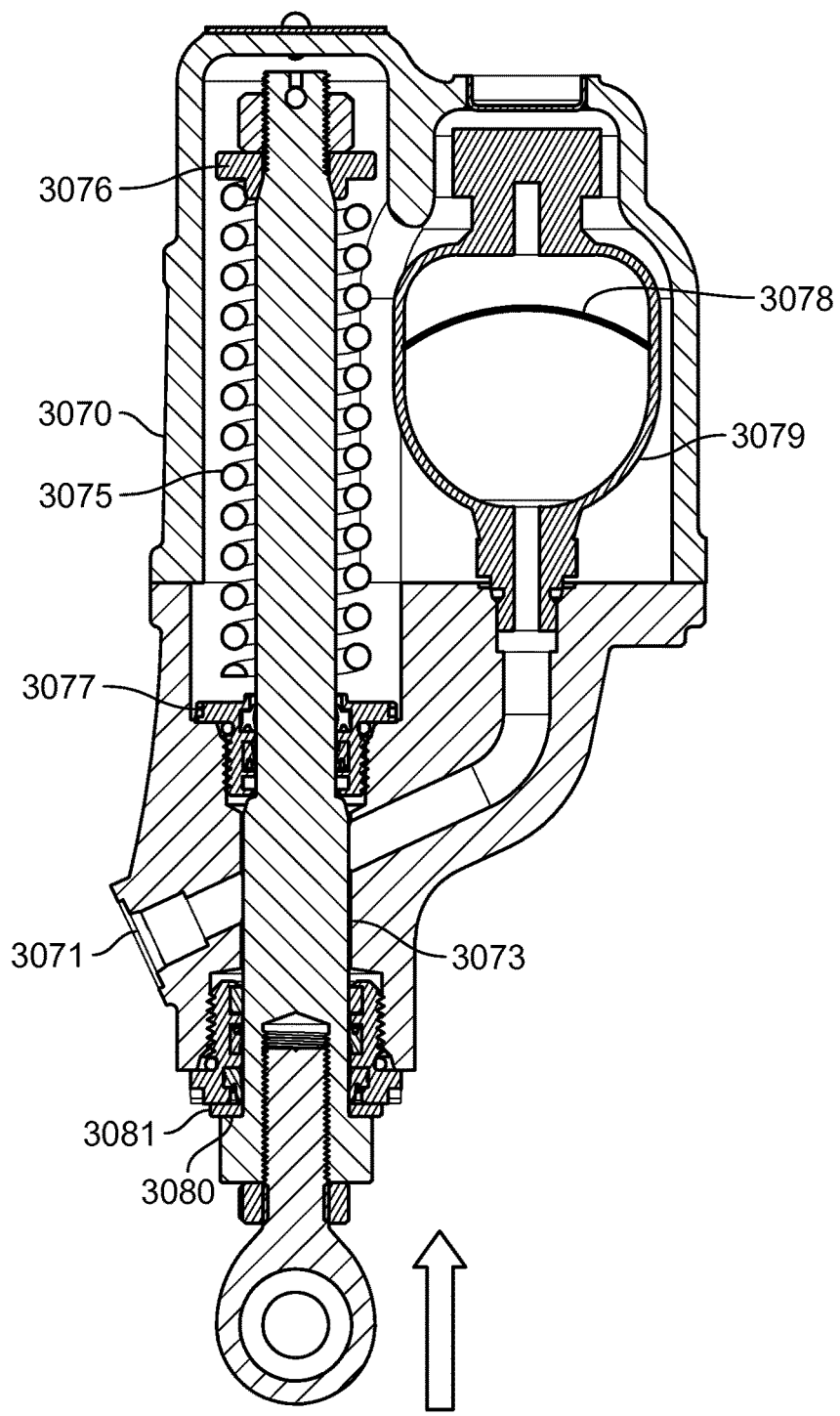

The hydraulic cylinder 4070 is shown in more detail in FIGS. 53-55. Pressurized hydraulic fluid from the tractor is supplied by a hose (not shown) to a port 4071 that leads into an annular cavity 4072 surrounding a rod 4073, and then on into an accumulator 4079. After the internal cavities connected to the port 4071 are filled with pressurized hydraulic fluid, the port is closed by a valve, as will be described in more detail below. The lower end of the annular cavity 4072 is formed by a shoulder 4074 on the rod 4073, so that the hydraulic pressure exerted by the hydraulic fluid on the surface of the shoulder 4074 urges the rod 4073 downwardly (as viewed in FIGS. 53-55), with a force determined by the pressure of the hydraulic fluid and the area of the exposed surface of the shoulder 4074. The hydraulic fluid thus urges the rod 4073 in an advancing direction (see FIG. 54).

When the rod 4073 is advanced outwardly from the cylinder 4070, the rod pivots the support arms 4030, 4031 downwardly, thereby lowering the clearing wheels 4022, 4023. Conversely, retracting movement of the rod 4073 pivots the support arms 4030, 4031 upwardly, thereby raising the clearing wheels 4022, 4023.

The accumulator 4079 includes a diaphragm that divides the interior of the accumulator into a hydraulic-fluid chamber 4079a and a gas-filled chamber 4079b, e.g., filled with pressurized nitrogen. FIG. 53 shows the rod 4073 in a position where the diaphragm is not deflected in either direction, indicating that the pressures exerted on opposite sides of the diaphragm are substantially equal. In FIG. 54, the hydraulic force has advanced the rod 4073 to its most advanced position, which occurs when the resistance offered by the soil to downward movement of the clearing wheels 4022, 4023 is reduced (e.g., by softer soil or a depression in the soil).

As can be seen in FIG. 54, advancing movement of the rod 4073 is limited by the "bottoming out" of a coil spring 4075 located between a flange 4076 attached to the inner end of the rod 4073 and a flange 4077 attached to the interior of the cylinder 4070. As the rod 4073 is advanced, the coil spring 4075 is progressively compressed until it reaches its fully compressed condition illustrated in FIG. 54, which prevents any further advancement of the rod 4073. Advancing movement of the rod 4073 also expands the size of the annular cavity 4072 (see FIG. 54), which causes the diaphragm 4078 in the accumulator 4079 to deflect to the position illustrated in FIG. 54 and reduce the amount of hydraulic fluid in the accumulator 4080. When the rod 4073 is in this advanced position, the support arms 4030, 4031 and the clearing wheels 4022, 4023 are pivoted to their lowermost positions relative to the row unit 4011.

In FIG. 55, the rod 4073 has been withdrawn to its most retracted position, which can occur when the clearing wheels 4022, 4023 encounter a rock or other obstruction, for example. When the rod 4073 is in this retracted position, the support arms 4030, 4031 and the clearing wheels 4022, 4023 are pivoted to their uppermost positions relative to the row unit. As can be seen in FIG. 55, retracting movement of the rod 4073 is limited by engagement of a shoulder 4080 on the rod 4073 with a ring 4081 on the trailing end of the cylinder 4070. As the rod 4073 is retracted by forces exerted on the clearing wheels 4022, 4023, the coil spring 4075 is progressively expanded, as illustrated in FIG. 55, but still applies a retracting bias to the rod 4073.

Retracting movement of the rod 4073 virtually eliminates the annular cavity 4072 (see FIG. 55), which causes a portion of the fixed volume of hydraulic fluid in the cylinder 4070 to flow into the chamber 4079a of the accumulator 4079, causing the diaphragm 4078 to deflect to the position illustrated in FIG. 55. This deflection of the diaphragm 4078 into the chamber 4079b compresses the gas in that chamber. To enter the chamber 4079a, the hydraulic fluid must flow through a restriction 4080, which limits the rate at which the hydraulic fluid flows into the accumulator. This controlled rate of flow of the hydraulic fluid has a damping effect on the rate at which the rod 4073 retracts or advances, thereby avoiding sudden large movements of the moving parts of the row-clearing unit.

When the external obstruction causing the row cleaners to rise is removed from the clearing wheels, the combined effects of the pressurized gas in the accumulator 4079 on the diaphragm 4078 and the pressure of the hydraulic fluid move the rod 4073 to a more advanced position. This downward force on the clearing wheels 4022, 4023 holds them against the soil and prevents uncontrolled bouncing of the wheels over irregular terrain, but is not so excessive as to leave a trench in the soil. The downward force applied to the clearing wheels 4022, 4023 can be adjusted by changing the pressure of the hydraulic fluid supplied to the cylinder 4070.

Figure 56:
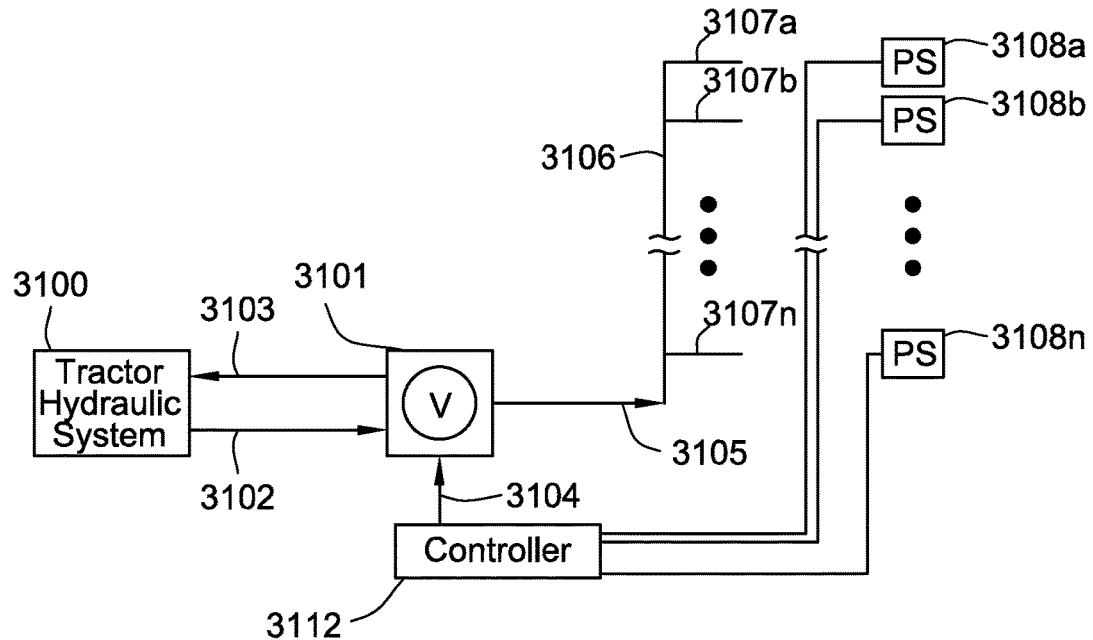
FIG. 56 is a schematic diagram of a first hydraulic control system for use in controlling the row-clearing unit shown in FIGS. 47-52.

FIG. 56 is a schematic of a hydraulic control system for supplying pressurized hydraulic fluid to the cylinders 4070 of multiple row units. A source 4100 of pressurized hydraulic fluid, typically located on a tractor, supplies hydraulic fluid under pressure to a pressure control valve 4101 via supply line 4102 and receives returned fluid through a return line 4103. The pressure control valve 101 can be set by an electrical control signal S1 on line 4104 from a controller 4112, to deliver hydraulic fluid to an output line 4105 at a desired pressure. The output line 4105 is connected to a manifold 106 that in turn delivers the pressurized hydraulic fluid to individual feed lines 4107a, 4107b . . . 4107n connected to the ports 4071 of the respective hydraulic cylinders 4070 of the individual row units. The row units include respective pressure sensors 4108a, 4108b . . . 4108n that monitor the forces on the tools to which the respective hydraulic cylinders are coupled, and the sensors produce electrical output signals that are fed back to the controller 4112 for use in determining a desired setting for the pressure control valve 4101.

Figure 57:
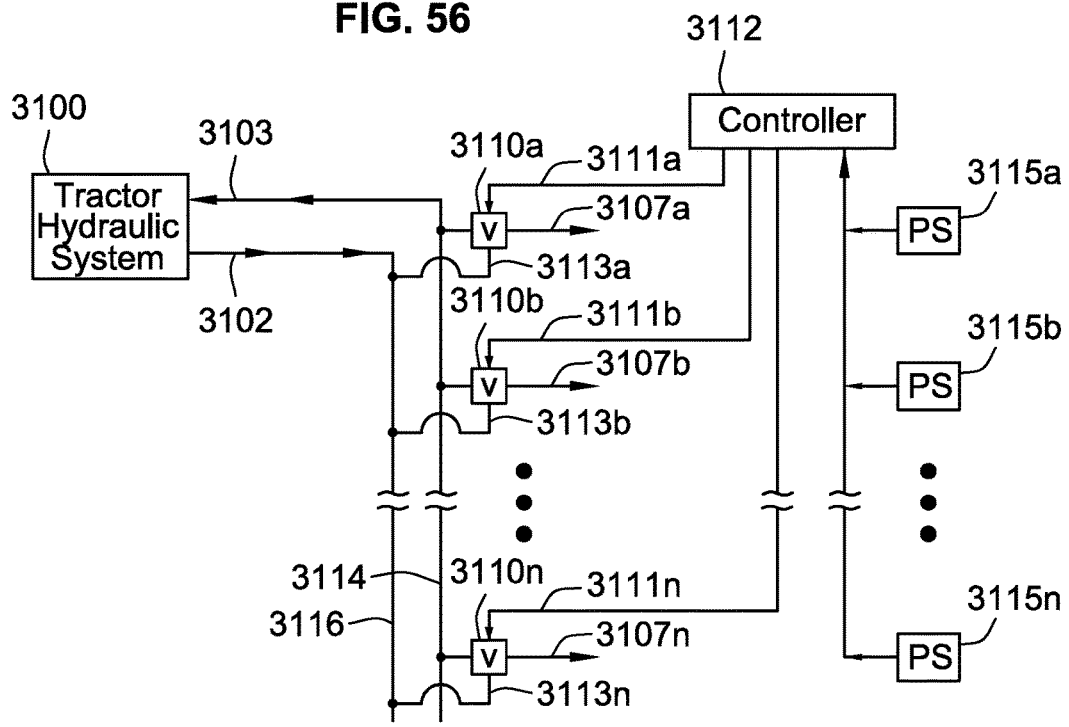
FIG. 57 is a schematic diagram of a second hydraulic control system for use in controlling the row-clearing unit shown in 47-52.

FIG. 57 is a schematic of a modified hydraulic control system that permits individual control of the supply of hydraulic fluid to the cylinder of each separate row unit. Portions of this system that are common to those of the system of FIG. 56 are identified by the same reference numbers. The difference in this system is that each of the individual feed lines 4107a, 4107b . . . 4107n leading to the row units is provided with a separate pressure control valve 4110a, 4110b . . . 4110n, respectively, that receives its own separate electrical control signal on one of a plurality of output lines 4011a, 4011b . . . 4111c from an electrical controller 4112. This arrangement permits the supply of pressurized hydraulic fluid to each row unit to be controlled by the pressure control valve 110 for that row unit. The individual valves 4110a, 4110b . . . 4110n receive pressurized hydraulic fluid via the manifold 4116 and separate supply lines 4113a, 4113b . . . 4113n, and return hydraulic fluid to a sump on the tractor via a return manifold 4114 connected back to the return line 4103 of the hydraulic system 4100 of the tractor.

One benefit of the control systems of FIGS. 56 and 57 is that as agricultural planters, seeders, fertilizer applicators, tillage equipment and the like become wider with more row units on each frame, often 36 30-inch rows or 54 20-inch rows on a single 90-foot wide toolbar, each row-clearing unit can be controlled independently of every other row-clearing unit. Thus, the down pressure for each row unit can be remotely adjustable from the cab of the tractor or other selected location. This permits very efficient operation of a wide planter or other agricultural machine in varying terrain without having to stop to make manual adjustment to a large number of row units, resulting in a reduction in the number of acres planted in a given time period. One of the most important factors in obtaining a maximum crop yield is timely planting. By permitting remote down force adjustment of each row-clearing unit (or group of units), including the ability to quickly release all down force and let the row cleaner quickly rise, e.g., when approaching a wet spot in the field, one can significantly increase the planter productivity or acres planted per day, thereby improving yields and reducing costs of production.

On wide planters or other equipment, at times 90 feet wide or more and planting at 6 mph or more forward speed, one row-clearing unit must often rise or fall quickly to clear a rock or plant into an abrupt soil depression. Any resistance to quick movement results in either gouging of the soil or an uncleared portion of the field and reduced yield. With each row unit having its own separate control, the clearing wheels and the rod of the hydraulic cylinder can move quickly and with a nearly constant down force.

Although the illustrative embodiments described above utilize clearing wheels as the agricultural tools, it should be understood that the invention is also applicable to row units that utilize other agricultural tools, such as fertilizer openers or rollers for firming loose soil.

Figure 58:
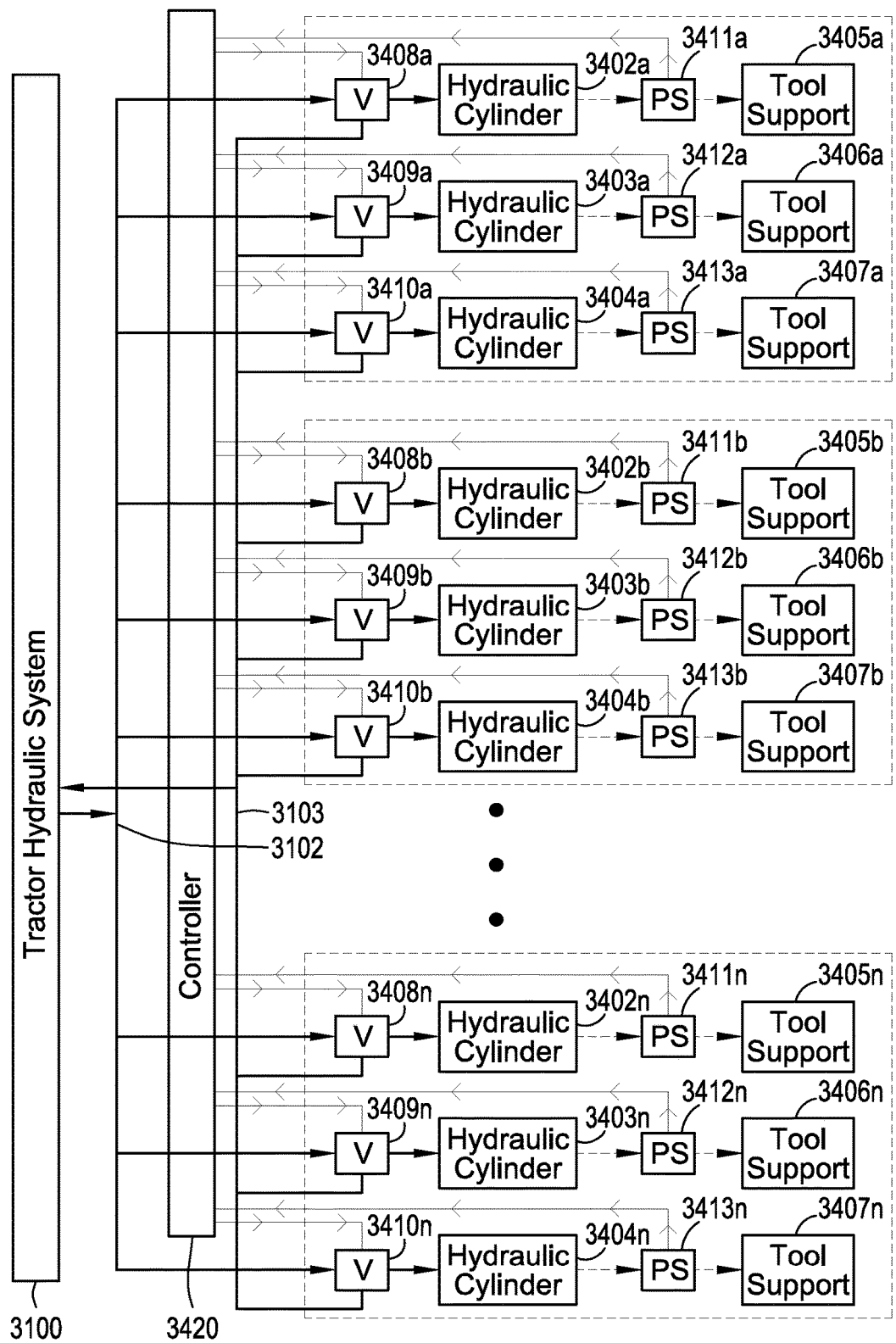
FIG. 58 is a functional block diagram of a hydraulic control system for use with multiple row units.

In order to dynamically control the hydraulic pressure applied to the soil-engaging tools in response to varying soil conditions, each pressure sensor is preferably connected between the ram of each hydraulic actuator 4019 and the support member for the tool controlled by that ram. One such system is illustrated in FIG. 58, in which a tractor hydraulic system 4100 supplies pressurized hydraulic fluid to multiple row units 4401a, 4401b . . . 4401n. In the illustrative system, each row unit includes three hydraulic cylinders 4402, 4403 and 4404, one for each of three tool support members 4405, 4406 and 4407, and the hydraulic fluid is supplied to each hydraulic cylinder through a separate pressure control valve 4408, 4409 or 4410 via a supply manifold 4102 and a return manifold 4103. A separate pressure sensor 4411, 4412 or 4413 (e.g., a load cell or strain gauge) is connected between the ram of each of the cylinders 4402, 4403 and 4404 and its associated tool support member 4405, 4406 or 4407, respectively. The electrical output signals from all the pressure sensors 4411-4413 are sent to a controller 4420, which generates a separate control signal for each of the pressure control valves 4408, 4409 and 4410.

In FIG. 58, the components of each row unit have been identified by the same reference numerals used for those same components in the other row units, with the addition of the same distinguishing suffixes used for the row units. For example, in row unit 4401a, the three hydraulic cylinders have been designated 4402a, 4403a and 4404a. Only three row units 4401a, 401b . . . 401n are shown in FIG. 58, but it will be understood that any number of row units may be used, and it is common practice to have a tractor pull many more than three row units, all of which are coupled to the hydraulic system of the single tractor.

The controller 4420 continuously monitors the electrical output signals from the pressure sensors 4411-4413 and uses those signals to produce a separate control signal for each of the valves 4408-4410. These signals control the pressure control valves 4408-4410 to maintain desired hydraulic pressures in the respective hydraulic cylinders 4402-4404 of all the row units. Consequently, if different row units encounter different soil conditions, those conditions are sensed by the respective pressure sensors 4115 and the output signals produced by those sensors cause different hydraulic pressures to be supplied to the different row units, thereby compensating for the particular soil conditions encountered by the different row units. For example, if some or all of the row units 4401 move from a region of relatively soft soil into a region of relatively hard soil, the output signals from the pressure sensors 4411-4413 on those row units will increase. These increases are detected by the controller 4420, which then automatically adjusts the control signals supplied to the corresponding valves to increase the hydraulic pressure supplied to the hydraulic cylinders associated with those valves.

The system of FIG. 58 is capable of providing independent control of the down pressure on different tools, such as the clearing wheels and the closing wheels, on the same row unit. The controller 4420 receives a separate input signal from the pressure sensor associated with each separate cylinder, and produces a separate control signal for each separate pressure control valve. Thus, the hydraulic pressure supplied to each separate hydraulic cylinder may be separately controlled, independently of all the other cylinders, whether on the same row unit or different row units.

The controller 4420 may be programmed to use different algorithms to determine how the hydraulic pressure supplied to any given cylinder is adjusted in response to changes in the signals from the pressure sensor for that cylinder. For example, the controller can simply convert the signal from a given pressure sensor into a proportional signal having a linear relationship with the sensor output signal, to produce a control signal that falls within a suitable range for controlling the corresponding pressure control valve (e.g., within a range of 0-10V). Alternatively, the conversion algorithm can apply a scaling factor or gain to the signal from the sensor as part of the conversion. Filters may also be employed in the conversion process, e.g., to ignore sensor signals above a first threshold value and/or below a second threshold value.

The sensor output signals may also be averaged over a prescribed time period. For example, the signal from each pressure sensor may be sampled at predetermined intervals and averaged over a prescribed time period, so that the control signal supplied to the pressure control valve associated with that sensor does not change abruptly in response to only a brief, temporary change in soil conditions. Certain parameters, such as scaling factors, can be made manually selectable to enable an operator selection to customize the behavior of one or more row units to suit personal preferences. Different "mappings" may also be provided to enable an operator to select predetermined sets of variables correlated to different conditions.

Figure 59:
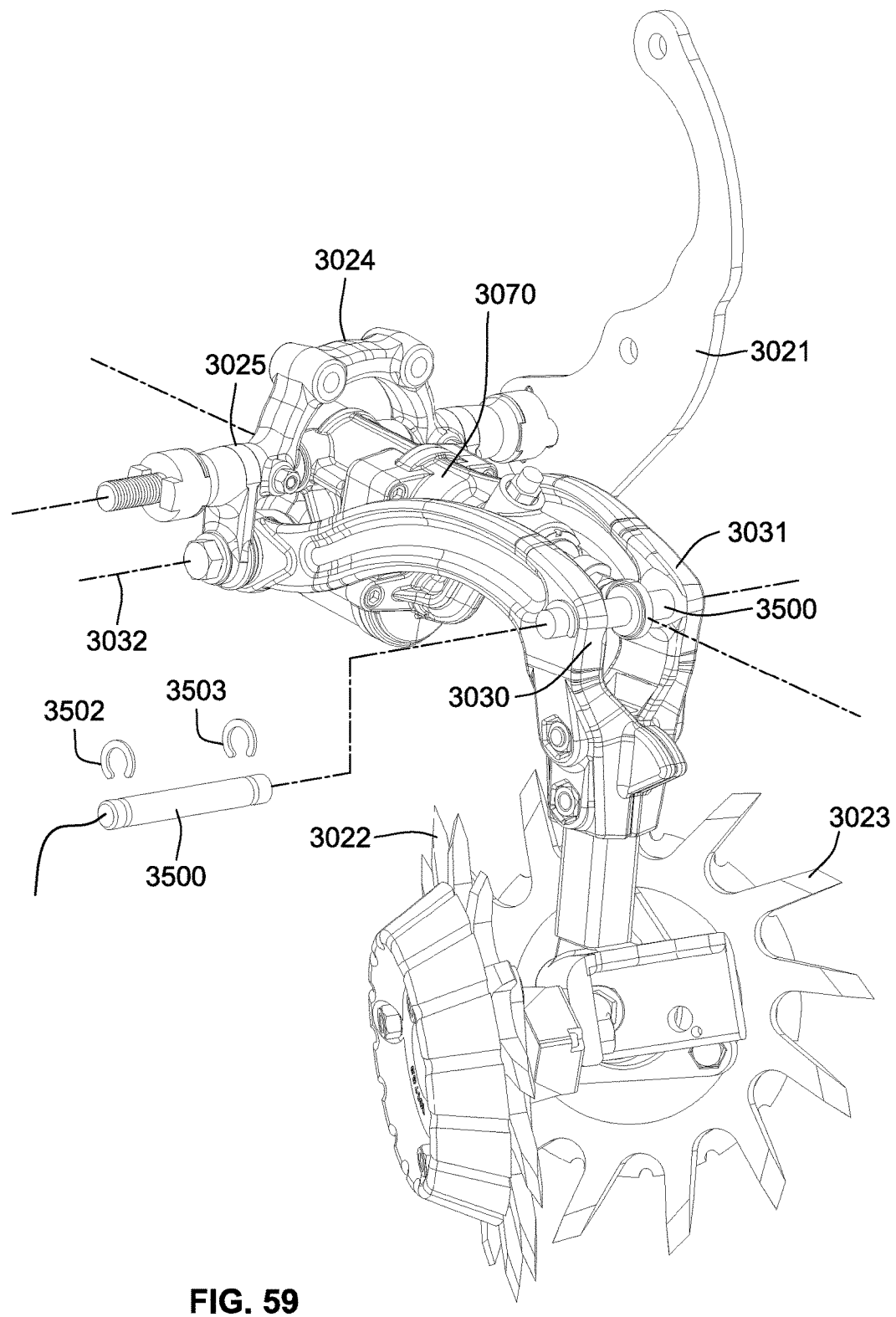
FIG. 59 is a perspective view similar to that of FIG. 49 but modified to include a pressure sensor, in the form of a load cell.
Figure 60:
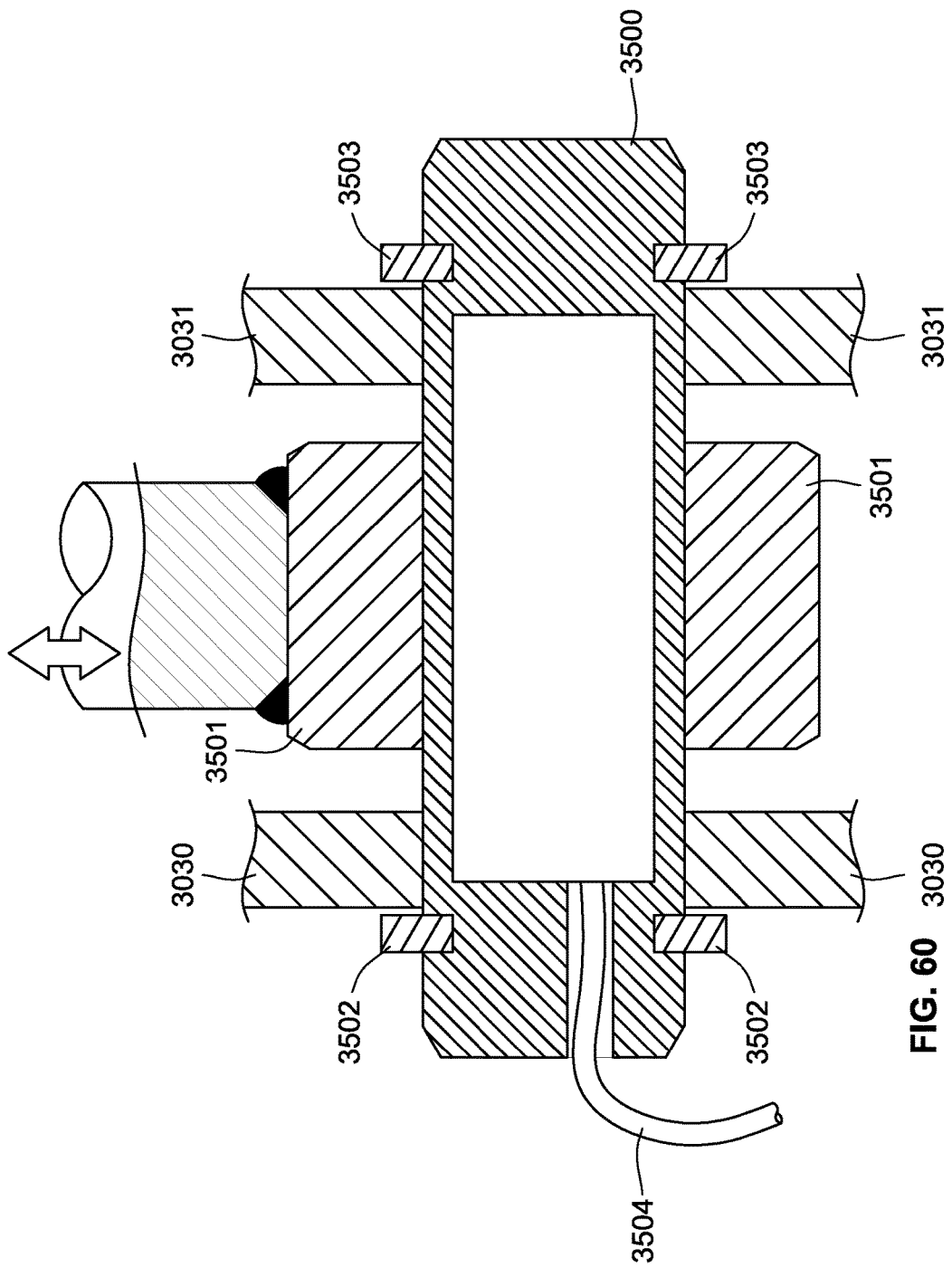
FIG. 60 is an enlarged section view taken longitudinally through the middle of the load cell shown in FIG. 59.

FIGS. 59 and 60 illustrate a load cell 4500 for sensing the pressure on a pair of clearing wheels 4022 and 4023. The load cell 4500 couples the rod of the hydraulic cylinder 4070 to the two arms 4030 and 4031 that carry the clearing wheels 4022 and 4023, so that the load cell is subjected to the same forces as the clearing wheels. Specifically, the load cell 4500 extends through an annulus 4501 attached to the end of the cylinder rod, and the opposite ends of the load cell extend through closely fitting apertures in the arms 4030 and 4031 and are secured thereto by a pair of C clips 4502 and 4503. As the forces exerted on the load cell change, the electrical output signal produced by the load cell on its output line 4504 changes in proportion to changes in the exerted forces.

The control system described above may utilize position sensors, pressure transducers, load sensors, biased mechanical switches, etc. to detect varying field conditions, and sends signals to a programmable logic controller. The controller in turn analyzes and processes those signals into a corrected usable signal, to be output to a number of integral hydraulic, pneumatic, or electric actuators that control parameters such as the down force on different parts of each row unit. The information collected in the process is preferably also used for a remote interactive display and controller, or for the development of soil condition maps, for use in future field planning, and maintenance.

As the science of agronomy expands, several factors that boost the yield potential of various row crops have been identified. Many of these factors can be controlled and physically manipulated by means of mechanical operations on soil and its accompanying residue and/or additional in-field obstacles such as rocks, waterways, etc. The need to have real-time control over all implement systems is of critical importance as row crop operations move to large platform tools, with single operators.

Additionally, the mapping of in-field obstacles has strong potential to supplement planning for field development and maintenance, such as the removal of obstacles in the field (e.g., rocks, fence posts, etc.), determining appropriate crop rotation, identifying trouble spots for soil erosion, identifying areas that may benefit from tiling, determining appropriate tillage practices, and determining application rates for fertilizers and pesticides.

Row unit down force can be used to control both the depth of a seeding unit or other agricultural implement, and the compaction of soil from a depth-gauging member such as the gauge wheels on a row crop planter. Two important elements of this process are the ability to ensure that the ground-engaging element (e.g., the vee opener blade on a planter row unit) consistently runs at a uniform depth, and that in the process of achieving depth, the gauging element(s) does not excessively compact the ground. Compacted ground is known to inhibit the germination and emergence of row crop seeds, as well as the lateral root growth of a row crop seedling.

Row cleaner down force can be used to control the height and load of a floating row cleaners, which are devices that stretch and deliver row crop residue around the path of a seeding implement, or other depth gauging member to ensure that the depth gauging member runs upon a consistent surface. Running on a consistent surface allows for more uniform depth of the ground-engaging member. In the case of a seeding machine, this promotes consistent depth of seed, which is known to boost yield potential.

A controllable down force can be used to regulate both the depth of a ground-engaging element of a cutting disc, and compaction caused by an adjacent gauge wheel. As an example, consistent depth of fertilizer is known to those skilled in the art to promote ideal nutrient uptake in a row crop plant. Consistent depth can also allow for uniform soil coverage of fertilizer by a furrow-closing device. Uniform coverage can reduce fertilizer loss from surface runoff, and/or loss due to volatilization of nitrogen, and off gassing.

Closing wheel down force can be used to regulate the depth on a furrow-closing device. Consistent, properly calibrated down pressure and depth on a furrow closing device on a seeding unit, or other ground engaging tool, can ensure soil coverage over the furrow without causing excess compaction, or blow-out. This is of particular importance in the placement of row crop seeds. The seed ideally requires the furrow closer to press soil tight to the seed to promote germination, while allowing the surface to remain loose, so that the seedling can emerge with little resistance due to compaction, or crusting.

A depth gauging element actuator is any device that allows for remote adjustment of the depth-gauging element of a row crop tool. Gauging depth is a critical element of almost all row crop tools (seeding units, tillage tools, fertilizer coulters, etc.) In the case of a seeding unit, gauge wheel settings are of primary importance. Uniform depth of the seed is well known to significantly improve yield potential. A real world example: If the gauge wheels on a seeding unit build up with mud, it is important to adjust the stops on the gauge wheels to correct for the added increase in radius on the gauge wheels, and maintain vee-opener blade depth.

In one embodiment, a planting row unit is attachable to a towing frame for movement in a forward direction on a field having soil of varying hardness conditions. The planting row unit includes an opener device forward of the towing frame for preparing the soil for receiving at least one of the fertilizer and the seeds. The opener device includes a soil-hardness sensor for detecting changes in soil-hardness conditions and an opener blade for maintaining, in response to the changes, a substantially constant soil-penetration depth Z in the soil independent of the varying hardness conditions. A modular actuator is mounted to the opener device for applying pressure to the opener blade.

The nature of systems of large numbers of sensors and actuators on agricultural implements can be confusing and cumbersome if the performance of all individual units, and their auxiliary components, cannot be quickly reviewed, and subsequently adjusted in a timely manner. Row crop production is extremely time and soil-condition sensitive, and certain operations benefit tremendously from the easing of real-time operator input control, particularly in the case of systems installed on ultra-wide toolbars (over 60 ft.). In many of these systems, one operator must monitor and make adjustments to 50 or more units. Those units may have 4 or 5 auxiliary systems that also require monitoring and adjustment. The necessity to have a comprehensive high-speed controller and monitor to assist in regulating all actuator activity in a particular system is evident when a single operator must monitor and adjust hundreds of components in real-time. Smaller operators can also realize a significant advantage if methods are properly employed.

A system for integrated control over all onboard actuators on an agricultural implement is described here. Typical of a row crop tool are two primary elements, a ground-engaging component, and a depth-gauging component. There may be more than one ground-engaging component, or depth-gauging component, depending on the tool. The positions of the lowest elements of the individual components are necessarily unequal. The lowest element of the ground-engaging component/s is identified by the extent to which the engaged media (e.g., soil, crop residue) is being physically manipulated. The lowest element of the gauging component regulates the extent to which the ground-engaging components manipulate the engaged media. Regulating the depth on a ground-engaging component is of primary interest.

For measurement and regulation of depth, the chief sensing element of this system is a position sensor. This sensor may be linear or angular in nature and, depending on the method, may be either an absolute or a relative displacement sensor. This sensor may also be a laser rangefinder, or ultra-sonic in nature. This measurement is the primary input to an onboard programmable controller. The physical device generating this primary input may be used on an auxiliary or add-on component, such as a leading furrow opener having both a ground-engaging member and a depth-gauging member fitted with a position sensor situated to measure the relative distance between the ground-engaging member support, and the depth-gauging member support. The device may also be located on the ground-engaging member and depth-gauging member of the primary tool, such as the vee-opener blades on a seeding unit. Supplementary sensors may be installed both as primary sensing units, as well as performance correction devices, on the primary tool and on auxiliary tools. For example, on a seeding device, position sensors may be installed on a leading furrow opener, on a residue-managing device, on the seeding row unit, and on the furrow closer. In many cases, due to cost constraints, operators may choose only one or two position sensors as their primary signals, with the additional sensor(s) only positively contributing to error correction over the entire device. Ideally, all four inputs are utilized for analyzing a row unit, and auxiliary tool position, and outputting a signal to all actuators that re-position the tool, or auxiliary components, to allow for maximum performance from the tool and its auxiliary components.

For correction and determination of performance of row crop tool actuators, the chief sensing element is an integrated pressure transducer. Supplemental performance measurements may include load sensors (which are pre-installed on many ground-engaging tools) or biased proximity switches. These sensors may be used to correct errors that occur in the processing of the position sensor signal, and to verify that the actuators are performing properly. For example, many seeding units are equipped with "load pins" on the upper stops of the units' gauge wheels. Such load pins can generate signals that correlate directly to the signals generated by the position sensors.

Integration of mechanical and electrical devices is possible with outdoor-rated, compact programmable logic controllers. The multi-channel controller in this system receives the input signal of the position sensor of the primary ground-engaging tool, and any additional auxiliary signals, and then processes those signals to generate a base signal that is output to the actuators. This signal may be processed using a number of mathematical methods to output a signal best suited for proper response from a particular actuator. After the signal is processed, it is checked and corrected using the signals from pressure transducers, load sensors or biased proximity switches. For example, in a seeding unit that is equipped with an actuated furrow opener, an actuated residue manager, a row unit down force actuator, and an actuated closing wheel, the primary signal is received from the furrow-opener position sensor. This signal is supplied to a controller that averages or otherwise mathematically manipulates the signal to produce a clean, consistent signal to each component's actuator. This signal typically differs for each actuator, and different computations are typically required for each output signal.

Once the signals of all the sensors have been processed and corrected, and the actuators have been activated, it is preferred to be able to visually inspect the performance of each individual row unit and its auxiliary components. Also, due to the nature of agricultural field work, it is beneficial to be able to control all elements of the system from a remote location such as a tractor cab. To this end, the system may employ a vehicle bus to direct information to an in-cab monitor from the individual row controllers, where the information can be processed and viewed in a variety of different configurations. This information may also be delivered wirelessly to a remote location to alert an operator (e.g., via text messaging or e-mail) when errors occur with an actuator or any of its associated sensors. Some operators will choose to employ all available actuators and all available sensors on all rows, and will want to have direct control row-by-row, in sections, or across the entire toolbar, depending on the operation and the disposition of the operator.

The preferred user interface is an interactive in-cab display having several features that allow the operator to quickly review all systems and adjust the appropriate actuator(s) accordingly. The display may provide row-by-row viewing of the functionality of individual tools and auxiliary components, or the functionality may be viewed over integrated sections, or by averages of units over a particular section. The interface also alerts the operator when any of the various actuators and/or sensors are malfunctioning, and signals which rows or sections need to be checked for repair, or calibration.

There are a large number of mathematical methods by which individual controllers process and output signals. Due to the nature of the engaged media, the controller must sample the position of a particular tool, or component, and create a meaningful signal to be transmitted to the actuator. When in the field, row crop tools often encounter some relatively periodic oscillations due to ridges formed from a variety of pre-plant tools (tillage, fertilizer application, etc.). Additionally the position sensor will register large spikes as a result of encountering massive in-field obstacles (e.g., rocks, concrete, fence posts, etc.). Depending on location, the number of large spikes may be very frequent. The controllers must be able to register a wide variety of oscillations. In general, as ground hardness increases, the actuator must increase down force to push with more force against the hard ground. However, a massive, hard object like a rock requires a different approach. When encountering a massive object, increasing pressure on the actuators will greatly increase general wear on the row crop tool, potentially causing irreparable damage. Thus, when encountering massive objects, the controller preferably recognizes the immovable object and, whenever possible, reduces pressure on the row unit to avoid excessive wear on the tool.

The reading of the signals from the position sensors provides an additional side benefit. As the data stream feeds into the controller, a forward velocity signal and a GPS coordinate signal may simultaneously be gathered from the local CAN. This data collectively can form a soil condition map of the field, identifying large stones or other obstacles that the operator can later efficiently remove by referring to the map. Additionally, when planning for tillage in a particular field, the operator may use the soil condition map to help identify areas that require more or less tillage.

Rocks, clods, soil type, soil hardness, moisture level and other environmental factors can affect the aperiodic oscillations of any ground-engaging tool sensor signals. The system identifies oscillations unique to a particular condition, or obstacle, using wave pattern recognition software. This data stream is synchronized with the GPS signal, and is used to develop a graphical representation of the field, providing a interactive map with GPS coordinate locations of soil compaction, excessive moisture, in-field obstacles such as rocks, or fence posts that the user may want to remove, or identify other conditions that, if treated, may boost soil fertility.

This system may employ the input from any number of cameras, either section-by-section, or row-by-row. There are a variety of small, robust, weatherproof camera systems available on the market. The implementation of visual surveillance is for two primary purposes: visual verification of in-field obstacles for use with soil condition maps, and remote row unit inspection in the case of error signals. When reviewing soil condition maps generated by the system, it is helpful to visually inspect the obstacle, or other condition that is identified by the system. Upon encountering a unique signal of interest, the controller activates a camera remotely to snap a still shot of the obstacle or condition of interest, or if the camera is generating video content, that data stream is time-stamped to easily synchronize with the video. The user may then select an obstacle identified by the system as a signal of interest, and visually inspect the ground, to more easily determine if it is profitable to remove an obstacle or otherwise treat the soil.

As toolbars grow in size, the distance from the ground-engaging tool to the eyes of the operator may be too great for detailed inspection. Further, with the common use of multiple-hose routings for the delivery of products, and with the integration of high-capacity commodity tanks or hoppers into toolbars, it may be impossible for the operator to see some rows from the operator's vantage point. If a sensor in the system sends an error signal, the error may or may not be adversely affecting performance. The cost of stopping an ultra-wide planter, even for a few minutes, during the optimal planting window can be significant. If an implement is sending an error message, but upon visual inspection seems to be functioning adequately, it may prove to be more profitable to keep the implement moving. In some configurations, having the ability to visually inspect areas on an implement that has sensors detecting errors can allow the operator to determine if the problem is critical and needs to be addressed, or if it can wait until the implement consumables are depleted and is stopped for reloading, or is otherwise down for maintenance.

An additional function of the in-cab display is to assist in controlling the depth-gauging member of the row crop tool. The ability to remotely control depth may be of use to operators who are working in fields with widely varying conditions. The ability to slightly raise or lower the ground-engaging element of the tool can be critical in some applications. Additionally, in wet conditions mud build-up on a depth-gauging member may cause erratic and uneven placement of a particular commodity (e.g., seed, fertilizer), which adversely affects yield potential.

The system may include a photogate, sonogate, rangefinder or other sensor that directly determines the height of mud buildup on a gauge wheel. This may also be accomplished by using a sensor capable of determining the angular velocity of a wheel. As the radius on the wheel increases due to mud buildup, the angular velocity changes proportionally, and so may be used to adjust the depth setting to account for the additional radius of the gauge wheel. In either case, sensors determine the average displacement between the opener and the gauge wheel. If a change in relative displacement occurs, the system recognizes that change, and sends a signal to the gauge wheel actuator to make the appropriate adjustment, and maintain a set displacement.

Figure 61:
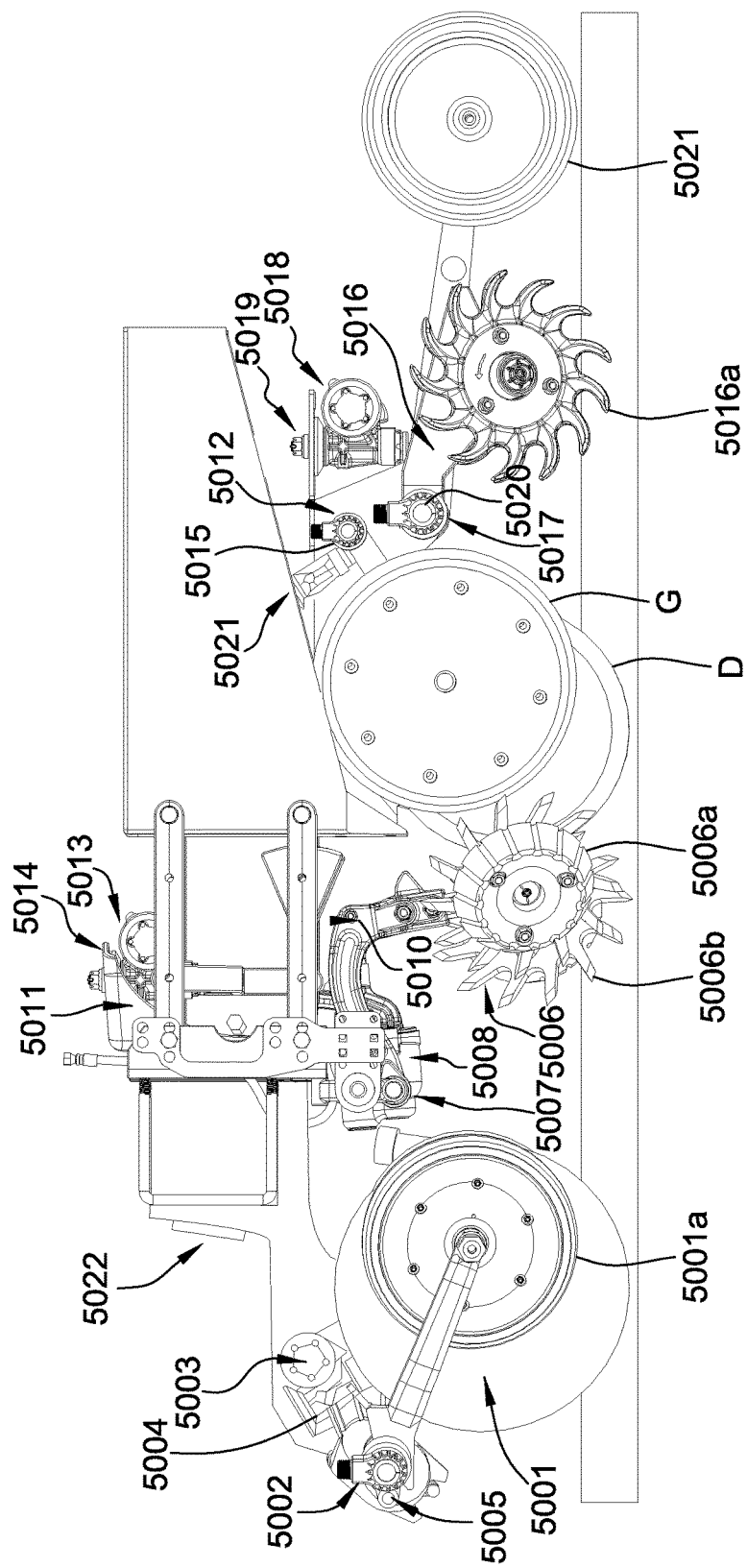
FIG. 61 is a side elevation of a modified embodiment having multiple control systems.

FIG. 61 illustrates a complete system of tools that includes (1) a soil-hardness-sensing unit that includes a cutting disc 5001, a gauge wheel 5001a, a cutting disc position sensor 5002, a cutting disc actuator 5003, a cutting disc pressure transducer 5004, a cutting disc load sensor/proximity switch 5005; (2) a controllably actuated row cleaner 5006 that includes a pair of cleaning wheels 5006a and 5006b, a row cleaner position sensor 5007, a row cleaner actuator 5008, a row cleaner pressure transducer 5009, a row cleaner load sensor/proximity switch 5010; (3) a remotely actuated row unit that includes an actuator cradle 5011, a row unit position sensor 5012, a row unit actuator 5013, a row unit pressure transducer 5014, a row unit load sensor/proximity switch 5015; (4) a furrow-opening disc D and an adjacent gauge wheel G; (5) a furrow closing unit 5016 that includes at least one closing wheel 5016a, a furrow closer position sensor 5017, a furrow closer actuator 5018, a furrow closer pressure transducer 5019, a furrow closer load sensor/proximity switch 5020 and a trailing gauge wheel 5021; and (6) a row unit programmable controller 5022.

In FIG. 61, the cutting disc actuator 5003 receives a signal from the position sensor 5002. This sensor's signal is the initial signal to be processed, corrected and then output to the various actuators 5003, 5008, 5013 and 5018. Depending on the needs of the operator, some tools may be added or removed, but all have the same general configuration: sense position, adjust actuator, and verify or correct signal with load sensor or proximity switch.

Figure 62:
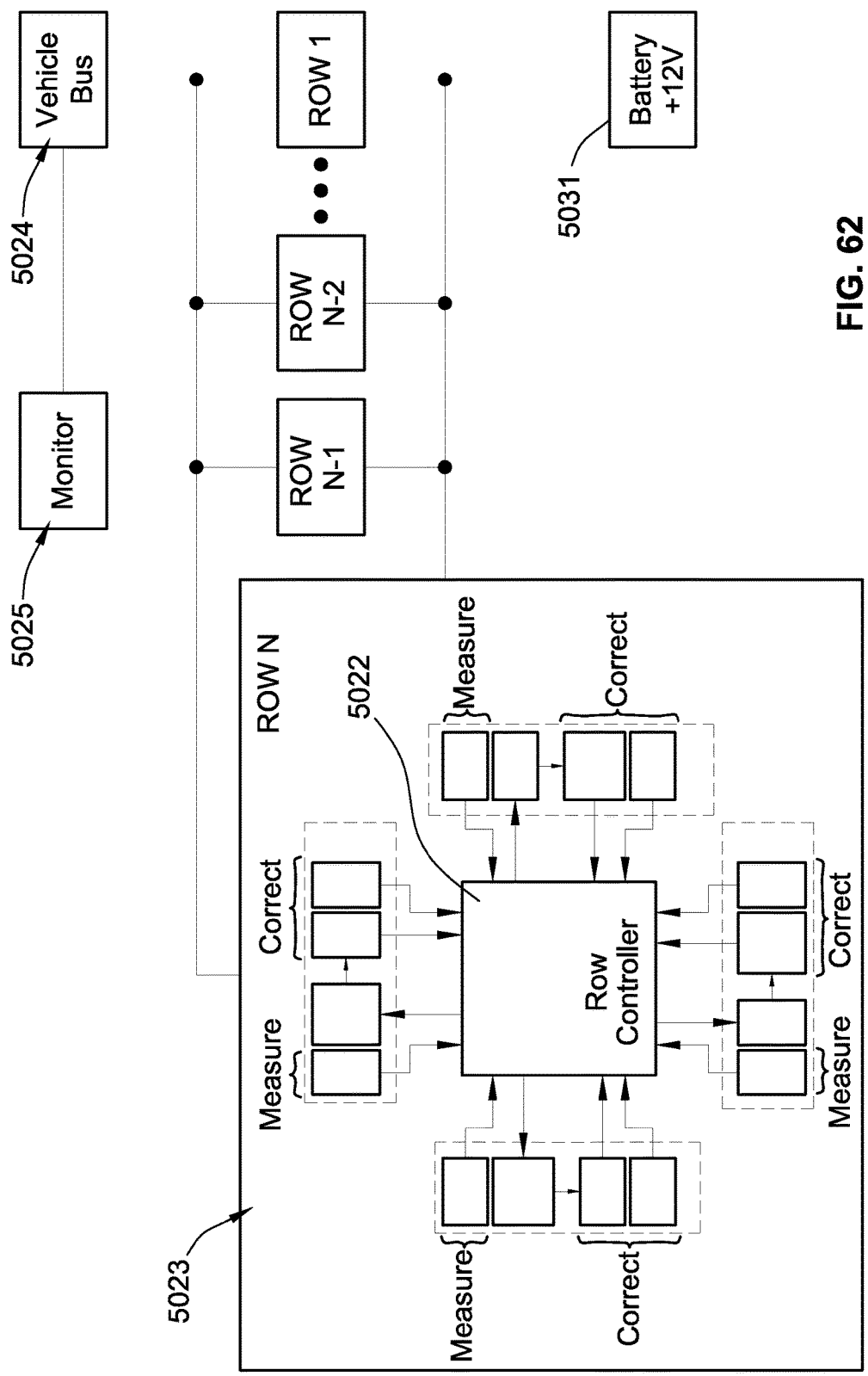
FIG. 62 is a block diagram of the multiple control systems for multiple row units of the type illustrated in FIG. 61, and a display coupled to the control systems in the multiple row units.

FIG. 62 illustrates an exemplary algorithm for use in the system of FIG. 61. In this diagram, the various sensor signals are supplied to and processed by the row controller 5022. The signals from the position sensors, the load sensors, and the pressure transducers of all the components are fed simultaneously into the row unit controller 5022. This may include all the signals from all available sensors, or may utilize a smaller number of inputs if the demands of the operation do not require more advanced control over a particular operation. After all sensor signals are received, the controller 5022 generates output signals that produce any desired changes in the position and/or pressure of all the system actuators. Additionally, if available, the signals from the position sensors may be adjusted by employing the inputs from the pressure transducers, or the load sensors associated with the actuators. In this example, every row is controlled individually by means of an output signal on a vehicle bus 5024 from the in-cab controller/monitor 5025. Here, "Row N" 5023 is the nth row of a large platform seeding machine. Each of the N row units has an onboard controller 5022 coupled to the vehicle bus 5024 and a battery 5031. All components may be monitored, and controlled from the in-cab interface.

Figure 63:
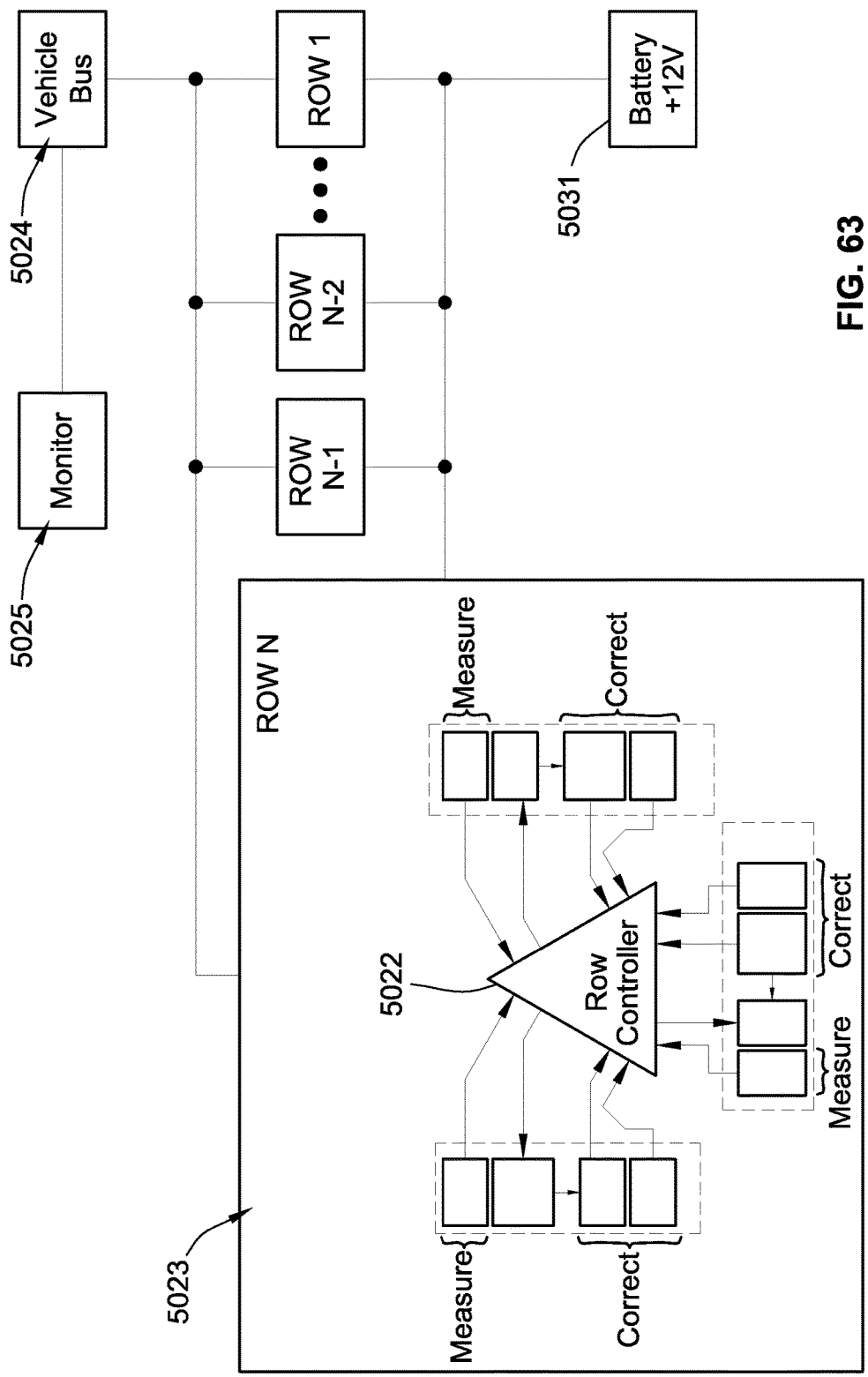
FIG. 63 is a block diagram of a slightly simplified version of the system illustrated in FIG. 62.

FIG. 63 is an example of an algorithm similar to the algorithm of FIG. 62, but in this case the row cleaner unit has been removed. Despite the lack of a row cleaner, a properly placed position sensor can still generate a usable signal. However, the more inputs, the more potential physical malfunctions may occur. In some instances, fewer inputs may lead to a slightly more trouble-free signal generation.

Figure 64:
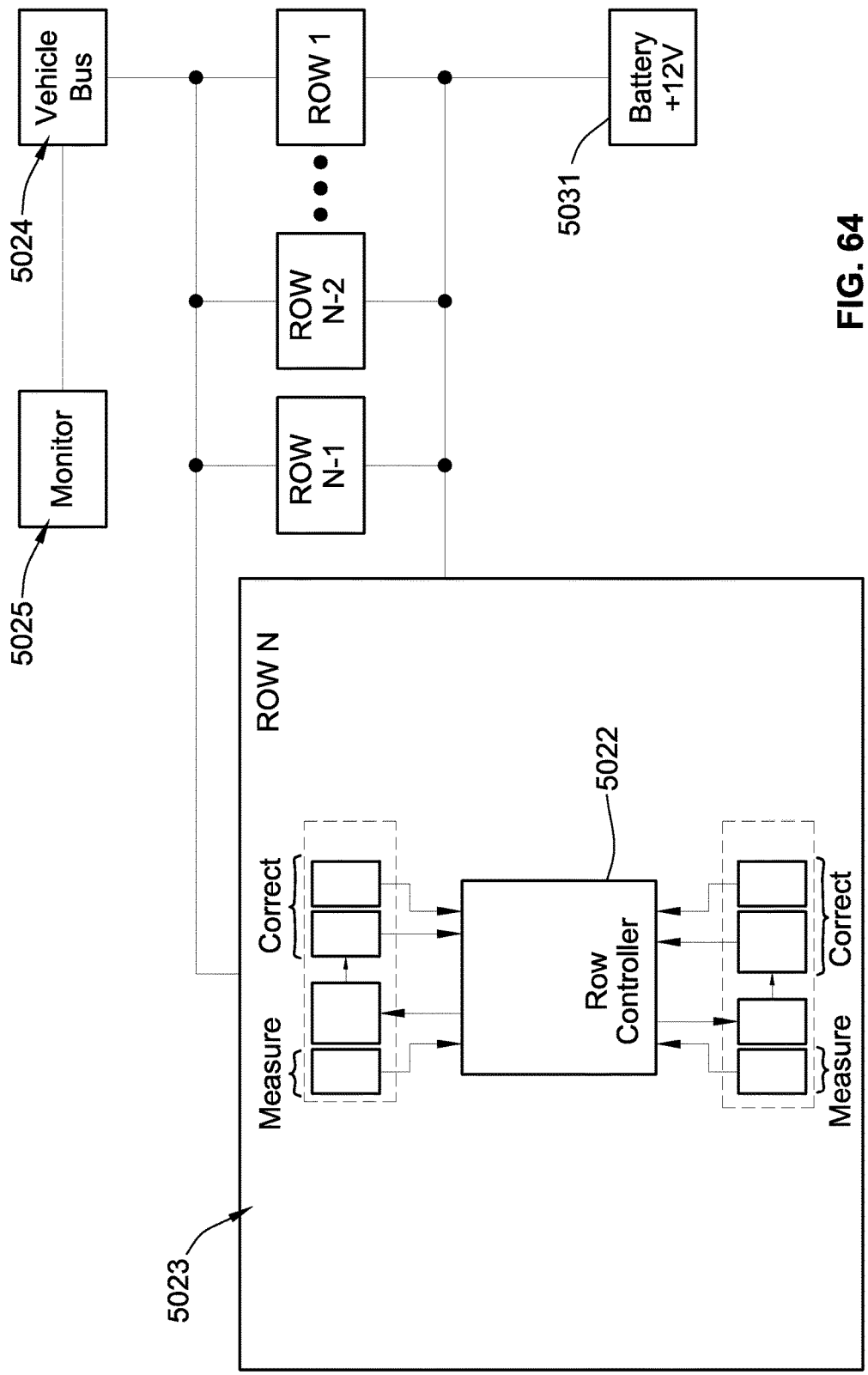
FIG. 64 is a a block diagram of a further simplified version of the system illustrated in FIG. 62.

FIG. 64 is another example of a simplified algorithm. In this example only the cutting disc, and the row unit are outfitted with sensors, and actuators. This system requires much less computational power, and once again reduces the chance of potential problems that may arise from large numbers of sensors in a single row unit.

Figure 65:
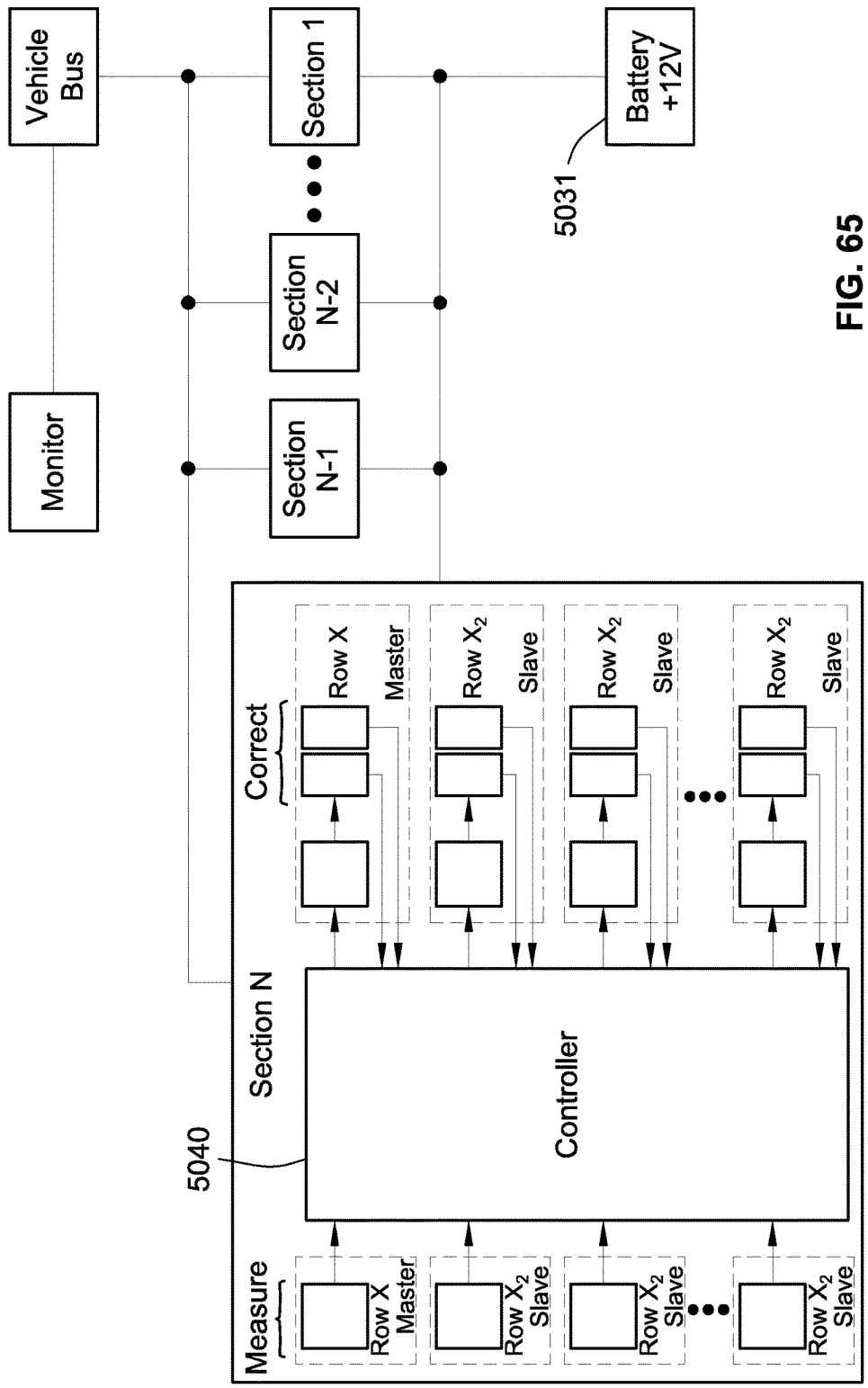
FIG. 65 is a block diagram of multiple control valves for multiple row units arranged in multiple groups or sections.

FIG. 65 illustrates a system that provides sectional control over row unit actuators. In this example, the signals of m row units in each of n sections are fed into a single controller on a master row unit X for that section. All the other row units in each section are slave units controlled by the controller 5040—in the master row unit. The signals received by the controller 5040 on a master unit are combined to generate a separate output signal for each of the slave units' actuators. Each section then has its own output that may be monitored and controlled from the in-cab interface. This sectional control is another technique to reduce the overall cost of such a system. In many instances, field conditions over the width of a small number of rows change very little. In this case, the operator can still realize significant advantages utilizing sectional control.

Figure 66A:
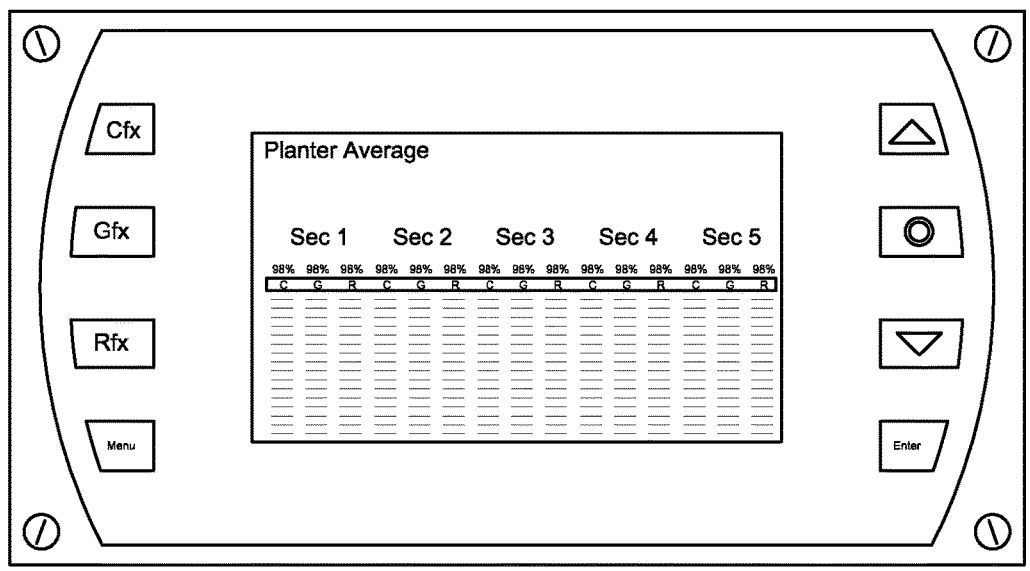
FIG. 66A is an exemplary display configured to depict real-time graphics when an implement is moving across a field.
Figure 66B:
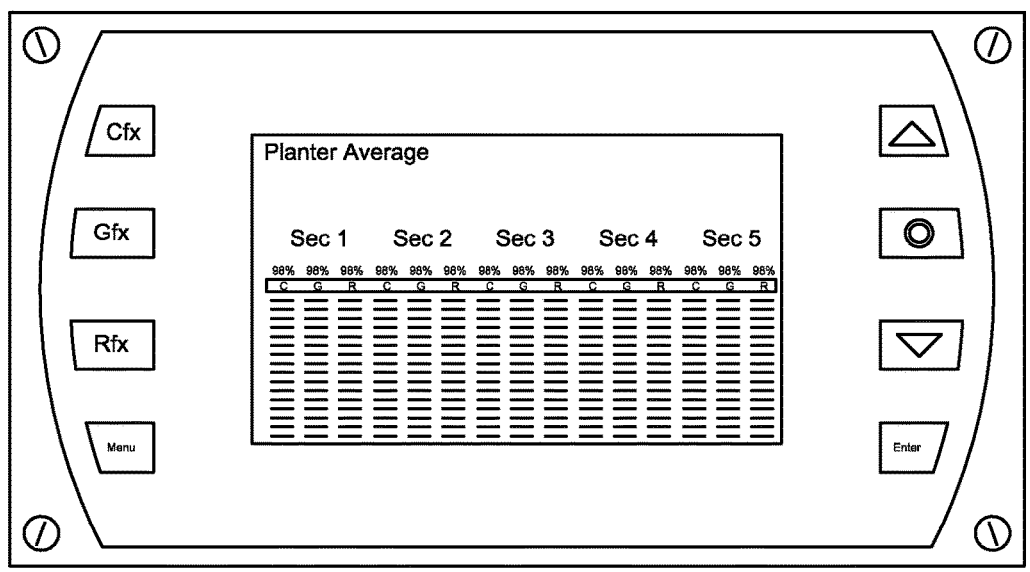
FIG. 66B is an exemplary display depicting real-time graphics of one or more performance metrics relating to a tool as it is moving across a field.

FIG. 66A shows an in-cab interface when the implement is stationary, and FIG. 66B shows an exemplary display when the implement is moving across a field. In this particular example, the implement has five sections of row units. The display for each section includes three columns, one for each of the three different actuators included in each row unit. In this example, the actuators are identified as "C" for a coulter, "G" for clearing wheels, and "R" for the row unit, and the bars in the respective columns represent the average performance of all the actuators of each of the three types in the row units in the identified section. The display for each column is a vertical column of small horizontal bars. In FIG. 66A, none of the bars is illuminated because the implement is stationary. In FIG. 66B, the bars are depicted as illuminated uniformly but, as described in detail below, one of the bars in each column will be illuminated more brightly and with a color different from the other bars in that column, with the vertical position and color of that bar graphically indicating the average performance level of the corresponding tools in the row units in that particular section.

At the top of each column, a displayed number represents the current average performance of the corresponding is in the row units in that particular section, where 100% performance represents sensor signals that cause the controller to produce an output signal that does not require any changes in the respective actuators for that type of tool in the row units in that particular section. For example, in Section 1, the 98% at the top of column "C" means that the average value of the outputs of the actuators for the coulters in the three row units in Section 1 has been within 98% the respective target values for those actuators during the time interval used to compute the average value. The time interval used to compute the average values is typically a sliding window that is 2 to 5 minutes long, during about 120 to 300 sensor readings are taken for each actuator.

Figure 66C:
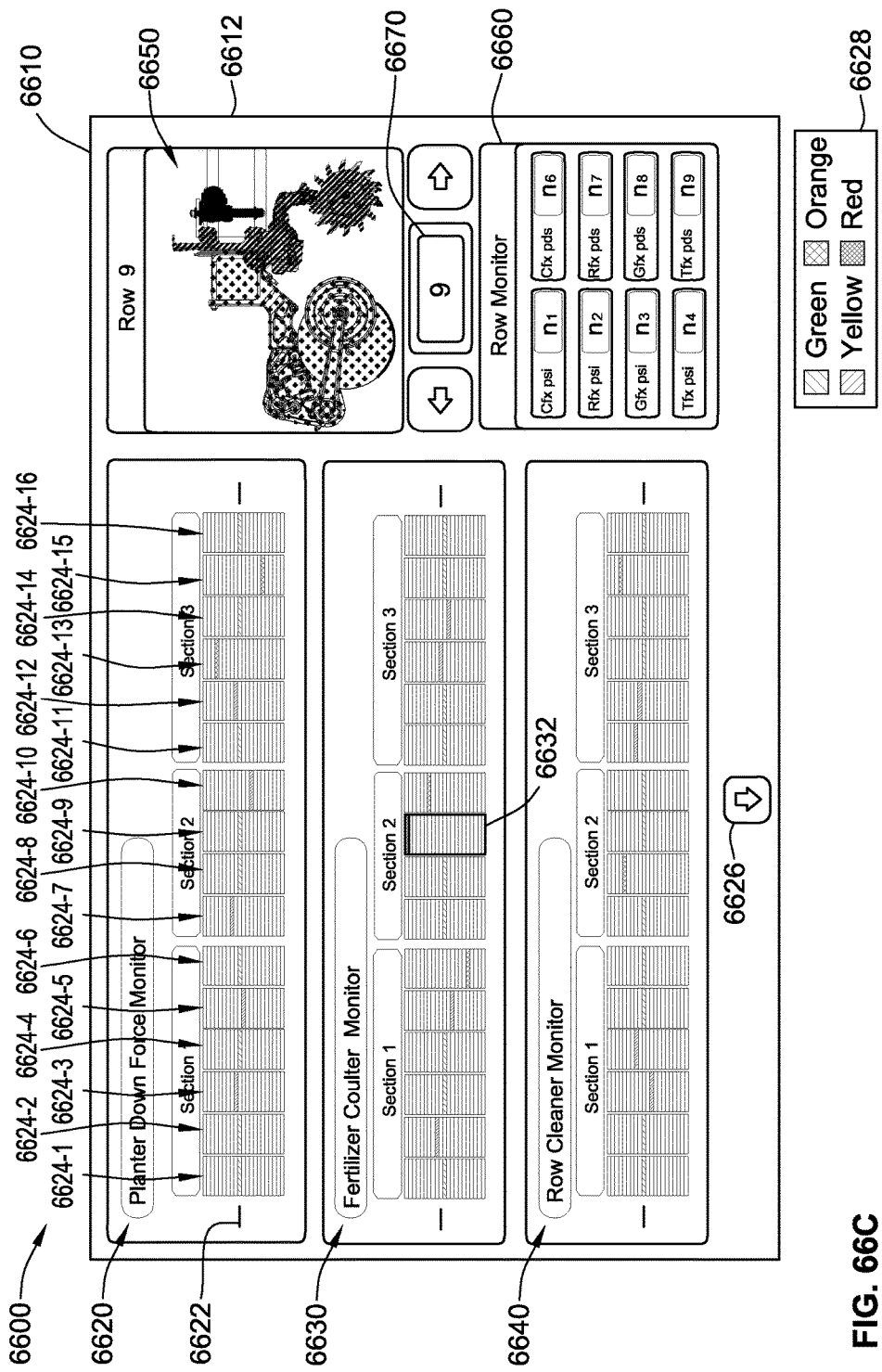
FIG. 66C is an exemplary display depicting a modified screen for monitoring one or more parameters associated with one or more tools across all the row units of a planter.

FIG. 66C depicts an exemplary screenshot 6612 of a modified display on a video display 6610 in a monitor system 6600 for an agricultural machine such as an agricultural seed planter (e.g., a planting unit 10, a fertilizer/opener unit, a strip-till cleaner unit, a full-width tillage unit, or any other agricultural machine for which a judgment about how much depth penetration of soil is needed or desired). The monitor system 6600 includes a controller, such as the controller 112, 2613, 2626, 4112, 4420, or the main controller 915, central processor 2614, 2627 or master controller 2650, or any other controller or processor described herein. The controller used to control the displays shown in FIGS. 66A-66E is a controller specially programmed with machine-readable instructions embodied in software and/or firmware to perform the row monitoring aspects described in connection with FIGS. 66A-66E.

As described above, the row planting unit 10 includes multiple row units, such as 16 in number. Each of the row units has a soil-engaging tool 2202, such as a coulter (e.g., a fertilizer coulter) or V-opener or furrow-opening disk or coulter 11, 711, 800, 2112, 3015 (sometimes called CFX™ herein), a row cleaner 2122, 2222 (sometimes called GFX™ herein), and/or a closing wheel 2114, 2214 (sometimes called TFX™ herein). Each of the row units also includes one or more actuators (typically multiple actuators), such as any combination of a hydraulic actuator 2120, 2220 that actuates the row unit, and one or more modular actuators 2420 which cause the soil-engaging tools 2202, 2104, 3015, 2122, 2114 to be urged toward earth (e.g., the soil) according to an actuator signal received from the controller. If there are multiple soil-engaging tools in any given row unit, then the row unit preferably has one actuator for each soil-engaging tool. Thus, if there are four soil-engaging tools on a row unit, then there are four separate actuators, one for each of the four soil-engaging tools. A "soil-engaging tool" is a tool (or implement) that is configured to engage soil or earth under control of a control system.

In some aspects, the planting row unit itself includes one or more tools or implements, such as any combination of a coulter, a gauge wheel, a hardness sensor disk or wheel, and the like. Each "tool" is associated with at least one actuator that controls the one or more tools mechanically coupled to that actuator. To avoid confusion, the row unit itself (whether it is a planter type, a fertilizer type, a strip-till cleaner, a full-width tillage type, etc.) can be considered a tool or implement, such as when it has a gauge wheel or a coulter or the like attached to it. However, in other aspects, each tool can be independently actuated by its own respective actuator, and the graphical user interfaces shown and described herein enable the operator to separately monitor at least one measurable parameter for each such tool on the row unit. Thus, when describing a row unit herein as having or including a soil-engaging tool, it is more accurate to say that each row unit has one or more soil-engaging tools "associated with" the row unit.

Each of the row units includes one or more sensors, such as the position or ground-hardness sensors, pressure sensors, load cells or strain gauges described above. Each sensor measures a parameter related to or indicative of the force or pressure exerted on the mechanism associated with one of the actuators or the position of that mechanism. Each sensor provides an electrical signal indicative of the measured parameter to the controller. The measured parameter can be a force or pressure, or a position related to a distance traveled by the soil-engaging tool, such as a depth of soil penetration by the soil-engaging tool. For example, when the sensor is a position sensor, the measured parameter can be a position related to a distance into the soil penetrated by the soil-engaging tool, e.g., the position can include an angular displacement or distance (e.g., height relative to earth) between the soil-engaging tool, on one hand, and ground or a reference structure on the row planting unit 10, on the other hand. When the sensor is a pressure sensor, the parameter can be a force or a pressure. Force and pressure are related quantities, so these terms are used interchangeably herein. Again, there is preferably one sensor for each soil-engaging tool of the row unit. Thus, if there are four soil-engaging tools on a row unit, then there are four separate sensors, one for each of the four soil-engaging tools. Note that there can be more than one sensor that measures different parameters relating to the same soil-engaging tool. In aspects of the present disclosure, a minimum of one sensor is provided for each soil-engaging tool in each row, though any number of sensors can monitor multiple parameters relating to the soil-engaging tool, such as soil hardness of the soil engaged by the tool, soil moisture, downforce on the tool, load on the tool, vertical position of the tool relative to the surface of the soil, angular position of the tool relative to a fixed reference structure, pressure on the tool, geographic location or position of the tool (e.g., GPS coordinates), and the like.

The video display 6610 is coupled to the controller, which executes machine-readable instructions stored on one or more non-transitory storage media. The machine-readable instructions can be implemented as firmware or software or both and stored on the one or more non-transitory storage media. The controller causes the video display 6610 to display graphical elements thereon, and a conventional touch-sensitive interface (not shown) can be coupled to or integral with the video display 6610 to receive human inputs corresponding to selections of selectable elements displayed on the video display 6610. In the example shown in FIG. 66C, the video display 6610 displays in real time as the row units are moved along the earth, row monitor graphical representations 6620, 6630, 6640 that indicate deviations of measured values from target values for different actuators on each of the 16 row units. The planting row unit preferably maintains a consistent soil depth penetration across the field being planted so that the seeds are planted a consistent depth into the soil, e.g., 3 inches, depending on the crop being planted. Thus, the measured values can be ultimately related to actual soil penetration depths as measured by the sensor(s), and the target values are related to a desired soil penetration depth as a function of the crop being planted. For example, the measured value can correspond to $Z_{ACT}$, described above in connection with FIGS. 40A and 40B, and the target value can correspond to $Z_{THEOR}$, described above in connection with FIGS. 40A and 40B.

In the exemplary screen shot in FIG. 66C, there are sixteen row units grouped into three sections, labeled Section 1, Section 2, and Section 3, respectively, though any other textual or graphical label can be used to indicate the different sections. The first Section 1 includes six row units, the second Section 2 includes four row units, and the third Section 3 includes six row units. The number of row units in each of the sections is merely exemplary, and any number of sections can be predefined or defined by the operator of the row planting unit 10, where the number of sections does not exceed the number of row units. Similarly, any number of row units can be predefined or defined by the operator of the row planting unit 10, where the number of row units in a section does not exceed the total number of row units in the row planting unit 10. No one row unit can be defined to be a member of more than one section.

The row monitor graphic representations 6620, 6630 and 6640 represent actuators on each of the respective row units. In this example, the row monitor graphical representation 6620 shows measured parameter deviations for an actuator acting on the row unit frame in each of the sixteen row units. The row monitor graphical representation 6630 shows measured parameter deviations of a fertilizer coulter implement for each of the sixteen rows. The row monitor graphical representation 6640 shows measured parameter deviations of a row cleaner implement for each of the sixteen rows. The screen shot 6612 includes a button 6626, which can be actuated through the touch-sensitive interface to show additional tools or implements, such as a cleaning wheel implement. As explained above, each row unit includes a hydraulic actuator 2120, 2220 that actuates the planting row unit 10 as a whole, and the deviation of the measured parameter from the target parameter is shown for each of the row units in the topmost graphical representation 6620.

The screenshot 6612 also includes a target line 6622 that indicates the desired value of a measured parameter on the row monitor graphical representation 6620. In this example, the measured parameter deviation (i.e., an indication of whether and how much the measured parameter deviates from the target parameter) is displayed as an illuminated horizontal bar (though any other graphical representation can be used) in real time as the sixteen row units are moved along the earth. Each of the sixteen row units is shown as one of sixteen vertical columns 6624-1 through 6624-16, each of which graphically resemble a measurement meter for each of three different actuators in the three windows 520, 6630 and 6640.

The target line 6622 bisects each of the vertical meters 6624-1 through 6624-16 such that a deviation above the target line 6622 means that too much force or pressure is being applied by the corresponding actuator, and a deviation below the target line 6622 means that too little force or pressure is being applied by that actuator. Alternatively, a deviation above the target line 6622 can mean that too little force or pressure is being applied by the corresponding actuator, and a deviation below the target line 6622 can mean that too much force or pressure is being applied by that actuator. The target value for each soil-engaging tool can be predetermined and stored in the one or more non-transitory storage media. Such target values are well known to or readily ascertainable by those of ordinary skill in the art to which the present disclosure pertains, and can be dependent upon the type of crop being planted by the row planting unit 10.

In the "Planter Down Force Monitor" window 6620 in the display shown in FIG. 66C, the measured parameter deviation for each of the sixteen rows is shown in a color that represents the extent of the deviations between the measured value and the target value for each planter row unit 10. For example, the color green can be used to indicate that the measured value is within an acceptable range above or below the target value, e.g., a percentage deviation of +/−10% to +/−20% from the target value; the color yellow can be used to indicate that the measured value exceeds but does not maximally exceed the acceptable range, e.g., a percentage deviation of +/−20% to +/−40% from the target value; and the color orange can be used to indicate that the measured value maximally exceeds the acceptable range, e.g., a percentage deviation of +/−40% to +/−80% from the target value. When the measured value exceeds the target value by more than +/−80%, the color red can be used to indicate a tool malfunction.

The operator can touch any of the measurement meters corresponding to the row units to select that row unit or tool for a more detailed display in windows 6650, 6660 and 6670 on the right-hand side of the display screen. In the example shown in FIG. 66C, the operator has selected the fertilizer coulter in the ninth row by touching the meter 6632 in the graphical representation 6630. Thus, the controller causes the window 6650 to display a graphical portrayal of the soil engaging tool(s) on the ninth row unit. In this example, two soil-engaging tools are shown in the graphical portrayal 6650, a row cleaner implement (GFX™) and a fertilizer coulter implement (CFX™). Again, fewer or more tools or implements can be displayed by the monitor system, such as a closing wheel implement (TFX™). The displayed soil-engaging tools are shown in colors corresponding to the colors of the latest measured values for the respective tools for the ninth row unit in the meter windows 6620, 6630 and 6640. For example, here, the fertilizer coulter is shown in red, indicating a tool failure or malfunction, and the row cleaner and the row unit down force actuator are shown in green, indicating operation within an acceptable range. A legend 6628, which is not displayed on the video display 6610, is shown in FIG. 66C to aid the reader in correlating the black-and-white symbol patterns with the displayed color.

The display window 6660 displays the latest numerical values measured for each of the tools or implements for the selected row or for the row unit (RFX™) (in this example, the ninth row). In this example, the representations are shown as values in psi (pounds per square inch) and corresponding values in pds (pounds, at the bottom of the implement where it engages the soil) for four tools. Here, a closing wheel tool is not shown on the screenshot 6612, but the operator can use the button 6626 to scroll down to see a row monitor graphical representation for the closing wheel (referred to as "Tfx" in FIG. 66C). One of tne of the row monitor graphical representations 6620, 6630, 6640 may disappear from view to make room for the new row monitor graphical representation. The values n1-n4 in the row monitor window 6660 represent the values in psi measured by the sensors associated with each of the four tools in the ninth row, and the values n6-n9 represent the values in pounds corresponding to the measurements by the sensors associated with each of the four tools in the selected row (here, the ninth row). These values n1-n4 and n6-n9 change in real time as the implements are moved along the earth by the row planting unit 10. Here, the different tools are as follows: Cfx refers to a fertilizer coulter or opener tool, which is monitored in sixteen different rows in the row monitor graphical representation 6630. Rfx refers to a planter row unit, which is monitored in sixteen different rows in the row monitor graphical representation 6640. Gfx refers to a row cleaner tool, which is monitored in sixteen different rows in the row monitor graphical representation 6620. Tfx refers to a closing wheel tool, whose row monitor graphical representation is not shown in this screenshot 6610.

The screenshot 6612 includes a button 6670 that indicates a row number (here, 9), which corresponds to the row unit selected by the operator as described above. As the row units are being moved along the earth, the operator can select, via the touch-sensitive interface, the button 6670 to change the row unit.

Figure 66D:
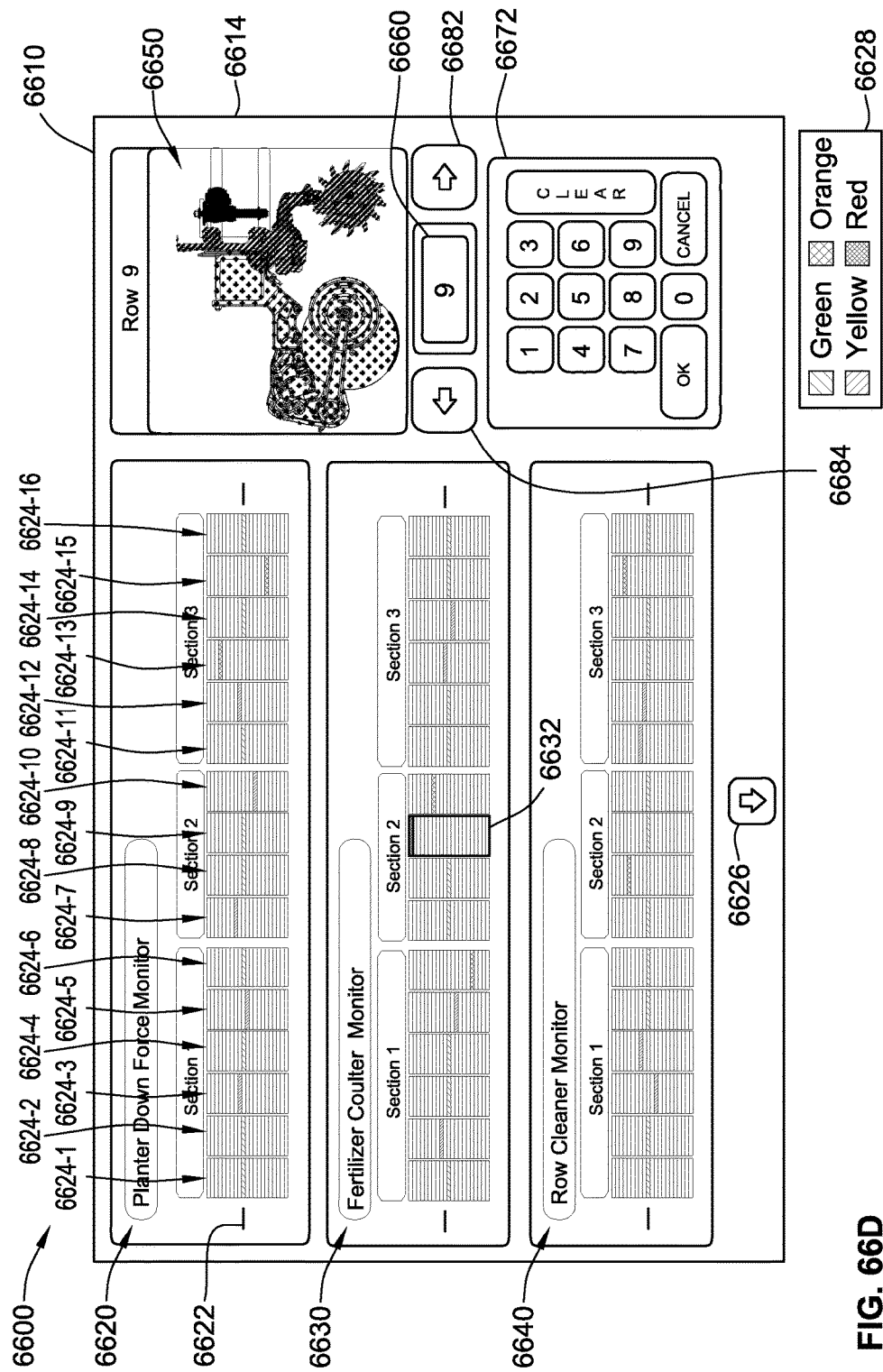
FIG. 66D shows an exemplary number keypad that can be used by the operator to quickly select a row unit for immediate monitoring as the row units are being moved across a field.

FIG. 66D illustrates an example screenshot 6614 that is displayed in response to the operator's selecting the button 6670 shown in FIG. 66C. A number keypad 6672 is shown, and the operator can enter a new row unit number using the keypad 6672, and then press the OK button 6674 to cause a different row unit (e.g., the first row unit) to be displayed as the graphical portrayal 6650 and the measured parameters for the soil-engaging tools for the newly selected row unit to be displayed in the row monitor window 6660. Alternately, instead of selecting the button 6670, the operator can sequentially cycle to the next row by selecting button 6682 or to the previous row by selecting button 6684. The keypad 6672 allows the operator to jump quickly to any desired row number, and this feature enhances the user experience as the number of row units increases. For example, if the operator is currently monitoring row unit number 2, and desires to start monitoring row unit number 16, the keypad 6672 allows the operator to quickly begin monitoring row unit number 16 without having to press a button multiple times. Or, the operator can simply touch, via the touch-sensitive interface relative to the video display 6610, one of the vertical columns 6624-1 through 6624-16 for any of the soil-engaging tools to begin monitoring parameters being monitored by that row unit in the row monitor window 6660. By presenting the operator with multiple ways of easily selecting any tool in any row, the operator can quickly monitor those parameters without having to slow down or stop the row planting unit 10 or focus prolonged attention on the video display 6610, which would otherwise lead to a loss of efficiency, unnecessary distraction, or even an accident. For example, if the operator is monitoring row unit 2 as the row planting unit 10 is moving along the earth, and suddenly the column for the row cleaner tool in row number 15 indicates a red color indicating a potential tool malfunction, the operator can quickly either touch the column (6624-15) for the graphical representation 6640 for the row cleaner tool to immediately begin monitoring in real time the parameter values being measured by the one or more sensors associated with the row cleaner tool in that row.

Figure 66E:
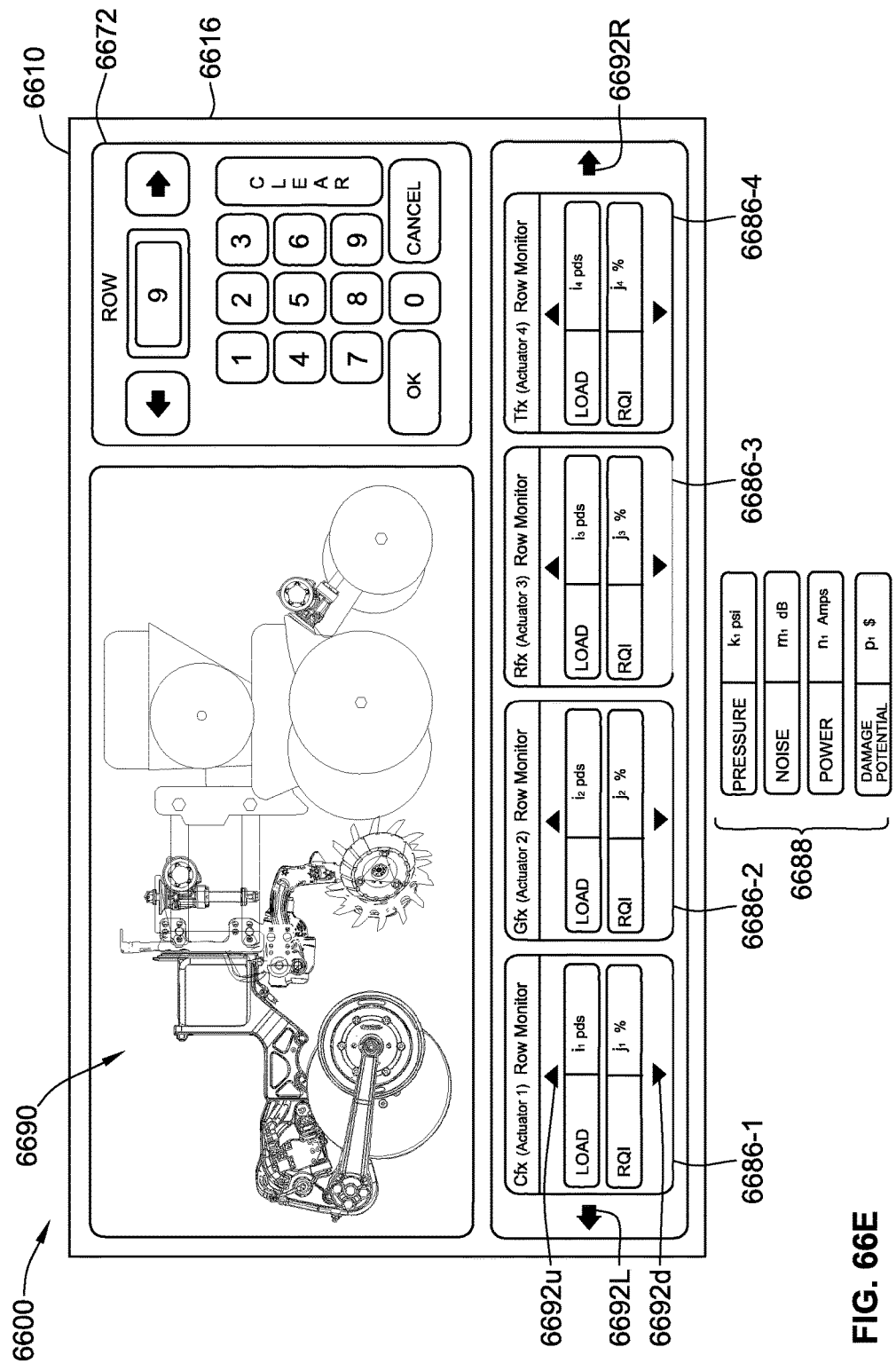
FIG. 66E is an exemplary display depicting an exemplary row diagnostics screen with tool parameter monitor windows.

FIG. 66E illustrates an example row diagnostic screen 6616 displayed on the video display 6610. This screenshot 6616 includes a graphical representation 6690 of the row planting unit 10 for the selected row (number 9 in this example). The row diagnostic screen 6616 also displays four tool parameter monitor windows 6686-1 through 6686-4 and the keypad 6672. Each of the tool parameter monitor windows 6686-1 through 6686-4 includes an up arrow 6692*u* and a down arrow 6692*d*, which allows the operator, via the touch-sensitive interface, to scroll through various measured or calculated parameters associated with the respective tool. For example, the tool parameter monitor window 6686-1 corresponds to a fertilizer coulter tool (called Cfx in FIG. 66E), and displays a load parameter in pounds and a ride quality index (RQI) in percent. The load can be measured by one or more of the sensors associated with the tool, and the RQI can be calculated from the measured load. The up and down arrows 6692*u*, 6692*d* allow the operator to scroll through additional parameters, shown below the screen 6672 in block 6688. Block 6688 is not actually displayed on the screen 6616 until the operator scrolls through to them. Rather, for ease of illustration, the block 6688 is shown below the screen 6616 and portrays additional parameters that can be monitored by the operator in the row diagnostic screen 6616. For example, the pressure on the tool in psi can be monitored, the noise in the tractor cabin in dB can be monitored, the power utilized by that row unit or by that tool can be monitored in amps or watts, and the potential monetary damage caused by a particular tool malfunction, for example, can be calculated and displayed as a dollar amount. The monetary damage can be calculated as a function of the number of time units a tool has malfunctioned, for example, and a predetermined amount of revenue derivable by time unit and stored in the one or more storage media accessed by the row monitor controller.

Three other tools are also shown on the row diagnostic screen 6616. Multiple measured or calculated parameters associated with the row cleaner tool in row unit number nine is shown or can be accessed by selecting, via the touch-sensitive interface, the up or down arrows 6692*u*, 6692*d* in the tool parameter monitor window 6686-2, multiple measured or calculated parameters associated with the planter tool in row unit number nine is shown or can be accessed by selecting the up or down arrows 6692*u*, 6692*d* in the tool parameter monitor window 6686-3, and multiple measured or calculated parameters associated with the closing wheel in row unit number nine is shown or can be accessed by selecting the up or down arrows 6692*u*, 6692*d* in the tool parameter monitor window 6686-4. Additional tools in row unit number 9 can be accessed by selecting, via the touch-sensitive interface, the left or right arrows 6692L, 6692R on the row diagnostic screen 6616. Alternately, the left and right arrows 6692L, 6692R can be used to move sequentially between adjacent row unit numbers. For example, when there are four tools in each row unit, then all four tool parameter monitor windows 6682-1 through 6682-4 can be shown on one screen 6616, allowing the left and right buttons 6692L, 6692R to be used to cycle through the next or previous row unit. Alternately, the operator can use the keypad 6672 on the row diagnostic screen 6616 to jump to any row unit number or cycle to an adjacent row unit.

Figure 70:
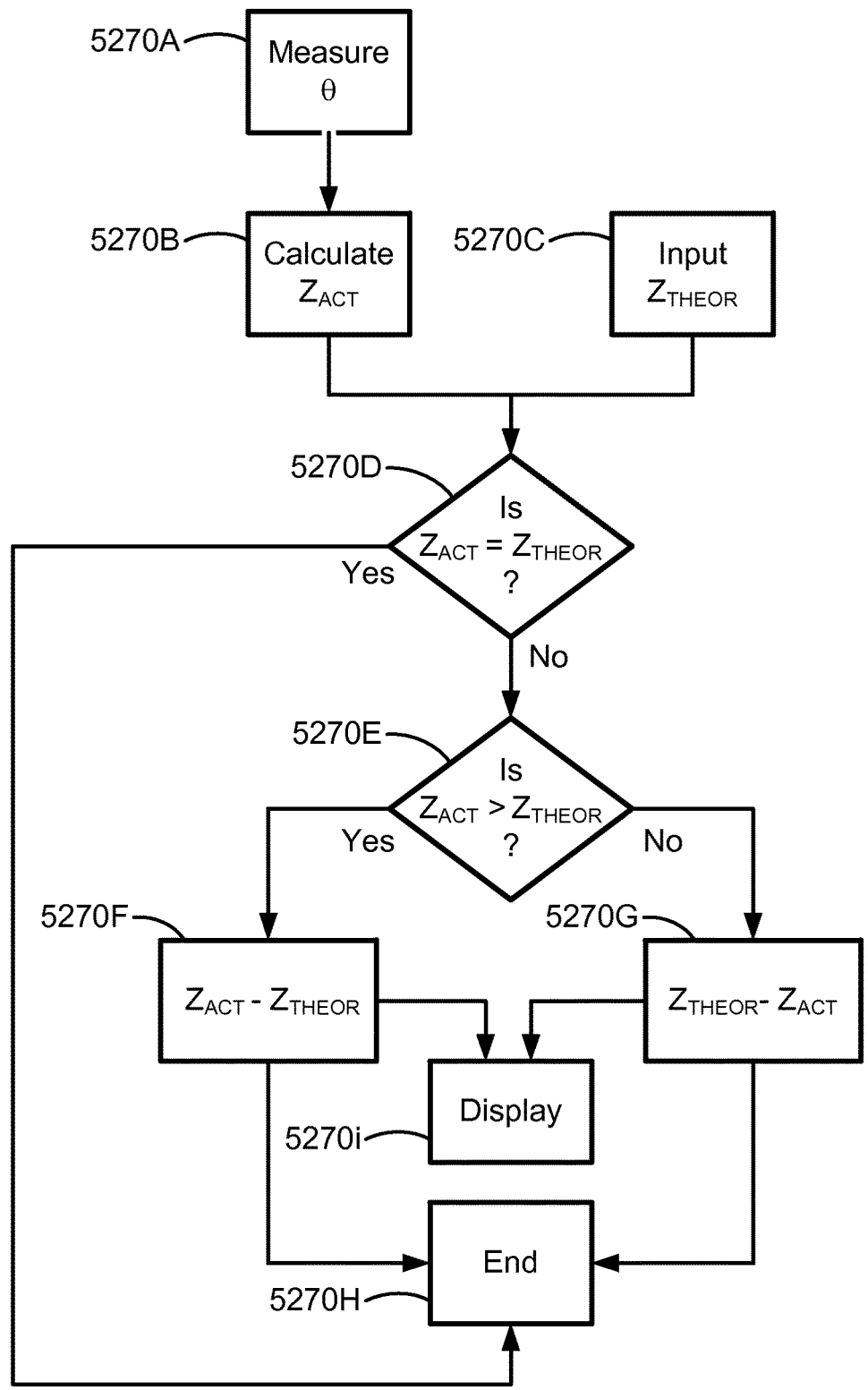
FIG. 70 is a flowchart of an algorithm that can be used in connection with FIG. 40B.

As depicted in FIG. 70, the algorithm described above in connection with FIG. 40B may be modified to produce the values ($Z_{ACT}-Z_{THEOR}$) and/or ($Z_{THEOR}-Z_{ACT}$) at steps 5270F and 5270G for display at step 5279*i*, to provide a visual display of the difference between the current actual depth $Z_{ACT}$ and the theoretical depth $Z_{THEOR}$.

Figure 67:
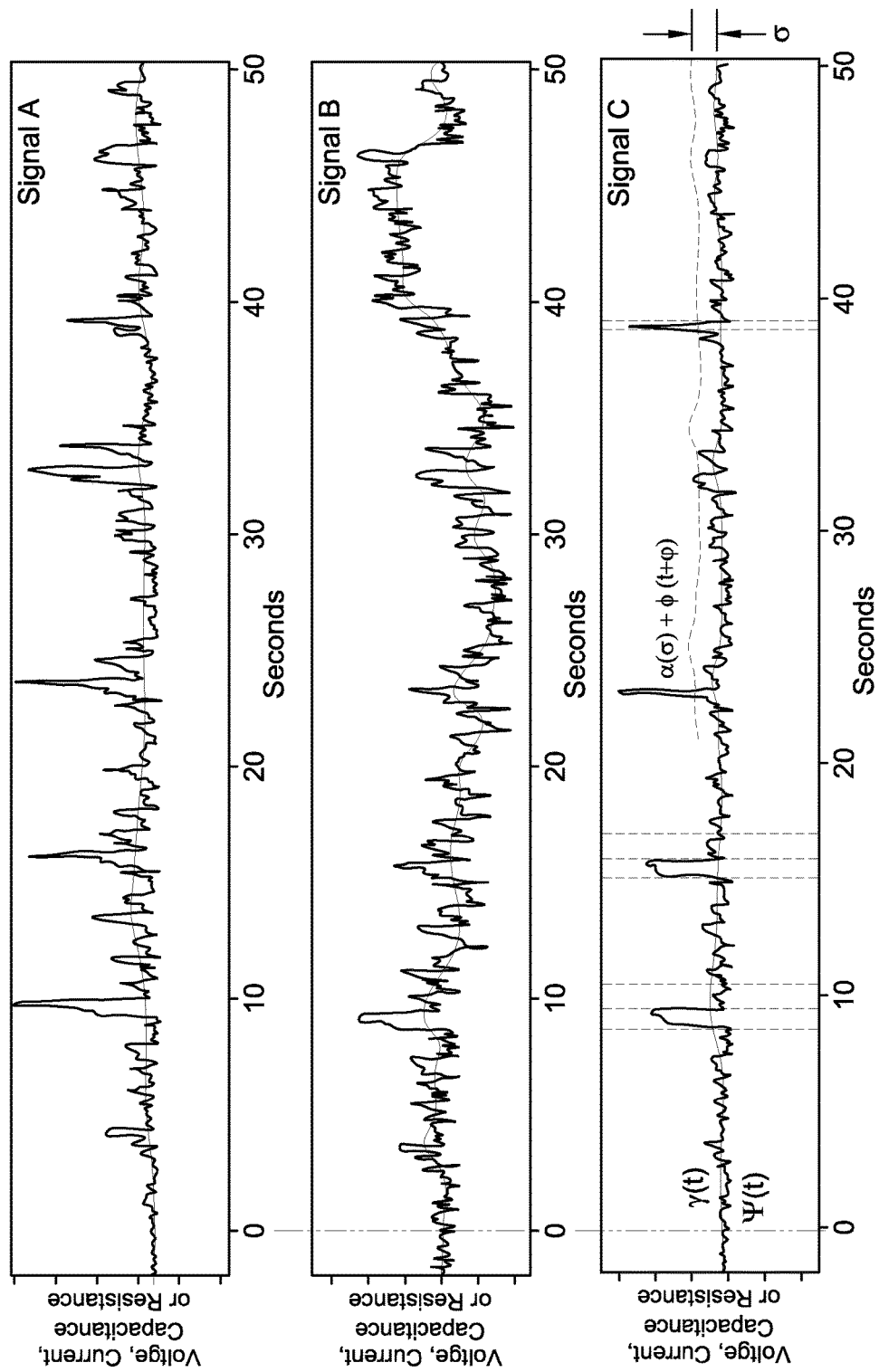
FIG. 67 is a series of plots representing the variations in electrical parameters representing the performance of an implement as it traverses an agricultural field.

FIG. 67 is an example of possible input signals from a sensor associated with a tool of or associated with a row unit. Some periodic oscillations are typical of a real world environment. Ridges are formed in the field from any number of soil handling operations, and would be apparent from the signal received from the position sensors. These small oscillations are easily removed, and transformed into a smooth, usable signal by averaging over some time period, and using that averaging as a smoothing operation. In some cases the implementation of a low pass filter, or other noise cancelling process can be implemented to further smooth the signal output to the actuator. It is important that any tool smoothly, and consistently follow ground contours. Such an operation requires a smooth consistent signal from the row controller. In FIG. 67, $\psi(t)$ is an example of a real-time signal (e.g., in volts, amps, capacitance, or resistance) being received from the position sensor. $\Phi(t)$ is a smoothed signal to be used a base signal for output to the various actuators.

As has been mentioned previously, massive or immovable objects can be encountered in the field. It is important to detect significant spikes and to remove them from the signal. To that end, one method of sensing a spike is running a differentiation process on the input signal, $\psi(t)$, and determining the slope of a function over a time period. If there is a rapid change in slope over a relatively small period of time, it can be assumed that the unit has contacted a massive object. In response, the controller can stop taking measurements from the row unit. After detecting the spike, the controller reverts to a recently generated average signal and hold. After a short time, the controller once again begins sampling the signals from the various row sensors. Eliminating these spikes from the input signal greatly reduces the potential for excess down force on a tool encountering a massive object, which can otherwise greatly reduce the life of a tool.

Another method of eliminating spikes is to average over some time period and check a phase-shifted multiple of the original signal. As an example, a "cutoff" point may be 1 or 1.5 standard deviations at any given time. The phase shift allows the controller to use a recent signal to eliminate any significant spikes.

Figure 68:
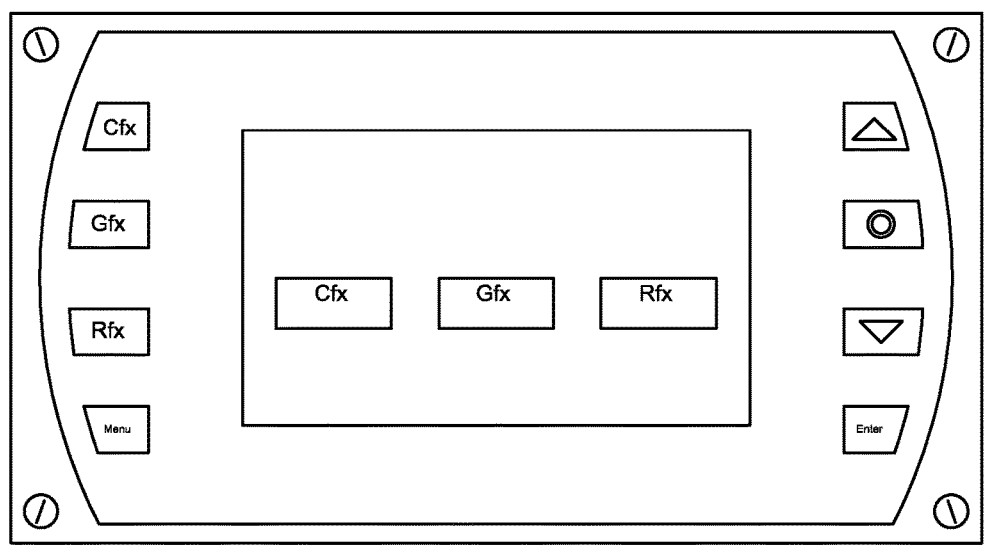
FIG. 68 is an exemplary touch-screen display depicting a control panel for use by an operator to select the type of tool to be monitored on the display.

FIG. 68 is an exemplary touch-screen display depicting a control panel for use by an operator to select the type of tool to be monitored on the display.

FIG. 69 is an example of an exemplary interactive map screen. Here, signals of interest are pictorially represented, such as by a most-likely pattern match, on the monitor (e.g., rock, waterway, terrace.). They can be outlined or highlighted in red to be readily identified as a potentially troublesome obstacle. Chart 5026 illustrates a possible pictorial representation of tire tracks from a grain cart, combine or tractor tire, or may also represent a pivot track from an irrigation rig. Chart 5027 illustrates an impassable obstacle, like a roadway, or other solid immovable obstacle. Chart 5028 illustrates a massive infield obstacle such as a rock, fencepost or other in-field object. Chart 5029 represents excessive moisture, or waterway in the path of a particular tool. Chart 5030 is an example of a local anomaly, such as a sand boil, or a rock pile. Chart 5131 is an area of light residue. An area of light residue is of interest, because it may represent an area of poor crop performance, or an area prone to erosion. Chart 5032 represents a terrace, or other zone where the implement may or may not be returning usable consistent signals. Chart 5033 represents contours of variation both in soil density and in moisture content. Such areas are frequently referred to as management zones. These areas are interactive, and can be closely analyzed. Selecting the contour in a particular spot can give some local information about soil type, rock pressure, and moisture levels. To help illustrate, FIG. 69 includes a key showing various in-field conditions graphically. Beside each graphic representation is a possible associated signature signal of a particular in-field obstacle or condition. Signals from position sensors, load sensors and pressure transducers all have signature signals that reflect the engaged media. This system identifies the signature signal of interest, and produces a graphical representation of the condition on the map.

Aspects of the present disclosure relate to an agricultural implement row unit controller (computer), which is integrated row-by-row, or by section-by-section, for automated control over corresponding actuators of a primary ground engaging tool, and its auxiliary components or attachments, or a group of attachments or tools, for example, any combination of a vee-opener type planter row unit, a fertilizer coulter, a row cleaner, and a closing wheel.

A signal processor operates on input signals from one or more row unit-mounted sensors, and sends the generated output signal to one or more row units, and their auxiliary tools actuators, such as, for example, signals received from position sensors on one or more tools, signals received from pressure transducers on one or more tools, signals received from load sensors of one or more tools, a signal sent to a vee-opener type planter row unit down force actuator, a signal sent to a row cleaner actuator, a signal sent to a fertilizer coulter actuator, a signal sent to a closing wheel actuator.

Aspects of the present disclosure also relate to methods of signal processing that recognizes signature waveforms unique to a particular field condition—a "signal of interest." Input signals are simultaneously integrated and differentiated to identify local maxima, and minima, and their associated areas over an experimentally determined time period. Discrete-time optimal control operations (e.g., a Monte Carlo algorithm) can provide additional corrections for signal recognition. This signal includes information from a position sensor, a laser rangefinder or other sensor designed to measure relative displacement of a ground engaging device, and its depth gauging member, or a combination of such devices. This method also identifies errors due to sensor malfunction by noting that the data stream is absent, or outside of specification, and in some cases may be used to identify mechanical failures of a particular tool. Signature waveforms unique to a particular condition can be used in combination with the forward speed of the tractor, and a GPS signal to create a map that identifies field conditions, and presents the operator a data stream that can correlate to a map with graphical representations of a particular conditions.

A signal of interest can be, for example, a spike from a massive in-field obstacle identified by a slope approaching infinity over a time period proportional to the product of an averaged in-field obstacle length, and an averaged implement velocity; or a signal of interest can be the signature area, over a predetermined time period, of a semi-regular, semi-repeating signal unique to a particular soils characteristics, such as dry bulk density, wet bulk density, porosity, volumetric water content/saturation, particle size distribution, intergranular contact forces, and shear stress.

Another method of signal correction employs the input signals of existing implement (tool) sensors, and other supplementary sensors to verify that the primary signal generator is functioning properly, and provides additional corrected signals that can be superposed into the base signal to ensure output signals properly affect a given actuator. For example, the signal from a load pin installed on the stops of a gauge wheel on a vee-opener type planter row unit, or the signal of a pressure transducer installed on a hydraulic actuator can be monitored. These signals correct a primary input signal from a position sensor or other displacement sensor, mounted on an opening coulter, which is leading a planter row unit.)

Another aspect includes a system of cameras, mounted on or near a row unit, or section of row units, and oriented so that a particular row unit, or section of row units can be visually inspected remotely. This system has the ability to snap still photographs to be analyzed either in real-time, or for reference later to assist in the development of a field maintenance plan.

A graphical user interface (GUI)/computer collects row controller information via a vehicle bus, and simultaneously displays input and output information of an agricultural implements row units sensors and unit controllers, and the sensors of the row units auxiliary components. This display shows information on any number of row unit actuators either row-by-row or by section averages, such as shown in FIGS. 66A-66E. The operator can select a particular tool or tool set, using a simple graphical representation of the tool, or a text description of a tool to monitor a particular tools performance, and make judgments on whether to address errors returned by a local row controller, or if it is more profitable to keep the implement moving (see FIG. 66E), and address the error after planter consumables have been depleted and the implement is stopped. This interface is customizable to allow the user to prioritize toolsets by their individual criteria of importance. This interface also allows for on-the-go changes to the signal processing of the individual row controllers. The GUI may also display a photograph of an erring unit by employing the feed of cameras mounted either row-by-row, or by section, granting the user the ability to visually inspect, and make judgment calls on the importance of addressing a particular error, or if it is more profitable to continue the operation despite the error. For example, any combination of the following can be displayed: the simultaneous display of the overall performance, power consumption, system pressure, errors, and profit loss based on the signals received from the sensors of a row crop planters: actuated fertilizer coulters, actuated row cleaners, actuated row unit down force, gauge wheel depth regulators, actuated closing wheels, and also the customizable display of additional supplemental, or preexisting sensors.

A user alert system recognizes errors streaming in from the vehicle bus and alerts the operator remotely. This alert system uses existing mobile platforms to send error information to any number of e-mail addresses, or text enabled wireless devices such as tablets, or mobile phones. This allows both operators and farm managers to be aware of onboard malfunctions as they occur. This system also works in tandem with the camera system to issue a command to a particular camera to generate a visual record of the error.

A system of mapping, created from an incoming data stream from the primary monitors computer, which presents field condition maps, graphically represented on a GUI either in-cab, or on a remote computer. This map exploits the information collected from the pattern-recognition algorithm to make semi-realistic, graphical representations of field conditions. These representations are selectable and the user can zoom-in on a particular area to allow for a better understanding of the level of profit loss that may be associated with a particular field condition. The map would allow to zoom out to view and entire field, or set of adjacent fields, or zoom in for detailed analysis, such as the identification, and graphical representation of rocks, waterways, terraces, sand boils, residue levels, tire tracks, grain cart tracks, or any other condition that may require a change to a particular operation, or may require field maintenance.

A system for sensing, using either a photogate, a sonogate, a laser rangefinder or other such device, to directly detect the change in radius on a gauge wheel as it builds with mud and residue, or sheds mud and residue. This signal is processed to be sent to an actuator that regulates the depth stops on a farm implements depth gauging element. As an alternative, a sensor that detects angular frequency may be used for example, in the case of a gauge wheel, as the angular velocity decreases, it is proportional to an increase in radius, and hence mud or debris on the wheel. This signal can then be used to determine the proper setting on the stops of the gauge wheel. Additionally, variations in optimum depth for a agricultural implement may change as the implement moves through the field, this system allows for on-the-go variations in planting depth to optimize seed placement for a particular set of field conditions.

An actuator that regulates the relative displacement between the lowest members of a ground-engaging tool, and that tools depth-gauging member. This actuator would use receive signals from the sensors to ensure a gauging member of its associated tool has the ideal displacement from the ground-engaging member. This actuator may be hydraulic, or electric in nature, and is robust enough to accommodate the instantaneous forces associated with a particular agricultural implement.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A system for separately controlling a down force on each of a plurality of different tools on each row unit of an agricultural implement having multiple row units, said system comprising
    a plurality of hydraulic cylinders in each of said row units for applying a separately controllable down force to each of said tools,
    a plurality of separate control valves each of which is coupled to one of said hydraulic cylinders,
    a plurality of sources of pressurized hydraulic fluid each of which is coupled to one of said control valves for supplying pressurized hydraulic fluid to said control valves, and
    an electrical controller coupled to said control valves for supplying a separate control signal to each of said control valves to permit remote adjustment of the down force applied to each of said tools.

2. The system of claim 1, in which said separately controllable down forces for each row unit are applied to at least two different tools.

3. The system of claim 1, which includes a manifold receiving pressurized hydraulic fluid from said sources and distributing said pressurized fluid to said hydraulic cylinders via said control valves.

4. The system of claim 1, which each of said hydraulic cylinders urges a separate tool downwardly with a controllable force that is adjusted for different soil conditions.

5. A method of separately controlling a down force on each of a plurality of different tools on each row unit of an agricultural implement having multiple row units, said method comprising
    applying a separately controllable down force to each of said tools via a plurality of hydraulic cylinders, each of which is coupled to one of said tools,
    supplying pressurized hydraulic fluid from a source of pressurized hydraulic fluid to a plurality of control valves each of which is coupled to one of said hydraulic cylinders, and
    supplying a separate control signal from an electrical controller to each of said control valves to permit remote adjustment of the down force applied to each of said tools.

6. The method of claim 5, in which said separately controllable down forces for each row unit are applied to at least two different tools.

7. The method of claim 5, which includes receiving pressurized hydraulic fluid in a manifold on each of said row units and distributing said pressurized fluid from said manifold to said hydraulic cylinders via said control valves.

8. The system of claim 5, in which each of said hydraulic cylinders urges a separate tool downwardly with a controllable force that is adjusted for different soil conditions.

* * * * *